United States Patent [19]

Minovitch

[11] Patent Number: 4,624,109
[45] Date of Patent: Nov. 25, 1986

[54] CONDENSING ATMOSPHERIC ENGINE AND METHOD

[76] Inventor: Michael A. Minovitch, 2832 St. George St., Los Angeles, Calif. 90027

[21] Appl. No.: 522,847

[22] Filed: Aug. 12, 1983

Related U.S. Application Data

[63] Continuation-in-part of Ser. No. 297,087, Aug. 27, 1981, abandoned.

[51] Int. Cl.[4] .................................... F01K 17/00
[52] U.S. Cl. ................................... 60/648; 60/655; 62/8
[58] Field of Search ............... 60/651, 655, 671, 512, 60/641.1, 641.6, 648; 62/8, 9, 10, 36

[56] References Cited

U.S. PATENT DOCUMENTS

| | | | |
|---|---|---|---|
| 3,451,342 | 6/1969 | Schwartzman | 60/641.1 X |
| 4,285,203 | 8/1981 | Vakil | 60/655 X |
| 4,326,382 | 4/1982 | Baardson | 60/655 |

*Primary Examiner*—Stephen F. Husar
*Attorney, Agent, or Firm*—Christie, Parker & Hale

[57] ABSTRACT

A thermodynamic method and engine is provided for extracting natural thermal energy from ambient atmospheric air and converting it into mechanical work. The extraction process is accomplished by isentropically expanding ordinary air at atmospheric pressure into a thermally insulated vacuum chamber maintained at low pressure. By employing sufficiently high expansion ratios, a large portion of the air can be made to undergo a spontaneous phase transformation into the solid state at cryogenic temperature. This results in a substantial reduction of the specific volume of the condensed air which enables the vacuum environment of the chamber to be maintained by expending less mechanical work than that gained from the initial expansion. Thus, the net amount of mechanical work generated therefrom is positive. Substantial additional mechanical work is generated by harnessing the thermal potential difference between the low temperature condensed air and the ambient environment via additional cryogenic engine stages.

394 Claims, 45 Drawing Figures

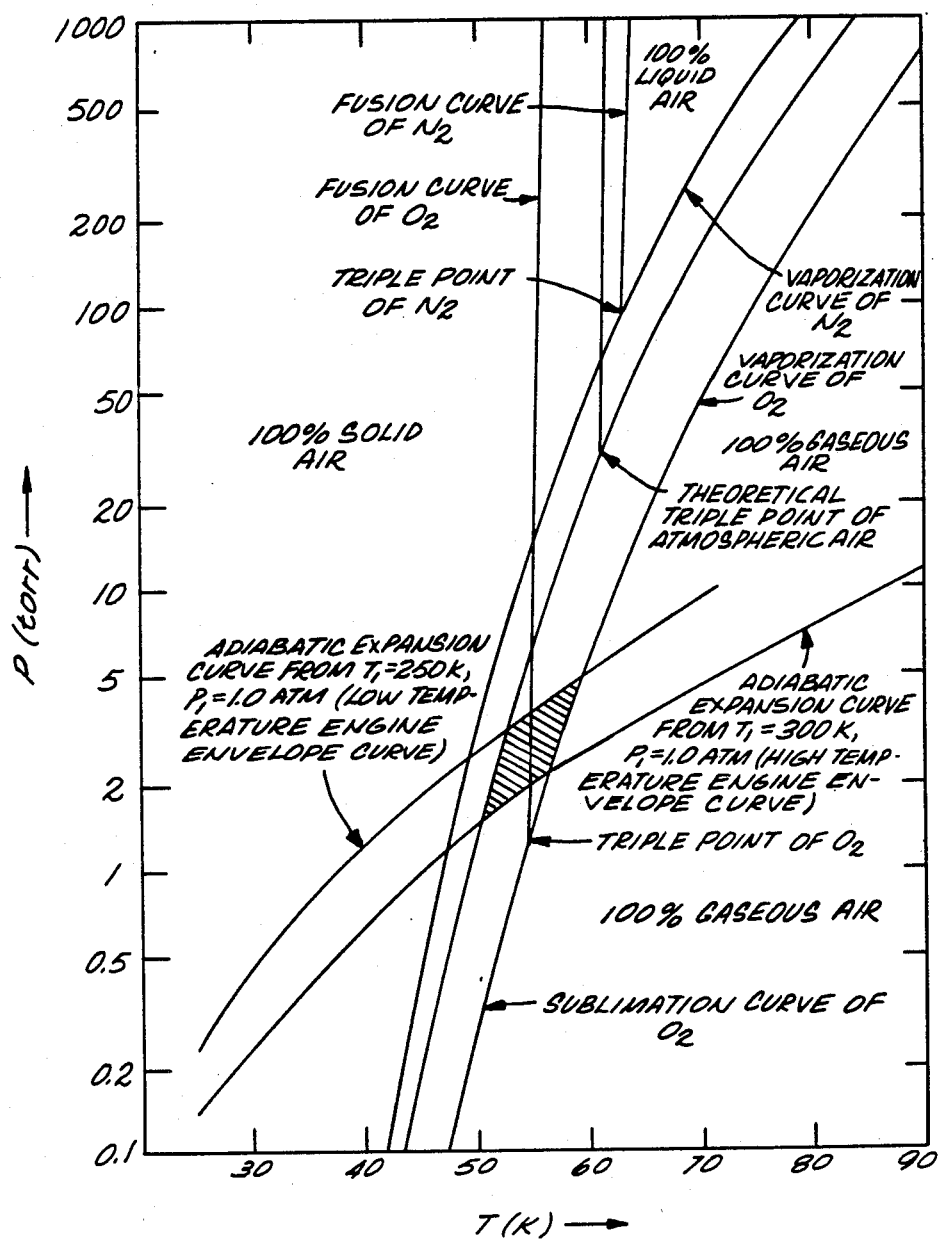

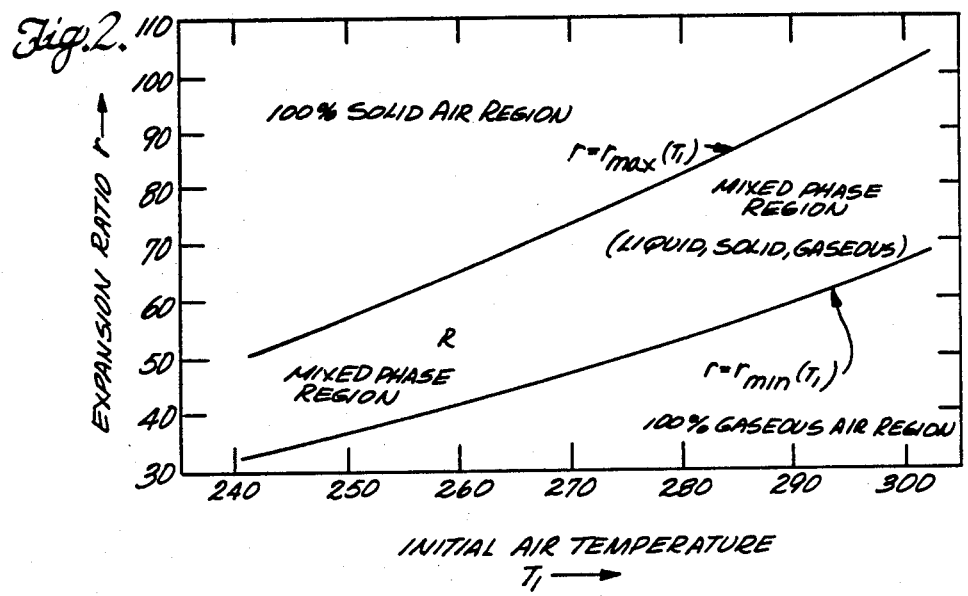
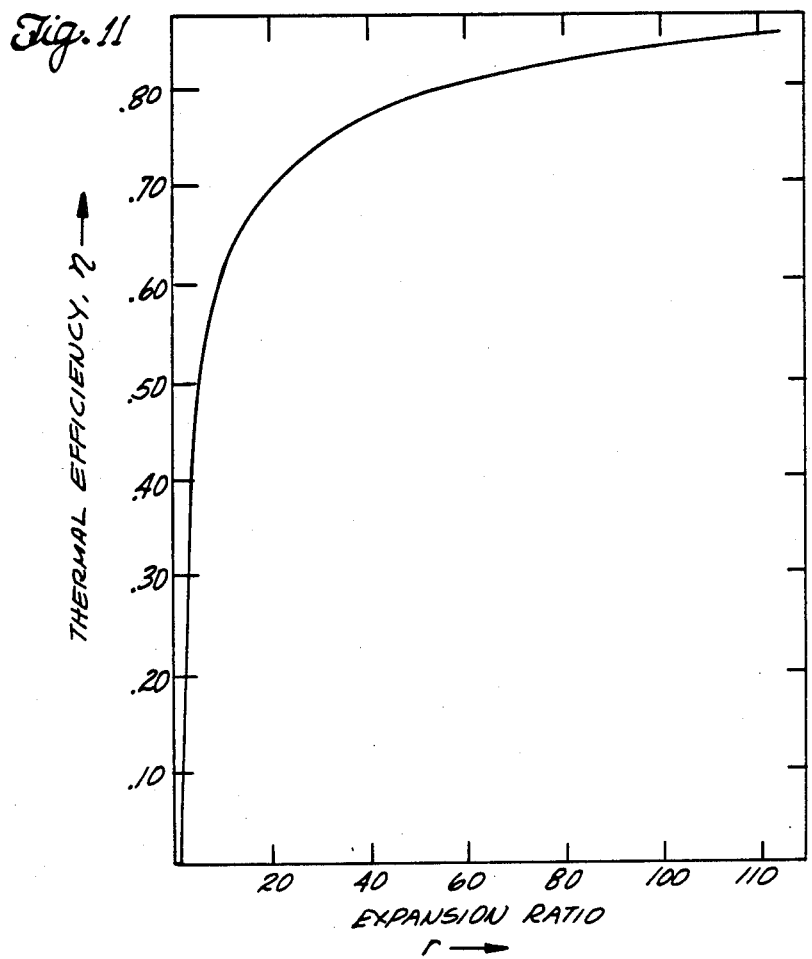

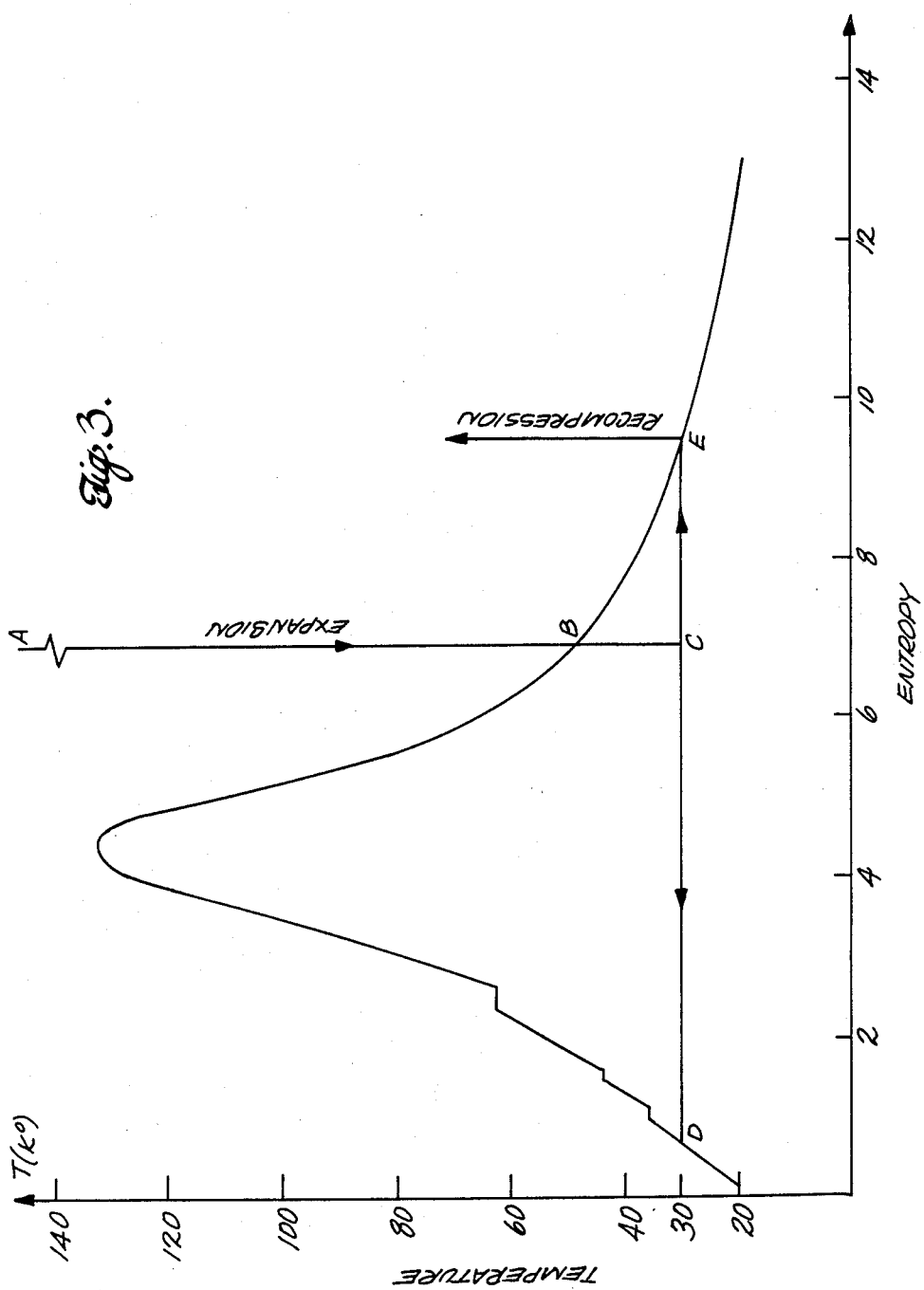

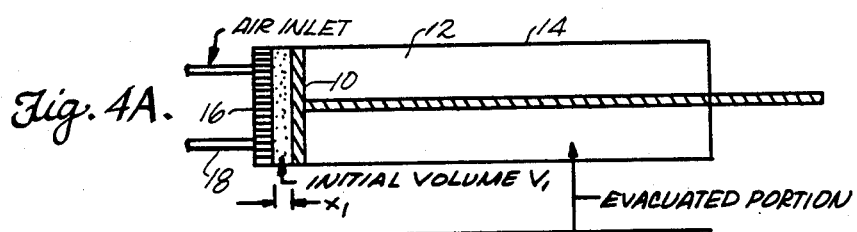
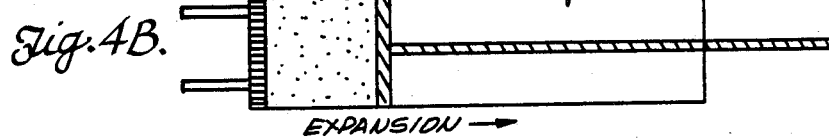
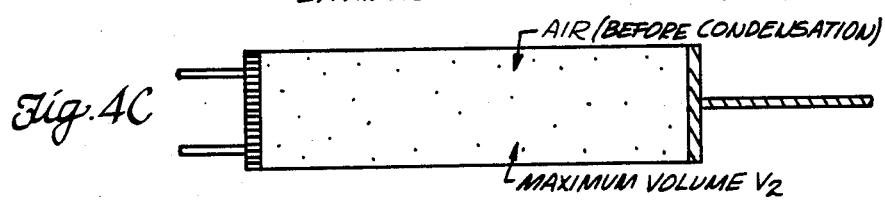
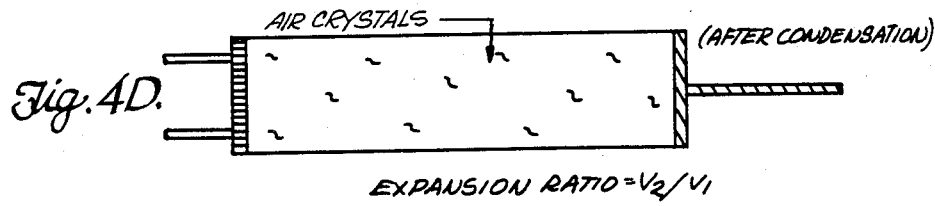
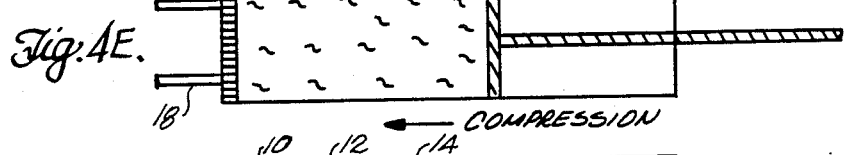
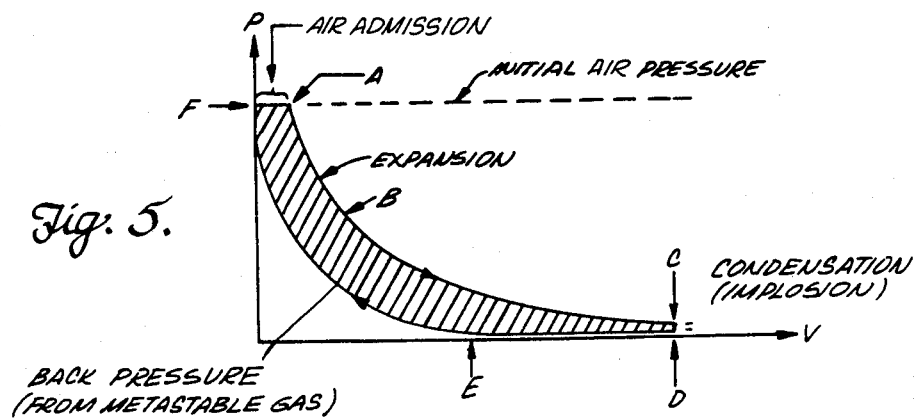

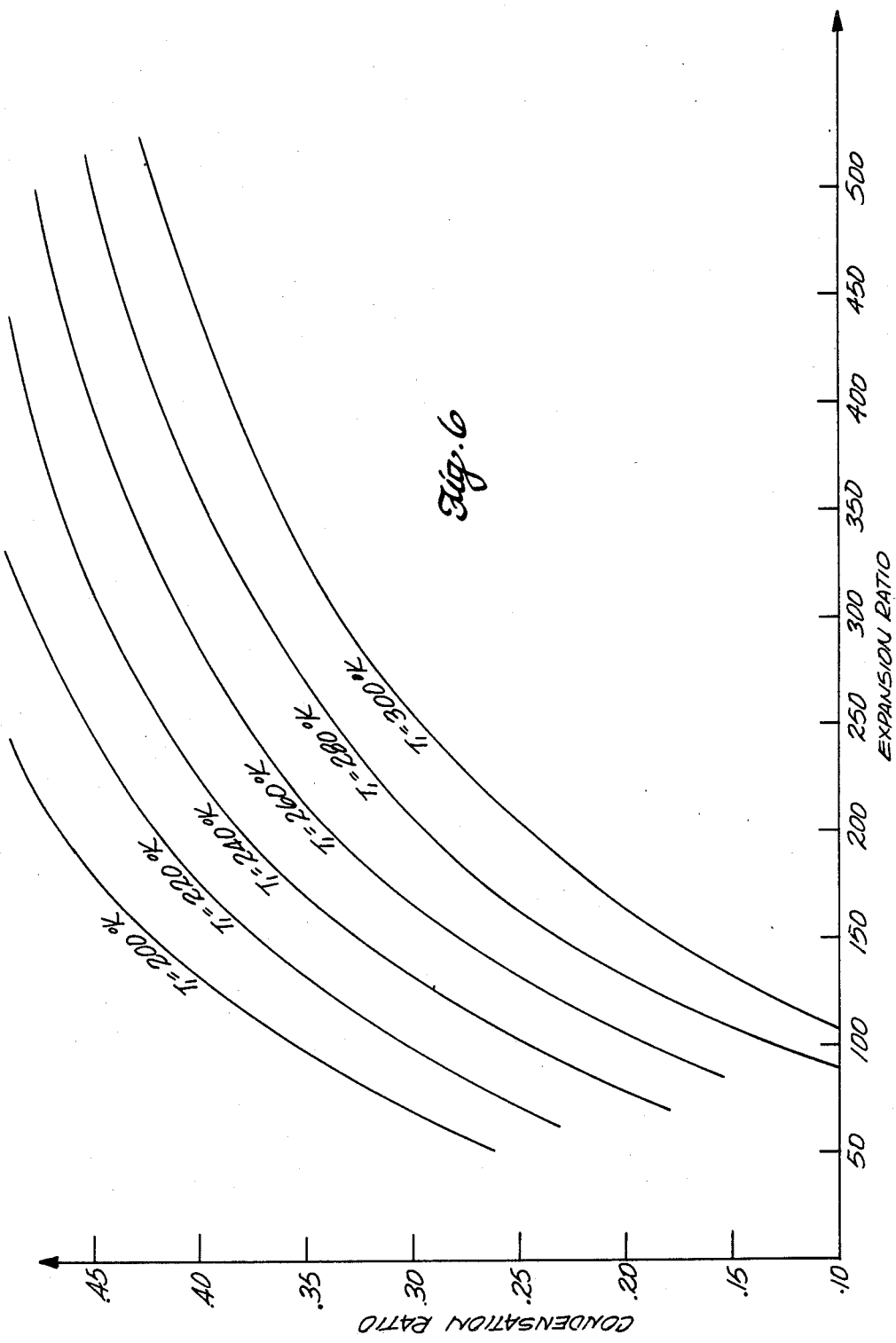

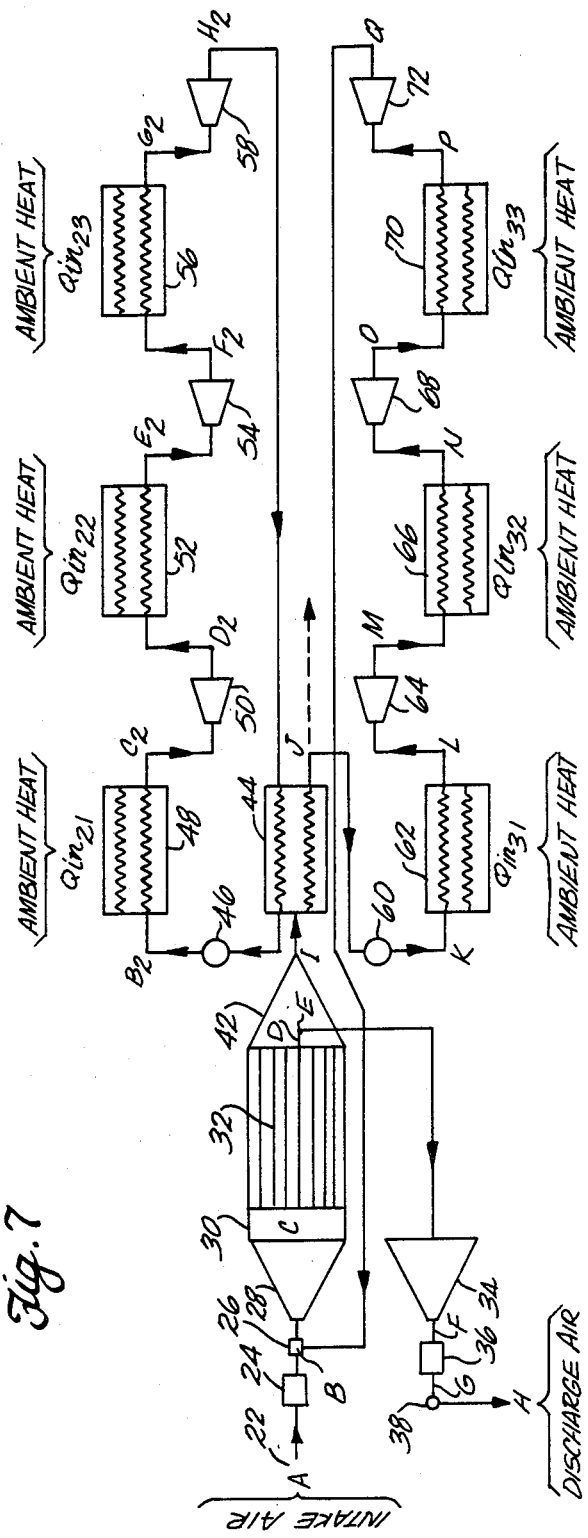

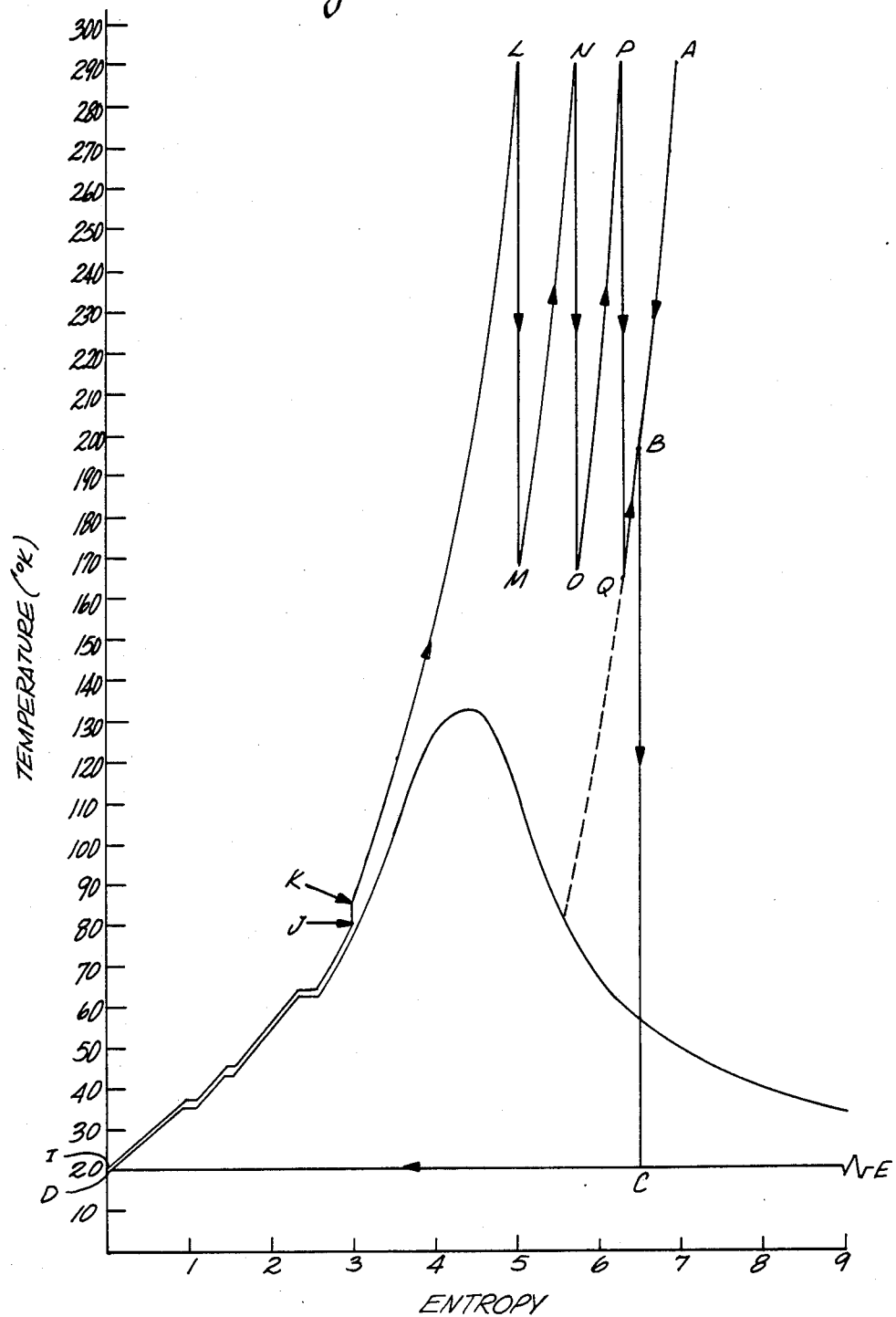

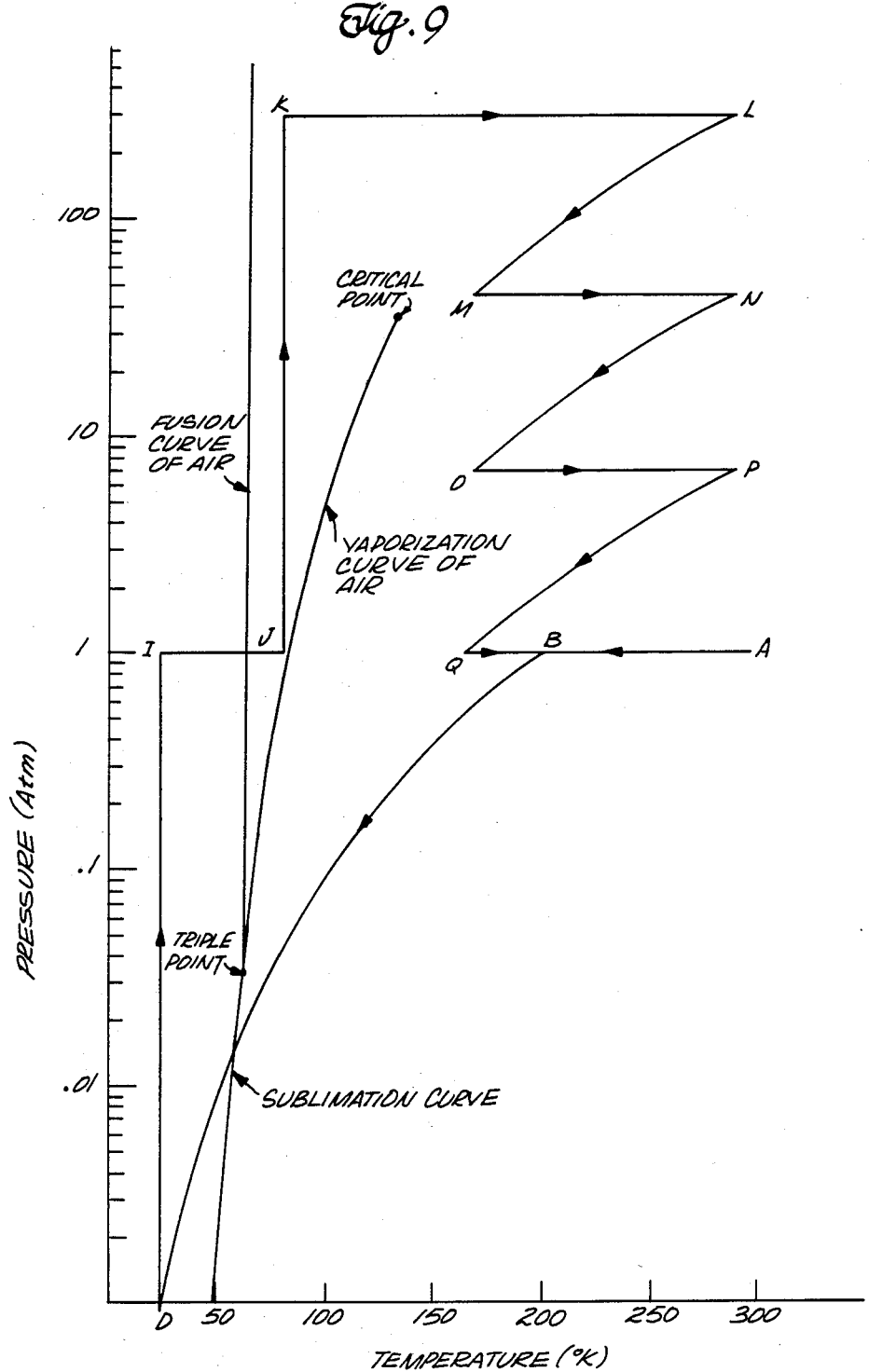

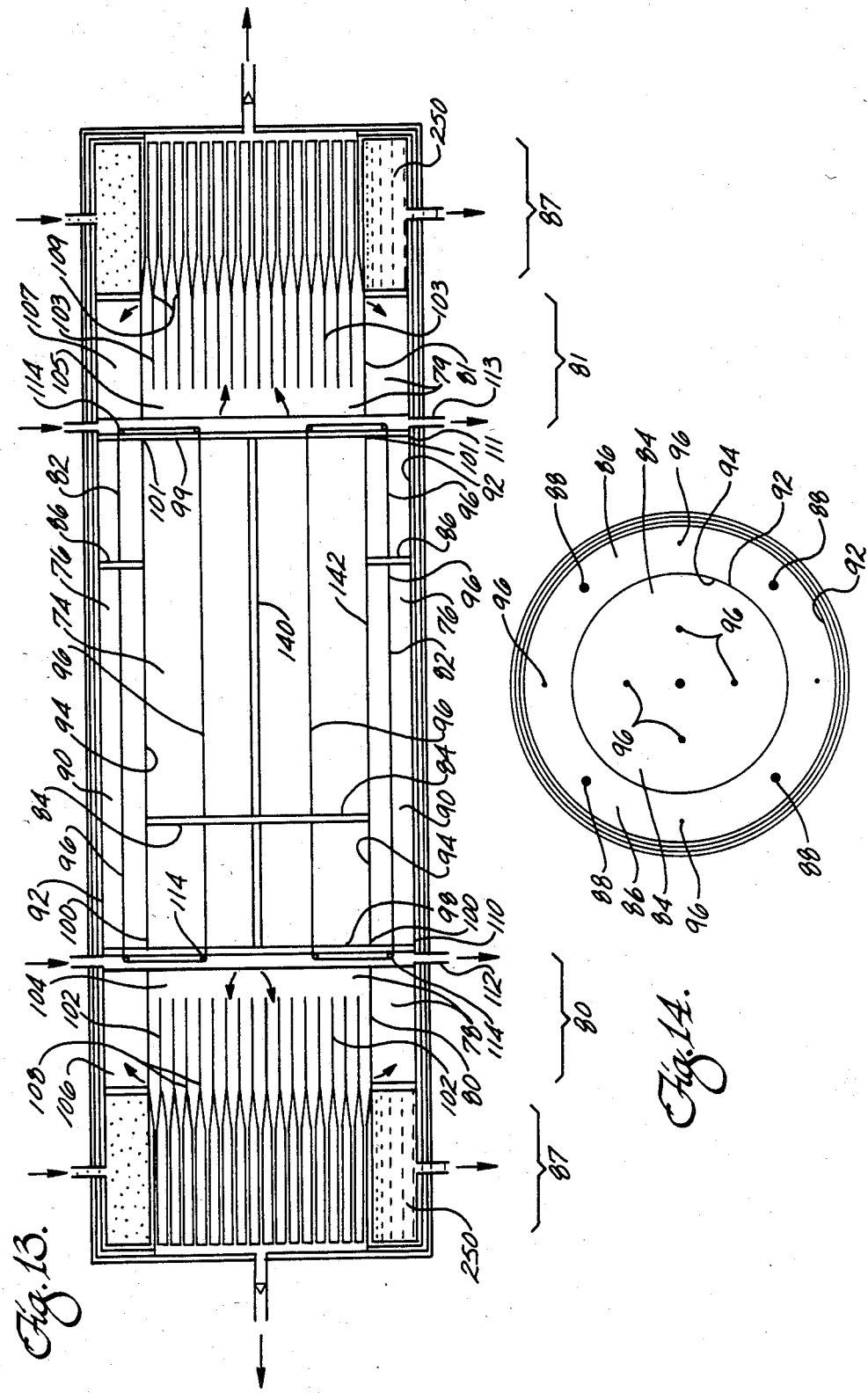

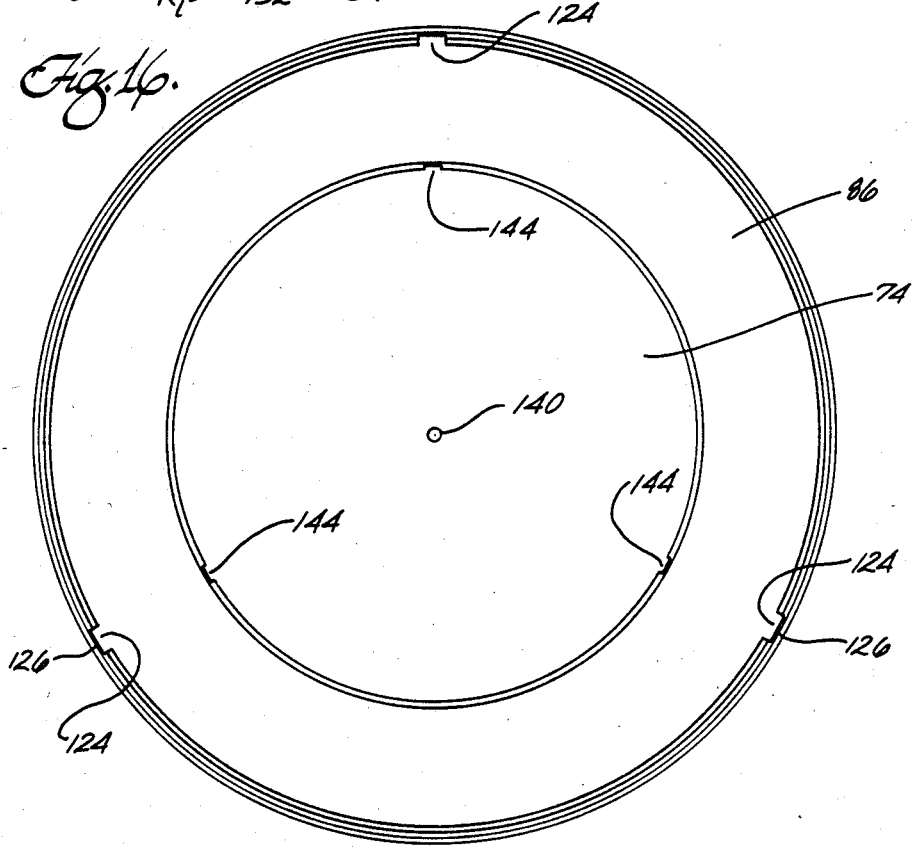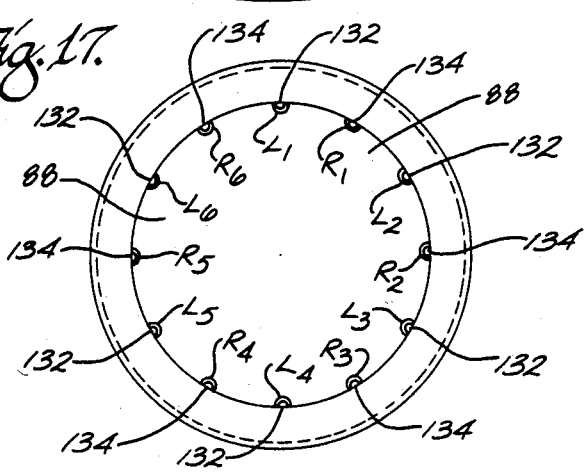

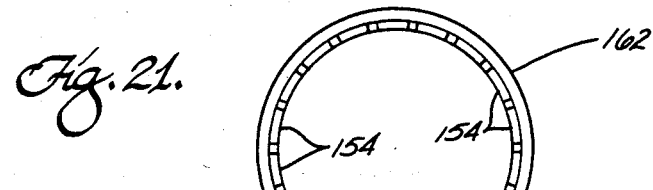
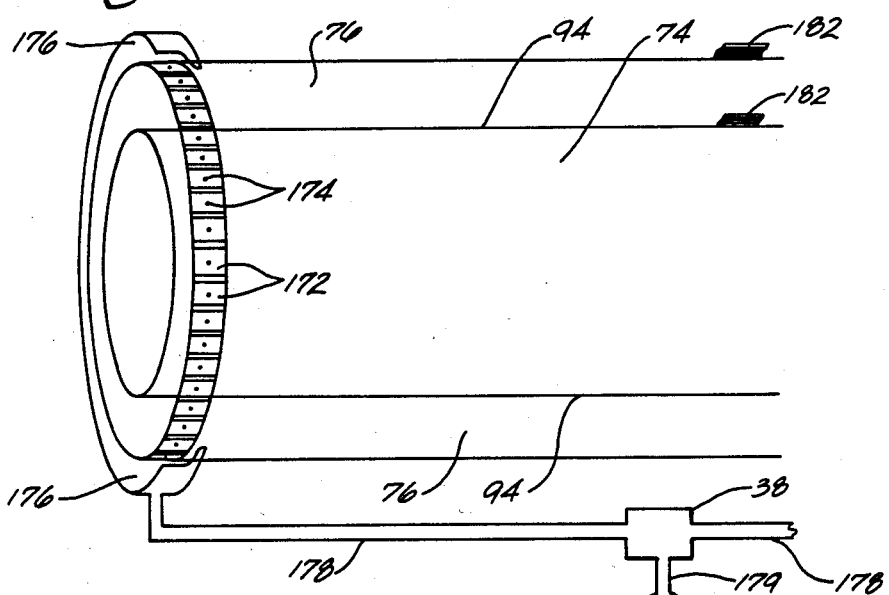
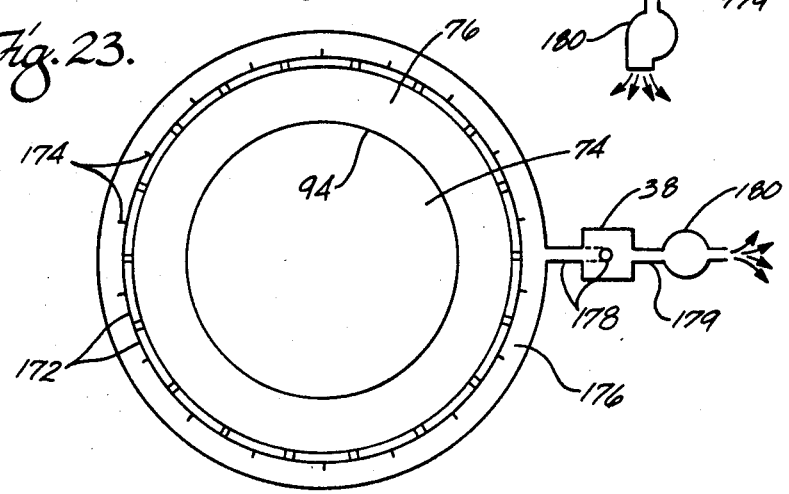

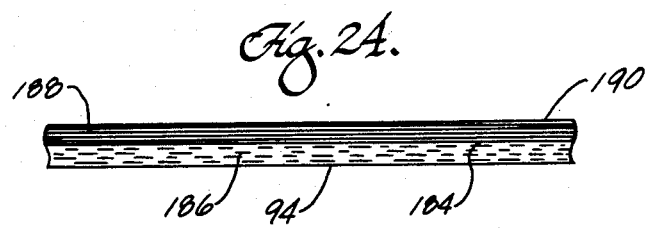
Fig. 24.
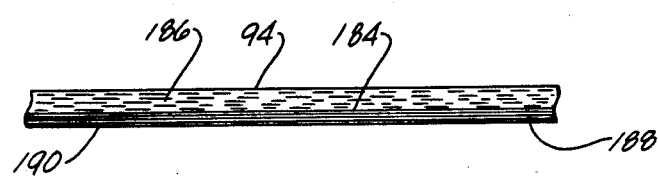
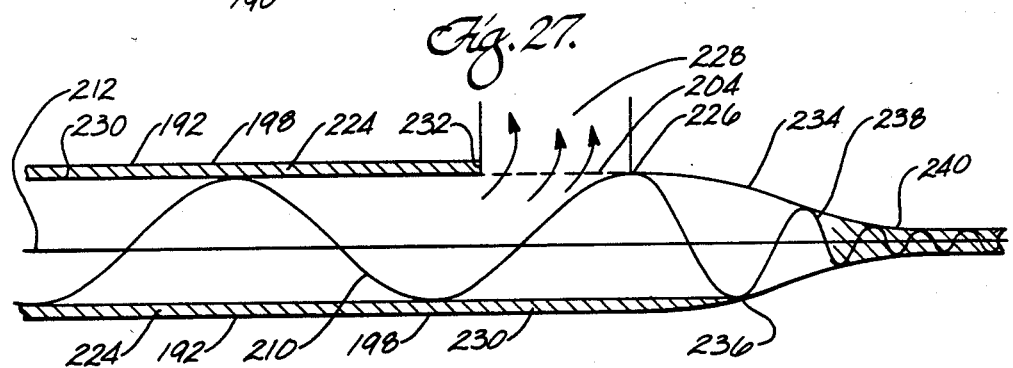
Fig. 27.
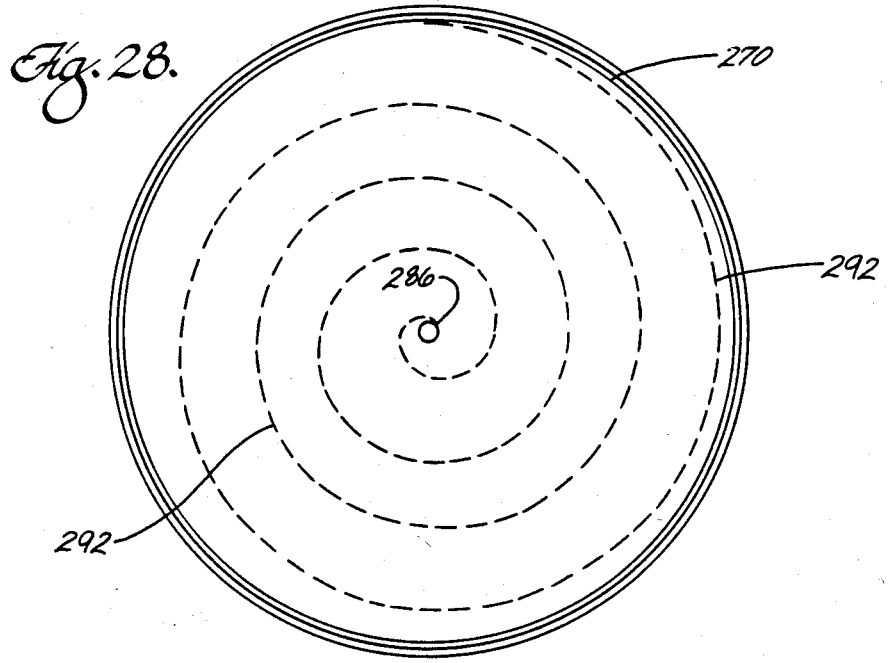
Fig. 28.

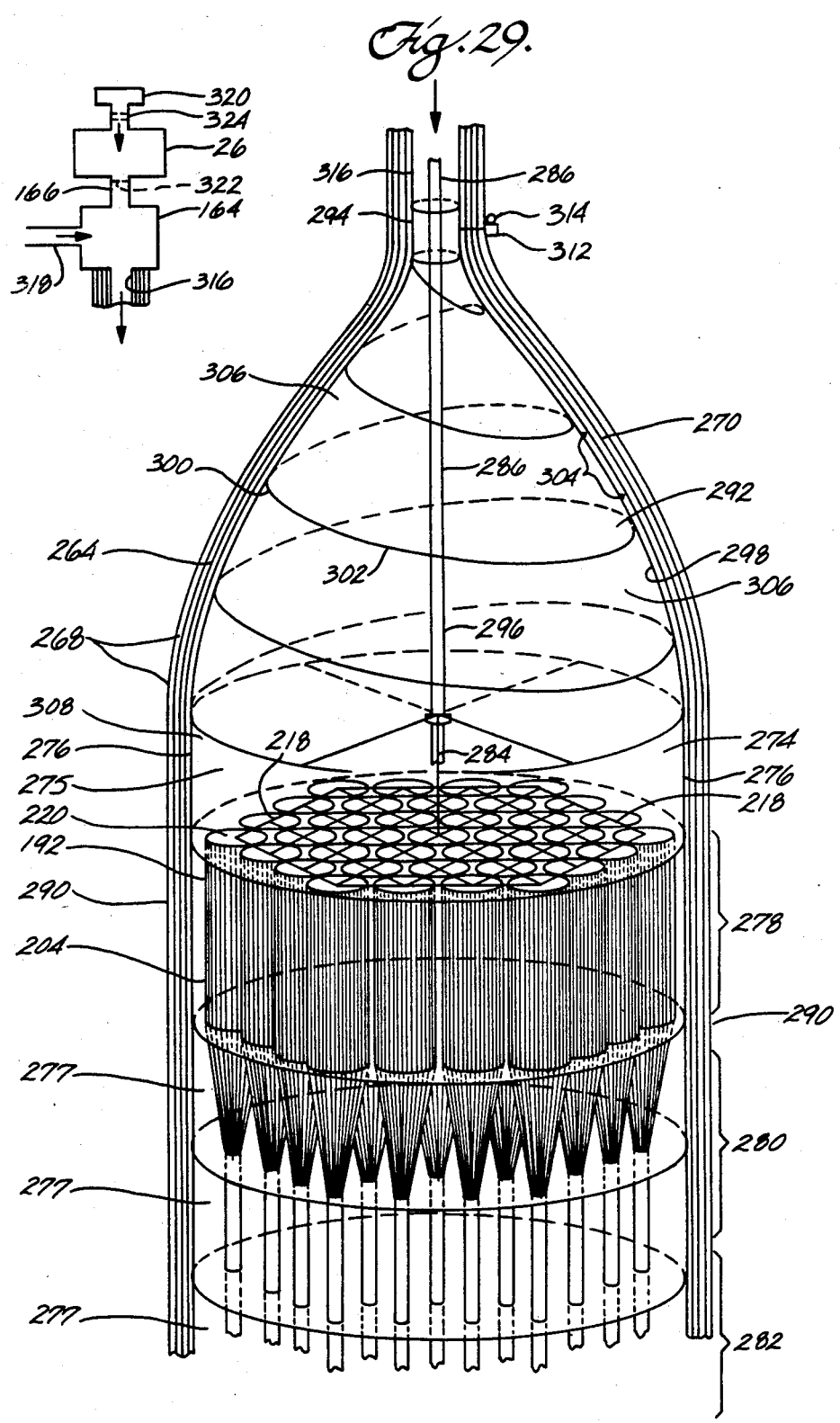

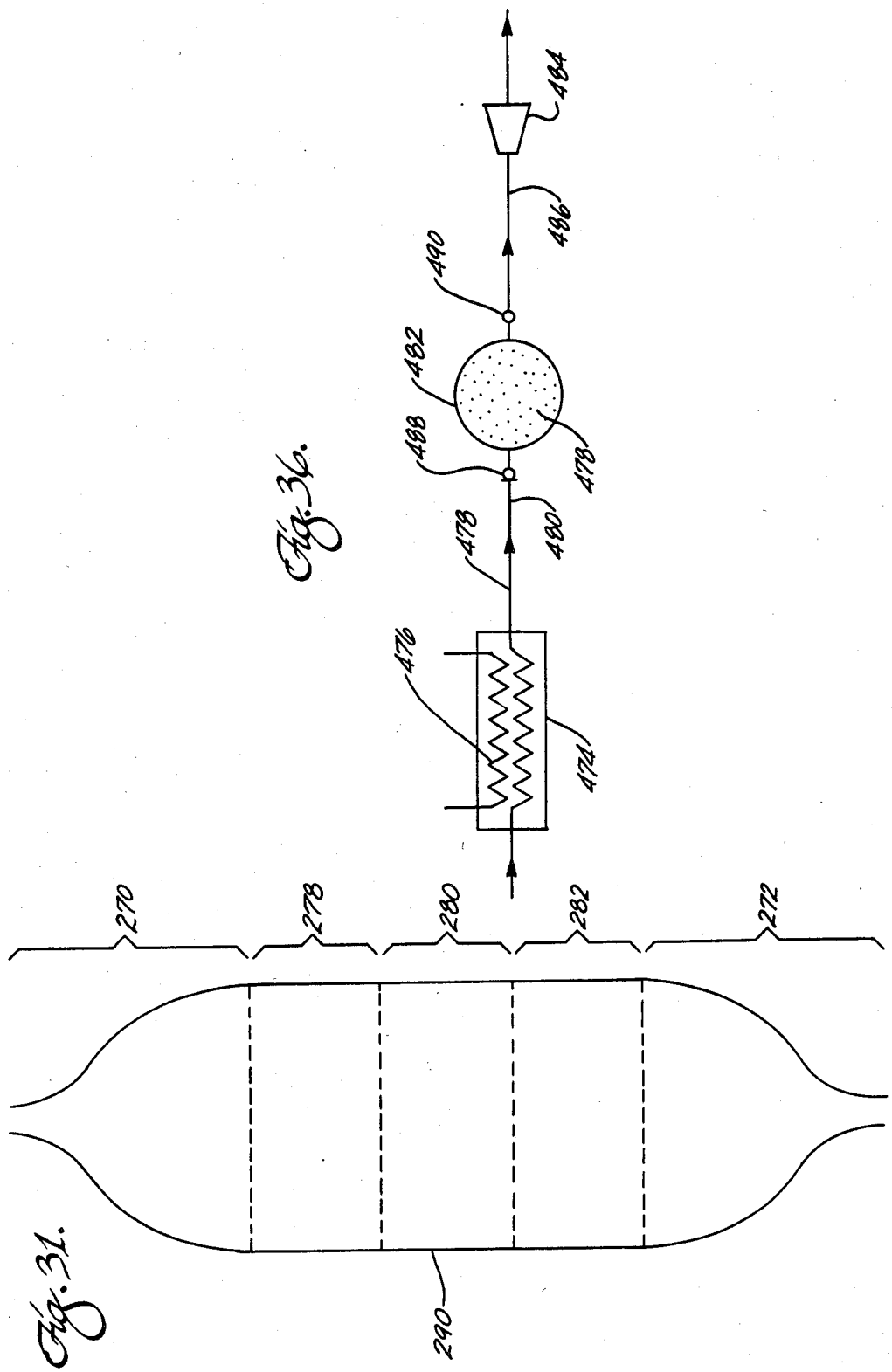

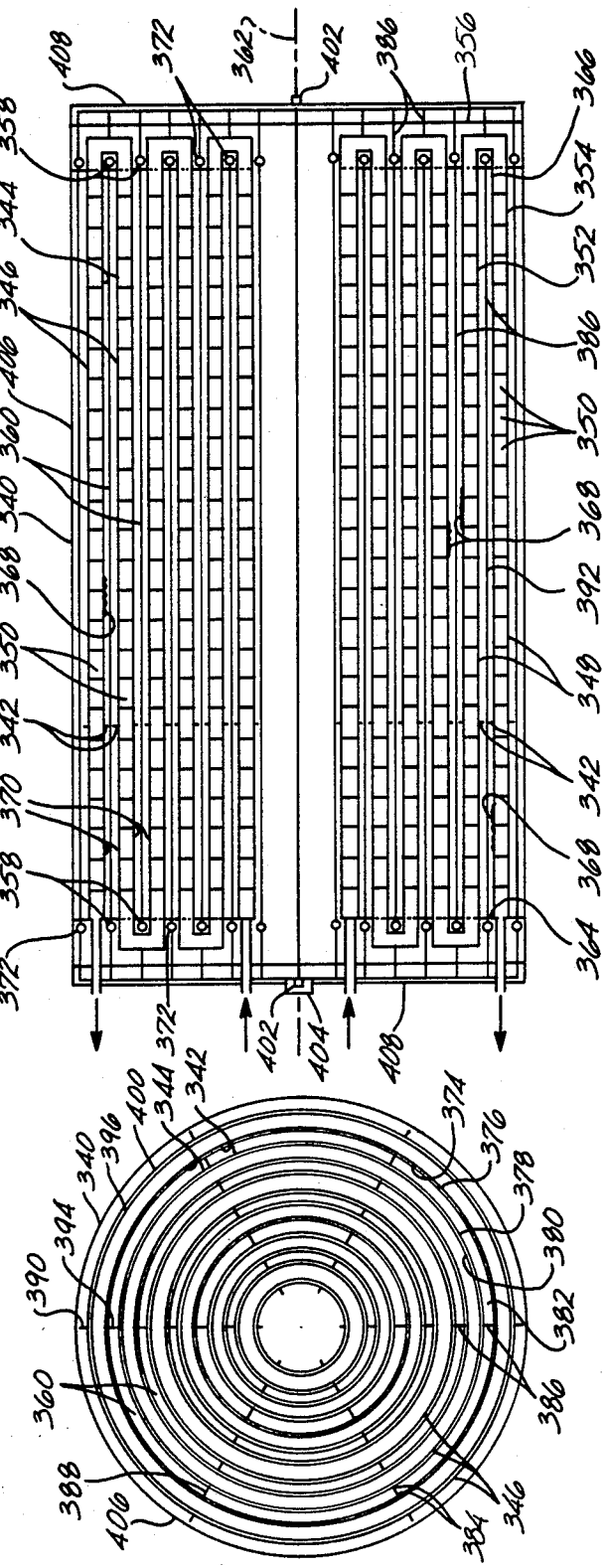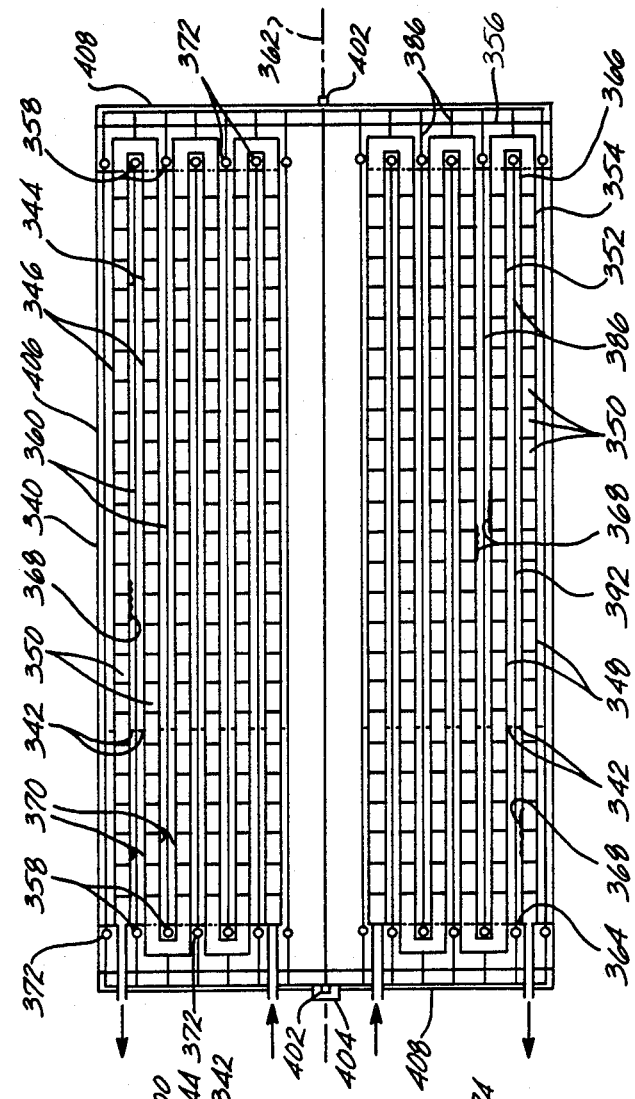

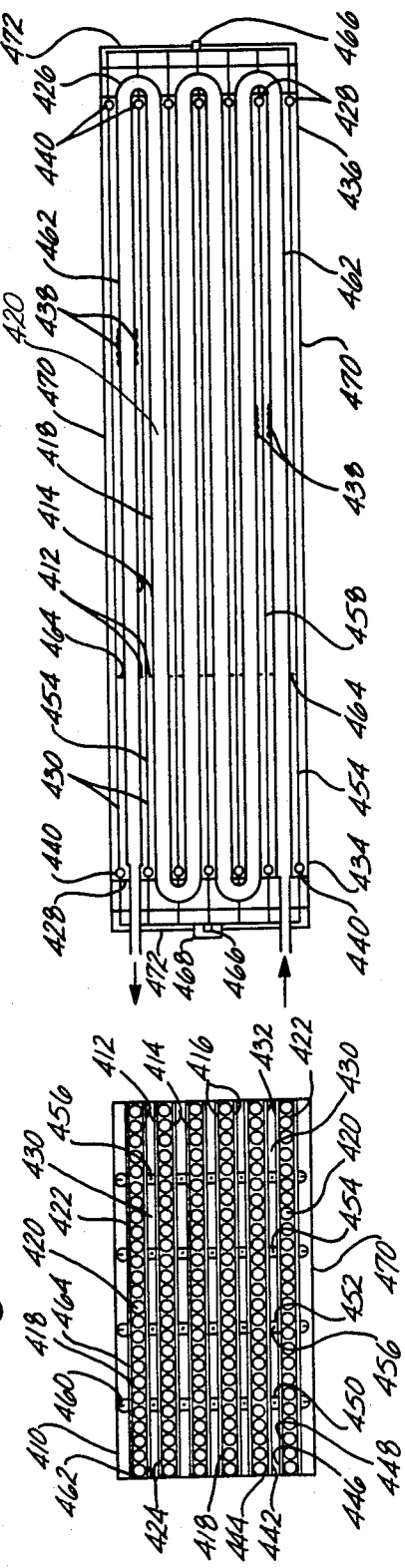

CONDENSING ATMOSPHERIC ENGINE AND METHOD

CROSS-REFERENCE TO RELATED APPLICATION

This is a Continuation-in-Part of my U.S. patent application, Ser. No. 297,087, filed Aug. 27, 1981, now abandoned, which is hereby incorporated by reference.

BACKGROUND

For hundreds of years engineers and scientists have recognized that the ambient thermal energy of the natural environment that is heated by the sun contains essentially unlimited amounts of free thermal energy. Unfortunately, all prior attempts to harness this natural heat energy and convert it into mechanical work by a closed cycle condensing heat engine utilizing this natural thermal energy for its high temperature heat reservoir have failed. As a result of all of these unsuccessful attempts, thermodynamicists have concluded that such engines are impossible. In fact, thermodynamicists are so convinced that such engines are impossible, they have categorically labeled them as "perpetual motion machines of the second kind."

It is important to emphasize, however, that this negative conclusion is not based on any fundamental physical law of nature but rather by the unsuccessful attempts to construct such engines. Although the "second law of thermodynamics" is usually cited as the basic reason why such engines are believed to be imossible, the second law itself is based on unprovable "postulates" laid down by Kelvin, Clausius and Planck over a century ago when the principle of conservation of mass and energy was accepted without question.

The Kelvin-Planck statement of the second law of thermodynamics states that "it is impossible to construct an engine which, operating in a cycle, will produce no other effect than the extraction of heat from a single heat reservoir and the performance of an equivalent amount of work." It is important to emphasize that the word "cycle" in this statement means a closed cycle process wherein the working fluid is circulated over and over again between the heating step and the expansion step such that the thermodynamic state of the working fluid always returns to its initial state. (In fact, strictly speaking, only those devices operating under a closed cycle can be classified as heat engines.) Hence, the second law of thermodynamics only applies to closed cycle heat engines. (See *Thermodynamics*, Charles E. Merrill Publishing Co., Columbus, Ohio, pages 147–153 by Joachim E. Lay, particularly the footnote at page 148.)

By designing a "heat engine" that falls outside the operating conditions of the second law of thermodynamics it is possible to harness the natural thermal energy of the surrounding environment at ambient temperature and convert a portion of it into useful mechanical work. One such "heat engine" is a simple toy called the "drinking bird" that can be found in almost any novelty shop. Although this engine is a closed cycle condensing heat engine and uses the ambient environment as its high temperature heat reservoir, it operates by generating an artificial low temperature heat reservoir by evaporating water. Hence, it does not operate according to the prescribed conditions of the Kelvin-Planck statement of the second law of thermodynamics and therefore cannot violate this law. The basic thermodynamic operating principles of this engine were analyzed by Carl Bachhuber in his paper, "Energy From the Evaporation Of Water," *American Journal of Physics*, Vol. 51, No. 3, March 1983, pp. 259–264. In particular, Bachhuber has shown that ordinary water can be used to extract an unlimited amount of natural thermal energy from the surrounding environment and convert it into mechanical work.

Moreover, the specific energy of the water than can be converted into useful mechanical work by this engine is approximately twice the specific energy available in automotive storage batteries. In a technical report issued by the Rand Corporation in August 1966, entitled *A Simple Heat Engine of Possible Utility in Primitive Environments*, Rand Corporation Publication No. P-3367, Richard Murrow proposed constructing larger versions of this engine for pumping water from the Nile river. A scaled up model of the basic drinking bird engine was constructed to a height of seven feet and found to be able to generate considerable mechanical work. (See, "The Research Frontier—Where is Science Taking Us," *Saturday Review*, Vol. 50, June 3, 1967, pp. 51–55, by Richard Murrow.) Obviously, engines such as these are not "perpetual motion machines." In principle, larger engines of this type could be used to propel ocean going vessels indefinitely using ordinary sea water for generating an unlimited amount of mechanical work. Although this possibility is generally believed to be thermodynamically impossible, it is clearly not impossible. The existence of these engines proves that it is indeed possible to convert natural heat energy of the environment at ambient temperature into an unlimited amount of mechanical work by creating an artificial low temperature heat reservoir below ambient.

The "atmospheric engine" disclosed herein is a semi-open cycle, multi-stage, heat engine that also converts natural ambient heat energy of the environment into mechanical work but uses ordinary air instead of water to create an artificial low temperature heat reservoir. Since air is universally available all over the Earth, the atmospheric engine will be much more practical than the drinking bird engine. It will be shown that the specific energy of air that can be converted into mechanical work by the atmospheric engine is much higher than the specific energy of water used in the drinking bird engine. Hence, the disclosed atmospheric engine will be much more powerful than the drinking bird engine.

Since the disclosed atmospheric engine is not a closed cycle engine and operates, as in the case of the drinking bird engine, by generating an artificial low temperature heat reservoir below ambient, it does not violate the second law of thermodynamics.

BRIEF SUMMARY OF THE INVENTION

With the foregoing in mind the present invention provides a heat engine and method for operating same that extracts a portion of the natural thermal energy of ordinary atmospheric air, that is heated by the sun and compressed by the Earth's gravitational field, and converts it directly into mechanical work. The basic operating principles involve simultaneously utilizing ordinary air as the high temperature heat reservoir and as the phase changing working fluid in a semi-open thermodynamic cycle. The natural thermal energy of the air is extracted and converted into mechanical work by isentropically expanding it inside a thermally insulated cryogenic vacuum chamber with an expansion ratio on the order of 300. If the initial air temperature is 290° K. (ambient atmospheric temperature) this expansion ratio will reduce the air temperature to below 30° K. About 30% of this expanded low temperature air will undergo a spontaneous, self-induced, phase transformation directly into the solid stage represented by the formation of solid air particles. The solidified air results in a several hundred fold reduction of its specific volume.

The solidified air is removed from the chamber, repressurized to atmospheric pressure and melted into the liquid state by absorbing thermal energy. The unsolidified gaseous air is also removed from the chamber and repressurized back to ambient atmospheric pressure and discharged back into the open atmosphere. Since the amount of gaseous air that is repressurized and discharged back to the ambient atmosphere at atmospheric pressure is always less than the amount of air that was initially expanded, the energy expended repressurizing the gaseous air is less than that gained from the initial expansion. Consequently since the amount of energy expended by pressurizing the solidified air back to atmospheric pressure is negligible, the resulting net amount of output work is always positive.

A low temperature, cryogenic operating environment for the expansion chamber can be provided without consuming any energy by mounting the chamber inside a cryogenic Dewar vessel and utilizing the liquefied air as a cryogenic refrigerant. The expansion chamber can therefore be completely immersed in a bath of its own liquefied working fluid. This low temperature cryogenic environment also enhances the phase transformation process.

The output work of the engine can be significantly increased by harnessing the thermal potential difference between the cryogenic liquid air and the natural environment after it is circulated through the cooling Dewar. This is accomplished by compressing the liquefied air to 300 Atm by a cryogenic hydraulic compressor and feeding it into a high pressure ambient vaporizer that is maintained in thermal contact with the natural environment. The compressed liquefied air circulating through the vaporizer extracts and absorbs a significant amount of additional natural thermal energy from the environment. The cryogenic fluid is heated above its critical temperature, vaporizes into high pressure gaseous air and superheated to ambient temperature.

After leaving the ambient vaporizer, the high pressure air is fed into a high pressure, isentropic expander where a large portion of the natural thermal energy extracted from the ambient environment inside the vaporizer is converted into additional mechanical work. The pressure ratio of this expander is such that the pressure of the expanded air leaving the expander is still fairly high. Thus, since the expansion process reduces the temperature of the pressurized air significantly below ambient, the low temperature pressurized air is fed into another ambient heat exchanger (that is also maintained in thermal contact with the environment) in order to extract still more natural thermal energy from the environment. After this second isobaric heating process, the pressurized air is withdrawn from this second ambient heat exchanger at about ambient temperature and injected into another isentropic expander where a large portion of the natural thermal energy extracted from the environment in the previous heating step is converted into additional mechanical work. Similarly, the pressure ratio of this second expander is designed to allow the low temperature air leaving this expander to still have a relatively high pressure in order to extract and convert still more natural thermal energy into mechanical work by repeating the above steps in another ambient heat exchanger and expander. Since the amount of mechanical work consumed by compressing the liquefied air to 300 Atm is negligible compared to the amount of mechanical output work generated by each of these expanders, these multiple expansion and reheating steps significantly increases the total amount of mechanical output work that is generated from the incoming air.

The air leaves the last expander at about ambient atmospheric pressure but at a temperature that is still significantly below ambient. This air is recycled back into the first stage where it is mixed with new air drawn from the atmosphere and re-expanded. Since this recycled air is significantly below ambient, the resulting pre-expansion air mixture is also below ambient which increases the phase condensation ratio. By independently pre-cooling the new air taken from the atmosphere before mixing it with the very cold recycled air, the air mixture can be reduced to about 200° K. (at ambient atmospheric pressure) prior to expansion which can generate phase transformation ratios on the order of 0.50 (50%) when isentropically expanded with expansion ratios on the order of 300.

Since the minimum expansion ratios required for self-induced, spontaneous phase transformation starting from ambient atmospheric pressure are on the order of 100, prior art expansion chamber designs are impractical and can not be used in my air-powered engine without major alterations. Therefore, the present application also includes designs for providing suitable piston and turbine expansion chambers that also have the capability of delivering variable expansion ratios of essentially unlimited magnitude. This variable expansion ratio feature also provides a means for controlling the power output of the engine.

Further features of this invention include a closed cycle intermediate stage for harnessing the thermal potential of the very cold solidified air with respect to the ambient environment thereby increasing the total output of the engine.

DRAWINGS

These and other advantages and features of the invention will be apparent from the disclosure, which includes the specification with the foregoing and ongoing description, the claims and in the accompanying drawings wherein:

FIG. 1 is a composite graph of the temperature/pressure phase diagrams of nitrogen, oxygen and ordinary atmospheric air at cryogenic temperatures near their triple points;

FIG. 2 is a composite graph of the threshold expansion ratios that are required for achieving partial phase transformation of atmospheric air via adiabatic expansion beginning at standard atmospheric pressure and various initial temperatures;

FIG. 3 is a Temperature-Entropy diagram of atmospheric air illustrating the proportional amount of ambient atmospheric air that undergoes spontaneous solidification into the solid phase by an initial isentropic expansion with very high expansion ratios;

FIG. 4A is a schematic longitudinal cross section of a single cylinder, single piston, two stroke cryogenic expansion chamber of my atmospheric engine at the moment atmospheric air is admitted into the cylinder for the power stroke prior to expansion with an initial volume $V_1$;

FIG. 4B illustrates the piston/cylinder expansion chamber of FIG. 4A when the air has expanded to some intermediate volume while forcing the piston to some intermediate point between the cylinder's end walls;

FIG. 4C illustrates the piston/cylinder expansion chamber of FIG. 4A when the air has reached maximum expansion with volume $V_2$ when the piston reaches the opposite end wall just before phase transformation;

FIG. 4D illustrates the piston/cylinder expansion chamber of FIG. 4A after the air reaches maximum expansion and just after partial phase transformation;

FIG. 4E illustrates the piston/cylinder expansion chamber of FIG. 4A when the piston is returned to some intermediate point between the ends of the cylinder on the return stroke and showing the air in its partially solidified cryogenic phase;

FIG. 4F illustrates the piston/cylinder expansion chamber of FIG. 4A after the condensed and noncondensed air is ejected from the cylinder and just prior to the admission of new gaseous air at the beginning of a new power stroke;

FIG. 5 is a pressure-volume work diagram corresponding to one complete cycle of the piston/cylinder expansion chamber described in FIGS. 4A, 4B, 4C, 4D, 4E and 4F and illustrates the net amount of useful mechanical work derived therefrom;

FIG. 6 is a composite graph of the phase transformation ratio of air versus expansion ratio corresponding to various initial air temperatures with an initial pressure equal to standard atmospheric pressure;

FIG. 7 is a block diagram of a multiple stage air-powered condensing atmospheric engine corresponding to one embodiment of the present invention;

FIG. 8 is a Temperature-Entropy diagram of atmospheric air illustrating the basic thermodynamic operating principles of the air-powered condensing atmospheric engine corresponding to the block diagram of FIG. 7;

FIG. 9 is a Temperature-Pressure phase diagram of atmospheric air further illustrating the basic thermodynamic operating principles of the air-powered condensing atmospheric engine corresponding to the block diagram of FIG. 7;

FIG. 11 is a graph of the thermal efficiency versus expansion ratio corresponding to an adiabatic expansion that determines the fractional amount of enthalpy that is extracted from a compressed gaseous working fluid and converted into mechanical work by the expansion;

FIG. 13 is a schematic longitudinal cross section of a piston driven ambient air expansion/recompression system including dual vacuum chambers, solid phase condensers and second stage condensers illustrating their design and construction;

FIG. 14 is a schematic transverse cross section of a piston driven ambient air expansion/recompression system including dual vacuum chambers, solid phase condensers and second stage condensers illustrating their design and construction;

Figure 18:
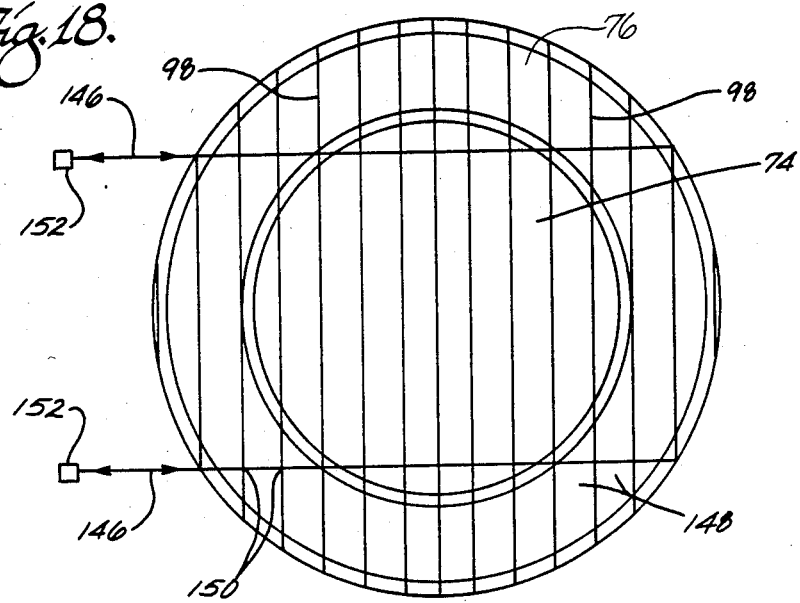
Figure 19:
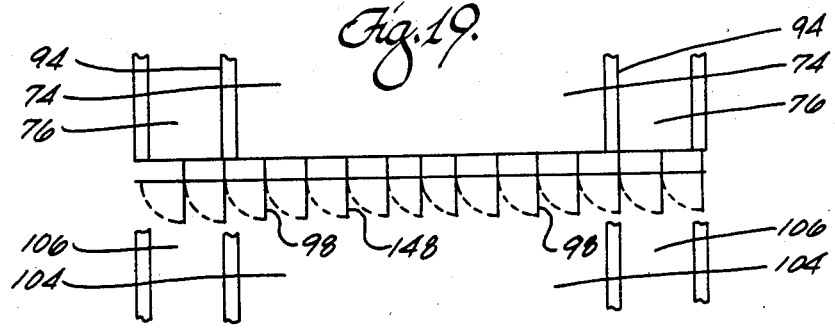
Figure 20:
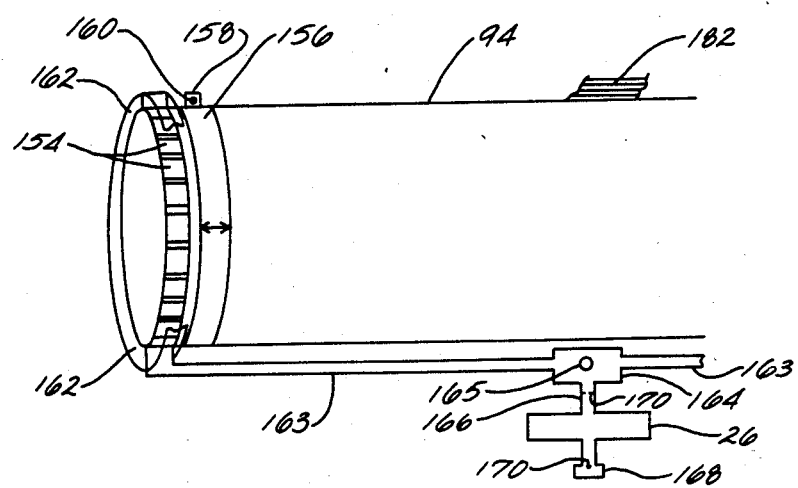
Figure 26:
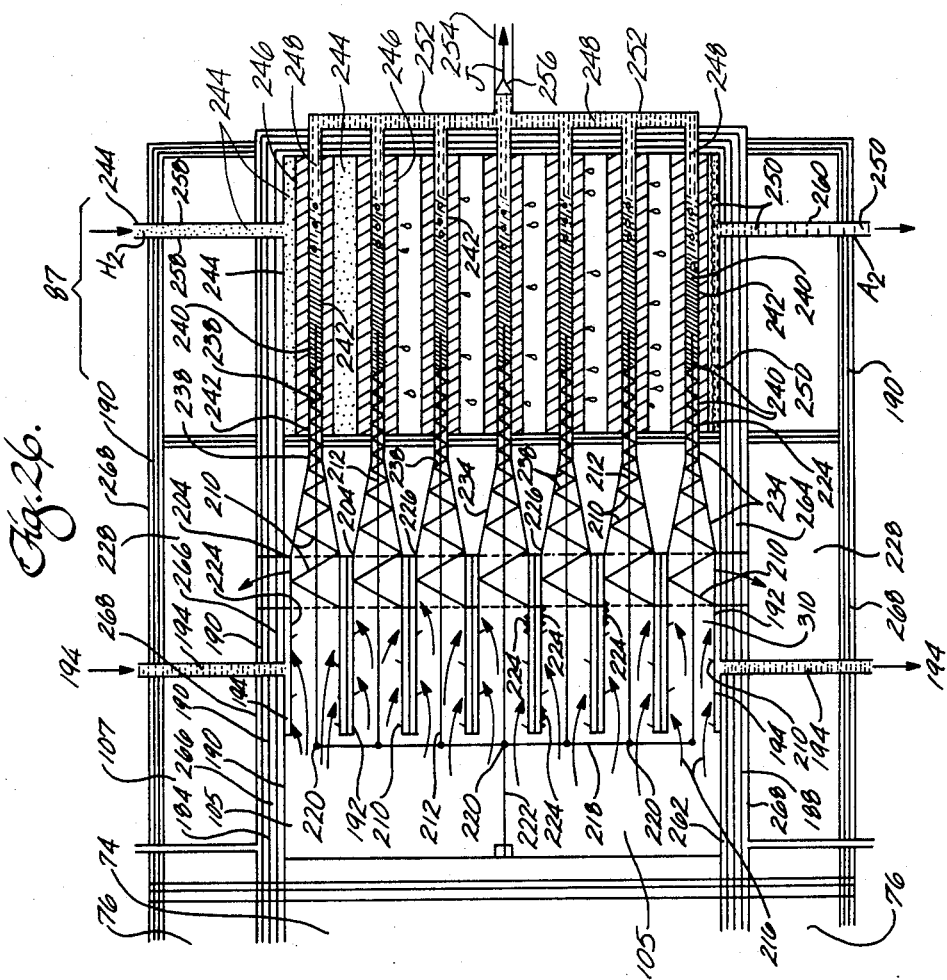
Figure 25:
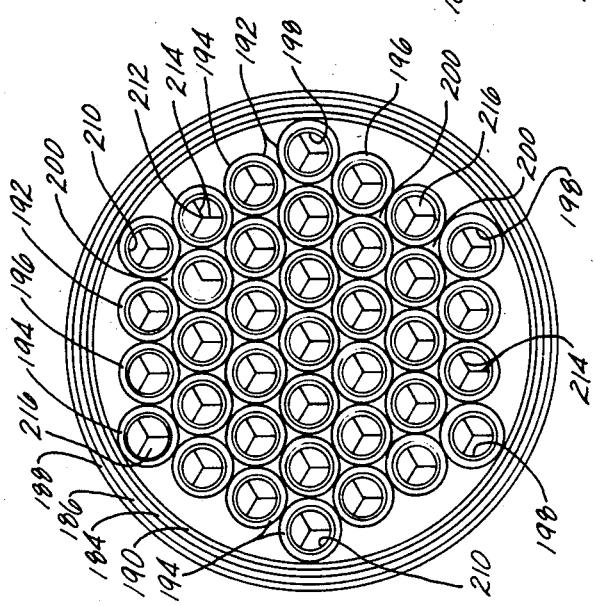
Figure 30:
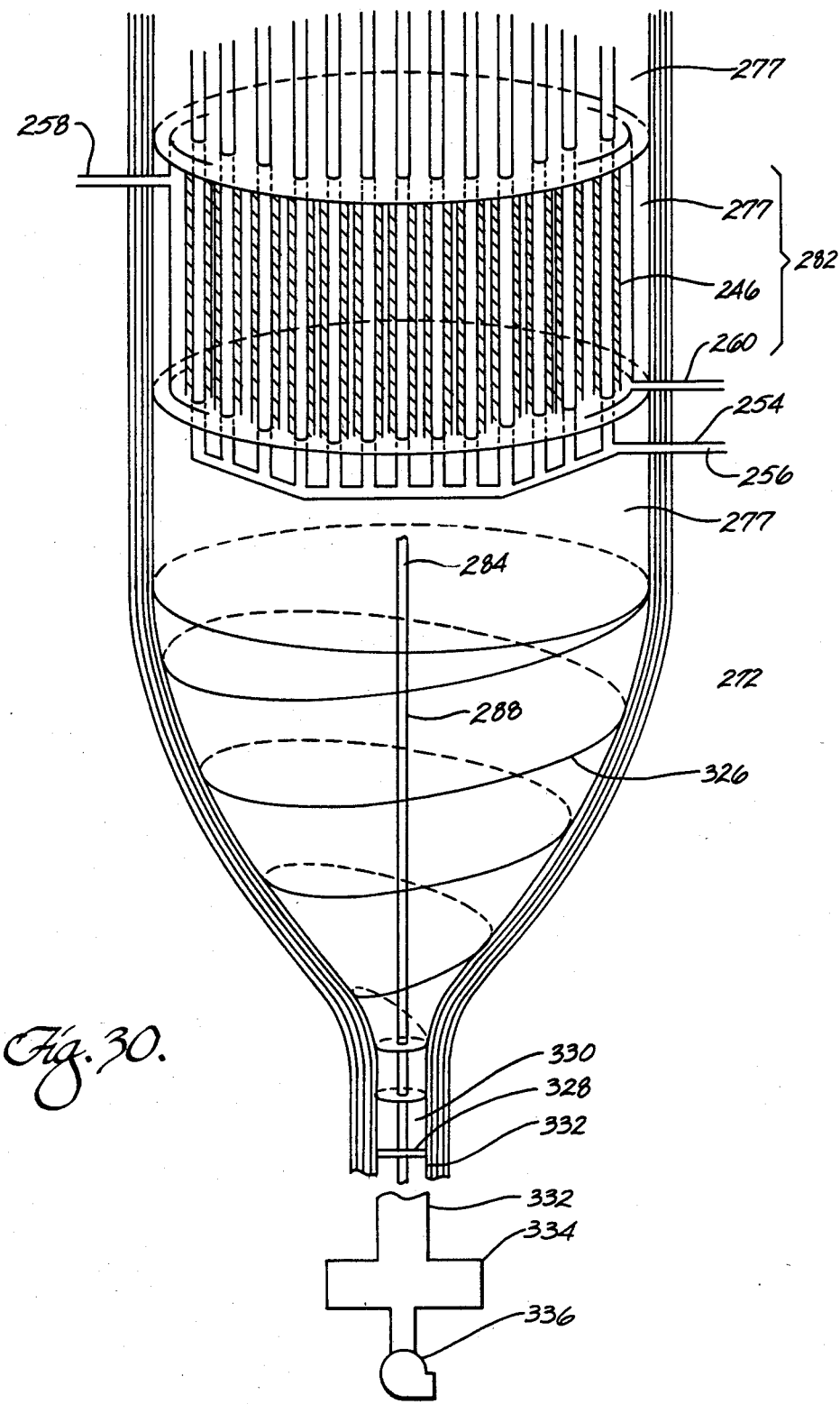
Figure 37:
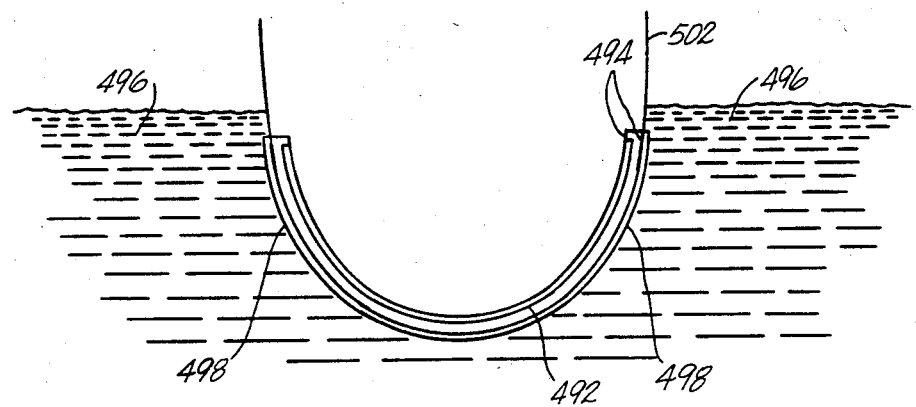
Figure 38:
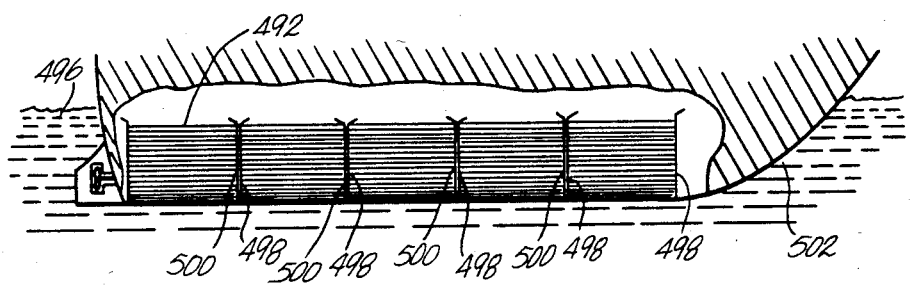
Figure 39:
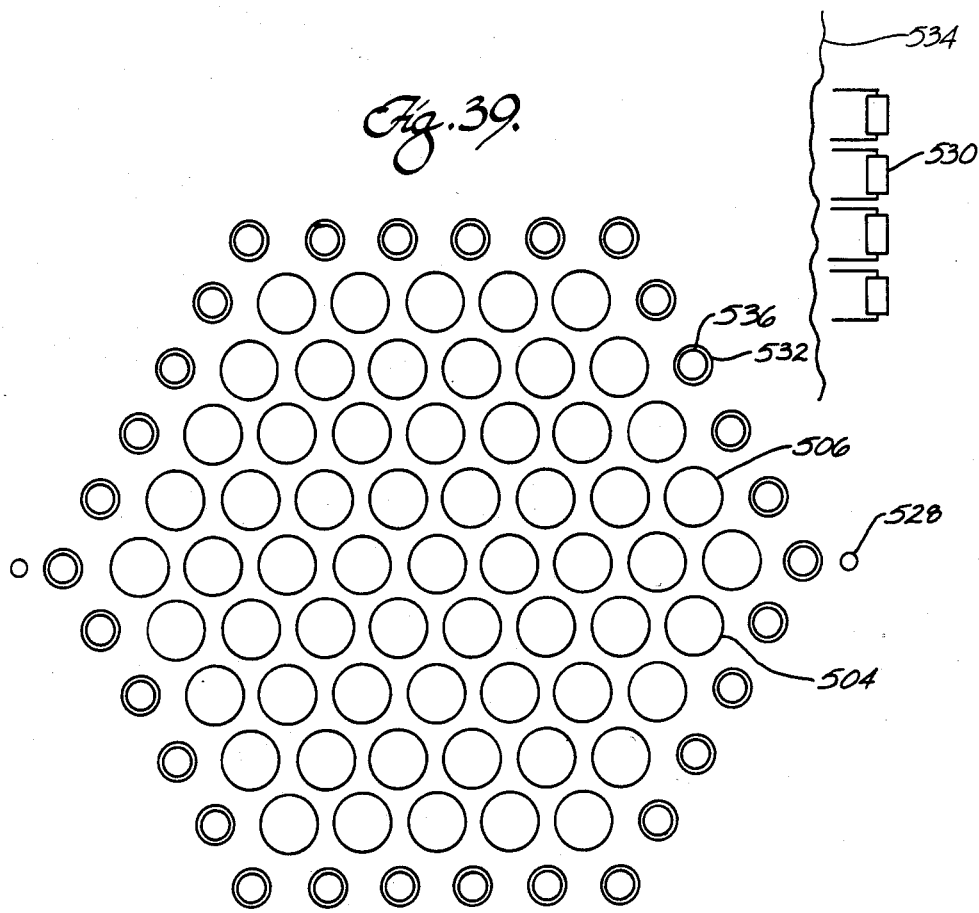
Figure 40:
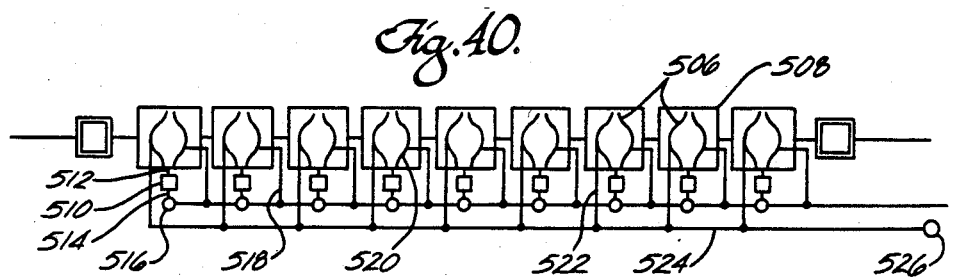

FIG. 15 is an enlarged schematic longitudinal cross section of the upper portion of the annular recompression chamber and recompression piston of FIG. 13 illustrating the detailed design and construction of the mechanical drive train system for converting the reciprocating back and forth linear motion of the recompression piston with arbitrarily long stroke length directly into pure rotational motion of internal drive shafts;

FIG. 16 is an enlarged schematic cross section through the recompression piston's transverse midplane inside the recompression cylinder further illustrating the mechanical drive train system;

FIG. 17 is an enlarged schematic transverse cross section of one rotating drive shaft inside the recompression cylinder illustrating the twisting drive shaft grooves and the piston torque bearings rinding inside them;

FIG. 18 is a schematic transverse cross section of a shutter door mechanism mounted on each end of the piston driven expansion/recompression chamber for expelling expanded air-slugs into the flanking vacuum chambers while simultaneously allowing the noncondensed portion to be admitted into the recompression chamber;

FIG. 19 is a schematic longitudinal cross section through the center of the shutter door mechanism shown in FIG. 18 further illustrating its design and construction;

FIG. 20 is a schematic longitudinal perspective view of one end of the piston driven expansion cylinder illustrating the design and construction of a plurality of air-inlet passageways;

FIG. 21 is a schematic transverse cross section through one end of a piston drive expansion cylinder further illustrating the design and construction of a plurality of air-inlet passageways;

FIG. 22 is a schematic longitudinal perspective view of one end of the piston driven annular recompression chamber illustrating the design and construction of a plurality of discharge passageways for the noncondensed partially recompressed air;

FIG. 23 is a schematic transverse cross section through one end of a piston driven recompression chamber further illustrating the design and construction of the discharge passageways for the noncondensed partially recompressed air;

FIG. 24 is a schematic longitudinal cross section through the expansion chamber surrounded by a Dewar jacket containing liquid air at cryogenic temperatures that is in direct thermal contact with the external walls of the expansion chamber;

FIG. 25 is a schematic transverse cross section illustrating the design, construction and operating principles of a cryogenic air condenser and solid phase compressor;

FIG. 26 is a schematic longitudinal cross section illustrating the design, construction and operating principles of a thermally insulated first stage vacuum chamber, solid phase air condenser, solid phase air recompressor and second stage condenser of one embodiment of a piston driven first stage atmospheric engine;

FIG. 27 is an enlarged longitudinal cross section through the end portion of one solid phase condensing tube illustrating the design and construction of a discharge passageway for the gaseous expanded air vapor that does not condense after passing through the condensing tube;

FIG. 28 is a schematic transverse cross section illustrating the design and construction of a low pressure axial flow turbine expander and one of its spiraling expansion blades;

FIG. 29 is a schematic longitudinal perspective view illustrating the design, construction and operating principles of a low pressure turbine expander, vacuum chamber, solid phase condenser, and solid phase recompressor for the first stage of an atmospheric engine;

FIG. 30 is a schematic longitudinal perspective view illustrating the design and construction of a low pressure turbine recompressor that is driven by the turbine expander of FIG. 29;

FIG. 31 is a schematic longitudinal cross section of a turbine driven first stage atmospheric engine illustrating the various components and including the second stage condenser;

FIG. 32 is a transverse cross section illustrating the construction details of a cylindrical high pressure convective ambient air heat exhanger equipped with a mechanical system for removing condensates;

FIG. 33 is a longitudinal cross section illustrating the construction details of a cylindrical high pressure convective ambient air heat exchanger equipped with a mechanical system for removing condensates;

FIG. 34 is a transverse cross section illustrating the construction details of a rectangular, multiple layer high pressure convective ambient air heat exchanger equipped with a mechanical system for removing condensates;

FIG. 35 is a longitudinal cross section illustrating the construction details of a rectangular, multiple layer high pressure convective ambient air heat exchanger equipped with a mechanical system for removing condensates;

FIG. 36 is a block diagram illustrating a pressure vessel interposed between an ambient heat exchanger and an expander for energy storage, load leveling and instant power;

FIG. 37 is a schematic transverse cross section of the double hull design on a marine vessel containing a plurality of ambient water heat exchangers for one or more atmospheric engines;

FIG. 38 is a schematic longitudinal cross section of the double hull on a marine vessel illustrating the water intake and discharge ducts for circulating ambient water over the various ambient heat exchangers of an atmospheric engine that are mounted inside the vessel's double hull;

FIG. 39 is a schematic horizontal plan view of an array of large first stage turbo expander/recompressors with associated second and third stage engines for generating bulk electric power; and FIG. 40 is a schematic vertical cross section through the diameter of the array shown in FIG. 39 further illustrating the second and third stage engines that are coupled to electric generators.

DESCRIPTION OF THE PREFERRED EMBODIMENT

In prior art condensing heat engines, the Earth's atmosphere is utilized as an infinite low temperature heat sink. In particular, it is used to absorb the latent heat of condensation of their expanded working fluids (usually water) so as to bring about the required phase transformation. The high temperature heat reservoir is represented by a boiler that is maintained at very high temperatures by burning fossil fuels or by operating a nuclear reactor.

Unfortunately, combustible fuels are being depleted at a rapid rate. They are expensive and their combustion products are toxic and harmful to all life and to the environment. Nuclear fission reactors are subject to catastrophic accidents and generate very dangerous radioactive waste products. There is also the increasingly serious problem of "thermal pollution" that results from the necessity of having to absorb all of the rejected latent heat of condensation into the environment.

In the condensing heat engine disclosed herein the Earth's atmosphere is utilized as an infinite high temperature heat reservoir that is heated by the sun. The working fluid is the atmosphere itself. Thus, in this engine, the working fluid is compressed by the Earth's gravitational field to its working pressure of 10.1325 N/cm$^2$ and heated to its high temperature of 290° K. by the sun. The heated, pressurized air is isentropically expanded inside a thermally insulated cryogenic vacuum chamber thereby converting a large portion of its natural ambient heat energy directly into mechanical work. The required condensation is obtained not by extracting the latent heat of condensation of the expanded air by absorbing it in some other substance maintained at a very low cryogenic temperature, but by slowing down the individual air molecules by transferring a sufficiently large portion of their kinetic energy to the moving member of the expander (e.g., a piston) such that the natural intermolecular attractive forces (i.e., van der Waals forces) can take hold and produce the desired condensation. The condensation generates a significant reduction in the specific volume of the expanded air which is utilized to help maintain the required vacuum environment of the expansion chamber essentially without expending any mechanical work. One of the most important features of the present invention is the fact that this condensation can be achieved directly from the expansion process itself which is simultaneously used to generate the mechanical work.

Although it is thermodynamically impossible to condense 100% of the expanded air by any direct isentropic expansion process to matter how high the expansion ratio may be, it is possible to condense about 30% if the expansion ratio is on the order of 300. Thus, a mechanical pump is required to remove the remaining 70% of uncondensed gaseous air from the vacuum chamber which is returned to the atmosphere. Consequently, in this embodiment, the engine will generate a positive net amount of output work equal to about 30% of that generated by the initial expansion. But since ambient atmospheric air is free and universally available all over the Earth in unlimited quantities, the engine represents a revolutionary means for generating free and unlimited mechanical work. I have named my engine an air-powered "condensing atmospheric engine".

In order to calculate the theoretical thermal energy density of ordinary ambient atmosphere air at sea level which can be harnessed and converted directly into mechanical work by expanding it inside a thermally insulated vacuum chamber, it is convenient to begin with the so-called "work equation" corresponding to adiabatically expanding a compressed gas. This equation is $$W = \frac{P_1V_1 - P_2V_2}{\gamma - 1} \tag{1}$$

where $V_1$, $P_1$ and $V_2$, $P_2$ denotes the volume and pressure of a given quantity of gas before and after expansion respectively. The amount of mechanical work generated therefrom is denoted by W, and $\gamma$ is a constant depending on the particular gas. For low temperature air, this constant is 1.415. The expansion ratio is given by $$r = V_2/V_1 \tag{2}$$

The adiabatic expansion equations relating temperature $T_1$, $T_2$ and pressure $P_1$, $P_2$ before and after the expansion respectively, are given by $$T_2 = T_1 r^{1-\gamma} \tag{3}$$

$$P_2 = P_1 r^{-\gamma} \tag{4}$$

Consequently, by substituting equations (2) and (4) into equation (1), the work equation can be expressed as $$W = \frac{P_1V_1}{\gamma - 1}[1 - r^{1-\gamma}] \tag{5}$$

The maximum possible work W that can be obtained by the expanding gas is given by $$W = \lim_{r \to \infty} W = \frac{P_1V_1}{\gamma - 1} \tag{6}$$

The factor defined by $$\eta = 1 - r^{1-\gamma} \tag{7}$$

in equation (5) represents the thermal efficiency of the expansion process. This efficiency $\eta$ is also equal to the Carnot efficiency $$\eta = \frac{T_1 - T_2}{T_1} \tag{8}$$

which can be obtained by substituting equation (3) into equation (7). Hence, equation (5) can be expressed as $$W = \left(\frac{P_1V_1}{\gamma - 1}\right)\eta \tag{9}$$

where $\eta$ denotes the thermal efficiency given by (7) or (8).

The well known perfect gas law is $$PV = nRT \tag{10}$$

where the gas constant R=8.3144 Joules/(Mole °K.) and where n=m/M denotes the number of moles contained in a quantity of gas with mass m and molecular weight M. Consequently, when equation (10) is substituted into equation (9) the work W that is generated by an adiabatic expansion is given by $$W = \left(\frac{mRT_1}{M(\gamma - 1)}\right)\eta \tag{11}$$

Thus, the quantity $$W = \frac{W}{m} = \frac{RT_1}{M(\gamma - 1)} \tag{12}$$

represents the thermal energy density of a compressed gas at temperature $T_1$ and molecular weight M.

The molecular weight of ordinary atmospheric air is 28.9752 and its ambient temperature $T_1$ is approximately 290° K. Consequently, the available thermal energy density of ordinary air at standard temperature and pressure is $$W \text{ (air)} = \frac{8.314 \times 290}{28.9752 \times .415} = 200.529 \text{ Joules/gm}$$

In order to comprehend the magnitude and implications of this energy density, it is helpful to compare it with other natural energy reservoirs that can be harnessed for the generation of mechanical work. For example, water stored in a reservoir above a dam has an energy density equal to gh where the constant g denotes the gravitational constant 9.8 m/sec² and where h denotes the height in meters above the turbine (i.e., water head). Consequently, in order to match the same energy density as atmospheric air, a dam would have to have a water head of 200,529 Joules/(9.8 m/sec²)=20,462 m (67,133 ft). A brisk wind moving along at 20 mph (8.94 m/sec) through the blades of a wind turbine, (i.e., windmill) has an energy density of 39.95 Joules/kg. Consequently, the energy density of ordinary "motionless" atmospheric air at standard temperature and pressure is 5,019 times greater than that of a 20 mph wind.

The above numerical comparisons clearly reveal the true enormity of the energy reservoir represented by ordinary ambient atmospheric air. The present invention is based upon recognizing this fact and providing an engine without violating the second law of thermodynamics that can harness this energy reservoir by direct thermodynamic processes. In the prior art, the atmosphere is viewed as an essentially infinite heat sink that is utilized to dump waste heat produced artificially in prior art heat engines that pollute it with burning fuels that are also very expensive. In the present invention the atmosphere is viewed as a natural "high temperature" heat reservoir that can be harnessed to generate unlimited energy with zero pollution and zero fuel cost.

In view of equation (7) an adiabatic expander with an expansion ratio of r=300 will have a thermal expansion efficiency of $\eta$=0.9062 or 90.62%. Thus, the expander will generate 181.728 Joules for each gram of incoming air. Unfortunately, if the pre-expansion air temperature $T_1$=290° K., then only about 30% of the incoming air can be condensed by the expansion process, removed from the vacuum chamber and repressurized back to the initial ambient atmospheric pressure with the expenditure of negligible mechanical work (because of its reduced specific volume). The remaining 70% of noncondensed gaseous air has to be removed from the vacuum chamber and recompressed back to atmospheric pressure by a mechanical vacuum pump. Since the amount of noncondensed gaseous air in the vacuum chamber is about 70% of the original expanded air, the amount of mechanical work consumed by the vacuum pump in removing this air is about 70% of the mechanical work gained during the initial expansion. Thus, the net output work is about $(181.728 - 0.7 \times 181.728)$ Joules/gm = 54.519 Joules/gm. The corresponding net thermal efficiency $W_{net}/Q_{in} = 54.519/200.529 = 0.272$ (27.2%) which is approximately equal to that of prior art heat engines. Actually, this is not quite correct since the entropy of the noncondensed gaseous air will be much higher than that of the pre-expanded air. Hence, it will require the expenditure of much more mechanical work to recompress it back to ambient atmospheric pressure. Furthermore, equations (1)–(12) are based on ideal gases that do not take into consideration the effect of intermolecular van der Waals forces. However, if the repressurization process were carried out while cooling the air, the amount of work required to recompress and remove it from the chamber can be significantly reduced to the point where the above approximation is valid. Thus, if the engine's intake is 1.0 gm of air per second, the net power output will be about 54.5 Watts.

Although the present invention is basically a condensing heat engine, it differs from all others in the prior art in that the roles of the ambient atmosphere are completely reversed. In this engine, the ambient atmosphere is utilized as the engine's high temperature heat reservoir and the atmosphere itself is utilized as the engine's condensing working fluid. This represents a radical and fundamental difference between this engine and all others in the prior art.

The "boiler" in this condensing atmospheric engine is much larger than those of other condensing heat engines. In fact, its boundary is the entire surface of the Earth and the working fluid is confined inside this boiler by "gravitational confinement" that is sustained by the Earth's gravitational field. This field also compresses the gaseous working fluid by "gravitational compression" to 10.13 N/cm$^2$ (14.7 lbs/in$^2$) at sea level. Moreover, unlike the boilers of prior art condensing heat engines which are heated by burning combustible fuels or by nuclear fission processes, the boiler of the air-powered atmospheric engine is continuously heated and maintained at its "high temperature" by the clean burning fusion energy generated inside the sun at zero cost. Thus, in reality, this air-powered atmospheric engine introduced herein is a fusion powered engine.

This fusion engine should not be confused with prior art "solar engines" that intercept and convert incident solar radiation into extractable energy such as in solar power plants, solar cells or the like. These prior art engines require direct sunlight which is falling on the Earth's surface at about 0.95 KW/m$^2$. Since the energy conversion efficiencies are usually below 30% for these engines, the receiver area required to generate 100 KW, for example, will exceed 351 m$^2$ (3,777 ft$^2$). These receivers usually have to be continuously moved so as to follow the sun as it moves across the sky. The air-powered atmospheric engine, however, can operate just as well at night as by day and can even be located underground. Air-powered atmospheric engines can also deliver significantly greater power densities (i.e., power-to-weight ratios) than these solar engines, wind turbines and other engines utilizing secondary energy resources. Although air-powered atmospheric engines are somewhat more bulky and dimensionally larger than prior art condensing heat engines of equal power output, they are essentially empty vacuum chambers with relatively low weight.

Before going into the detailed design specifications, it should also be pointed out that the air-powered atmospheric engine not only represents a practical and safe fusion engine concept but also a complete world wide energy generating and distribution system. First of all, only one fusion powered central energy source (the sun) is involved and this source heats the working fluid—ordinary atmospheric air—at a rate of about $1.5 \times 10^{11}$ MW to an average temperature of about 290° K. This high temperature heat reservoir is in reality, at a very high temperature relative to cryogenic temperatures. All of the individual atmospheric engines are powered by this same high temperature working fluid which represents their common high temperature heat reservoir. No electric transmission lines or pipe lines are needed to convey input energy to these engines. Nor do they require fuel tanks for carrying fuel. Rather, these atmospheric engines always have access to their input energy wherever they are by merely being in the open atmosphere. Moreover, the input energy is inexhaustible and free of charge. These revolutionary operating features, which characterize my atmospheric engines, do not exist in the prior art.

It has been commonly believed for over a century that it is thermodynamically impossible to harness the ambient thermal energy of the natural environment and convert it into useful mechanical work by any condensing heat engine. Such engines have been called "perpetual motion machines of the second kind". Yet my condensing atmospheric engine is a heat engine that does harness the natural thermal energy of the ambient environment and converts a portion of it into useful mechanical work. However, it will be shown herein that it does not violate the second law of thermodynamics and does not fall into the category of "perpetual motion machines of the second kind". The basic reason is due to the fact that my condensing atmospheric engine is a "semi-open cycle" condensing heat engine which is totally unique in the prior art. This is made possible by utilizing the atmosphere itself as the condensing working fluid. Perpetual motion machines of the second kind are condensing "closed cycle" heat engines.

Although a basic operating net output performance of 54.519 Joules per gram of air ingested into the ambient air expander is fairly high, this net output work can be significantly increased by utilizing the thermal potential difference between the 30% condensed air at cryogenic temperatures that the engine produces as a by-product and the natural environment at ambient temperature. Thus, for example, if the condensed cryogenic air at atmospheric pressure is liquid air at 80° K., it could be compressed to say 300 Atm and fed through a series of ambient vaporizers and isentropic expanders. The cryogenic fluid would extract additional natural thermal energy from the ambient environment for conversion into additional mechanical work. Such a scheme could generate a net amount of 98.268 Joules of additional output work. The total net output work would be boosted to 152.787 Joules/gm which represents an increase of over 180%. Moreover, by recycling the expanded air back through the first expander (along with a portion of new air taken from the atmosphere) the condensation ratio can be significantly increased without increasing the expansion ratio thereby increasing the engine's net output to even higher levels. Thus, the preferred embodiment of my condensing atmospheric engine incorporates these additional features as integral parts of its basic design.

The underlying theoretical feasibility of my air-powered atmospheric engine essentially rests upon the possibility of actually achieving a self-induced, spontaneous phase transformation with ordinary ambient air by an isentropic expansion process inside a low temperature vacuum chamber starting from standard atmospheric temperature and pressure. This possibility can in fact be accomplished which can be demonstrated by referring to the graphs of FIG. 1. This figure containes pressure-temperature phase diagrams of nitrogen, oxygen and ordinary atmospheric air near their triple points. These curves represent the equilibrium phase boundaries between the gaseous, liquid and solid states that are functions of temperature T and pressure P. The boundary between the gaseous and liquid states is a curve called the "vaporization curve"; the boundary between the gaseous and solid states is another curve called the "sublimation curve"; and the boundary between the liquid and solid states is called the "fusion curve". The point where the substance can coexist in equilibrium in the gaseous, liquid and solid states is called the triple point. These curves are important because the physical state of any pure gas such as nitrogen or oxygen at any arbitrary temperature and pressure can be immediately determined by simply plotting the point (T,P) on its phase diagram and observing the "state region" that it lies in. (See, for example, *Phase Equilibria*, Academic Press, New York & London, 1970 by A. Reisman.) Notice that the phase diagram of atmospheric air lies inside the phase boundaries of nitrogen and oxygen. This is because air is a mixture of essentially 76% nitrogen and 24% oxygen by weight. Hence, the region bounded by these curves represents a "mixed phase" region of atmospheric air. Accurate phase properties of atmospheric air were determined experimentally by A. A. Vasserman and V. A. Rabinovich and reported in their book: *Thermophysical Properties of Liquid Air And Its Components*, U.S. Department of Commerce/The National Science Foundation, Technical Translation No. TT69-55092, 1970.

Let the points $(T_1, P_1)$ and $(T_2, P_2)$ denote the initial and final temperatures and pressures of any ordinary gas that is expanded adiabatically inside an expansion chamber. As described above, these parameters are related to the expansion ratio r by equations (3) and (4). The expansion ratio r can be eliminated from equations (3) and (4) to give $$P_2 = P_1 \left( \frac{T_2}{T_1} \right)^{\frac{\gamma}{\gamma-1}} \tag{13}$$

In the preferred embodiment of the air-powered engine, the initial pressure $P_1$ is assumed to be equal to standard atmospheric pressure which is 760 torr (10.13 N/cm²). If this value is substituted into equation (13) the result is a one parameter family of curves of $P_2$ versus $T_2$ with $T_1$ acting as the parameter. Suppose that the initial temperature $T_1$ of the air is between 300° K. (80.3° F.) and 200° K. (−99.7° F.). When $T_1 = 300°$ K. is substituted for this parameter, equation (13) determines a curve of $P_2$ versus $T_2$ which I shall call the high temperature operating curve of the engine. When $T_1 = 200°$ K. is substituted for this parameter, equation (13) determines another curve of $P_2$ versus $T_2$ which I shall call the low temperature operating curve of the engine.

These two curves will be called the operating envelope of the air-powered atmospheric engine and are plotted and superimposed on the phase diagrams of FIG. 1. (However, by recycling the previously condensed air back into the initial expander and pre-cooling the new air taken from the atmosphere, it should be possible to obtain pre-expansion air temperatures below 200° K.)

Notice that both the high and low temperature engine envelope curves intersect the sublimation curve of $N_2$ at a fairly large angle and penetrate deep into the 100% solid phase region of atmospheric air. This intersection and penetration therefore demonstrates that ordinary atmospheric air can indeed undergo a self-induced, spontaneous phase transformation by an essentially adiabatic expansion process starting from standard atmospheric temperature and pressure.

The sublimation curve of $N_2$ bounded by the engine envelope curves defines essentially an absolute boundary between the 100% solid phase of atmospheric air (which exists on the left hand side of this boundary) and partially solid, liquid and gaseous phases (which exist on the right hand side of this boundary). The vaporization curve of $O_2$, bounded by the engine envelope curves, defines another essentially absolute boundary. In this case, however, the boundary separates the 100% gaseous phase of atmospheric air (which exists on the right hand side of this boundary) from the partially liquefied, solidified and gaseous phases which exist on the left hand side of this boundary (but to the right of the $N_2$ sublimation curve). Thus, the diamond shaped region bounded by the vaporization curve of $O_2$, the sublimation curve of $N_2$ and the high and low temperature engine envelope curves represents a transition region where the expanded air exists as a mixture of gaseous, liquid and solid phases in thermodynamic equilibrium with each other. This region will be called the "mixed phase region".

Let $T_1$ denote any initial temperature between 300° K. and 200° K. This parameter value determines a unique curve of $P_2$ versus $T_2$ (as described above for the cases $T_1 = 300°$ K. and $T_1 = 200°$ K.) which intersects the boundaries of the mixed phase region at specific points. These intersection points correspond to unique values of the expansion ratio r that can be determined from equation (3) or (4). FIG. 2 gives the graphs of these threshold expansion ratios represented by $r = r_{mixed}(T_1)$ and $r = r_{solid}(T_1)$ that correspond to intersections with the $O_2$ vaporization curve and with the $N_2$ sublimation curve, respectively. The region bounded by these curves and the two vertical ordinate lines $T_1 = 200°$ K. and $T_1 = 300°$ K. represents the mixed phase region of FIG. 1.

These graphs shown in FIG. 2 are important because they give detailed information about the phase transformation such as the minimum required expansion ratio needed to enter the mixed phase region starting from any initial temperature $T_1$ as well as the minimum required expansion ratio needed to pass out of this region and into the solid phase region. For example, if $T_1 = 275°$ K., these threshold expansion ratios would be $r_{mixed} = 49.68$ and $r_{solid} = 76.78$, respectively, which can be read off the graphs directly by following the $T_1 = 275°$ K. ordinate line vertically upward to the $r = r_{mixed}$ and $r = r_{solid}$ curves and reading the expansion ratios at these intersections respectively.

In order to obtain maximum phase transformation, the preferred embodiment of the air-powered atmospheric engine will always employ expansion ratios that send the air into the solid phase region. Thus, if $T_1=300°$ K., the minimum required expansion ratio would be 100.79.

The above examples, along with FIG. 2 clearly show the advantage of cooling the air before allowing it to enter into the expansion chamber because for equal expansion ratios the air will be driven further into the solid phase region if it is pre-cooled. This will result in a more complete phase transformation (i.e., a greater phase transformation ratio).

In view of the very low cryogenic air temperatures generated inside the expansion chamber when these high expansion ratios are executed, the air is sent through a very large temperature gradient as it expands within the chamber. This temperature range is so high that it would be difficult to maintain an even approximate adiabatic expansion process if the walls of the chamber were kept at standard ambient atmospheric temperature (i.e., 290° K.). (These high wall temperatures would also tend to inhibit the phase transformation process.) Consequently, in the preferred embodiment of the invention, the expansion chamber is mounted inside a cryogenic Dewar vessel that is filled with very cold liquid air obtained as a by-product from melting solid air particles that were produced from previous expansions. The temperature of this liquid is not too far above the triple point of atmospheric air which is approximately 61° K. ($-212°$ C. or $-350°$ F.). Thus, the walls of the expansion chamber are in direct contact with this cold liquid air and are therefore maintained at very low cryogenic temperatures. This low temperature environment of the expansion chamber not only makes an adiabatic process easier to achieve but it also enables the expansion process to become nearly isentropic as well. That is to say, the net increase in the entropy $\Delta S$ of the air as it expands through the gaseous phase is very small. Thus, this low temperature environment of the chamber further assists the self-induced, spontaneous phase transformation process.

The above phase diagrams and graphs only demonstrate that it is possible to achieve some self-induced, spontaneous phase transformation in ordinary atmospheric air by isentropically expanding the air with very high expansion ratios on the order of 100. They do not however, and in fact, they can not, reveal quantitatively how much of the air undergoes phase transformation. This information can only be obtained from a detailed Temperature-Entropy diagram of atmospheric air.

FIG. 3 is a detailed Temperature-Entropy diagram of atmospheric air extended to very low cryogenic temperatures. It is based on the above-mentioned book by Vasserman and Rabinovich combined with the "Temperature-Entropy Diagram for Air between 80° K. and 450° K.", published by the British Oxygen Co., Ltd., 1954; and the publication by G. Walker et al, entitled "The Vapor Pressure Of Dry Air At Low Temperatures", *Advances in Cryogenic Engineering,* Vol. 11, 1966, pp. 372–378. The construction of FIG. 3 also involved a detailed mole fraction averaging of low temperature thermodynamic data of nitrogen and oxygen given by W. T. Ziegler and J. C. Mullins in their reports: *Calculation Of The Vapor Pressure And Heats Of Vaporization And Sublimation Of Liquids And Solids Especially Below One Atmosphere. IV. Nitrogen And Fluorine,* Technical Report No. 1 National Bureau of Standards, Boulder, Col., Apr. 15, 1963 and *The Thermodynamic Properties of Oxygen From* 20° K. *to* 100° K., Technical Report No. 2, National Bureau of Standards, March 1, 1962.

The point A on the TS diagram of FIG. 3 represents ambient atmospheric air at standard temperature (290° K.) and pressure (10.13 N/cm²). The corresponding entropy $S(T_1)=6.861$ Joules/gm°K. The vertical line downward from point A to point B represents the isentropic expansion of ambient air down to its saturated vapor curve at point B to about 48° K. In view of equation (3), the expansion ratio r can be obtained by the equation $$r = \left(\frac{T_2}{T_1}\right)^{\frac{1}{1-\gamma}} \qquad (14)$$

Hence, by setting $T_1=290°$ K., $T_2=48°$ K. and $\gamma=1.415$, it follows that $r=76.26$. However, at point B, which lies on the saturated vapor curve of air, the actual amount of spontaneous phase transformation induced by the isentropic expansion is zero (i.e., the phase transformation ratio R is zero). Spontaneous phase transformation can only be achieved when the vertical isentropic expansion line penetrates below the saturated vapor curve. When this happens, the corresponding phase transformation ratio R is given by the formula $$R = \frac{S_v(T_2) - S(T_1)}{S_v(T_2) - S_s(T_2)} \qquad (15)$$

where $S_v(T_2)$ and $S_s(T_2)$ denotes the corresponding entropy of air on the saturated vapor and the saturated solid curves of air respectively corresponding to the saturated air temperature $T_2$. For example, if $T_2=30°$ K., then $S_v(T_2)=9.591$ Joules/gm°K. and $S_s(T_2)=0.595$ Joules/gm°K. Hence, in this case R $(T_2)=(9.591-6.861)/(9.591-0.595)=0.303$. Thus about 30% of the expanded air will undergo spontaneous phase transformation into solid air crystals while the remainting 70% of the expanded air will be gaseous saturated vapor. The corresponding expansion ratio can be calculated from equation (14). The result is $r=236.68$. The entropy of the 30% solidified air is 0.595 Joules/gm°K. and the entropy of the 70% saturated air vapor is 9.591 Joules/gm°K. It should be pointed out that these entropy values are based on a zero entropy point adopted in the above-mentioned books by Ziegler and Mullins. Since only differences in entropy values are important in thermodynamic calculations, the selection of the zero entropy point is not very important.

Since the actual phase transformation ratio R can now be determined quantitatively, the basic operating feasibility of my atmospheric engine can be demonstrated by numerical calculations. For simplicity, I shall assume that the engine comprises a simple frictionless piston 10 moving inside an evacuated cylinder 12 whose external walls 14 are maintained at cryogenic temperatures as illustrated schematically in FIGS. 4A–4F.

In this simplified embodiment, the operating cycle begins with the admission of ambient atmospheric air at standard temperature $T_1=290°$ K. and pressure $P_1=10.1325$ N/cm² when the piston 10 is adjacent a plurality of air intake ports 16 at the left end of the cylinder as illustrated in FIG. 4F.

Since the cylinder 12 is evacuated on the right hand side of the piston 10, the pressure of the gaseous working fluid (air) begins to move the piston 10 to the right.

Meanwhile additional air enters through the intake ports 16 at about constant initial pressure $P_1$. After the piston moves a relatively short distance $x_1$, as shown in FIG. 4A, the intake ports 16 are closed, which locks a small "air slug" with initial volume $V_1$ into the cylinder at the initial pressure $P_1$. The air then begins to expand isentropically against the piston with a pressure which now begins to decrease. FIG. 4B shows the piston 10 moving to the right at some intermediate point between the ends of the cylinder under the force of the expanding air slug.

After a short time interval, the piston 10 reaches the right hand end of the cylinder 12 (at $x=x_2$) where it momentarily stops. At this point the expanded air slug reaches its maximum volume $V_2$. If the expansion ratio $r=236.68$ and if $V_1=100$ cm$^3$, then $V_2=rV_1=23,668$ cm$^3$. The number of moles of air inside $V_1$ is 0.0042023 which can be calculated from equation (10). Suppose that during the isentropic expansion there is no phase transformation. Consequently, the air pressure after expansion $P=0.0044287$ N/cm$^2$ which can be calculated from equation (4). The resulting mechanical work $W_e=21.890$ Joules which can be calculated from equation (1). The thermal efficiency $\eta$ of the expansion is 0.897 which can be calculated by equation (7). Thus, almost all of the natural thermal energy of the initial ambient air slug in $V_1$ is extracted and converted directly into mechanical work. The air is therefore reduced to a very cold supersaturated cryogenic state by the expansion. In view of equation (3), the temperature of the air inside $V_2$ is 30° K. Since the phase transformation ratio R is 0.303 for this isentropic expansion, 30% of the expanded air inside $V_2$ solidifies into solid air crystals.

This phase transformation or condensation is an actual "implosion" of the air into its solid state and is the direct antithesis of the "explosion" phenomenon which characterizes prior art heat engines such as internal combustion engines. This is accomplished by removing a sufficient amount of kinetic energy from the individual gas molecules by employing extremely high expansion ratios so that their natural intermolecular attractive forces (i.e., van der Waals forces) can take hold and produce the desired condensation. The physical effect of this condensation is a several hundred fold reduction of the specific volume of 30% of the expanded air inside the cylinder which results in an immediate decrease in pressure. After the condensation takes place, the pressure inside $V_2$ is reduced to 0.0031001 N/cm$^2$, which can be calculated from equation (10) where $n=0.7\times 0.0042023=0.0029416$ moles of gaseous air occupying $V_2$. (The vapor pressure of the solidified air is very low and does not contribute to the pressure inside $V_2$.) FIGS. 4C and 4D show the expanded air inside the cylinder immediately before and immediately after condensation respectively.

For simplicity, assume that the solidified air is removed from the cylinder and isentropically recompressed back to ambient atmospheric pressure immediately after condensation. Since the specific volume of the solidified air is very low, the amount of work consumed by this recompression is negligible. However, this is not true for the remaining 70% unsolidified gaseous air remaining inside the cylinder. This gaseous air is removed by driving the piston 10 back toward the left as shown in FIG. 4E. The required compression ratio needed to recompress the gaseous air vapor back to standard atmospheric pressure (10.1325 N/cm$^2$) can be calculated from equation (4) where $P_2=0.0031001$ N/cm$^2=0.0003060$ $P_1$. The result is $r=304.532$. Hence, the contracted volume $V_1'=23,668/304.532=77.719$ cm$^3$. The mechanical work expended by this return stroke can be calculated approximately by equation (1). The result is $W_c=17.208$ Joules. Consequently, the net gain of mechanical output work is $W_e\text{-}W_c=4.682$ Joules.

After $V_1'$ is reached, the discharge tube 18 is opened, and the piston 10 is advanced all the way to the left hand cylinder wall as shown in FIG. 4F so that the unsolidified air is exhausted back into ambient atmosphere. Since the air pressure is constant during this portion of the piston stroke, the amount of additional work expended is equal to $V_1'P_1$. However, this work is more then compensated when the initial air slug was admitted into the cylinder to fill the initial volume $V_1$ before the air was expanded. Thus, the net gain in mechanical work due to air admission and discharge is $(V_1\text{-}V_1')$ $P_1=2.258$ Joules. Thus, the actual net gain in mechanical output work is $W_{net}=4.682+2.258=6.940$ Joules. The corresponding work per gram of air intake (specific work) is $6.940/0.004202M)=56.997$ Joules/gm.

It is interesting to calculate the temperature of the unsolidified air after it is recompressed to ambient pressure inside the cylinder and discharged back into the atmosphere. This exhaust temperature can be calculated from equation (3) by setting $r=304.5$ and $T_2=30°$ K. The result is 322° K. (120° F.). This high exhaust temperature is due to the fact that the entropy of the exhaust air $=S_v(T_2)=9.591$ Joules/gm°K. while the entropy of the preexpanded ambient air is 6.861 Joules/gm°K. Thus, by utilizing the ambient atmosphere as a heat sink, the unsolidified air can, in principle, be cooled by the atmosphere while it is recompressed back to ambient pressure. This would reduce the amount of mechanical work expended on the recompression and hence, increase the total net output work of the engine. Notice that in this engine design, the atmosphere is simultaneously utilized both as a high temperature heat reservoir and as a low temperature heat sink for reducing the entropy of the expanded air and bringing about its condensation. This is accomplished by removing the noncondensed expanded air with the high entropy but keeping the condensed solidified air with the low entropy. In removing the high entropy noncondensed gaseous air by repressurizing it back to ambient atmospheric pressure, its temperature will be increased to levels significantly above ambient because of its high entropy. Thus, the relatively cool ambient atmosphere can be utilized to extract and absorb heat from the repressurized noncondensed gaseous air in order to reduce the energy consumed while repressurizing it back to ambient atmospheric pressure. Thus, in this process, the ambient atmosphere is utilized as an infinite heat sink to absorb the heat energy generated by repressurizing the noncondensed gaseous air back to ambient atmospheric pressure. This cooling process lowers the entropy of the repressurized air. Thus, the initial entropy of the original air prior to expansion is lowered because the expansion and recompression steps were isentropic (which do not change the entropy). The high entropy of the noncondensed gaseous air was balanced by the low entropy of the condensed solidified air. Consequently, when the ambient atmosphere absorbs the heat energy of the high entropy noncondensed gaseous air (which lowers its entropy) the low entropy of the condensed air is no longer balanced by the high entropy of the noncondensed air. This results in a lowering of the combined entropy of the condensed air and the noncondensed air. The low entropy of the condensed air was made possible by the high entropy of the noncondensed air which was, in turn, reduced by heat transfer to the ambient atmosphere. Thus, the low entropy of the condensed air was actually accomplished by absorbing the entropy in the ambient atmosphere.

After the noncondensed gaseous air is discharged back into the atmosphere, the cycle is repeated by ingesting new air from the atmosphere and repeating the steps shown in FIGS. 4A–4F. The corresponding "work diagram" is shown in FIG. 5. The net mechanical output work $W_{net}$ generated in each cycle is illustrated by the shaded area. The points A, B, C, D, E, and F shown on the work diagram of FIG. 5 correspond to FIGS. 4A, 4B, 4C, 4D, 4E, and 4F respectively.

One of the most important operating features of the engine is the fact that it continuously generates solid air at very low cryogenic temperatures. This by-product can be utilized to provide the vacuum expansion chamber with a renewable cryogenic environment to assist and enhance the phase transformation process. However, it should be emphasized that this cryogenic air does not serve as the engine's low temperature heat sink for absorbing the latent heat of condensation of the expanded air to bring about its phase transformation. The phase transformation process is accomplished by isentropically expanding the air with very high expansion ratios whereby a significant fraction of the kinetic energy of all of the expanded air molecules is transferred to the moving piston. That portion of the slowest moving molecules in the Boltzmann velocity distribution, that have velocities below the minimum threshold velocity required to repel the attractive intermolecular van der Waals forces, spontaneously condense on one another into solidified air crystals.

Upon removing this portion of condensed cryogenic air from the chamber and repressurizing it back to ambient atmospheric pressure, it can be utilized to provide a low temperature operating environment for the expansion chamber in order to insure isentropic or nearly isentropic expansions. However, by adopting an engine design that takes maximum advantage of cryogenic insulation material with exceedingly high thermal insulation characteristics such as "evacuated cryogenic multilayer insulation", the amount of heat energy absorbed by the cryogenic air can be kept relatively small—especially since it is not needed to absorb the latent heat of condensation. Consequently, the cryogenic air can also be utilized to pre-cool the incoming ambient air before it is expanded in order to increase the phase transformation ratio. It can also be utilized to cool the expanded noncondensed gaseous air while it is being compressed back to atmospheric pressure in order to reduce the work expended on this recompression. Finally, after serving as an engine coolant, liquefied air can be compressed to very high pressures and utilized to extract more ambient thermal energy from the natural environment for conversion into additional mechanical work.

Many different embodiments of the engine are possible which utilizes this condensed solidified air in different ways. In the preferred embodiment, this solidified air is utilized to increase the engine's maximum net output. However, since the optimum engine design can only be determined by experimental testing with actual working models it is difficult to predict herein what this optimum design will be.

These are the basic operating principles of my air-powered condensing atmospheric engine. Barring mechanical breakdown, the engine could run indefinitely, generating free and unlimited mechanical work from the natural thermal energy of ordinary ambient atmospheric air. It is important to emphasize the fact that although the engine is a cyclic condensing heat engine, it has a "semi-open" operating cycle. If it were designed as a closed cycle engine by feeding the recompressed noncondensed air immediately back into the intake duct for re-expansion, it would eventually run down because the high entropy of the exhaust air would retard the phase transformation process when it is re-expanded. This semi-open cycle operating principle also enables the engine to operate without violating the second law of thermodynamics. (However, the basic physical mechanism which the engine employs for circumventing the second law is based on significantly reducing the random velocities of the air molecules by isentropic expansion such that a relatively large fraction of them end up with random velocities below the minimum threshold velocities needed to repel the attractive intermolecular van der Waals forces and hence undergoes spontaneous condensation.)

In order to translate the above theory and operating principles into a practicle engine design that can be constructed to generate useful mechanical work, it is important to understand its most fundamental aspect— phase transformation of atmospheric air via isentropic expansion.

Table 1 gives the resulting phase transformation ratios R corresponding to various initial temperatures $T_1$ and expansion rates r. The numerical values are computed from the Temperature-Entropy diagram of air given in FIG. 3 and equations (3) and (15) with the expansion ratio r and $T_1$ independent parameters.

TABLE 1

Phase Transformation Ratios and Saturated Vapor Temperatures of Atmospheric Air Generated by Isentropic Expansions With High Expansion Ratios

| | $T_1 = 300°$ K. | | $T_1 = 280°$ K. | | $T_1 = 260°$ K. | | $T_1 = 240°$ K. | | $T_1 = 220°$ K. | | $T_1 = 200°$ K. | |
|---|---|---|---|---|---|---|---|---|---|---|---|---|
| r | R | $T_2$ | R | $T_2$ | R | $T_2$ | R | $T_2$ | R | $T_2$ | R | $T_2$ |
| 100 | .069 | 44.4 | .125 | 41.4 | .185 | 38.5 | .243 | 35.5 | .300 | 32.5 | .352 | 29.6 |
| 150 | .180 | 37.5 | .229 | 35.0 | .279 | 32.5 | .325 | 30.0 | .377 | 27.5 | .422 | 25.0 |
| 200 | .240 | 33.3 | .292 | 31.1 | .338 | 28.8 | .381 | 26.6 | .422 | 24.4 | .464 | 22.2 |
| 250 | .296 | 30.3 | .338 | 28.3 | .377 | 26.3 | .416 | 24.3 | .456 | 22.2 | .491 | 20.2 |
| 300 | .335 | 28.1 | .369 | 26.3 | .407 | 24.4 | .445 | 22.5 | .479 | 20.6 | .506 | 18.8 |
| 350 | .362 | 26.4 | .396 | 24.6 | .431 | 22.9 | .465 | 21.1 | .494 | 19.3 | .518 | 17.6 |
| 400 | .384 | 25.0 | .418 | 23.3 | .444 | 21.6 | .479 | 20.0 | .504 | 18.3 | .527 | 16.6 |
| 450 | .403 | 23.8 | .435 | 22.2 | .465 | 20.6 | .490 | 19.0 | .513 | 17.4 | .535 | 15.8 |

TABLE 1-continued

Phase Transformation Ratios and Saturated Vapor Temperatures of
Atmospheric Air Generated by Isentropic Expansions With
High Expansion Ratios

| | $T_1 = 300°$ K. | | $T_1 = 280°$ K. | | $T_1 = 260°$ K. | | $T_1 = 240°$ K. | | $T_1 = 220°$ K. | | $T_1 = 200°$ K. | |
|---|---|---|---|---|---|---|---|---|---|---|---|---|
| r | R | $T_2$ | R | $T_2$ | R | $T_2$ | R | $T_2$ | R | $T_2$ | R | $T_2$ |
| 500 | .420 | 22.8 | .450 | 21.2 | .476 | 19.7 | .498 | 18.2 | .520 | 16.7 | .540 | 15.2 |

FIG. 6 is a composite graph of Table 1 showing the phase transformation R of air versus expansion ratio corresponding to various initial air temperatures. It is apparent from this figure that the phase transformation ratio R can be substantially increased by isobarically pre-cooling the incoming air to below ambient temperature before it is isentropically expanded inside the expansion chamber. Consequently, the design of the engine will incorporate this pre-cooling feature as an integral part of its basic design.

Omitting for the time being the very difficult engineering problem of designing an expansion chamber capable of isentropically expanding atmospheric air at standard atmospheric pressure into a vacuum chamber with an expansion ratio on the order of 300, it is important to point out another aspect that will also be incorporated into the basic engine design. It is clear from Table 1 that the condensed air produced by the expansion will have a temperature between approximately 16° K. and 30° K. Consequently, since the triple point of air is 61° K., the condensation is manifested by a direct solidification into the solid phase which completely avoids the liquid phase. Although this thermodynamic fact may be viewed as a serious obstruction in the design of an atmospheric engine, I hold a completely opposite point of view. This very cold solidified air presents a significant thermal potential difference with respect to the ambient environment that can be harnessed to generate additional mechanical work while the solid air is simultaneously liquefied. In particular, it can serve as a low temperature heat sink for a closed cycle intermediate stage cryogenic engine operating between liquid air temperature at 80° K. and the natural environment at 290° K. The condensing working fluid could be some other cryogen with a critical temperature significantly below ambient so that it can be superheated at 290° K.

This intermediate closed cycle stage could operate as follows: A suitable liquefied cryogenic working fluid is compressed to a high working pressure and fed into an ambient vaporizer that is maintained in thermal contact with the natural environment. The compressed low temperature cryogen circulating through this vaporizer creates a significant temperature gradient across the vaporizer and a large amount of natural ambient thermal energy is extracted from the environment and absorbed by the compressed cryogen. The cryogen is isobarically heated by absorbing this natural thermal energy above its critical temperature and is completely vaporized into a high pressure superheated gas. Unlike prior art condensing heat engines, this input thermal energy entering the ambient vaporizer is free, inexhaustible and non-polluting. The cryogenic working fluid emerges from the vaporizer as a compressed, superheated gas at about 290° K. This compressed gas is then fed into an expander where a large fraction of the natural thermal energy extracted from the environment is converted into additional mechanical output work. Since the specific volume of the gaseous working fluid is several hundred times greater than the liquefied working fluid, the mechanical work generated by the expander is significantly greater than that consumed by the compressor.

The pressure ratio of the expander is such that the expansion process simultaneously reduces the temperature and pressure of the gas to saturation point and the expanded gas leaves the expander as a saturated vapor. This saturated vapor is then fed into a condenser where it is isothermally condensed back into its original liquefied state. This liquefield cryogenic working fluid is then withdrawn from the condenser and fed back into the compressor where it is recompressed back to the high working pressure and the process is repeated in a closed cycle.

This condenser is maintained in thermal contact with the solidified air such that the cryogenic working fluid is isothermally condensed from a saturated vapor to a liquid, while the air is simultaneously heated and melted from a very cold solid to liquid at about 80° K. As described above, the liquefied air may be utilized as a cryogenic engine coolant. It is then compressed to a very high pressure and fed into another ambient vaporizer to extract more natural thermal energy from the environment for conversion into still more mechanical output work. After the expanded air reaches ambient atmospheric pressure (after it emerges from the last expander) it is mixed with a portion of pre-cooled air taken from the ambient atmosphere and recycled back into the initial expander. The amount of new air taken from the atmosphere is exactly equal to the amount of noncondensed gaseous air that is recompressed and discharged back into the open atmosphere. Since the expanded recycled air at atmospheric pressure will have a temperature significantly below that of the pre-cooled new air taken from the atmosphere, the process of mixing it with the new air and recycling back into the initial expander represents a powerful regenerative cooling system that will be able to generate very low equilibrium pre-expansion temperatures $T_1$ on the order of 200° K. at standard atmospheric pressure. This will enable the condensation ratio to exceed 0.50 using an expansion ratio of only 300.

The process of extracting additional natural thermal energy from the environment via ambient vaporizers for conversion into additional mechanical work will utilize very high working pressures on the order of 300 Atm (4,410 lbs/in$^2$). This will enable the process to be carried out by a series of multiple expansions and reheating steps thereby maximizing the resulting mechanical output work.

FIG. 7 is a block diagram of the preferred embodiment of my air-powered condensing atmospheric engine. The corresponding Temperature-Entropy (TS) diagram and Temperature-Pressure (TP) phase diagram of air corresponding to the block diagram of FIG. 7 are shown in FIGS. 8 and 9 respectively. All of the various thermodynamic processes taking place by the air flowing through the engine shown on the block diagram of FIG. 7 are illustrated by various lines superimposed on the TS and TP diagrams of air given in FIGS. 8 and 9 respectively. The points between these processes are denoted by capital letters and correspond to the flow points shown on FIG. 7.

Thus, in this embodiment, ordinary air 22 is drawn directly from the open atmosphere at point A at ambient temperature 290° K. and pressure 10.1325N/cm². This ambient intake air is isobarically pre-cooled by passing it through a heat exchanger 24. The air emerges from the heat exchanger 24 at point B and mixed with previously condensed air discharged from the last expander 72 also at atmospheric pressure but with a much lower temperature such that the equilibrium temperature after mixing is about 200° K. This mixing step takes place inside a thermally insulated cold air reservoir mixing vessel 26. After the air is mixed inside the mixing vessel at point B, it is fed into a thermally insulated, low pressure expander 28 where it is isentropically expanded with an expansion ratio on the order of 300 into a thermally insulated cryogenic vacuum chamber 30. The expander 28 extracts almost all of the natural gaseous thermal energy of the cold air at atmospheric pressure and converts a large portion of it directly into mechanical work $W_{e1}$, while simultaneously reducing the air to a very cold supersaturated vapor at about 19° K. The expansion takes place very rapidly and (in view of FIG. 6) leaves about 50% of the vapor in a gaseous "metastable" state inside the vacuum chamber at point C. This metastable air spontaneously condenses into solid air crystals along the inside surfaces of condensing tubes 32 mounted inside the vacuum chamber 30. This condensation occurs spontaneously without removing any latent heat because of the very low molecular velocities of the expanded supersaturated air vapor. Almost all of the initial pre-expanded kinetic energy of these molecules is transferred to the movable member of the expander during the expansion process and converted directly into mechanical work. The remaining 50% of the air becomes saturated air vapor at point E. Referring to the TS diagram of FIG. 8, the phase transformation ratio R is equal to the length of the line segment $\overline{CE}$ divided by the length of the line segment $\overline{DE}$ and is approximately 0.50. Although the total entropy of the condensed solid and the uncondensed gaseous air vapor taken together remains unchanged from its prexpanded entropy at point B (because of the isentropic nature of the expansion process) the entropy of the condensed air at point D is much lower than the entropy of the noncondensed saturated air vapor at point E. It is important to emphasize that this condensation was achieved without having to absorb any latent heat by a low temperature heat sink. This is the most important and key operating feature of my invention.

The gaseous uncondensed air at point E is withdrawn from the vacuum chamber 30 and fed into a first stage recompressor 34 where it is recompressed to some intermediate pressure below ambient atmospheric pressure. The amount of mechanical work consumed by this first stage recompression step is denoted by $W_{c11}$. The partially recompressed air emerges from this recompressor 34 at point F. The resulting temperature of the recompressed air is about equal to ambient atmospheric temperature. This nearly ambient high temperature is due to the fact that the entropy of this noncondensed air is greater than that of the pre-expanded air. The partially compressed air is then fed into another heat exchanger 36 which lowers its temperature to about 240° K. When it emerges from the heat exchanger 36 at point G, it is fed into a second compressor 38 where it compressed to ambient atmospheric pressure and discharged back into the open atmosphere at point H. The amount of work consumed by the second stage compressor is denoted by $W_{c12}$.

As described above, if the noncondensed gaseous air vapor were recompressed back to ambient atmospheric pressure by a single isentropic recompressor, the resulting air temperature would be well above ambient and the amount of mechanical work consumed would be fairly high. By breaking the recompression into two steps, separated by a cooling step, the total amount of mechanical work expended by the recompression back to ambient atmospheric pressure is significantly reduced.

The solidifed air is withdrawn from the condenser 32 at point D and is fed into a solid phase compressor 42 and isentropically compressed to ambient atmospheric pressure (1.0 Atm). (The detailed design of this solid compressor 42, as well as the solid phase condenser 32 and first stage expander 28 will be disclosed later). The amount of mechanical work consumed by this solid phase compressor 42 is denoted by $W_{c13}$. Since the specific volume of the solidified air is several hundred fold less than that of the gaseous air, $W_{c13} \approx 0$. Consequently, $W_{e1} > W_{c11} + W_{c12} + W_{c13}$ and the net amount of mechanical output work $W_{net1}$ = $W_{e1} - W_{c11} - W_{c12} - W_{c13}$ is positive.

In view of the above analysis, the corresponding net specific mechanical output work $\hat{W}_{net1}$ (i.e., the net mechanical output work generated from one gram of air taken from the atmosphere at point A) can be expressed approximately by $\hat{W}(200° K.)\eta[1-(1-R)]/(1-R) = \hat{W}(200°)\eta R/(1-R)$ where $\hat{W}(200°)$ represents the gaseous thermal energy density of air at 200° K. at standard atmospheric pressure, which can be calculated from equation (12), and where $\eta$ represents the thermal efficiency of the expander/recompressor, which can be calculated from equation (7). The condensation ratio is denoted by R. The term 1-R that appears in the denominator of the expression arises from the fact that the fraction of previously condensed recycled air that is mixed with the new air at point B (FIG. 7) is R and the fraction of new air taken from the ambient atmosphere at point A is 1-R. (The fraction of air that is expanded but not condensed is also 1-R.) It is obvious that the amount of new air taken from the atmosphere at point A decreases when the value of the condensation ratio R increases. The condensation ratio R can be obtained from Table 1. Hence, if r=300 and $T_1 = 200°$ K., $\hat{W}_{net1} = 138.289 \times 0.9062 \times [0.506/(1-0.506)-]$Joules/gm=128.361 Joules/gm. The total amount of air that is actually expanded inside the expander 28 is equal to 2.024 gm. This is composed of 1.000 gm of new air taken from the atmosphere at point A and 1.024 gm of previously condensed air that is recycled back into the expander 28 from the mixing point B. (Thus, in terms of unit mass flow through the expander 28, the net output work is 63.410 Joules/gm.)

The solidified air which emerges from the solid phase compressor 42 at point I at a temperature of about 19° K. represents a significant "reverse" thermal energy reservoir with respect to the natural environment at ambient temperature that can be utilized to generate a substantial amount of additional mechanical work. As described above, the harnessing of this new thermal energy potential difference between 19° K. and 290° K. (ambient) will be accomplished by two additional stages—an intermediate second stage and a third stage. The intermediate or second stage will harness the thermal potential difference of the condensed cryogenic air from its solid phase at 19° K. up to its liquid phase at about 80° K. The third stage will harness the thermal potential difference of the cryogenic air from its liquefied phase at 80° K., all the way up to ambient temperatures.

Referring back to the block diagram of FIG. 7, the partially compressed solidified air at point I (compressed to 1.0 Atm) is fed into a heat exchanger 44 where it is isobarically heated to 80° K. by absorbing the latent heat $Q_{out2}$ that is rejected by a closed cycle intermediate second stage cryogenic engine that is utilizing this heat exchanger 44 at its condenser. The high temperature heat reservoir of this intermediate second stage cryogenic engine is the natural thermal energy of the ambient environment at 290° K.

The total amount of heat $\hat{Q}_{in2}$ that can be absorbed by one gram of condensed air between 19° K. and 80° K. is given by $C_s(T_t - 19°) + h_f + C_l(80° - T_t) = \hat{Q}_{in2}$ where $T_t = 61°$ K. denotes the triple point of air, and where $C_s$ and $C_l$ denote the specific heats of solid and liquid air at 1.0 Atm near the triple point respectively and where $h_f$ denotes the latent heat of fusion of air. These values are: $C_s = 1.582$ Joules/gm°K., $C_l = 1.896$ Joules/gm°K., $h_f = 22.721$ Joules/gm. Consequently, $\hat{Q}_{in2} = 1.582(61-19) + 22.721 + 1.896(80-61) = \mathbf{125.189}$ Joules/(gm Air). Thus, the solidified air enters the heat exchanger 44, extracts the latent heat from the saturated second stage cryogen thereby liquefying the second stage cryogen while the air is simultaneously isobarically heated above its melting temperature $T_t$ whereupon the solid air crystals melt into liquid air which is further heated to 80° K. This liquid air is then withdrawn from the heat exchanger 44 at point J.

The closed cycle second stage cryogenic engine operates between the natural ambient environment, which it utilizes as its high temperature heat reservoir, and the condenser 44 where the solidified cryogenic air entering this condenser is utilized as its low temperature heat sink. The condensing working fluid selected for this intermediate, closed cycle second stage, engine is oxygen. Referring to FIG. 7, liquefied oxygen is withdrawn from its condenser 44 at point $A_2$ at 80° K. in a saturated liquid state. The four thermodynamic state parameters; temperature T, pressure P, specific enthalpy H, and entropy S, at this saturated liquid point $A_1$ are: $T_{21} = 80.000°$ K., $P_{21} = 0.297$ Atm, $H_{21} = -150.700$ Joules/gm and $S_{21} = 2.741$ Joules/gm°K. (The detailed thermodynamic analysis of this intermediate second stage is based on very accurate thermodynamic property data of oxygen published by L. A. Weber in his book: *Thermodynamic and Related Properties of Oxygen from the Triple Point to 300° K. at Pressures to 1000 Bar,* NASA Reference Publication No. 1011, NBSIR 77-865 December 1977.)

The liquefied oxygen at point $A_2$ is fed into a cryogenic hydraulic compressor 46 where it is isentropically compressed to 300 Bar (296.077 Atm). The compressed liquefied oxygen emerges from this compressor 46 at point $B_2$ with its thermodynamic state parameters equal to: $T_{22} = 84.421°$ K., $P_{22} = 296.077$ Atm, $H_{22} = -125.783$ Joules/gm, $S_{24} = 2.741$ Joules/gm°K. The mechanical work $\hat{W}_{c2}$ consumed by the compressor 46 is given by $\hat{W}_{c2} = H_{22} - H_{21} = 24.917$ Joules/gm. The compressed liquid oxygen leaves the compressor 46 at point $B_2$ and is immediately fed into the first ambient vaporizer 48 which is maintained in thermal contact with the natural environment where it is isobarically heated. This vaporizer 48 may be immersed in a large body of ambient water, or it may be embedded under ground and in thermal contact with ambient earth, or positioned above the ground and receiving natural thermal energy from ambient air that is circulated over it.

Since the temperature of the compressed liquefied oxygen entering the vaporizer 48 (which is 84.421° K.) is significantly below that of the natural environment, the thermal gradient across the vaporizer 48 is very large and thus the cryogenic oxygen extracts the natural thermal energy from the environment at a rapid rate. Therefore, the compressed oxygen is rapidly heated above its critical temperature (154.8° K.) and vaporizes to become a pressurized gas which is superheated to ambient (290° K.). This pressurized, superheated oxygen leaves the ambient vaporizer 48 at point $C_2$ with its thermodynamic state parameters equal to: $T_{23} = 290.000°$ K., $P_{23} = 296.077$ Atm, $H_{23} = 203.990$ Joules/gm, $S_{23} = 4.733$ Joules/gm°K. The amount of heat energy $\hat{Q}_{in21}$ that is extracted and absorbed from the natural environment during this first isobaric heating step is given by $\hat{Q}_{in21} = H_{23} - H_{22} = 329.773$ Joules/gm.

Upon leaving the first ambient heat exchanger (i.e., vaporizer) 48 at point $C_2$ (FIG. 7) the superheated pressurized oxygen is fed into the first isentropic expander 50 where a large portion of the natural thermal energy $\hat{Q}_{in21}$ extracted from the environment inside the vaporizer 48 is converted into mechanical work $\hat{W}_{e21}$. As indicated in FIG. 7, a portion of this output work is used to drive the compressor 46 which consumes $\hat{W}_{c2}$. The outlet pressure $P_{24}$ of this expander 50 is designed to be 88.823 Atm. This outlet pressure is designed to produce approximately equal pressure ratios for the first two expanders. (The outlet pressure for the third expander is designed to reduce the oxygen to the saturated vapor state prior to liquefaction inside the condenser 44.)

The oxygen leaves the first expander 50 at point $D_2$ with its thermodynamic state parameters equal to: $T_{24} = 207.125°$ K., $P_{24} = 88.823$ Atm, $H_{24} = 138.310$ Joules/gm, $S_{24} = 4.733$ Joules/gm°K. (The pressure ratio of the first expander 50 is $P_{23}/P_{24} = 3.333$.) Consequently, the amount of mechanical work generated by the first expander is equal to $\hat{W}_{e21} = H_{23} - H_{24} = 65.680$ Joules/gm. This is almost three times greater than the amount of mechanical work consumed by the compressor 46.

Since the expanded oxygen leaving the first expander 50 at point $D_2$ has a temperature of 207.125° K. which is significantly below ambient it is fed into a second ambient heat exchanger 52 that is also maintained in thermal contact with the environment. The compressed oxygen at 88.823 Atm is circulated through this second heat exchanger 52 where it extracts and absorbs a considerable amount of additional thermal energy from the natural environment. Thus, the oxygen is isobarically reheated back to ambient and emerges from this second ambient heat exchanger 52 at point $E_2$ on FIG. 7. The thermodynamic state parameters of the compressed superheated oxygen at $E_2$ are: $T_{25} = 290.000°$ K., $P_{25} = 88.823$ Atm, $H_{25} = 240.850$ Joules/gm, $S_{25} = 5.154$ Joules/gm°K. The amount of additional thermal energy $\hat{Q}_{in22}$ that is extracted and absorbed from the natural environment during the second isobaric heating step is given by $\hat{Q}_{in22}=H_{25}-H_{24}=102.540$ Joules/gm.

After leaving the second ambient heat exchanger 52 at point $E_2$ (FIG. 7) the superheated pressurized oxygen is fed into the second isentropic expander 54 where a large portion of the natural thermal energy $\hat{Q}_{in22}$ extracted from the environment during the second heating step is converted into additional mechanical work $\hat{W}_{e22}$. Since there are only three expansion steps in this intermediate closed cycle stage, the outlet pressure $P_{26}$ of this second expander 54 at point $F_2$ must be equal to 25.969 Atm in order to obtain the required initial pressure at the final expansion (so as to reduce the oxygen to a saturated vapor at 80° K. prior to liquefaction). Consequently, the thermodynamic state parameters at point $F_2$ after the second isentropic expansion step are: $T_{26}=200.871°$ K., $P_{26}=25.969$ Atm, $H_{26}=168.591$ Joules/gm, $S_{26}=5.154$ Joules/gm°K. (The pressure ratio of the second expander 54 is $P_{25}/P_{26}=3.420$.) Consequently, the amount of mechanical work generated by the second expander 54 is $\hat{W}_{e22}=H_{25}-H_{26}=72.259$ Joules/gm. Since all of the mechanical work $\hat{W}_{c2}$ consumed by the compressor 46 is supplied entirely by the output work $\hat{W}_{e21}$ of the first expander 50, all of the output $\hat{W}_{e22}$ generated by the second expander 54 contributes towards the net output work of this intermediate stage.

Since the expanded gas temperature after this second expansion step is again significantly below ambient, it is fed into a third ambient heat exchanger 56, that is also maintained in thermal contact with the natural environment. Thus, after emerging from the second expander 54 at point $F_2$, the cold, compressed oxygen is fed into the third ambient heat exchanger 56 at temperature $T_{26}=200.871°$ K. and pressure $P_{26}=25.969$ Atm and is circulated through it where it is isobarically reheated back to ambient a third time by extracting and absorbing a significant amount of additional natural thermal energy from the environment. The pressurized reheated oxygen gas leaves the third heat exchanger 56 at point $G_2$ (FIG. 7). The corresponding thermodynamic state parameters of the oxygen at point $G_2$ are:

$T_{27}=290.000°$ K., $P_{27}=25.969$ Atm, $H_{27}=256.967$ Joules/gm, $S_{27}=5.519$ Joules/gm°K. Consequently, the amount of additional thermal energy $\hat{Q}_{in23}$ that is extracted and absorbed from the natural environment during the third isobaric heating step is given by $\hat{Q}_{in23}=H_{27}-H_{26}=88.376$ Joules/gm.

After leaving the third ambient heat exchanger 56 at point $G_2$ (FIG. 7) the superheated pressurized oxygen is fed into the third isentropic expander 58 where a large portion of the natural thermal energy $\hat{Q}_{in23}$ extracted and absorbed from the ambient environment during the third heating step is converted into additional mechanical work $\hat{W}_{e23}$. Since this last expander 58 is designed to transform the oxygen into a saturated vapor at 80° K., the thermodynamic state parameters of the oxygen after leaving the expander 58 at point $H_2$ are:

$T_{28}=80.000°$ K., $P_{28}=0.297$ Atm, $H_{28}=71.700$ Joules/gm, $S_{28}=5.519$ Joules/gm°K. Thus, the pressure ratio of this expander is $P_{27}/P_{28}=87.438$. The mechanical work generated by this third expander is $\hat{W}_{e23}=H_{27}-H_{28}=185.267$ Joules/gm. Upon leaving this expander 58, the saturated oxygen vapor is recycled back into the condenser 44 where its latent heat of condensation is extracted and absorbed by the incoming solidified air at 19° K. Thus, the saturated oxygen vapor is isothermally liquefied while the solidified air is simultaneously melted and heated to liquid air at 80° K. and the cycle is repeated.

The total mechanical output work $\hat{W}_{e2}$ that is generated by the three expanders 50, 54 and 58 is given by $\hat{W}_{e2}=\hat{W}_{e21}+\hat{W}_{e22}+\hat{W}_{e23}=323.206$ Joules/gm. Thus, the net mechanical output work $\hat{W}_{net2}=\hat{W}_{e2}-\hat{W}_{c2}=298.289$ Joules/gm.

The total heat energy $\hat{Q}_{in2}$ that is extracted from the natural environment by this intermediate stage is given by $\hat{Q}_{in2}=\hat{Q}_{in21}+\hat{Q}_{in22}+\hat{Q}_{in23}=520.689$ Joules/gm. The resulting net thermal efficiency of this stage is therefore $\hat{W}_{net2}/\hat{Q}_{in2}=0.573(57.3\%)$. The corresponding Carnot efficiency $\eta=(290-80)/290=0.724(72.4\%)$. The amount of latent heat rejected in the condenser 44 is given by $\hat{Q}_{out2}=H_{28}-H_{21}=222.400$ Joules/gm.

In order for this intermediate stage, closed cycle condensing cryogenic engine to operate properly, all of its latent heat of condensation rejected in the condenser 44 at 80° K. must be completely absorbed by the incoming solidified air at an initial temperature of 19° K. which is heated and leaves the condenser as liquid air at 80° K. In order for this balance to occur, the relative mass flow rate between the working fluid of the intermediate stage (oxygen) and the air passing through the condenser 44 must be carefully controlled. Since the amount of latent heat rejected by one gram of oxygen passing through the condenser is $\hat{Q}_{out2}=222.400$ Joules and the amount of heat that can be absorbed by one gram of air entering the condenser in the solid state at 19° K. and leaving in the liquid state at 80° K. is $\hat{Q}_{in2}=125.189$ Joules, the required mass flow ratio $m_{21}$ between the oxygen and the air is given by $$m_{21} = \text{oxygen/air} = \frac{Q_{in2}}{Q_{out2}} = .563$$

Consequently, for every gram of air that passes through the condenser 44, only 0.563 gm of oxygen can be passed through in order for the oxygen to be completely condensed into liquid. Thus, the net output work that can be generated from one gram of air passing though the condenser 44 is given by $m_{21}\hat{W}_{net2}$. Since the proportional amount of air actually solidified by the main expander 28 is equal to the condensation ratio R, the amount of condensed air leaving the condenser 32 at point D corresponding to one gram of new air taken into the engine from the atmosphere at point A (FIG. 7) is equal to $R/(1-R)=1.024$ gm. Consequently, the net mechanical output work $W_{net2}$ generated by the closed cycle intermediate stage corresponding to one gram of new air taken from the atmosphere at point A is given by $W_{net2}=m_{21}\hat{W}_{net2}[R/(1-R)]=0.563\times 298.289\times 1.024=172.016$ Joules/(gm air). Notice that this output work actually exceeds that generated by the first stage, which is 128.361 Joules/(gm air).

All of the above detailed thermodynamic analysis of the second stage closed cycle condensing cryogenic engine involved the process of harnessing the cryogenic thermal potential of the condensed air contained between its 19° K. solid state and its 80° K. liquid state relative to the ambient environment at 290° K. This was achieved by utilizing the air in this range as a low temperature heat sink for a closed cycle intermediate stage that utilizes the natural thermal energy in the ambient environment as its high temperature heat reservoir. I shall now describe how the remaining cryogenic thermal potential of the condensed air contained between its 80°0 liquid state up to its gaseous state at ambient temperature can be harnessed to generate additional mechanical work.

Before processing, I would like to point out that instead of utilizing the liquefied air emerging from the heat exchanger 44 at point J (FIG. 7) with a a temperature of 80° and a pressure of 1.0 Atm to generate more mechanical work, it could be withdrawn from the engine at this point to be used for other purposes. In this engine design, the first two stages can be viewed as an air liquefaction machine for manufacturing liquid air. The liquid air could then be used to manufacture liquid oxygen, nitrogen, krypton, neon, xenon, etc., by well known methods of air separation. However, instead of expending mechanical work to obtain the liquid air as in all prior art air liquefying machines, this machine obtains liquid air by generating mechanical work. It is interesting to estimate the amount of mechanical work $\hat{W}_{net}$ generated by liquefying one gram air. Since, in this embodiment there is no third stage, there is no recycled air. Consequently, it will be impossible to obtain a pre-expansion air temperature $T_1$ at point B (FIG. 7) of 200° K. However, it will be possible to cool the air to about 260° K. by means of the pre-cooler 26. Thus, the condensation ratio corresponding to an isentropic expansion ratio of 300 will be about 0.407. The net output work $\hat{W}_{net1}$ of the first stage will be reduced to about 66.309 Joules/(gm air intake). The corresponding net output work $\hat{W}_{net2}$ generated by the second stage will be 63.157 Joules/gm air). Thus, the total net output work corresponding to one gram of intake air will be 129.466 Joules. The total net amount of output work $W_{net}$ generated while producing one gram of liquid air at 80° K. will be $(66.309/R) + m_{21} \hat{W}_{net2} = 318.032$ Joules where $R = 0.407$ and $m_{21} = 0.520$. In prior art air liquefying machines every gram of liquid air requires the expenditure of a minimum of 717.46 Joules of mechanical work. (For detailed expositions on prior art air liquefaction methods see: *The Physical Principles of Gas Liquefaction and Low Temperature Rectifaction*, Longmans, Green & Company, London, New York, Toronto, 1949 by M. Davies; and *Cryogenic Systems*, McGraw-Hill Book Company, New York, 1966, pp. 75-183, by R. Barron.) Thus, the present invention also represents a revolutionary new air liquefaction machine and method for operating same, that generates mechanical work rather than consumes mechanical work while simultaneously manufacturing liquid air. The option of operating the atmospheric engine as an air liquefaction machine for simultaneously manufacturing liquid air and generating mechanical output work is indicated in FIG. 7 by the dashed arrow at point J.

Since the main object of the present invention is the generation of mechanical work, the liquid air at point J (FIG. 7) will be used in the preferred embodiment to generate more mechanical work. Thus, the remaining operating features of my air-powered condensing atmospheric engine are designed to harness the remaining thermal potential difference existing between the 80° K. liquid air at point J and the 290° K. ambient environment by converting it into a substantial amount of additional mechanical work.

Thus, referring to FIG. 7, after the liquefied air is discharged from the intermediate stage condenser 44 at point J it is fed into a compressor 60 where it is isentropically compressed to 300 Atm. This compression step consumes an amount of work $\hat{W}_{c3}$ given by $$\hat{W}_{c3} = \frac{(300 - 1) \times 10.132 \text{ N/cm}^2}{1.148 \text{ gm/cm}^3} = 26.390 \text{ Joules/gm}$$

where the density of the air is given by 1.148 gm/cm³. The solid phase compressor 42 only consumes $\hat{W}_{c13} = 0.100$ Joules/gm in compressing the solidified air from 0.237 torr (0.0003 Atm) to 760 torr (1.0 Atm).

The compressed liquefied air emerges from the compressor 60 at point K and is injected into another high pressure ambient heat exchanger 62 (that is in thermal contact with the ambient environment) where it is isobarically heated. This heat exchanger 62 may be immersed in a body of water, or embedded under ground that is in thermal contact with the ambient earth, or maintained above the ground and receiving natural thermal energy from the ambient air that is circulated over it. Since the temperature of the compressed liquefied air entering the heat exchanger 62 is significantly below that of the natural environment, the thermal gradient across the heat exchanger is very large. Hence, the cryogenic air extracts the natural thermal energy from the environment at a rapid rate. The temperature of the compressed liquefied air rapidly rises above its critical temperature (132.5° K.) and the air is vaporized into compressed gaseous air that is superheated to ambient. The compressed gaseous air leaves the heat exchanger 62 at point L. The total amount of heat absorbed during this isobaric heating step is $\hat{Q}_{in31} = H(L) - H(K) = 344.974$ Joules/gm which is obtained by taking the difference between the specific enthalpies at points L and K on the TS diagram of air given by the above cited reference of the British Oxygen Company (BOC).

The isentropic compression step inside the compressor 60 is represented by the vertical line segment $\overline{JK}$ on the TS diagram of air given in FIG. 8 and by the nearly vertical line segment $\overline{JK}$ on the PT phase diagram of air given in FIG. 9. The isobaric heating step inside the ambient heat exchanger 62 is represented by the isobaric curve $\overline{KL}$ on the TS diagram of air (FIG. 8) and by the horizontal line segment $\overline{KL}$ on the PT phase diagram of air (FIG. 9).

The high pressure superheated air at point L is then fed into an isentropic expander 64 where a large portion of the thermal energy extracted from the environment inside the heat exchanger 62 is converted into additional mechanger work $\hat{W}_{e31}$. The outlet pressure of this expander at point M is designed to be 45 Atm. Consequently, using the TS diagram of air given by BOC, the mechanical work $\hat{W}_{e31}$ can be calculated by taking the difference between the specific enthalpies at points L and M at constant entropy. The result is $\hat{W}_{e31} = H(L) - H(M) = 111.002$ Joules/gm. This isentropic expansion step is represented by the vertical line segment $\overline{LM}$ on the TS diagram of the air (FIG. 8) and by the adiabatic expansion curve $\overline{LM}$ on the PT diagram of air (FIG. 9).

The expander 64 not only generates mechanical work but simultaneously reduces the temperature of the air significantly below ambient thereby creating another thermal potential difference between the ambient environment which is utilized to extract more natural thermal energy for conversion into more mechanical work. The outlet temperature of the expanded air at point M is 168° K. (This temperature is also obtained from the TS diagram of air given by BOC.) Since this temperature is significantly below ambient, the pressurized air at point M (at temperature 168° K., and pressure 45 Atm) is fed into another ambient heat exchanger 66 where it is isobarically reheated back to ambient by extracting additional natural thermal energy from the environment. After this second reheating step, the air emerges from the ambient heat exchanger 66 at point N (FIG. 7) with a temperature of 290° K. and a pressure of 45 Atm. This second isobaric reheating step is represented by the isobaric curve $\overline{MN}$ on the TS diagram of air (FIG. 8) and by the horizontal line segment $\overline{MN}$ on the PT phase diagram of air (FIG. 9). The total amount of heat $\hat{Q}_{in32}$ extracted from the environment during this reheating step is $\hat{Q}_{in32} = H(N) - H(M) = 147.779$ Joules/gm which is obtained from the TS diagram of air given by BOC.

The pressurized air at N is then fed into another isentropic expander 68 where a large portion of the natural thermal energy extracted from the ambient environment in the previous heating step is converted into still more mechanical work $\hat{W}_{e32}$. The outlet pressure of this expander 68 at point O is designed to be 7 Atm. The mechanical work $\hat{W}_{e32}$ is calculated by taking the difference between the specific enthalpies at points N and O at constant entropy on the TS diagram of air (BOC). The result is $\hat{W}_{e32} = H(N) - H(O) = 118.664$ Joules/gm. The expansion process simultaneously reduces the temperature of the air which appears at the outlet point O at 167.5° K. which is also obtained from the TS diagram of air (BOC).

Since the outlet temperature of the compressed air (at 7.0 Atm) at point O is again significantly below ambient, it is fed into another ambient heat exchanger 70 to extract more natural thermal energy from the ambient environment for conversion into additional mechanical work. By circulating through this third ambient heat exchanger 70, the compressed air is isobarically reheated back to ambient and emerges from this heat exchanger 70 at point P (FIG. 7) at a temperature of 290° K. and a pressure of 7.0 Atm. This isobaric reheating step is represented by the isobaric curve $\overline{OP}$ on the TS diagram of air (FIG. 8) and by the horizontal line segment $\overline{OP}$ on the PT phase diagram of air (FIG. 9). The total amount of natural heat energy extracted from the ambient environment inside the ambient heat exchanger 70 is obtained by taking the difference between the specific enthalpies at points P and O. The result is $\hat{Q}_{in33} = H(P) - H(O) = 126.528$ Joules/gm which is obtained from the TS diagram of air given by BOC.

The heated, compressed air at point P, is then fed into the last isentropic expander 72 where a large portion of the natural thermal energy extracted from the ambient environment inside the third ambient heat exchanger 70 is converted into additional mechanical work $\hat{W}_{e33}$. The outlet pressure of this expander at point Q is designed to be 1.0 Atm (i.e., ambient atmospheric pressure). The value of $\hat{W}_{e33}$ is obtained by taking the difference between the specific enthalpies at points P and Q at constant entropy. The result is $\hat{W}_{e33} = H(P) - H(Q) = 124.284$ Joules/gm which is obtained from the TS diagram of air given by BOC. This final isentropic expansion step is represented by the vertical line segment $\overline{PQ}$ on the TS diagram of air (FIG. 8) and by the adiabatic expansion curve $\hat{PQ}$ on the PT phase diagram of air (FIG. 9).

The total mechanical work $\hat{W}_{e3}$ that is generated by the third stage is equal to the combined output work generated by the three isentropic expanders 64, 68, and 72. This work is $$\hat{W}_{e3} = \hat{W}_{e31} + \hat{W}_{e32} + \hat{W}_{e33} = 353.950 \text{ Joules/gm}$$

Hence, the net output work of this third stage is $$\hat{W}_{net3} = \hat{W}_{e3} - \hat{W}_{c3} = 327.460 \text{ Joules/gm}$$

The total input heat $Q_{in3}$ that is extracted from the natural environment by one gram of air passing through the three ambient heat exchanges 62, 66, and 70 which was converted into the above output work $W_{e3}$ by the three expanders 64, 68 and 72 is given by $$\hat{Q}_{in3} = \hat{Q}_{in31} + \hat{Q}_{in32} + \hat{Q}_{in33} = 619.281 \text{ Joules/gm}$$

Consequently, the net thermal efficiency of this third stage is $$\hat{W}_{net3}/\hat{Q}_{in3} = 0.529 \ (52.9\%)$$

The exhaust air leaving the last expander 72 at point Q (at ambient pressure 1.0 Atm) is at a temperature of 165° K. Consequently, instead of discharging this cold air back into the atmosphere it is mixed with the pre-cooled intake air at point B (FIG. 7) inside the cold air reservoir vessel 26 and recycled back into the expander 28 of the first stage. Thus, about 50% of the inlet air at atmospheric pressure $P_1$ entering the first expander 28 of the atmospheric engine at point B is very cold air that has been previously condensed and cycled through the third stage. The other 50% is drawn from the open atmosphere at point A, circulated through the pre-cooler 24, and mixed with the recycled air at point B. The equilibrium temperature $T_1$ of the resulting mixture at point B (at standard atmospheric pressure $P_1$) prior to expansion inside the initial expander 28 will be about 200° K. (or colder). After this mixed air is expanded through the expander 28, and fed through the cryogenic condensing tubes 32, a fraction R solidifies into solid air crystals and fed into the heat exchanger 44 (i.e., the second stage condenser) where it is melted into liquid air, compressed, and fed through the third stage as described above. The fractional part that does not condense is $1-R$ and is recompressed back to ambient atmospheric pressure $P_1$ and exhausted back into the open atmosphere at point C.

Pre-cooling the ambient air taken from the atmosphere at point A (FIG. 7) will be relatively easy because the low temperatures generated by the atmospheric engine can be readily utilized as a low temperature heat sink. For example, the discharge temperature of the air coming out of expanders 64 and 68 at points M and O (FIG. 7) in the third stage is 168° K. This very low gas temperature can be utilized as a very effective low temperature coolant for the incoming ambient air. Thus, instead of feeding this low temperature gas directly into the ambient heat exchangers 66 and 70, it could be temporarily diverted and fed into the intermediate heat exchanger 24 and utilized for cooling the incoming air via thermal convection. After circulating through this heat exchanger 24 (which would be in a parallel configuration to increase the thermal absorption from the circulating incoming ambient air) it could then be returned to points M and O and fed into their respective ambient heat exchangers 66 and 70. Since the gas has to be heated back to ambient in any case, it may as well serve as a heat sink for the incoming air before it is heated all the way back to ambient. Since the effective mass flow rate of this cooling gas circulating through the ambient air pre-cooler 24 would be twice that flowing through the third stage, and since the amount of ambient air flowing into the pre-cooler 24 is 1−R times the total amount entering the expander 28, the ambient air could be cooled to fairly low temperatures before it is mixed with the recycled air that is discharged from the expander 72 at 165° K. Consequently, after mixing the pre-cooled air with the 165° K. recycled air and taking into consideration the relative mass flows, the resulting temperature after mixing would be about 200° K. However, these calculations do not take into consideration the regenerative cooling effect of continuously recycling the very cold air coming out of the third stage (which will result in steadily increasing condensation ratios). Thus, it would be relatively easy to obtain pre-expansion temperatures below 200° K. which would generate condensation ratios above 0.5. This would result in a substantial increase in net output because the mass flow rates $\dot{m}_2$ and $\dot{m}_3$ would be significantly increased.

Similarly, after the gas passing through the second stage has been expanded through expanders 50 and 54 (FIG. 7) the resulting outlet gas temperatures at points $D_2$ and $F_2$ are 207° K. and 201° K. respectively. Thus, instead of feeding this low temperature gas directly into the ambient heat exchanges 52 and 56 as previously described, it could be temporarily diverted and fed into another intermediate heat exchanger 36 and utilized for cooling the partially compressed, noncondensed air coming from the recompressor 34 (FIG. 7). After circulating through this heat exchanger 36 (which would also be in a parallel configuration to increase the thermal absorption from the circulating outgoing partially compressed air) it could then be fed into their respective ambient heat exchangers 52 and 56. Since this gas also has to be heated back to ambient, it may as well serve as a heat sink for the outgoing noncondensed air before it is heated all the way back to ambient. As in the previous case, since the effective mass flow rate of this cooling gas circulating through the air cooler 36 would be twice that flowing through the second stage, the outgoing noncondensed air could probably be cooled to about 250° K. or lower before it is fed into the second recompressor 38 and recompressed all the way to ambient atmospheric pressure and discharged back into the atmosphere. This would significantly reduce the mechanical work $W_{c12}$ that is expended by the second recompressor 38 in the first stage of the atmospheric engine. The result would be a significant increase in the net amount of mechanical output work $\dot{W}_{net1}$ generated by the first stage since $W_{net1} = \dot{W}_{e1} - \dot{W}_{c11} - \dot{W}_{c12} - \dot{W}_{c13}$ where $\dot{W}_{c11}$ represents the amount of mechanical work expended by the first recompressor 34 while partially recompressing the noncondensed air.

This same design technique can also be applied to provide a very cold cryogenic environment for the first stage expander 28 and vacuum chamber 30. Thus, instead of feeding the cryogenic liquefied air emerging from the condenser 44 at point J at 80° K. and 1.0 Atm pressure into the high pressure hydraulic compressor 60, it can be temporarily diverted and fed into and circulated through a liquid air Dewar jacket that completely surrounds the external walls of the expander 28 and vacuum chamber 30. In some embodiments, this liquefied air may be in direct thermal contact with the external walls of the expansion chamber. This provides the expansion chamber with a cryogenic environment for enhancing the phase transformation process. It will also minimize any increase in entropy during the expansion process.

After this liquid air is circulated through this Dewar jacket it is returned to point J and fed into the compressor 60. Although it will be at a slightly higher temperature, it will still be essentially 100% liquid so that the work expended by the compressor $\dot{W}_{c3}$ is only slightly more than it would be if there were no diversion and the liquid air was 80° K.

If desired, a lower liquid air temperature can be obtained for circulating through this Dewar jacket by diverting the condensed air passing through the condenser 44 immediately after the solidified air is melted to liquid air at the triple point, which is 61° K. After this 61° K. liquid air is circulated through the Dewar jacket, it is returned back to the condenser 44 at a slightly higher temperature. This diversion could be compensated by raising the liquefaction temperature of the second stage by changing the saturated vapor pressure.

This same technique can also be applied to utilize the liquid oxygen in the second stage that is emerging from the condenser 44 at point $A_2$ at 80° K. Thus, instead of immediately feeding this liquefied oxygen into the compressor 46 as soon as it emerges from the condenser 44, it can be temporarily diverted and fed into a cryogenic liquefied gas Dewar jacket described above. After circulating through this Dewar at about 80° K., the liquefied gas is returned to point $A_2$ and fed into the compressor 46. Since the liquefied oxygen is still essentially 100% liquid when it enters the compressor 46, the amount of mechanical work expended by it remains about the same. (The liquefied oxygen would be partially compressed before entering the Dewar to insure that it remains a liquid).

All of the above described cold gas and liquefied gas diversions were omitted from FIG. 7 in order to simplify the discussion concerning the main operating principles of the engine. However, these are important features and operating principles of the invention which should be kept in mind throughout the remainder of this specification. These features can be incorporated into the preferred embodiment of the atmospheric engine.

Although I have pointed out that a pre-expansion temperature of about 200° K. can be obtained by pre-cooling the new air taken from the atmosphere and recycling the very cold air that is discharged from the last expander 72 thereby obtaining a condensation ratio $R \approx 0.5$, I shall now show that this engine design will actually be capable of generating much lower pre-expansion temperatures and therefore higher condensation ratios while maintaining the same expansion ratio (300). This can be demonstrated as follows: Suppose $R = 0.5$. Then for every gram of new air taken from the ambient atmosphere at point A and fed into the air pre-cooler 26 at 290° K., there is 2 gm of cold air entering at about 168° K. which is diverted from the discharge points M and O of expanders 64 and 68 (FIG. 7) and utilized as a coolant by circulating it through the air pre-cooler 24. After circulating through the pre-cooler (where heat transfer is via thermal convection) the equilibrium discharge temperature will be $(\frac{1}{3}) \times 290°$ K. $+ (\frac{2}{3}) \times 168°$ K. $= 209°$ K. Consequently, when this new pre-cooled air at 209° K. is mixed with the recycled air at 165° K. at point B, the resulting thermal equilibrium temperature $T_1 = (\frac{1}{2}) \times 209°$ K. $+ (\frac{1}{2}) \times 165°$ K. $= 187°$ K. In view of Table 1, when this cold air is expanded through expander 28 with an expansion ratio of 300, the resulting condensation ratio will be significantly above 0.5. This will result in a regenerative cooling process that will produce steadily increasing condensation ratios—with steadily increasing engine performance. The pre-expansion air temperature at point B will gradually decrease and approach a limiting value of about 170° K. Of course, the expansion ratio can also be increased to 400 or even 500 which will also increase the condensation ratio. For purposes of consistency, I will assume that $T_1 = 200°$ K. and $r = 300$ so that $R = 0.506$ although this is probably a very conservative estimate.

Since, for every gram of new air taken into the engine from the atmosphere at point A, there is $R/(1-R)$ grams of recycled air that condenses, the net amount of mechanical output work $W_{net3}$ generated by the third stage corresponding to one gram of new intake air is given by $W_{net3} = \hat{W}_{net3} R/(1-R) = 335.414$ Joules/(gm air). Notice that this represents more mechanical output work than the first two stages combined, which is 300.377 Joules/(gm air). The total net output work $\hat{W}_{net}$ of the atmospheric engine that is generated by ingesting only one gram of new air from the ambient atmosphere is given by combining the output of all three stages. Thus, $$\hat{W}_{net} = \hat{W}_{net1} + W_{net2} + W_{net3} = 635.791 \text{ Joules/(gm air)}$$

It is clear that most of this total output work is generated by the second and third stages. These stages operate by extracting ambient thermal energy from the natural environment by means of the heat exchangers 48, 52, 56, 62, 66, 70 (FIG. 7 and converting it into mechanical output work via the expanders 50, 54, 58, 64, 68 and 72. If it were not for the fact that these two stages are connected to the first stage, these second and third stage engines would violate the second law of thermodynamics and would therefore represent "perpetual motion machines of the second kind". Thus, the first stage represents the key ingredient that enables the engine to operate without violating the second law.

The net power output $P_{net}$ of my condensing atmospheric engine corresponding to various air intake rates $\dot{m}_1$ is given in Table 2. The corresponding net power outputs $P_{net1}$, $P_{net2}$, and $P_{net3}$ of the three individual stages making up the engine are also tabulated along with their corresponding mass flow rates $\dot{m}_1$, $\dot{m}_2$, and $\dot{m}_3$. The mass flow rate of incoming ambient air at point A is denoted by $\dot{m}_1$ and the corresponding mass flow rate of oxygen circulating around the closed cycle second stage is denoted by $\dot{m}_2$. The mass flow rate of air flowing through the third stage is $\dot{m}_3$. The total amount of air flowing through the first stage expander is $\dot{m}_1 + \dot{m}_3$. The relationship between $\dot{m}_1$ and $\dot{m}_3$ is given by $\dot{m}_3 = \dot{m}_1 R/(1-R)$. The mass flow rate of the second stage working fluid $\dot{m}_2$ is related to $\dot{m}_1$ by the equations $\dot{m}_2 = m_{21} \dot{m}_3 = m_{21} \dot{m}_1 R/(1-R)$. Consequently, since $R = 0.506$ and $m_{21} = 0.563$, then $\dot{m}_2 = 0.577 \dot{m}_1$ and $\dot{m}_3 = 1.024 \dot{m}_1$. The total net output power $P_{net}$ of the engine is given by $P_{net} = P_{net1} + P_{net2} + P_{net3} = \dot{m}_1 W_{net1} + \dot{m}_2 \hat{W}_{net2} + \dot{m}_3 \hat{W}_{net3}$ where $\hat{W}_{net1} = 128.361$ Joules/gm, $\hat{W}_{net2} = 298.289$ Joules/gm and $\hat{W}_{net3} = 327.460$ Joules/gm

TABLE 2

Theoretical Power Output of Air-Powered Condensing Atmospheric Engines Corresponding to Various Air Intake Rates With R = .506

| $\dot{m}_1$ (gm/sec) | $P_{net1}$ (KW) | $\dot{m}_2$ (gm/sec) | $P_{net2}$ (KW) | $\dot{m}_3$ (gm/sec) | $P_{net3}$ (KW) | $P_{net}$ (KW) |
|---|---|---|---|---|---|---|
| 10 | 1.28 | 5.77 | 1.72 | 10.24 | 3.35 | 6.36 |
| 20 | 2.57 | 11.53 | 3.44 | 20.49 | 6.71 | 12.72 |
| 40 | 5.13 | 23.07 | 6.88 | 40.97 | 13.42 | 25.43 |
| 60 | 7.70 | 34.60 | 10.32 | 61.46 | 20.12 | 38.15 |
| 80 | 10.27 | 46.13 | 13.76 | 81.94 | 26.83 | 50.86 |
| 100 | 12.84 | 57.67 | 17.20 | 102.43 | 33.54 | 63.58 |
| 200 | 25.67 | 115.34 | 34.40 | 204.86 | 67.08 | 127.16 |
| 400 | 51.34 | 230.67 | 68.81 | 409.72 | 134.17 | 254.32 |
| 600 | 77.02 | 346.01 | 103.21 | 614.57 | 201.25 | 381.47 |
| 800 | 102.69 | 461.34 | 137.61 | 819.43 | 268.33 | 508.63 |
| 1000 | 128.36 | 576.70 | 172.02 | 1024.29 | 335.41 | 635.79 |
| 2000 | 256.72 | 1153.35 | 344.03 | 2048.58 | 670.83 | 1271.58 |
| 4000 | 513.44 | 2306.70 | 688.06 | 4097.17 | 1341.66 | 2543.17 |
| 6000 | 770.17 | 3460.06 | 1032.10 | 6145.75 | 2012.49 | 3814.75 |
| 8000 | 1026.89 | 4613.41 | 1376.13 | 8194.33 | 2683.32 | 5086.33 |
| 10000 | 1283.61 | 5766.76 | 1720.16 | 10242.91 | 3354.14 | 6357.91 |

The above table clearly demonstrates the very high performance capabilities of my atmospheric engine. For example, by ingesting the fuel (ordinary air) at a rate of only 50 gm/sec, the net power output is 31.79 KW or 42.63 HP. This power is sufficient for propelling a standard size automobile. Although the size of the first stage expander will be much larger than the size of gasoline engines of equal power (because of the extremely high expansion ratios) its weight will be relatively low. Hence, the power-to-weight ratio of my atmospheric engine should be fairly high relative to gasoline or Diesel engines.

The high pressure cryogenic expanders 50, 54, 58, 64, 68 and 72 where most of the power is generated, can be very compact relative to their output. Such expanders can easily deliver output power on the order of 15 KW to 20 KW while weighing only a few kilograms. The crucial operating characteristic in any expander that gives good compactness (i.e., small size and low weight with high output power) is pressure and in this respect, cryogenic expanders are unsurpassed and capable of delivering power-to-size and power-to-weight ratios far beyond any internal combustion engine or cyclic heat engine. The reason for this extremely high performance lies in the fact that as operating temperatures decrease, the tensil strengths of most metals increase. The reverse is true when the operating temperatures increase and this is the principal reason why conventional heat engines, such as large steam generating plants, can never exceed certain operating temperatures and pressures that greatly inhibit their overall performance (i.e., power-to-weight and power-to-size ratios and thermal efficiencies). With high strength stainless steel, the operating pressures of cryogenic expanders can be exceedingly high without risk of failure.

But cryogenic expanders have other advantages besides being able to operate at very high pressure loads. Since the fatigue of metals is also significantly reduced at cryogenic temperatures (without losing their ductility and becoming brittle) operation failures due to metal fatigue is almost completely eliminated. Thus, the useful life expectancy of high pressure cryogenic expanders are often 100% longer than those of conventional high temperature heat engines.

The specific expansion system that is used in the atmospheric engine can include high pressure piston driven reciprocating expanders, that are more suitable in the high pressure range (e.g., 50 Atm to 500 Atm) and rotary expanders (turboexpanders) that are more suitable in the lower pressure range (e.g., 10 Atm–50 Atm). However, the actual expansion system will depend upon the specific application (i.e., whether the engine will propel a moving vehicle or power a bank of fixed electric generators for generating bulk electric power). But whatever the application, the operating efficiencies of state of the art reciprocating and rotary expanders exceed 85% and in large units can exceed 90%. Excellent technical expositions on cryogenic expanders are presented in the following references: "Cryogenic Turboexpanders", *LNC/CRYOGENICS*, February/March 1973, pp. 7–15 by H. D. Linhardt; "Performance of an Air Expansion Engine", *Advances in Cryogenic Engineering*, Vol. 1, 1960, pp. 105–110, by J. E. Jensen; "Expansion Turbines and Engines for Low Temperature Processing", *Advances in Cryogenic Engineering*, Vol. 1, 1960 by M. L. Land.

Atmospheric engines could also be designed for propelling aircraft. Since these engines have a high power-to-weight ratio and do not require any full tanks (or fuel load) they would be ideal for propelling aircraft of almost unlimited size with enormous payloads. Moreover, since these engines can operate continuously without stopping (barring mechanical failure) such aircraft would have unlimited range and could remain aloft cruising above the Earth's surface indefinitely. (Propeller driven flying wings would be the most suitable design.) They could actually be designed as self-contained flying cities with thousands of inhabitants.

Atmospheric engines would also be ideal for propelling large ocean going vessels. Such vessels would also have unlimited range. In this application, the ambient heat exchangers 48, 52, 56, 62, 66, and 70 could be immersed in and maintained in thermal contact with the ambient water. The heat transfer process would be very efficient because water has a high thermal capacity. However, in these configurations, the atmospheric engines would not be strictly "air-powered". Most of the natural ambient thermal energy of the environment that is extracted and converted into mechanical work would come from the water instead of the atmosphere. However, since the low temperature heat sink used in harnessing the natural thermal energy in the water originates from the condensed air generated by the first stage, the atmosphere is still the underlying energy source.

Still another application for my atmospheric engine would be the generation of large amounts of bulk electric power for public utility companies. These engines would be very large and their drive shafts would be coupled directly to very large electric generators. Such power plants could generate cheap electric power on an unprecedented scale. They could dwarf in magnitude the maximum power output of all other types of power plants including the largest hydroelectric, fossil fuel, nuclear fission or even the nuclear fusion plants envisioned for the next century.

Air-powered condensing atmospheric engines could also be used to generate cheap electric power at electric generating plants where large bodies of water are unavailable. The large ambient air heat exchangers could be mounted to take advantage of the extra heating effect of incident solar radiation falling on the thermal surfaces of the exchangers. (Large reflectors could be mounted around the periphery of the heat exchangers to amplify this radiation.)

Finally, since all of the atmospheric engines disclosed herein operate silently, and without discharging any combustion exhaust or nuclear waste products, these engines eliminate all noise pollution, thermal pollution and air pollution. In fact, an air-powered condensing atmospheric engine actually cleans the air as it operates because essentially all particulate contamination (such as smoke particles, dust particles, etc.,) along with many foreign chemical vapors is filtered out and removed from the ingested air by various filters and traps inside the first stage to reduce mechanical friction. Thus, the noncondensed gaseous air that is discharged back into the atmosphere will be exceptionally clean and free of essentially all pollutants. Furthermore, since these engines operate at cryogenic temperatures, they will tend to actually cool the natural environment as they operate. However, since the mechanical work produced by the engine, such as propelling a vehicle through the air will tend to heat the environment, the net thermal effect will be essentially zero. (The noncondensed air that is discharged back into the atmosphere may also have a temperature significantly above ambient even though it is pre-cooled by passing through the air-cooler heat exchanger 38 because of its high entropy inside the vacuum chamber 30. But this overall heating effect will be relatively minor.) Consequently, atmospheric engines represent the ideal ecological engine in that they will preserve the overall ecological and thermal balance between man and the natural environment indefinitely into the future regardless of how much power mankind wishes to produce with these engines.

Before considering any detailed structural designs it is important to point out and emphasize that the bove performance characteristics given in Table 2 are based upon thermodynamic analysis assuming ideal operating conditions. Thus, the actual performance of these engines may be somewhat below that given in Table 2. On the other hand, multiple stage condensing atmospheric engines have many design variables that could be optimized to give theoretical performance figures significantly higher than those given in Table 2. Furthermore, by constructing sufficiently large engines, it is possible to obtain overall performances that approach ideal operating conditions. Consequently, when these considerations are factored into the actual design of condensing atmospheric engines, the resulting actual performance figures may be very close to that given in Table 2.

The current "state of the art" operating efficiencies of cryogenic expanders and compressors are about 85%. Cryogenic heat exchanges (and condensers) are about 90% efficient. (Some designs exceed 95%). Pressure losses (i.e., line losses) can be easily compensated by compressing the liquefied cryogenic working fluids to slightly higher working pressures. The additional mechanical work consumed by operating at these higher pressures is relatively small and essentially negligible. In fact, the actual net output of stages two and three can be increased by operating at higher working pressures (e.g., 500 Atm instead of 300 Atm).

Inefficiencies due to non-isentropic flows can be compensated by employing well known techniques of over-expansion (to compensate for non-isentropic expanders). Over-expansions involve expanding the superheated pressurized gaseous working fluids to slightly lower pressures.

There is another very important aspect that should be pointed out and emphasized. The basic underlying operating principle that is at the heart of my invention is the ability to obtain actual phase transformation in atmospheric air by a direct isentropic expansion process. I believe that I have rigorously demonstrated by the above theoretical discussion that such a phase transformation is indeed possible by employing sufficiently high expansion ratios on the order of 300. I have also demonstrated that the amount of phase transformation (i.e., the condensation ratio R) can be significantly increased by isobarically pre-cooling the incoming air before it is expanded. I have further demonstrated that it is possible to obtain initial, pre-expansion air temperatures $T_1$ on the order of 200° K. by recycling the cold air discharged from the last expander 72 back into the first stage. Moreover, as pointed out above, this is a very conservative figure. Much lower temperatures should be possible thereby giving condensation ratios significantly above 0.506. Furthermore, by increasing the expansion ratio from 300 to say 500, the condensation ratio can also be significantly increased.

I shall now direct my attention to the practical engineering problem of transforming the above disclosed theory and operating principles for generating useful mechanical work from ordinary ambient atmospheric air into the actual physical form of an operating atmospheric engine. However, at the outset we are confronted by a rather serious and fundamental problem that has no solution in the prior art. In view of Table 1, the required expansion chambers suitable for air-powered atmospheric engines have to be capable of generating expansion ratios on the order of 300 in order to achieve the desired phase transformation ratios. But energy extracting, isentropic expansion chambers capable of delivering expansion ratios of this magnitude do not exist in the prior art. Thus, one of the most important structural novelties of the present invention is the disclosure of a cryogenic, low pressure, work generating cold air expander that is very nearly isentropic and capable of providing essentially unlimited expansion ratios and pressure ratios with variable mass flow. Two basic designs for this expander will be disclosed. The first design is a reciprocating piston driven expander and the second is a continuous flow rotating turbine expander.

The prior art is completely void of reciprocating piston driven expanders capable of delivering expansion ratios and pressure ratios on the order of 300 and 1000 respectively. Moreover, there are absolutely no expanders of any type in the prior art that are designed for initial pressures of only 1.0 Atm (i.e., ambient atmospheric pressure). The combination of these operating parameters, which are basic to most air expanders designed for air-powered condensing atmospheric engines, result in very unusual operating characteristics that are not found in any prior art expander (reciprocating or non-reciprocating).

One of these unusual operating characteristics of the first stage cold air expander that is a direct result of these high expansion ratios and low initial pressures is the peculiar force profiles that are generated inside the expanders and applied to the movable members. Thus, before considering the detailed mechanical design of a reciprocating expander suitable for air-powered condensing atmospheric engines, it will be helpful to study these force profiles in more detail.

Consider a uniform thermally insulated circular cylinder with a movable airtight frictionless piston. Suppose that the inside radius of this cylinder is denoted by a and that its longitudinal axis of symmetry is coincident with the x axis of a coordinate system with origin fixed at the inside wall of the cylinder from which an adiabatic expansion begins. Hence, this inside cylinder wall is located at $x=0$. The piston face that is opposite this wall, just prior to expansion, is located at $x=x_1$. Thus, the initial volume $V_1$ of the atmospheric air that is admitted into the cylinder for expansion is given by $V_1 = \pi a^2 x_1$. The air pressure on the opposite side of the piston is negligible and can be assumed to be zero. Thus, the initial force $F_1$ that is acting on the piston is given by $F_1 = P_1 \pi a^2$ where $P_1$ is equal to standard atmospheric pressure 10.13 N/cm². This natural air pressure forces the piston to move in the cylinder in a power stroke. The air is adiabatically expanded and the instantaneous air pressure P, acting on the piston, is given by $P = P_1 (x_1/x)^\gamma$ which follows directly from equations (2) and (4). Hence, the force F that is exerted on the piston by the expanding air at any point x is given by $$F = \pi a^2 P_1 (x_1/x)^\gamma \qquad (16)$$

Figure 10:
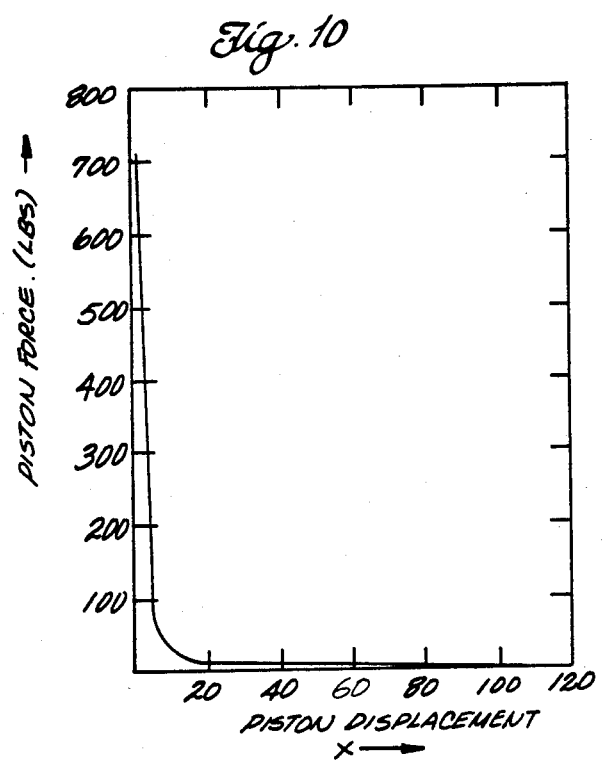
FIG. 10 is a graph illustrating the force exerted on a 20 cm diameter piston moving inside an evacuated cylinder by the pressure exerted by an expanding air-slug with an initial pressure equal to ambient atmospheric pressure.

The graph of this function $F=F(x)$ is given in FIG. 10 for the special case where $a=10$ cm. The unit of measurement is selected to be $x_1$. Notice that by choosing this unit of measurement, x become equal to the instantaneous expansion ratio r.

In order to reduce the expanding air to a supersaturated vapor by an isentropic expansion with an expansion ratio of 300, the piston must move from $x=x_1$ to $x=300 \, x_1$. If $x_1=1$ cm (0.39 in) the piston's stroke length (i.e., displacement) will be 300 cm (118.11 in or 9.84 ft). It is apparent from FIG. 10 that the force profile $F(x)$ that is exerted on the piston by the expanding air decreases very rapidly as x increases during the power stroke and has the characteristics of an impulse.

The thermal energy that is extracted from the expanding air and converted into mechanical output work $W_e$ by this adiabatic expansion process is given by equation (1) where $V_2$ denotes the final volume of the expanded air inside the cylinder. Alternative expressions for $W_e$ were derived above and given by equations (5) and (9) where $\eta$ denotes the thermal efficiency of the expansion given by equation (7). Notice that all of these equations are independent of the initial temperature $T_1$. This independence on the initial temperature $T_1$ may seem confusing since the output work $W_e$ generated from the expansion is obtained by converting a portion of the initial thermal energy W of the gaseous ambient air given by equation (6) inside the initial volume $V_1$ into mechanical output work $W_e$. The reason lies in the fact that when the initial temperature $T_1$ is lowered (or raised) the density of the air increases (or decreases)

such that if $P_1$ and $V_1$ are constant, the mass of air m inside $V_1$ increases (or decreases) respectively. But the total gaseous thermal energy W of the air inside $V_1$ given by equation (11) remains unchanged. It is this total energy content $W=P_1V_1/(\gamma-1)$ that is inside $V_1$, along with the expansion ratio r, that determines how much energy will be extracted by the expansion and converted into mechanical output work $W_e$. Thus, in view of equation (9) $W_e=W\eta$ where W is a constant and the thermodynamic efficiency $\eta$ is dependent only on the expansion ratio r given by equation (7). The graph of the function $\eta=\eta(r)$ given by equation (7) is shown in FIG. 11. In studying this graph (FIG. 11) it should be noted that the expansion ratios (called "compression ratios") of prior art spark ignition internal combustion engines only range from about 7 to 11 with 11 as an upper limit that cannot be exceeded because of preignition problems. The piston driven expanders of Diesel engines have expansion ratios that range from 12 to about 18 1 but rarely exceed 18. Thus, it is apparent from FIG. 11 that the ambient air expanders with expansion ratios of about 300 will have a much higher thermodynamic efficiency $\eta$ than those of prior art internal combustion engines.

By substituting the expressions $V_1=\pi a^2 x_1$, $V_2=\pi a^2 x$, $P_2=P_1(x_1/x)^\gamma$ with $\gamma=1.415$ into equation (1), $W_e$ can be expressed as $$W_e = \frac{P_1 \pi a^2}{.415}[x_1 - (x_1/x)^\gamma x]$$

Figure 12:
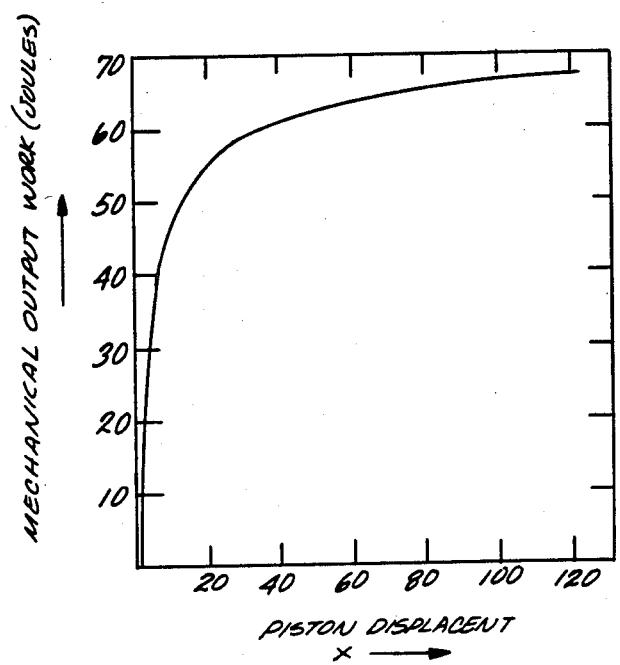
FIG. 12 is a graph of the mechanical work generated by adiabatically expanding a 20 cm diameter 1.0 cm long air-slug initially at standard atmospheric pressure inside a vacuum chamber.

The graph of this equation corresponding to $a=10$ cm and $x_1=1.0$ cm is shown in FIG. 12. At the end of the expansion $x=300$ cm, $\eta=0.906$ and $W_e=69.513$ Joules.

The volume energy density $\widetilde{W}=W/V_1$ of a compressed gas with pressure $P_1$ can be obtained directly from equation (6) and is expressed by $$\widetilde{W} = \frac{W}{V_1} = \frac{P_1}{\gamma - 1} \qquad (17)$$

This quantity represents the volume counterpart to the mass energy density $\hat{W}$ of a compressed gas given by equation (12). In the case of ambient atmospheric air, $P_1=10.1325$ N/cm². Hence, $$\widetilde{W}(\text{air}) = \frac{(10.1325 \text{ N/cm}^2}{1.415 - 1} = .2442 \text{ Joules/cm}^3$$

Hence, the work $W_e$ generated by expanding an initial volume of air $V_1$ can be expressed as $$W_e = \widetilde{W}(\text{air})V_1\eta \qquad (18)$$

where $V_1$ is given in cm³. This equation also demonstrates the fact that the amount of output work $W_e$ that is generated by the expanding air is completely independent of the initial temperature $T_1$. However, since the mass of air contained inside $V_1$ increased with decreasing $T_1$, and since most of the total output work of the atmospheric engine is generated from the second and third stages, the performance of the atmospheric engine will always increase if the initial air temperature $T_1$ inside $V_1$ is decreased as low as possible.

Equation 18 also shows that in optimizing the design of the expander for maximum output work per stroke, the initial volume $V_1$ should be as large as possible. Consequently, if the expansion ratio $r=300$, then $V_2=300 V_1$. Thus, the first stage expanders will be more bulky than prior art internal combustion engines that generate the same power. However, it should be also pointed out that the initial pre-expansion air pressure of the first expander 64 of the third stage (FIG. 7) of air-powered condensing atmospheric engines is 300 Atm. Hence, the pre-expansion volume energy density $\widetilde{W}$ for this air is a factor of 300 times greater than the pre-expanded air in the first stage expander. For this high pressure air $\widetilde{W}=73.25$ Joules/cm³. Thus, the expander 64 will be small and compact but very powerful—much more powerful than expanders of prior art internal combustion engines of comparable size and weight.

The extremely high expansion ratios, along with the unusual impulsive nature of the expansions, place severe operating demands on the required first stage expanders that are not found in the prior art. A central problem is that of devising a compact and efficient mechanical linkage system that is capable of transforming the inherently large, impulsive, back and forth linear motion of the piston into pure rotational motion of a drive shaft. In prior art piston driven engines, this problem is solved by connecting the piston to a connecting rod, which is connected to a crankshaft, which turns the drive shaft. Since the stroke lengths are just a few inches and since the power output is fairly high, this solution is quite satisfactory. But piston driven first stage expanders for atmospheric engines require stroke lengths of several feet instead of inches and, when this fact is coupled with the fact that these expanders develop significantly less work per stroke than is generated by a piston driven internal combustion engine of equal piston diameter, this traditional connecting rod/crankshaft drive train interface solution becomes impractical.

The fact that the condensing air is solidified rather than liquefied places another serious problem on the design of the expander. Consequently, the actual condensation must be designed to occur outside the expansion chamber rather than inside. Furthermore, since about 50% of the expanded air remains uncondensed, this uncondensed air will have to be recompressed back to ambient atmospheric pressure by a recompressor and forced out of the engine. In view of these basic operating characteristics, the design of the engine's first stage disclosed herein will be subdivided into three basic systems: The expansion chamber containing a movable piston, a vacuum chamber containing a solid phase condenser, and a recompressor containing another moving piston for recompressing the noncondensed gaseous air.

In order to obtain high mechanical efficiency and minimize sources of mechanical friction, the drive train will be designed such that the back and forth expansion strokes of the expansion piston will be linked directly to the back and forth recompression strokes of the recompression piston. Thus, all of the output work of the expansion piston is used to drive the recompression piston. Since the expander will generate more mechanical work than is consumed by the recompressor, the excess work generated (i.e., net output work) will be extracted by a plurality of rotating drive shafts that pass through the recompression piston. Thus, the solution of this mechanical linkage drive train problem that is disclosed herein for a preferred embodiment of the reciprocating piston driven first stage expander involves completely eliminating the connecting rod and crankshaft driving elements of the prior art and connecting the recompression piston directly to a plurality of "internal" drive shafts mounted inside the recompression chamber. Since there is no connecting rod, or crankshaft, the mechanical efficiency is higher than that of prior art reciprocating drive trains and there are fewer moving parts. But most important of all, it allows the piston to have almost unlimited stroke lengths that are capable of generating essentially unlimited expansion ratios. In addition, it is compact.

FIGS. 13 and 14 are schematic longitudinal and transverse cross-sectional views of the entire first stage expansion/recompression system illustrating the expansion chambers 74, recompression chamber 76, flanked by two sets of vacuum chambers 78, 79, solid phase condensers 80, 81, a mechanical linkage system 82 connecting the expansion piston 84 to the recompression piston 86, and a rotating drive train 88. The recompression chamber 76 comprises an annular region 90 bounded by two co-axial cylinders 92 that are co-axial with the central expansion cylider 94. The construction is such that the annular recompression chamber 76 is mounted around the external surfaces of the inner expansion cylinder 94 (as shown in FIGS. 13 and 14) so as to form a single compact unit.

The expansion piston 84 is forced to move back and forth inside the central expansion cylinder 94 by the large pressure forces that are exerted on the piston 84 from air-slugs at atmospheric pressure that are sequentially introduced from alternating ends of the cylinder 94 at the precise moment the expansion piston 84 is adjacent each end wall of the cylinder 94 at the end of the preceding power stroke. Since the air pressure on the other side of the expansion piston 84 is very low, the force exerted on the piston is very high. A plurality of relatively thin flexible cables 96 (with very low thermal conductivity) connect the moving expansion piston 84 directly to the recompression piston 86 such that when the expansion piston 84 is forced to move in one direction, under the force of an expanding air-slug, the recompression piston 86 is forced to move in the opposite direction via the connecting cables 96.

As soon as the expansion piston 84 reaches one end of the expansion cylinder 94, the expanding air-slug is at maximum expansion. At this moment, an exhaust shutter 98 on the left (or 99 on the right) mounted on the transverse left (right) end wall opposite the expansion piston 84 is opened. This shutter 98 (or 99) opens a large passageway through the cylinder's end wall and into the adjacent vacuum chamber 78 on the left (or 79 on the right). The pressure inside the vacuum chamber 78(79) is slightly lower than that of the fully expanded air-slug such that the expanded air-slug expands still further as it moves into the vacuum chamber 78(79) via the slight pressure differential. As soon as the shutter door 98(99) is opened which admits the expanded air-slug into the vacuum chamber 78(79), a plurality of air-inlet ports 101(100) located around the circumferential right(left) hand end periphery of the expansion cylinder 94 adjacent the expansion piston 84 are also opened thus forcing the expansion piston 84 to move back to the left(right) inside the expansion cylinder 94 under the pressure force of a new air-slug. Thus, the expanded first air-slug is automatically expelled from the expansion cylinder 94 by the expanding second air-slug which forces the expansion piston 84 to move in the opposite direction in another power stroke. However, the expanded first air-slug is actually not forced out of the expansion cylinder 94 by the moving piston 84 because the vacuum chamber 78(79) is always maintained at a lower pressure than the fully expanded air-slug. Thus, the "back pressure", exerted on the moving expansion piston 84 from the previously expanded first air-slug is essentially zero.

The very low pressure, vacuum environment, of the vacuum chambers 78, 79 are maintained by the condensing process wherein a portion of the expanded air-slug condensed as it passes through the condeners 80, 81 which are mounted inside the vacuum chambers 78, 79 respectively (which reduces its specific volume by several hundred fold) and by simultaneously removing the gaseous uncondensed portion. Since the initial expansion process is very rapid, the expanding air-slugs are transformed into a supersaturated "metastable" state that is still gaseous at maximum expansion (inside the expansion cylinder). Although the inside walls of the expansion cylinder 94 (and expansion piston 84) are very cold, they are not sufficiently cold to enable any of the super-saturated air to condense on their surfaces.

The solid phase condensers 80, 81 comprise a plurality of parallel condensing tubes 102, 103. The inner walls of these tubes comprise the condensing surfaces and are coated with a layer of previously condensed solidified air crystals at about 18° K. These condensing tubes 102, 103 are mounted inside the vacuum chambers 78, 79 respectively such that the vacuum chambers 78, 79 are each divided into two regions that are separated by the condensing tubes. The left vacuum chamber 78 is divided into a first region 104, that is located between (and connected to) the left end of the expansion chamber 74 and the beginning of the condensing tube 102; and a second region 106 that is located between (and connected to) the end of the condensing tubes 102 and the left end of the recompression chamber 76. The right vacuum chamber 79 is also divided into a first region 105, that is located between (and connected to) the right hand end of the expansion chamber 74 and the beginning of the condensing tubes 103; and a second region 107 that is located between (and connected to) the end of the condensing tubes 103 and the right end of the recompression chamber 76. The pressure inside both regions of each vacuum chamber 80, 79 are approximately equal to that inside their respective condensing tubes 102, 103.

When the expansion piston 84 is at the extreme right-(left) hand end of the expansion cylinder 94 and adjacent the right (left) hand end wall, the left (right) hand shutter doors 98(99) are opened. The expanded air-slug inside the expansion cylinder 94 moves into the first region 104(105) of the left (right) vacuum chamber 78(79) and passes through the condensing tubes 102(103). The supersaturated metastable air condenses on top of the layers of previously condensed air. That portion of the expanded air that does not condense after passing through the tubes 102(103) is discharged into the second region 106(107) of the vacuum chamber 78(79) via a plurality of relatively large discharge passageways 108(109) through the lateral end walls of the condensing tubes 102(103). This second portion 106(107) of the vacuum chamber 78(79) has an annular geometry and is mounted around the outside periphery of the condenser 80(81) and extends back toward the central expander/recompressor around the outside walls of the first portion 104(105) of the vacuum chamber, and is connected directly to the recompression chamber 76 via an extension of the shutter doors 98(99).

The construction is such that when the shutter doors 98(99) are opened and closed, the first 104(105), and second 106(107), portions of the vacuum chamber 78(79) are opened and closed simultaneously to the interiors of the expansion chamber 74 and recompression chamber 76 respectively.

The general operating principles of this piston driven first stage atmospheric engine can be summarized as follows: Suppose the first air-slug reaches maximum expansion inside the expansion cylinder 94 when the expansion piston 84 is at the extreme right hand end of the expansion cylinder 94. At this instant the shutter doors 98 on the left end of the expansion cylinder 94 are opened and the expanded air-slug rapidly moves into the left hand vauum chamber 78 (and receives an additional expansion). Notice that when the shutter doors 98 are opened, the passageway between the annular region of the second portion 106 of the left hand vacuum chamber 78 (containing previously expanded noncondensed air at very low pressure) is also opened. At this instant, the recompression piston 86 is at the extreme left hand end of the recompression chamber 72 adjacent this shutter 98. (The shutter doors 98, 99 open outward.) At this same instant (when the shutter 98 is opened) the right hand air-inlet ports 101 adjacent the expansion piston 84 are also opened and a second air-slug is admitted into the expansion cylinder 94 on the right. Consequently, the expansion piston 84 is driven back toward the left by the pressure force exerted on it by the second air-slug on the right. In view of the connecting cables 96 between the expansion and recompression pistons, when the expansion piston 84 is driven to the left, the recompression piston 86 is driven to the right, thus creating a vacuum region behind it. Since the shutter 98 adjacent the moving recompression piston 86 is open, the vacuum is filled by the gaseous air of the first air-slug that does not condense inside the condensing tubes 102. When the expansion piston 84 reaches the extreme left end of the expansion cylinder 94, the left hand shutter 98 is closed. Thus, all of the expanded first air-slug is removed from the expansion cylinder 94. That portion of the air-slug which condenses into solidified air crystals remain inside the condensing tubes 102, inside the left hand vacuum chamber 78. Most of the portion which does not condense is drawn into and locked inside the recompression chamber 76. At this instant (when the shutter doors 98 are closed) the second air-slug is at maximum expansion inside the expansion cylinder 94 and identical shutter doors 99 mounted on the right hand end of the expansion cylinder 94 (that also cover the right hand end of the recompression chamber 76) are opened. Also, at the instant this shutter 99 is opened, the left hand air-inlet ports 100 adjacent the expansion piston 84 are simultaneously opened and a third air-slug is admitted on the left. This third air-slug drives the expansion piston 84 back towards the right (in another power stroke) and therefore, drives the recompression piston 86 in the opposite direction toward the left (via the connecting cables 96) thereby recompressing the noncondensed gaseous portion of the first air-slug that is locked inside the recompression chamber 76. Notice also that when the recompression piston 86 is driven back toward the left, it not only recompresses the noncondensed portion of the first air-slug on the left, but simultaneously draws the concondensed portion of the second air-slug out of the right hand vacuum chamber 79 and into the right hand side of the recompression chamber 76.

When the pressure of the noncondensed portion of the first air-slug reaches some certain predetermined value $P_1'$ during the recompression process, where $P_1' < P_1 =$ ambient atmospheric pressure, a plurality of pressure activated one-way relief valves 110 open on the left hand end periphery of the annular recompression chamber 77 which allow the noncondensed, recompressed air-slug to leave the recompression chamber 76 through discharge conduits 112 with a predetermined pressure $P_1'$. An identical system of pressure activated relief values 111 and discharge conduits 113 are mounted on the right hand end periphery of the recompression chamber 76. Thus, in view of the connecting cables 96 that connect the expansion piston 84 to the recompression piston 86, all of the mechanical work $W_{c11}$ required to recompress the noncondensed portion of the first air-slug inside the recompression chamber 76 is supplied by the mechanical work $W_{e1}$ generated by the expanding third air-slug. Consequently, since $R > 0$ and $P_1' < P_1$, it follows that $W_{ei} > W_{c11}$ and the expansion piston 84 will be driven back and forth inside the expansion cylinder 94 under the pressure forces of additional expanding air-slugs admitted sequentially from alternating ends of the expansion cylinder 94 in a self-sustaining, working generating process, that can be continued indefinitely. The net output work $= W_{e1} - W_{c11}$ is extracted by the rotating internal drive shafts 88 that pass through the annular recompression piston 86. The vacuum inside the vacuum chambers 78,79 is automatically maintained by the reduced specific volume of the condensing air, while the noncondensed air is continuously removed and recompressed by the recompression piston 86.

Since some portion of each expanded air-slug is always condensed ($R > 0$) it follows that if the volume of the recompression chamber 76 is equal to the volume of the expansion chamber 74, the pressure inside the vacuum chambers 78,79 will always be less than the lowest pressure inside the expansion chamber 74. Thus, in this design, when the shutters 98(99) are opened on the expansion chamber 74, the expanded supersaturated air-slugs will always rush out of the expansion chamber 74 and into the vacuum chamber 78(79) while simultaneously experiencing a further expansion as it enters the chamber. This will tend to increase the condensation ratio R. Since this situation will always be desirable, it will be adopted as part of the basic design of reciprocating piston driven first stage expander/recompressors.

The value of the exhaust pressure $P_1'$ of the partially recompressed, noncondensed air-slugs is determined by its corresponding air temperature $T_1'$. Since this noncondensed air has a high entropy, the temperature $T_1'$ of the recompressed air at pressure $P_1'$ may be relatively high, exceeding ambient atmospheric temperature even if $P_1'$ is relatively low. (The reason for this was explained above). Thus, the partially recompressed air is fed into a heat exchanger 36 (FIG. 7) where it is cooled before continuing the recompression all the way back to ambient atmospheric pressure $P_1$. As explained above, this precooling step will reduce the final mechanical work expended while recompressing the noncondensed air back to ambient atmospheric pressure. The mechanical work $W_{c12}$ required to compress the partially compressed air from $P'_1$ to $P_1$ is also supplied by the expansion piston 84. Thus, the actual net output work $w_{net1}$ of the first stage of the atmospheric engine is given by $w_{net1} = W_{e1} - W_{c11} - W_{c12} - W_{c13}$. The intermediate cooling step is designed to reduce $W_{c12}$ so as to increase $W_{net1}$.

The mechanical linkage system 82 that transmits the mechanical power generated by the moving expansion piston 84 to the recompression piston 86 is relatively simple. This is due to the fact that both pistons move back and forth in opposite directions along parallel lines with equal displacements. A plurality of tension cables 96 connect the pistons directly to each face to form continuous loops. These cable loops are under fairly high tension and move around a plurality of guide pulleys 114 with very low friction. This mechanical linkage system is very efficient and generates very little frictional heat. It is also completely independent of the stroke length (i.e., displacement) of each piston. The drive train system comprising the internal rotating drive shafts 88 passing through the recompression piston 86 convert the moving reciprocating back and forth linear motion of the recompression piston 86 into purely rotational motion of the drive shafts 88. Moreover, this drive train system will be designed to generate smooth rotational torque on the rotating drive shafts 88 at constant angular velocity even though the forces acting on the driving piston 84 are very impulsive and even though the piston moves back and forth in opposite directions with high velocity changes and accelerations. This drive train system will also be designed to be completely independent of the displacement distance of the recompression piston 86. Such mechanical drive trains are not in the prior art and require a detailed technical description. This description will be presented herein with reference to FIGS. 15, 16 and 17.

FIGS. 15 and 16 illustrate enlarged longitudinal and transverse cross sections of a rotating drive shaft 88 passing through the annular recompression chamber 76 and through the recompression piston 86 moving inside it. FIG. 17 is a further enlarged transverse cross section of one rotating drive shaft 88 passing through the recompression piston 86.

As seen in FIG. 15, the internal drive shaft 88 penetrates both transverse end walls 116 of the annular recompression chamber 76, extends parallel to the longitudinal central axis of the expansion chamber 74 and passes completely through the annular compression piston 86. The circular holes 118 through each end of the annular recompression cylinder 76 that admit the drive shaft 88 contain three grooves 120 around their inside periphery. Three parallel flanges 122, extending a short distance radially outward from the surface on each end of the internal drive shaft 88, fit into these grooves 120 and prevent the drive shaft 88 from moving in a longitudinal direction inside the cylinder 76. The drive shaft 88 is therefore constrained to pure rotational motion inside the recompression cylinder 76.

The recompression piston 86 is constrained from rotating about the longitudinal axis by three other flanges 124 that ride in three relatively broad channels 126 extending along the inside walls of the recompression cylinder 76 that extend parallel to the longitudinal axis as shown in FIG. 16. Two sets ($L_i$, $R_i$, i=1,2,..., 6) of counter twisting parallel grooves are also cut into the internal drive shaft 88. One of these twisting drive shaft grooves $R_i$ is shown in FIG. 15. Two annular rotating sleeve bearings 128 and 130 are mounted around the recompression piston's inner periphery adjacent the drive shaft 88. The left hand sleeve bearing 128 has six linear torque bearings 132 that ride inside the six grooves $L_i$ and the right hand sleeve bearing 130 has six linear torque bearings 134 that ride inside the six grooves $R_i$. These two annular sleeve bearing 128 and 130 are constructed such that one and only one sleeve bearing remains fixed relative to the recompression piston, while the other bearing remains free to rotate (clockwise or counterclockwise) about the drive shaft 88 inside its mounting on the recompression piston. A clutch mechanism 136 inside the recompression piston 86 is triggered by a relatively small pin 138 extending a short distance into the recompression cylinder 76 from each end wall such that when the recompression piston 86 is closest to the left end wall, the pin 138 trips the clutch mechanism 136 which disengages the left hand annular sleeve bearing 128 from a locked mode to the freely rotating mode while simultaneously engaging the right hand annular sleeve bearing 130 from the freely rotating mode to the locked mode. Similarly, when the piston 86 is closest to the right end wall of the cylinder, the pin 138 on this end wall trips the clutch mechanism 136 which disengages the right hand annular sleeve bearing 130 from a locked mode to the freely rotating mode while simultaneously engaging the left hand annular sleeve bearing 128 from the freely rotating mode to the locked mode. Consequently, when the recompression piston 86 is forced to move from left to right under the pressure force of expanding air introduced from the right end of the expansion cylinder 94 (FIG. 13), the right hand annular sleeve bearing 130 is locked and the torque bearings 134 that are mounted on it exert rotational torque on the drive shaft 88 by riding inside the grooves $R_i$. The left hand annular sleeve bearing is free to rotate and does rotate because the torque bearings 132 connected to it are always riding inside the grooves $L_i$ which causes this bearing to rotate. This free rotation prevents these torque bearings 132 from exerting any counter torque on the drive shaft 88. When the recompression piston 86 is forced to move from right to left under the pressure force of expanding air introduced from the left end of the expansion cylinder 94, the left hand annular sleeve bearing 128 is locked and the torque bearings 132 that are mounted on it exert rotational torque on the drive shaft 94 by riding inside the grooves $L_i$. The right hand annular bearing 130 rotates freely so that the torque bearings 134 connected to it exert no counter torque on the drive shaft. Consequently, since the grooves $L_i$ and $R_i$ twist around the drive shaft in opposite senses, the torque delivered to the drive shaft when the recompression piston 86 is forced to move to the left or right is always in the same sense. The construction is such that the torque bearings ride snugly inside their respective grooves and the wall clearance between the recompression cylinder 76 and recompression piston 86 is very close such that the recompression piston 86 forms a barrier inside the annular recompression cylinder 76 that is essentially airtight. (The detailed sealing elements could use spring loaded Teflon rings and gaskets that are well known in the art of cryogenic expander design and are omitted from this disclosure).

As described above, it is the expansion piston 84, moving back and forth inside the expansion cylinder 94 under the pressure forces of the expanding air-slugs, that provide the driving force for moving the recompression piston 86 back and forth inside the annular recompression cylinder 76. This is accomplished by the connecting cables 96. The expansion piston 84 moves back and forth inside the expansion cylinder 94 with very little friction. It is guided along the longitudinal direction by a fixed central guide shaft 140 that extends along the central axis of the expansion cylinder 94 and passes through the center of the expansion piston 84. The expansion piston 84 is prevented from rotating about the central guide shaft 140 by three parallel flanges 142 that extend a short distance outward from the circumferential periphery of the expansion piston 84. These flanges 142 ride snugly inside three parallel guide channels 144 cut into and extending along the inside walls of the expansion cylinder 94, parallel to the guide shaft 140. The clearance between the walls of the expansion cylinder and the expansion piston is very close and essentially airtight.

The unique rotating mechanical drive train system that is attached to the recompression piston 86 allows the stroke length to be arbitrarily long, while converting these arbitrarily long, linear reciprocating motions of the recompression piston directly into pure rotational motion of the drive shafts. Moreover, this mechanical linkage design is extremely compact and is essentially built directly into the drive shafts and recompression piston and therefore does not take up any additional space since these elements are essential regardless of the type of linkage system that is adopted. Moreover, it will be shown below that the long piston stroke lengths are viewed as a beneficial characteristic and utilized to smooth out the otherwise impulsive force profiles that are exerted on the recompression piston by the air expanding against the expansion piston. This is accomplished by utilizing the inertial mass of both pistons as a linear kinetic energy storage system.

Most of the initial "burst" of force is used to accelerate the pistons to relatively high velocities and therefore give them high kinetic energy. When the air pressure drops to low values, this kinetic energy is recovered and converted into smooth rotational torque by the twisting grooves in the drive shaft that act as piston decelerators. It is possible to cut these grooves in the drive shafts according to precisely calculated pitch angle functions $\phi(x)$ such that the applied torque profile is not only smooth but essentially constant and independent of the recompression piston's position inside the recompression chamber. When the recompression piston approaches the end of its stroke, the "back-pressure" generated by recompressing the noncondensed air begins to rise very rapidly. But since this decelerating recompression force can be very accurately determined as a function of the piston's displacement distance x, it can be combined with the accelerating force function generated by the expanding air to give a net force function acting on the recompression piston by the expanding air and, simultaneously, by the compressing air.

If F(x) represents the net force acting on the recompression piston by the expanding and compressing air acting simultaneously, then the torque $\tau = \tau(x)$ exerted on each rotating drive shaft can be expressed as $$\tau(x) = \frac{b[F(x) - M(d^2x/dt^2)]}{n \tan \phi(x)}$$

where b denotes the radius of the drive shaft, M is the combined mass of the expansion piston 84 and the recompression piston 86, and where n denotes the total number of drive shafts 88 passing through the recompression piston 86. Consequently, by choosing the pitch function $\phi(x) = [F(x) - M(d^2x/dt^2)](b/n)$, the torque function $\tau(x)$=constant. If this constant internal torque $\tau$ is balanced by a constant external load torque (such as turning the rotor of a large electric generator) the angular velocity $\omega$ of each drive shaft will also be constant, which is denoted by $\omega_0$. Consequently, since $b\omega = (dx/dt) \tan \phi$, the above equation can be expressed as $$n\tau_0\omega_0 = [F(x) - M(d^2x/dt^2)](dx/dt)$$

This equation represents a second order differential equation in x whose solution x=x(t) defines the position x of the center of the recompression piston as a function of time t (i.e., the longitudinal position of the center of the piston).

The desired pitch angle function $\phi(x)$, that enables the recompression picton 86 to exert constant torque 96 0 on the drive shafts 88 as it moves back and forth inside the annular recompression cylinder 76 under the combined forces of the expanding and compressing air-slugs can be obtained by the equation $$\phi(t) = \phi[x(t)] = \tan^{-1}[b\omega_0(dx/dt)^{-1}]$$

where x=x(t) is the solution to equation (19). Although this function x(t) represents a function with time t acting as the independent variable, it can be expressed explicitly as a function of x by inverting the solution function x=x(t), (i.e., by replacing t in $\phi(t)$ with t=t(x) where t=t(x) is the inverse function of the solution function x=x(t). Hence, $\phi = \phi[t(x)] = \phi(x)$. The solution $\phi(x)$ defines the path for the $R_i$ grooves. The path for the $L_i$ grooves are defined by the symmetric pitch angle function $\phi(L-x)$ (where L is the total displacement distance) which is the mirror image of $\phi(x)$.

Equation (19) contains interesting information that allows one to gain a deeper physical understanding as to what is happening, dynamically, inside the expansion and recompression cylinders that result in the rather remarkable phenomenon of constant torque. In studying equation (19) the product of $\omega_0\tau_0$ represents power. It is, in fact, the power that is being delivered to the drive shaft by the moving recompression piston—which is, of course, constant between the torque $\tau_0$ and the angular velocity $\omega_0$ are constants. Let $F(x) = F_e(x) - F_c(x)$ where $F_e(x)$ represents the accelerating force function due to the expanding air-slug inside the expansion chamber 74 and where $F_c(x)$ represents the decelerating force function due to the compressing air-slug inside the recompression chamber 76. These functions can be approximated by $F_e = A_e P_1(x/x_1)^{-\gamma}$ and by $F_c = A_c P_v(y/y_1)^{-\gamma}$ where $A_e$ and $A_c$ denote the cross sectional areas of the expansion and recompression pistons respectively. The average pressure inside the vacuum chambers is denoted by $P_v$ for any y=L-x where L denotes the displacement distance and $y_1$ is a small constant (analogous to $x_1$). Cnsequently, the term $F_e(dx/dt)$ represents the instantaneous power given to the expansion piston by the expanding air-slug and $F_c(dx/dt)$ represents the instantaneous power taken from the recompression piston by the compressing air-slug when the expansion piston is at point x (and the recompression piston is at L-x). Thus, F(x)(dx/dt) represents net power being generated therefrom. The term $M(d^2x/dt^2)(dx/dt)$ in equation (19) represents the power used to simultaneously accelerate the expansion piston and the recompression piston.

The instantaneous kinetic energy KE of both pistons is given by $KE = (\frac{1}{2})M(dx/dt)^2$. Thus $d(KE)/dt = M(d^2x/dt^2)(dx/dt)$ = accelerating power.

Consequently, the net instantaneous power given to the drive shaft is equal to $F(x)(dx/dt) - M(d^2x/dt^2)(dx/dt)$. But this expression is equal to the right hand side of equation (19) which is a constant. Therefore, the constant torque $\tau_0$, constant output power $\tau_0\omega_0$ phenomenon, is the result of a precisely balanced interchange of power between that given to the expansion piston by the expanding air-slug, that subtracted from the recompression piston by the compressing air-slug, and that subtracted from both pistons and used to accelerate them.

Keeping in mind the above analysis, the mechanics of the constant torque, drive train system can now be explained. Initially, when an air-slug first begins to expand against the expansion piston 84, there is a very high impulsive force $F_e$ exerted on the expansion piston 84. (The retarding decelerating force $F_c$ acting on the recompression piston 86 at the beginning of the stroke is almost zero.) Instead of transforming a large portion of this force immediately into a sudden and very high impulsive torque on all of the drive shafts (as in conventional internal combustion engines) the major portion of it is used to accelerate both pistons—thus utilizing their total inertial mass M as a temporary kinetic energy storage system for absorbing most of the high initial energy generated by the expanding air-slug. A relatively small amount of force $F_l$ of this total initial force $F = F_e - F_c$ is used to exert some longitudinal force on the torque bearings 132 (or 134) that, riding inside their respective grooves $L_i$ (or $R_i$), result in a moderate but constant torque on the rotating drive shafts 88 (because of their pitch). It is clear from FIG. 10 that the force $F_e$ exerted on the expansion piston 84 by an expanding air-slug drops off very rapidly as the expansion piston moves along the x axis. Thus, there will come a point $x_0$ where the net accelerating force $F_{acc} = F - F_l = F_e - F_c - F_l = 0$ and the pistons can no longer be accelerated. But during the brief time interval when they were being accelerated, they accumulated significant kinetic energy. After the point $x_0$ is passed, this stored kinetic energy is now utilized to continue supplying the constant torque to turn the drive shafts and to supply the mechanical work to keep recompressing the non-condensed air inside the recompression chamber. The extraction of this kinetic energy takes place automatically by a decelerating force acting on the recompression piston that is generated by the increasing air pressure of the recompressing air, and by the interaction between the recompression piston's torque bearings and the drive shaft grooves which is transformed into constant torque. Analytically, this process can be seen by noting that when the pistons begin to slow down (after the expansion piston passes x), $d^2x/dt^2$ becomes negative. Hence, the term $-M(d^2x/dt^2)(dx/dt)$ becomes positive in equation (19). The pistons are decelerated by the recompressing air and by the drive shaft grooves such that their velocity decreases to zero at the exact point when both piston faces are up against and barely touching their respective end walls.

FIGS. 18 and 19 are schematic transverse and longitudinal cross sections of one of the two shutter doors 98 mounted on each end of the expansion/recompression chambers. These shutter doors 98 are designed to allow the expanded supersaturated air vapor inside the expansion chamber 74 to pass into the adjacent vacuum chamber while simultaneously allowing the gaseous noncondensed portion to enter the recompression chamber 76 with very little obstruction and a minimum amount of friction. They are opened by two mechanical arms 146 that move in transverse directions. These arms 146 are connected to the ends of each shutter panel 148 by small hinges 150. The arms 146 are moved by mechanical actuators 152 that automatically open and close the doors when the expansion piston 84 is at a maximum and minimum distance respectively.

FIGS. 20 and 21 are schematic longitudinal and transverse cross sections of one end of the expansion cylinder 94 illustrating the design and construction of a plurality of air-inlet ports 154. These air-inlet ports 154 are mounted around the circumferential periphery of each end of the expansion cylinder 94 and provide multiple passageways through the lateral walls of the expansion cylinder 94 at each end. They are relatively wide in order to allow the air to enter the expansion cylinder 94 very quickly when they are uncovered, 360° around the entire end periphery of the expansion cylinder 94. These air-inlet ports 154 are opened and closed by an airtight sleeve shutter 156 that moves back and forth in a longitudinal direction as shown in FIG. 20. The air-inlet ports 154 are uncovered by the sleeve shutter 156 immediately after the expanded air vapor exhaust shutter doors 98(99) are closed. Thus, a new air-slug is admitted into the expansion cylinder 94 immediately after a previously expanded air-slug is expelled. The sleeve shutter 156 is connected to a mechanical actuator 158 that triggers the sleeve shutter 156 to move a short distance away from the end periphery of the expansion cylinder 94 as soon as the adjacent air-outlet shutter door 98(99) is closed. This action uncovers the air-inlet ports 154 and a new air-slug begins to enter the expansion chamber 94. Since the air pressure of the air entering the expansion cylinder 94 is at ambient atmospheric pressure $P_1$, the expansion piston 84 is forced to move very rapidly toward the opposite end of the expansion cylinder 94. However, as soon as the expansion piston moves a certain pre-selected distance $x_1$, the mechanical actuator 158 is triggered and the sleeve shutter 156 is immediately closed. This action locks another discrete "charge of air" or "air-slug" into the expansion cylinder 94 with a pre-determined initial volume $V_1$ at ambient atmospheric pressure $P_1$ and some initial temperature $T_1$. This new air-slug expands against the expansion piston 84 forcing it to move toward the opposite end as described above. The mechanical actuator 158 can be controlled by a control actuator 160 such that the pre-expansion volume $V_1$ can be varied over a wide range. Since the total displacement of the expansion piston 84 is L, the expansion ratio $r = L/x_1$ can be controlled to vary over a wide range by controlling the value of $x_1$.

The air-inlet ports 154 are connected directly to an air feeding conduit 162 that extends completely around each end of the expansion cylinder 94. This conduit 162 is connected to another conduit 163 (FIGS. 20, 21) which is connected to a central cold air reservoir mixing vessel 164. All of the previously condensed air passing through the third stage and discharged from the last expander 72 (FIG. 7) is recycled back into the first stage at atmospheric pressure by feeding it into this cold air reservoir vessel 164 via conduit 165. Another conduit 166 feeds additional pre-cooled air taken from the open atmosphere at atmospheric pressure into the cold air reservoir vessel 164 where it is mixed with the recycled air before entering the expansion cylinder 94. This conduit 166 is connected to a heat exchanger 26. This heat exchanger 26 serves as an ambient air pre-cooler for pre-cooling that portion of new air that is drawn from the open atmosphere and deposited into the reservoir vessel 164 to make up for that portion of previously expanded air that does not condense. As described above, the coolant circulating through this heat exchanger 26 is previously condensed air circulating through the third stage at points M and O shown in FIG. 7. (As described above, if the expansion ratio is 300, then the equilibrium mixed air temperature inside the cold air reservoir vessel 164 should not exceed 200° K.).

Before feeding atmospheric air into the pre-cooler 26 directly from the ambient atmosphere, it is first past into a filtering system 168 (FIGS. 20, 21). This filtering system 168 is designed to remove particulate contaminates from the air such as dust particles and the like that could enter the expansion cylinder 94 and scratch or otherwise damage its inside surfaces or the surface of the moving expansion piston 84. Other traps 170 may also be inserted at various positions inside the air-inlet conduit (and inside the air-filtering system 168) for absorbing and removing water vapor. These filters and traps could also remove other vapors and foreign substances that could be present in the incoming new air. Thus, unlike all prior art heat engines that pollute the atmosphere, the air-powered atmospheric engine will actually clean the air when it operates.

FIGS. 22 and 23 are schematic longitudinal and transverse cross sections of one end of the annular recompression chamber 76 illustrating the design and construction of a plurality of air discharge ports 172. As in the design of the air-inlet ports 154, the air discharge ports 172 are mounted around the circumferential periphery of each end of the recompression chamber 76 and provide multiple passageways through the lateral walls of the recompression chamber 76 at each end. They are also relatively wide in order to allow the recompressed air to escape from the recompression chamber 76 very quickly, 360° around the entire end periphery of recompression chamber 76. Unlike the air inlet ports 154, these air discharge ports are covered by pressure activated, one-way, relief valves 174 that automatically open when the recompressed air inside the recompression chamber 76 reaches some minimum threshold pressure $P'_1$ that is below ambient atmospheric pressure $P_1$ (10.1325 N/cm$^2$). These valves 174 are also designed to be controllable such that the discharge pressure $P'_1$ can be varied over a wide range of values (not exceeding $P_1$).

These air discharge ports 172 are connected directly to an air discharge conduit 176 that extends completely around each end of the recompression chamber 76. This conduit 176 is connected to another conduit 178 (FIGS. 22, 23) which is connected to another heat exchanger 38. This heat exchanger 38 serves as an air cooler for the partially recompressed air before it is completely recompressed back to ambient atmospheric pressure $P_1$. (This heat exchanger corresponds to the heat exchanger 38 shown in FIG. 7.) As described above, the cooling medium circulating through this air pre-cooler 38 is very cold second stage working fluid taken at points $D_2$ and $F_2$ immediately after it is discharged from expanders 50 and 54. After circulating through the pre-cooler 38, the working fluid is returned to points $D_2$ and $F_2$ and fed into the ambient heat exchangers 52 and 56. (The cooling medium could also be ambient atmospheric air if the temperature $T'_1$ of the partially recompressed air exceeds ambient atmospheric temperature.)

After the partially recompressed air is cooled and emerges out of the heat exchanger 38 via another conduit 179, it is fed into another air recompressor 180 where it is compressed up to ambient atmospheric pressure $P_1$ and discharged into the open atmosphere. Although this air that is discharged back into the environment may be above ambient atmospheric temperature, it is extremely pure and free of essentially all pollution.

In the preferred embodiment the external walls of the expansion chamber 74 and the recompression chamber 76 are enclosed within a thick jacket of evacuated cryogenic insulation 182 in order to thermally isolate them from one another and from the ambient environment (FIGS. 20 and 22). In addition, all of the above described conduits for feeding low temperature air into the expansion chamber 74 are also thermally insulated from the ambient environment. The cold air reservoir vessel 164 would also be protected by a thick jacket of evacuated multilayer cryogenic insulation. In another embodiment, the external walls of the expansion chamber 74 could be maintained in direct thermal contact with a liquefied cryogenic medium. In this design, (FIG. 24) a cryogenic Dewar jacket 184 containing a liquefied cryogen 186 is mounted around the external walls of the expansion chamber 74 such that the liquefied cryogen is in direct thermal contact with these external walls. The Dewar jacket 184 could itself be enclosed by a thick thermal blanket 188 composed of layers of evacuated multilayer insulation 190. The cryogen circulating through this Dewar jacket 184 could be liquid air or some other liquefied gas that is used for the working fluid of the second stage (FIG. 7).

As illustrated in FIG. 13, the expansion and recompression chambers 74, 76 are mounted between two vacuum chamber 78, 79. Each of these vacuum chambers 78, 79 contain a solid phase air condenser. The design and construction of these solid phase condensers, together with the solid phase compressors, can be best described by referring to FIGS. 25 and 26 which illustrate transverse and longitudinal cross sections of these components respectively on the right hand side of the expander/recompressor. (The construction of the left vacuum chamber 78, left solid phase condenser 80 and left solid phase compressor is identical to that on the right hand side.) The condenser 81 is mounted completely inside the vacuum chamber 79 in such a way that the vacuum chamber 79 is divided into two completely separate regions, 105 and 107. The first region 105 is cylindrical and is connected directly to the cylindrical expansion chamber 74. The second region 107 is annular and is connected directly to the annular recompression chamber 76. The passageway between the expansion chamber 74 and the first region 105 is opened and closed by the shutter door 99. The passageway between the recompression chamber 76 and the second region 107 is opened and closed by the outer portion of the same shutter door 99. The operation of this shutter door was explained above.

The solid phase condenser 81 comprises a plurality of parallel double walled cylindrical condensing tubes 192. Liquefied hydrogen 194, at about 18° K., is circulated through the annular regions 196 inside the double walled condenser tubes 192 and is in direct thermal contact with the inside walls 198 of the condensing tubes 192 (which are the condensing surfaces of the condensing tubes 192). This liquid hydrogen enables the condensing surfaces 198 to be maintained at a very low temperature while the engine is turned off so that it can be restarted. The liquefied hydrogen thus serves as a cryogenic "primer" before the engine is started. After the engine is started, the supersaturated metastable air passing through these cryogenic condensing tubes condenses into solidified air crystals that form a layer of condensation all along the inside walls 198 of these condensing tubes 192. There is very little heat transfer between the condensing metastable air vapor and the liquefied hydrogen while the engine is operating.

The condensing tubes 192 can be constructed with aluminum or some other suitable material with high thermal conductivity. The space 200 between adjacent condensing tubes 192 is completely blocked off from the vacuum chamber 79 by a thermally insulated barrier 202 so that none of the expanded air vapor can enter this region. Consequently, the only way the expanded air can pass into the first region 105 of the vacuum chamber 79 and enter the second region 107 of the vacuum chamber is to pass through the condensing tubes 192.

As soon as the adjacent shutter doors 99 open from the expansion chamber 74, the metastable supersaturated air vapor is drawn into the first part 105 of the vacuum chamber 79 by virtue of its lower pressure. The supersaturated air vapor passes into the condensing tubes 192 and begins to solidify into air crystals on top of previously solidified air. The condensing tubes 192 are sufficiently long such that essentially all of the metastable, supersaturated air vapor condenses on them before reaching the end. That portion of the air that is not metastable, passes through the condensing tubes and escaptes through a plurality of gaseous air discharge passageways 204. These discharge passageways lead directly into the annular second half 107 of the vacuum chamber 79. Since the noncondensed air is drawn into the recompression chamber 76 by virtue of the moving recompression piston 86 and since the condensing air results in a reduction of its specific volume by almost three orders of magnitude, the vacuum environment of the vacuum chamber 79 is automatically maintained at a very low pressure and ready to receive the next expanded air-slug.

The mass flow rate $m_c$ of air condensing on the condensing walls 198 is given approximately by the equation $$\dot{m}_c = kAP\sqrt{\frac{M}{T}} \quad (20)$$

where P denotes the chamber pressure, T denotes the wall temperature and M denotes the molecular weight of air (28.9752). The total area of the condenser walls 198 is denoted by A and k is a constant. If the units of A, P and T are cm², torr (i.e., mm of Hg) and °K respectively, then k=0.05833. (See, *Handbook of High Vacuum Engineering*, Reinhold Publishing Corporation, New York, 1963, pp. 72–76, by H. A. Steinherz.) Thus, for example, if T=20° K., P=P$_2$=0.100 torr and A=20,000 cm² (2.0 m²), then m$_c$=140.4 gm/sec.

The solid phase compressor 208 is mounted inside the condenser tubes 192. Each tube 192 (FIGS. 25, 26) is fitted with a spiraling scraper blade 210 that is attached to a relatively small rotating axle 212 mounted along the tubes longitudinal central axis. Each scraper blade 210 is thin and narrow and is attached to the rotating axle 212 by small transverse connecting rods 214. Each scraper blade 210 is maintained in a non-contacting position with the external tube wall 198. This allows a relatively thin gap between the scraper blades 210 and the inner tube walls 198 which is filled by a thin layer of solidified air crystals. Since the scraper blades 210 and rotating axles 212 are relatively narrow, they do not block the air vapor 216 from entering the condenser tubes 192 and moving along their longitudinal axis.

The forward end of the rotating axles 212 are all connected to a flat grid 218 that is mounted at the forward end of, and perpendicular to, the condenser tubes 192. Mechanical rotating gears 220 connecting all of these rotating axles 212 are connected to a central rotating axle 222 which is, in turn, connected to the engine's drive train (FIG. 26). Consequently, when air is fed into the expansion chamber 74, the expanding air drives the drive train which, in turn automatically rotates all of the scraper blades 210. The rotation rate of the scraper blades 210 is relatively low and on the order of two to four revolutions per minute.

The rotating scraper blades 210 continuously scrape off the top layer of the solidified air crystals 224 from the external condenser tube walls 198 and moves them to the end 226 of the condenser tubes 192. FIG. 27 is an enlarged, longitudinal cross section of the end portion of one condensing tube 192 illustrating the construction of one gaseous air discharge passageway 204 for the noncondensing air 228. As illustrated in FIG. 27, the rotating scraper blade 210 is not in actual physical contact with the external walls 198 of the condensing tubes 192. Thus, there is a gap between the rotating blade 210 and the external wall surface 198 that is filled by a thin layer 230 of solidified air crystals. The purpose for this layer is to provide the noncondensed metastable air molecules ideal surfaces on which they can solidify on. When the rotating scraper blade 210 scrapes off the top layer of this solidified air, the remaining layer 230 still provides an ideal condensing surface. The frictional heating effect of the blade moving over the solidified air crystals is essentially zero. The gaseous air discharge passageway 204 extends a short distance 232 into the condensing tube 192, (in a perpendicular direction from the inside wall surface 198) to a distance exactly equal to the gap between the rotating scraper blade 210 and the wall surface 198. Consequently, when the scraper blade 210 is rotated inside the condensing tube 192, it just barely brushes up against the end of the discharge passageway 204, and therefore keeps it open and clear of solidified air crystals.

The condensing tubes 192 are extended beyond the discharge passageways 204 by converging, single walled, co-axial tubes 234 of very low thermal conductivity (such as Teflon or epoxy resin). The diameters of these tube extensions 234 decrease to about one-fourth of the diameter of the condensing tubes 192. The spiraling scraper blades 210 are also extended beyond the end of the condenser tubes 192, into these new tube sections 234. However, after a relatively short distance, the gap between the scraper blades 210 and the tube wall surfaces is narrowed until it is reduced to zero. Beyond this point 236 (FIG. 27) the spiraling scraper blades 210 always remain in physical contact with the tube walls of the new tube sections 234. The blades also become smooth closed surfaces beyond this point 236 and are connected directly to the rotation axles 212 (eliminating the need for transverse connecting rods). Thus, these closed surface rotating blades 238 force the solidified air crystals to move through the new tube sections 234. Consequently, the rotating blades 238 begin to squeeze the solidified air crystals 240, moving in these new tube sections, similar to a screw compressor. Thus, the result is a solid phase recompression of the solidified air crystals. The combination of the rotating closed surface blades 238, rotating inside the new tube sections 234, comprise a "screw compressor" and represents the solid phase isothermal recompressor system. It is powered by a relatively small fraction of the mechanical output work of the expansion piston 84.

The above described piston driven, first stage air expander/recompressor with flanking vacuum chambers, solid phase condensers and solid phase recompressors represents the first and most important stage of my multiple stage condensing atmospheric engine. This first stage generates the solidified air upon which the remaining two stagees utilize to generate additional mechanical work. Without the solidified air generated by the first stage, the second and third stages would be completely useless.

In the piston driven embodiment of the first stage disclosed above and illustrated in FIG. 13, there are essentially two identical sets of vacuum chambers 78, 79, solid phase condensers 80, 81 and solid phase recompressors 85 separated by the central expansion/recompression chambers. Thus, the above description of the vacuum chamber, solid phase condenser and solid phase recompressor applies to both sets. Although it will be impractical to divide the second stage, closed cycle cryogenic engine into two entirely separate units, its condenser 44 (FIG. 7) can be so divided by temporarily dividing the expanded second stage working fluid (e.g., oxygen) at point $H_2$ (FIG. 7) into two equal portions and feeding it into two identical second stage condensers 87 (FIG. 13) mounted at each end of the two solid phase recompressors 85. After this second stage working fluid is condensed into liquefied working fluid, both portions are recombined at point $A_2$. The design and operating principles of one of these second stage condensers 87 is illustrated in FIG. 26.

The design of each second stage condenser 87 is based on simply extending the insulated tube sections 234 carrying the compressed solidified air crystals 240 directly into each condenser 87. Thus, as shown in FIG. 26, after a relatively short distance, these insulated tube sections 234 pass into a thermally insulated second stage condenser 87. However, the tube sections 242 inside the condenser 87 are made of aluminum or some other material with high thermal conductivity in order to obtain a high heat flux through its walls between the very cold solidified air crystals 240 inside the tubes 242 and the warmer saturated vapor 244 of the second stage. A plurality of aluminum fins 246 are mounted on the tubes 242 inside the condenser 87 to enhance the heat transfer process. The incoming solidified air crystals 240 extract the latent heat of condensation from the saturated second stage vapor 244 which simultaneously melts the solid air crystals 240 into liquid air 248 and isothermally condenses the incoming saturated vapor 244 into liquid 250. Thermally insulated conduits 252 carry all of the liquid air coming out of the tubes 242 to a main liquid air conduit 254. This conduit contains a one-way pressure activated relief valve 256 that opens only when the pressure of the liquid air inside the tubes 242 exceeds 1.0 Atm. This pressure activated relief valve 256 automatically regulates the pressure generated by the solid phase recompression system so as to produce 1.0 Atm of liquefied air pressure at the discharge point.

As shown in FIG. 26, the incoming saturated second stage vapor 244 enters the condenser 87 at point $H_2$ via a thermally insulated conduit 258, circulates around the cooling fins 246, liquefies and leaves the condenser 87 through a thermally insulated discharge conduit 260 at point $A_2$. As described above, the liquefied cryogenic air emerging from the condenser 87 at point J and the liquefied cryogenic second stage working fluid emerging from the condenser 87 at point $A_2$ can be utilized as cryogenic first stage engine coolants before they are compressed to their high working pressures.

In order to enable some embodiments of the atmospheric engine to operate on an intermittant basis such as an automobile engine where the engine can be stopped and left in the off condition for extended time periods, it would be desirable to maintain the entire first stage (including the second stage condenser) within a long lasting cryogenic environment. For example, in this embodiment, all of the various components could be protected by a thick inner jacket of evacuated multilayer cryogenic insulation 262 (FIG. 26). This jacket could then be completely enclosed within a thick Dewar jacket vessel 264 containing a relatively large amount of liquefied air 266. Finally, the cryogenic Dewar vessel 264 could itself be completely enclosed within a thick outer jacket of evacuated multilayer insulation 268. The liquid hydrogen 194 surrounding the condensing tubes 192 would maintain these tubes at the condensing temperature such that the condensation process could begin as soon as the expanded air-slugs enter the condensing tubes 192.

Before disclosing the design of continuous flow turbines suitable for first stage atmospheric engines, it is instructive to estimate the expected performance of reciprocating piston driven first stage atmospheric engines similar to that described above for specific dimensions. If $V_1$ represents the initial volume of an air-slug entering the expansion chamber, the amount of work generated during the time when the air-slug is entering the chamber is equal to $P_1V_1$. During this time period, the air-slug moves the face of the expansion piston $x=0$ to $x=x_1$ with a constant pressure equal to $P_1$. The work $W_e$ generated from the expansion from $x_1$ to $x_2$ is given by $\bar{W}\eta V_1$ where $\bar{W}$ is the volume energy density of air given by equation (17) and where $\eta$ is the thermal efficiency given by equation (7). Hence, the total work generated by the complete stroke from $x=0$ to $x=x_2$ is given by $P_1V_1 + \bar{W}\eta V_1 = V_1(P_1 + \bar{W}\eta)$. The total amount of work consumed in recompressing the non-condensed portion of the expanded air-slug back to ambient atmospheric pressure $P_1$ is approximately equal to $(1-R)$ times that generated from the expander or $(1-R) V_1(P_1 + \bar{W}\eta)$ where R denotes the condensation ratio. Consequently, the net amount of mechanical work gained $W_{net1}$ is given approximately by $$W_{net1} = RV_1(P_1 + \bar{W}\eta) \qquad (21)$$

It is important to point out and emphasize that the contribution of the term $P_1V_1$ to the generation of mechanical output work (which represents the amount of mechanical work generated in moving the expansion piston from $x=0$ to $x=x_1$ during the admission of the air-slug prior to its actual expansion) is very significant. If this contribution were ignored, the net mechanical output work $W_{net1}$ expressed by equation (21) would be expressed by the equation $$W_{net1} = RV_1 \widetilde{W} \eta \tag{22}$$

In order to understand the effect of this $P_1V_1$ contribution, suppose that the pre-expansion temperature $T_1=200°$ K. and that the expansion ratio $r=300$. Then $R=0.506$ and $\eta=0.906$. Consequently, if the term $P_1V_1$ were ignored, the net output work per unit volume $W_{net1}/V_1$ computed from (22) would be 0.112 Joules/cm³. By including this $P_1V_1$ term as expressed in equation (21), the net mechanical output work per unit volume increases to 0.163 Joules/cm³. (In terms of net mechanical output work per unit gram of air drawn from the ambient atmosphere, the corresponding increase is from 128.333 Joules/gm to 187.117 Joules/gm. This represents a 46% increase in the net mechanical output work for the first stage.

In selecting the physical dimensions of the first stage expander/recompressor of the atmospheric engine, it is clear from equation (21) that $V_1$ should be as large as possible in order to maximize the net mechanical output work of this stage. For example, suppose that the inside diameter of the expansion cylinder were 150 cm (4.92 ft). Then, if $x_1=1.0$ cm, the initial volume $V_1=17,671$ cm³ and $W_{net1}=2884$ Joules/stroke. The required stroke length (i.e., displacement) is $300 x_1 = 300$ cm (9.84 ft). Suppose that this first stage reciprocating expander/recompressor were able to operate at a maximum speed of two complete cycles per second. Then, since there are two complete power strokes in each cycle, the net output power for the first stage would be 11.536 KW (15.470 HP).

The corresponding mass flow rate $\dot{m}_1$ can be calculated by first calculating the density of air at temperature $T_1$. This can be obtained directly from equation(10) by setting $P=P_1$, $n=m/M$, $T=T_1$ where the density $\rho=m/V_1$. The result is $$\rho = \frac{P_1 M}{RT_1} = \frac{.35311}{T_1} \left( \frac{gm \, °K.}{cm^3} \right) \tag{23}$$

Hence, the corresponding mass flow rate of incoming air $\dot{m}_1 = 4 \dot{V}_{1\rho} = 124.797$ gm/sec. Consequently, the net output power $P_{net2}$ generated from the second stage would be $\dot{m}_1 m_{21}$ $R\widehat{W}_{net2} = 124.797 \times 0.563 \times 0.506 \times 298.289 = 10.605$ KW The corresponding power developed by the third stage is $\dot{m}_1 R\widehat{W}_{net3} = 124.797 \times 0.506 \times 327.460 = 20.678$ KW. Thus, the combined output power of all three stages (i.e., the total output of this atmospheric engine) is 42.819 KW (57.422 HP). This power is sufficient to propel road vehicles.

Since the stroke lengths are unusually long in first stage piston driven air-powered atmospheric engines, the piston velocities are relatively high and hence their own inertial mass may prevent the engine from attaining a running speed of 2 cycles/sec. Thus, in order to alleviate possible piston inertial problems, the pistons are designed such that their inertial mass is very low. To accomplish this, the pistons are hollow with a "honeycomb" type of internal construction to give it the required rigidity. The special piston/drive shaft, direct drive coupling system described above designed for the air-powered atmospheric engine is ideally suited for reducing this piston inertial problem because the pistons are the only object that moves back and forth inside the cylinders. Conventional pistons are connected to a connecting rod that also moves back and forth inside the cylinder which itself has considerable inertial mass.

As an alternative to piston driven reciprocating expander and recompressor designs suitable for the first stage of atmospheric engines, I shall now disclose a design based on a continuous flow rotating turbine expander/recompressor. Unlike the piston driven counterparts, a rotating turbine is very smooth operating, continuous and essentially free of all vibration. Moreover, since it has significantly fewer moving parts, it will be much less prone to mechanical breakdown. As in the design of piston driven expander/recompressors, these turbo expander/recompressors will be capable of generating very nearly isentropic expansion ratios and pressure ratios on the order of 300 and 1,000 respectively. Thus, the design represents a fundamentally new innovation in the art of turbo machines.

FIG. 28 is a transverse cross section and FIG. 29 is a longitudinal perspective view illustrating the design and construction of a low pressure axial flow thermally insulated turboexpander 270 with unlimited and variable expansion ratios and pressure ratios. FIG. 30 is a longitudinal perspective view illustrating the design and construction of a low pressure axial flow turbocompressor 272 that is driven by the power generated by the turboexpander 270. As in the design of the piston driven first stage expander/recompressor disclosed above, the expanded air 274 leaving the turboexpander 270 is discharged directly into a vacuum chamber 276 that is maintained at a very low pressure. This vacuum chamber 276 is divided into two separate regions 275, 277 by the solid phase air condenser 278 that is mounted between them. The first region 275 begins at the discharge end of the turboexpander 270 and ends at the inlet portion of the condenser 278. The second region 277 begins at the vapor discharge end of the condenser 278 and ends at the inlet portion of the turborecompressor 272. The only way that expanded air can reach the second half 277 of the vacuum chamber 276 is to pass through the solid phase air condenser 278. As in the previous design, the solid phase recompressor 280 is mounted inside the solid phase condenser 278. The second stage condenser 282 (FIG. 30) is mounted on the opposite end (i.e., the discharge end) of the turborecompressor 272. A connecting drive shaft 284, passes through the vacuum chamber 276 and connects the driving rotor 286 of the turboexpander 270 directly to the driving rotor 288 of the turborecompressor 272 such that the rotating turboexpander 270 supplies direct mechanical power to rotate the turborecompressor 272.

As illustrated in FIGS. 29 and 30, the turboexpander 270, vacuum chamber 276, solid phase air condenser 278, solid phase air recompressor 280, turborecompressor 272 and second stage condenser 282 are all joined together and mounted inside a single, thermally insulated, compact unit or module 290. This compact module design therefore obviates the need for a considerable amount of conduits, heat shields and related apparatus that would otherwise be needed if these components were designed and mounted inside separate units. Moreover, this compact unit module design feature also enables the incoming air to be expanded, condensed and recompressed in a very efficient and continuous process that is thermodynamically close to ideal adiabatic flow conditions. This unit represents a turbine designed first stage for the atmospheric engine. Its operating principles are essentially identical to those of the piston driven module design given above. (It is essentially the turbine analogue of the piston driven first stage.)

In this first stage turbine embodiment, the turboexpander 270 comprises three rotating spiraling expansion blades 292 specifically designed for low pressure operation. The blades 292 begin at the end of an annular air-inlet duct 294 with a variable throat radius $R_1$, with the rotor's drive shaft 286 passing through its center. As shown in FIG. 29, the radius of the spiraling expansion blades 292 steadily increase along the shaft 296 to some maximum value $R_2$ at the downstream end of the turboexpander 270. The clearance between the inside walls 298 of the turboexpander 270 and the rotating blades 292 is extremely small and on the order of 20 to 60 microns. The lateral end of the blades 300 moving adjacent the turbine's inside walls 298 are thicker than the main body of the blades near the rotor shaft 286 and vary from about 3 blade thicknesses near the inlet to about 6 blade thicknesses near the outlet so that the boundary between the rotating blades 292 and the inside turbine walls 298 is essentially airtight. The lateral ends 300 of these spiraling blades 292 are also provided with a plurality of transverse flanges 302 that ride in airtight engagement inside a plurality of parallel transverse circular grooves 304 that are cut into the lateral inside walls 298 of the turboexpander 270 with increasing radii that extend from the inlet (where the radius is $R_1$) to the outlet (where the radius is $R_2$.)

The boundary between the spiraling expansion blades 292, the turbine walls 298 and the rotor shaft 286 defines three spiraling airtight passageways 306 with increasing cross sectional area. Consequently, these passageways represent spiraling expansion chambers that spiral around the rotor shaft 286. If a partial vacuum with low pressure $P_2$ is continuously maintained at the end 308 of the blades 292 (i.e., inside the vacuum chamber 276) then air, at ambient atmospheric pressure $P_1$, flowing into the spiraling expansion chambers will gradually decrease in pressure as it flows through the passageways 306 by virtue of its expansion. This decreasing air pressure generates pressure differentials between both sides of all the blades 292 along their entire surface area. These pressure differentials generate unbalanced forces on the blades 292 that result in smooth and continuous rotational torque on the rotor shaft 286.

Atmospheric air at some initial temperature $T_1$ and ambient atmospheric pressure $P_1$ is continuously fed into the turboexpander through a variable diameter annular air-inlet duct 294 at a steady, continuous rate and is uniformly expanded as it passes through the turbine.

Since heat flow through the walls of the turboexpander is essentially eliminated by cryogenic insulation, the expansion is very nearly isentropic. If the pitch of the blades 292 is designed to maintain a constant axial flow velocity through the turbine equal to the axial inlet velocity, then the air emerges at the end of the turbine with an expansion ratio r given by $$r = \frac{R_2^2 - R_0^2}{R_1^2 - R_0^2}$$

where $R_0$ denotes the radius of the rotor's drive shaft 286.

Since the throat radius $R_1$ is variable and can range from $R_1 = R_0$ to some maximum value equal to the initial blade radius, this expansion ratio can be varied from infinity to some minimum value (which is about 100). It was determined above that if the inlet air temperature and pressure is 200° K. and 1.0 Atm respectively, an expansion ratio of r=300 will reduce the expanded air to a metastable supersaturated vapor as it is discharged into the vacuum chamber 276 (FIG. 29). Thus, for these inlet conditions, if $R_0 = 1.0$ cm and $R_2 = 75$ cm, then a throat radius $R_1 = 4.444$ cm will produce an expansion ratio of 300 and the expanded air 310 entering the vacuum chamber 274 will be reduced to a supersaturated vapor at 18.8° K. The ability to change the expansion ratio while the turboexpander is operating is a valuable design feature since it allows a means for controlling the mass flow rate $\dot{m}_1$ of incoming air—and thus the engine's power.

A mechanical actuator 312 is connected to the variable diameter annular air-inlet duct 294 which enlarges and reduces the radius of this duct from a minimum of $R_1 = R_0$ to some maximum value $R_1 = R_{max}$. When $R_1 = R_0$, the inlet duct 294 is completely closed and no air passes through the turboexpander 270. (The expansion ratio r in this case is infinity.) When $R_1 = R_{max}$, the inlet duct 294 is completely open and the air flowing into the turboexpander 270 is maximum. (The expansion ratio is minimum in this case.) The actuator 312 is controlled by an electrical servo motor 314 that is activatd by an energizing current from some outside source.

A thermally insulated air-inlet conduit 316 is connected to the variable annular air-inlet duct 294 and has an inside radius greater than $R_{max}$. The other end of this air-inlet conduit 316 is connected to a thermally insulated cold air reservoir mixing vessel 164. All of the previously condensed air passing through the third stage and discharged from the last expander 72 (FIG. 7) is recycled back into the first stage turboexpander 270 at atmospheric pressure by feeding it into this cold air reservoir vessel 164 via conduit 318. Another conduit 166 feeds additional pre-cooled air taken from the open atmosphere at ambient atmospheric pressure into the cold air reservoir vessel 164 where it is mixed with the recycled air before entering the turboexpander 270. The other end of this conduit 166 is connected to a heat exchanger 26. This heat exchanger 26 serves as an ambient air pre-cooler for pre-cooling this new air taken from the atmosphere before depositing it into the cold air reservoir vessel 164. This new air is necessary to make up for that portion of previously expanded air passing through the first stage that does not condense. As described above in the piston embodiment, the coolant circulating through this heat exchanger 26 is previously condensed air circulating through the third stage at points M and O shown in FIG. 7 (As demonstrated above, if the expansion ratio is 300, then the equilibrium mixed air temperature inside the cold air reservoir vessel 164 should not exceed 200° K.)

Before feeding the new atmospheric air taken from the atmosphere into the pre-cooler 26, it is first fed through a filtering system 320 (FIG. 29). As in the previous embodiment, this filtering system 320 is designed to remove particulate contaminates from the incoming air such as dust particles and the like that could enter the turbo expander/recompressor system and scratch or otherwise damage its inside surfaces or other moving parts. Other traps 322 may also be inserted at various flow points for absorbing and removing water vapor. These filters and traps could also remove other vapors and foreign substances that could be present in the incoming new air. These filters and traps are essentially identical to those described above in connection with the piston driven first stage. An electric fan 324 can be mounted in front of some of the filters to insure an adequate flow of air through the filters, traps and heat exchanger in order to compensate for any loss of air pressure resulting while flowing through these systems (such that the initial pre-expansion air pressure $P_1$ is about equal to ambient atmospheric pressure).

The design and operating features of the solid phase air condenser 278 and solid phase air compressor 280 are essentially identical to that described above in connection with the piston driven embodiment. The noncondensed gaseous air vapor that does not condense while passing through the condensing tubes 192 is discharged through the walls of the condensing tubes 192 via passageways 204 and discharged directly into the second portion 277 of the vacuum chamber 276 and adjacent to the inlet portion of the turborecompressor 272.

The design of the turborecompressor 272 is essentially identical to that of the turboexpander 270. The spiraling rotating blades 326 of the turborecompressor 272 continually removes the noncondensed gaseous air from the after portion 277 of the vacuum chamber 276 in order to maintain its very low pressure. This turborecompressor 272, recompresses the noncondensed air to a certain intermediate pressure $P_1' < P_1$ before it is completely expelled from the module 290. This is accomplished by installing a one-way, pressure activated relief valve 328 at the discharge end 330 of turborecompressor 272. If the air pressure at the discharge end 330 exceeds $P_1'$, the relief valve 328 automatically opens and the air is fed into a discharge conduit 332. As in the piston embodiment, this discharge conduit 332 is connected to a heat exchanger 334, where the air is cooled before being compressed all the way back to ambient atmospheric pressure via a relatively small compressor 336. The heat exchanger 334 corresponds to the heat exchanger 38 shown in FIG. 7. As described in the piston embodiment of the first stage, the cooling medium circulating through this air pre-cooler 334 is very cold second stage working fluid taken at points $D_2$ and $F_2$ immediately after it is discharged from expanders 50 and 54 (at about 206° K.). After circulating through the pre-cooler 334, the working fluid is returned to points $D_2$ and $F_2$ and fed into the ambient heat exchangers 52 and 56. (The cooling medium could also be ambient atmospheric air if the temperature $T_1'$ of the partially recompressed air exceeds ambient atmosphic temperature.) As previously described, this pre-cooling step enables the noncondensed air to be recompressed back to ambient atmospheric pressure with an expenditure of mechanical work significantly less than what would be required if there were no intermediate pre-cooling. All of the mechanical work required to operate the final recompressor 336 is supplied from the drive shaft of the turboexpander 272. After the air is recompressed back to ambient atmospheric pressure $P_1$, it is exhausted back into the open atmosphere. It is important to point out again and emphasize, that this noncondensed exhaust air that is discharged back into the open atmosphere will be exceptionally pure and free of essentially all pollution.

The design and operating features of the second stage condenser 282 are essentially identical to that described above for the piston driven embodiment. The design components, structural features and associated subsystems are identified in FIG. 30 with the same element numbers used to describe this condenser in FIG. 26.

However, unlike the piston driven embodiment, this turbine embodiment only has one vacuum chamber, one solid phase condenser, one recompressor and one second stage condenser. It is therefore much simpler. It may also be capable of generating significantly higher net output power than its piston driven counterpart with the same size. FIG. 31 describes the general moduar design configuration of the turbine driven first stage atmospheric engine illustrating the location of the various components including the second stage condenser. This unit defines the first stage engine module 290.

Aside from the fact that the second and third stage cryogenic engines of my atmospheric engine are closed cycle, the basic operating principles and the basic operating components are very similar to those disclosed by E. H. Schwartzman in his U.S. Pat. No. 3,451,342 filed Oct. 24, 1965 entitled "Cryogenic Engine System and Method". Consequently, the detailed construction of these stages is considered to be within the prior art and no detailed description is given herein.

The basic formula used to estimate the net output work of a continuous flow turbine driven first stage atmospheric engine is given by equation (22). Hence, the net output power $P_{net1}$ is given by $$P_{net1} = R\dot{v}_1\widetilde{W}\eta \qquad (24)$$

where $\dot{v}_1$ denotes the volume rate of air flowing into the turboexpander 270 and where $\widetilde{W}$ denotes the volume energy density of air given by equation (17). I have shown above that if $R_2 = 75$ cm, then $R_1 = 4.444$ cm (assuming that $R_0 = 1.0$ cm and $r = 300$). Consequently, if the air flowing through the annular air-inlet duct 294 has an average axial flow speed of 20 m/sec, then $\dot{v}_1 = 117,789$ cm³/sec and $\eta = 0.906$. Consequently, if $T_1 = 200°$ K., $R = 0.506$ and the net output power is 13.184 KW. The corresponding mass flow rate $\dot{m}_1$ of air flowing into the turboexpander 270 can be calculated from equation (23) with $T_1 = 200°$ K. The result is $\dot{m}_1 = 207.963$ gm/sec. Hence, the net output power generated by the second stage engine $P_{net2} = \dot{m}_2 \hat{W}_{net2} = Rm_2\dot{m}_1$.
$\hat{W}_{net2} = 0.506 \times 0.563 \times 207.963 \times 298.289 = 17.672$ KW.
The net output power generated by the third stage engine $P_{net3} = R\dot{m}_1\hat{W}_{net3} = 34.458$ KW. Thus, the total net power output $P_{net}$ of this atmospheric engine is equal to the combined outputs of all three stages and is $P_{net} = P_{net1} + P_{net2} + P_{net3} = 65.314$ KW (87.588 HP). (Note that in this analysis the flow of new air taken from the ambient atmosphere is not $\dot{m}_1$ but rather $(1-R)$ $\dot{m}_1 = 102.734$ gm/sec. This is, of course, also equal to the rate at which the noncondensed air is discharged back into the atmosphere. However, this exhaust air is much cleaner than the intake air—although it may be at a higher temperature.

The total net output of the piston driven embodiment described above was only 42.819 KW (57.422 HP). Moreover, this turbine embodiment would be significantly smaller. The expansion/recompression cylinders of the first stage piston embodiment were 3 m long (9.84 ft) and the overall diameter would be at least 2.12 m (6.96 ft). The turbine first stage would be about 2 m (6.56 ft) long and about 1.6 m (5.25 ft) in diameter. Thus, the turbine embodiments would be much more suitable for road vehicles. Since the input fuel of atmospheric engines is ordinary ambient air these turbine embodiments would be ideal for propeller driven aircraft and marine vessels of all types and sizes.

For marine vessels and large stationary electric power generating plants, the ambient heat exchangers 48, 52, 56, 62, 66 and 70 (FIG. 7) of atmospheric engines would operate most efficiently if they were submerged in a large body of water at ambient temperature. However, if atmospheric engines are used to propel road vehicles and aircraft, this is obviously not possible. Only ambient air heat exchangers could be used. Unfortunately, prior art ambient air heat exchangers are not suitable for my atmospheric engines due to their limited heat transfer capability. Thus, the present disclosure will also include the detailed design and construction of ambient air heat exchangers and vaporizers specifically designed for the high pressure second and third stages of my air-powered condensing atmospheric engine.

One of the main operating features of my ambient air heat exchangers and vaporizers disclosed herein for use with my atmospheric engines, which distinguishes them from the prior art is that they are fitted with mechanical means for continuously removing any condensates that may condense and collect on their external surfaces. Such condensates reduce the thermal conductivity through the walls of these heat exchangers and hence reduces the heat flux flowing to the compressed cryogenic working fluid circulating inside them.

FIGS. 32 and 33 are transverse and longitudinal cross sections respctively illustrating the construction details of a cylindrical high pressure convective ambient air heat exchanger 340 (or vaporizer) equipped with a system of mechanical scrapers 342 to continuously remove condensates from the external surfaces 344 of the heat exchanger 340. In order to maximize the total conductive surface area of the heat exchanger 340 that is in thermal contact with flowing ambient air, the heat exchanger 340 is designed as a nested, co-axial series of cylindrical shells 346. Each shell 346 contains a set of three internal spiraling parallel passageways 348 containing high pressure cryogenic working fluid 350. The cryogenic working fluid 350 is circulated through each shell by spiraling through these internal passageways 348. When it reaches the end of one shell 352, the fluid is conveyed to an adjacent shell 354 by three relatively small conduits 356. Spacers 358 located at each end of the shells 346 keep the shells 346 rigidly separated at a constant distance. Ambient air is circulated through the annular space 360 between adjacent shells 346 and transfers a portion of its natural heat energy to the external surfaces of the shells 346 which is, in turn, absorbed by the flowing cryogen 350.

These co-axial cylindrical shells 346 enable the internal pressure of the cryogenic working fluid flowing through the passageways 348 to be very high without distorting the shape of the heat exchanger 340 while allowing the cross sectional area of the passageways 348 to be relatively large. The reason for this is due to the fact that essentially all of the stress loads are tangential to the shell surfaces. (These stress loads are compressional on the concave surfaces facing the central axis 362.)

Since the overall structural mass of these cylindrical high pressure ambient air heat exchangers is relatively low compared to the internal pressure loads, the operating power to weight and power to volume ratios are fairly high. These features are very desirable when air-powered airplanes are contemplated.

A system of co-axial transverse ring scrapers 342 sweep back and forth between each annular region 360 from one end 364 of the heat exchanger 340 to the other end 366 along the longitudinal direction. These scrapers 342 scrape off any condensate 368 that may condense on the external surfaces 370 of the shells 346 and transfers it to one end of the heat exchanger 340 where it is thrown off by a plurality of rotating brushes 372. Each ring scraper 342 is composed of two flat relatively thin and narrow circular co-planar blades. One blade 374 is maintained in perpendicular contact with one shell surface 376 and the other blade 378 is maintained in perpendicular contact with the adjacent shell surface 380. Ample space 382 is provided between these blades 374, 378 to allow the ambient air to also flow through the annular regions 360. The blades 374, 378 are connected to each other and maintained in contact with their respective surfaces by a plurality of transverse connecting rods 384.

A set of six rotating parallel longitudinal threaded rods 386 are mounted equidistant from each other inside each annular region 360. These rods 386 pass through six grooved holes 388 passing through structural supports 390 of the blades 374, 378 and connectors 384 such that the threads 392 of the rods 386 ride snugly inside and co-act with the grooves 394 inside the holes 388. Consequently, when the longitudinal rods 386 rotate in one direction, all of the blades are simultaneously moved longitudinally inside each annular region 360 between each pair of adjacent shells 346. The outer surface 396 of the largest diameter cylindrical shell 398 is fitted with only one moving blade 400 since there is no adjacent heat transfer surface. When the direction of rotation is switched, the direction of the blades are switched and sweep through the heat exchanger in the opposite direction. A clutch mechanism 402 triggered by the moving blades, is provided at each end to automatically switch the direction of rotation of the rods 386 when the blades reach each end of the heat exchanger. A relatively low power drive train 404 is provided at one end of the heat exchanger to drive the rotating rods 386.

The entire heat exchanger 340 is mounted inside a cylindrical aluminum protective housing 406. Screens 408 are mounted across each open end 364, 366 of the heat exchanger 340 to filter out foreign objects and particles from the air that may tend to collect and obstruct the air passageways inside the heat exchanger or bind the moving blades against the shell surfaces.

In order to provide additional strength, the external cylindrical housing could be constructed with very high strength stainless steel. Additional internal reinforcing structural elements would also be provided. Any structural failure, however, would be confined within the external housing.

The following numerical example will demonstrate the very large heat transfer surface area that is provided by this compact high pressure heat exchanger. Suppose that the length and maximum diameter of this heat exchanger is 100 cm and 50 cm respectively. Also suppose that the heat exchanger contains 6 nested cylindrical shells with thickness 2 cm and separation distance 2 cm. Consequently, the total effective heat transfer surface area A that will be in thermal contact with the flowing air is given by $A = 2\pi \times 100 \times [(25+23)+(21+19)+(17+15)+(13+11)+(9+7)+(5+3)] = 1.056 \times 10^5$ cm$^2$ (113.62 ft$^2$). A pair of these high pressure cylindrical ambient air heat exchangers can be mounted under the front hood of automobiles propelled by air-powered condensing atmospheric engines.

FIGS. 34 and 35 are transverse and longitudinal cross sections respectively, illustrating the construction details of a rectangular, multiple layer high pressure convective ambient air heat exchanger 410. This heat exchanger 410 is also equipped with a system of mechanical scrapers 412 for automaticaly removing condensates from the external surfaces 414. Except for the different geometric shape, the design and operation of this rectangular heat exchanger 410 is essentially identical to the cylindrical heat exchanger 340 described in FIGS. 32 and 33.

In order to maximize the total conductive surface area of the heat exchanger 410 that is in thermal contact with flowing ambient air, the heat exchanger is designed as a series of layered pairs of relatively thin parallel aluminum plates 416 containing a plurality of coplanar high pressure aluminum (or stainless steel) tubing 418 sandwiched between the plates 416. The tubes 418 contain pressurized cryogenic working fluid 420. The pressure tubes 418 extend back and forth between each pair of plates 416 and are mounted so as to be in good thermal contact with the plates 416. A metallic filler material 422 with high thermal conductivity (such as solder) fills the spaces between the plates 416 and tubes 418 which increases the thermal contact between the plates 416 and tubes 418. The tubes 418 are connected to the tubes of adjacent plates 424 by relatively small conduits 426.

Spaces 428, mounted around the periphery of the plates 416 keep each adjacent pair of plates 416 rigidly separated from each other at a constant distance. Ambient air is circulated through the relatively narrow slots 430 between adjacent plates 432 and transfers a portion of its natural thermal energy to the external surfaces of these plates. This thermal energy passes through the walls of these plates 432 and tubing 418 and is absorbed by the flowing pressurized cryogenic working fluid 420.

A system of co-planer transverse scrapers 412 sweep back and forth between the adjacent plates 432 from one end 434 of the heat exchanger 410 to the other end 436. These scrapers 412 scrape off any condensate that may condense on the external surfaces of the plates 416 and transfers it to one end of the heat exchanger 410 where it is thrown off by a plurality of rotating brushes 440. Each scraper 412 is composed of two flat relatively thin co-planar blades extending across the entire width of the plates 432. One blade 442 is maintained in perpendicular contact with one plate 444 and the other blade 446 is maintained in perpendicular contact with the adjacent plate 448. Ample space is therefore provided between the blades 442, 446 to allow ambient air to also flow through the slots 430 between the adjacent plates 432. The blades are connected to each other and maintained in contact with their respective surfaces by a plurality of transverse connecting rods 450 and supporting structure 452.

A plurality of rotating parallel threaded rods 454 extending along the length of the heat exchanger 410 are mounted inside each slot 430. These rods 454 pass through grooved holes 456 through the supporting structure 452 of each pair of blades 442, 446 such that the threads 458 of the rods 454 ride snugly inside and co-act with the grooves 460 inside the holes 456. Thus, when the rods 454 are rotated in one direction, all of the pairs of blades are simultaneously moved along the length of each slot 430 between adjacent plates 432. The outer plates 462 on each side of the heat exchanger 410 do not have adjacent plates and are therefore fitted with only one moving blade 464. When the direction of the rotating rods 454 is reversed, the direction of motion of the blades is reversed and sweep back through the heat exchanger in the opposite direction. A clutch mechanism 466 is provided at each end of the heat exchanger, that is tripped by the moving blades to automatically reverse the rotation of the rods 454 when the blades reach each end of the plates 432. A relatively low power drive train 468 is provided at one end of the heat exchanger 410 to turn the rotating rods 454.

The entire heat exchanger 410 is mounted inside an aluminum protective housing 470. Screens (or air filters) 472 are mounted across each end 434, 436 of the heat exchanger 410 to filter out obstructing objects from the air that may tend to collect inside the heat exchanger and bind the moving blades against the plates.

The following numerical example will demonstrate the large heat transfer surface area that is provided by the layered conducting plates 416 inside this rectangular heat exchanger 410. Suppose that the length and width of the plates 416 inside this heat exchanger 410 is 200 cm and 100 cm respectively and that it contains 6 parallel layers of plates 416 with external separation distances of 1.2 cm between adjacent layers. Consequently, the total effective heat transfer surface area A that will be in thermal contact with the ambient air flowing through the slots 430 of the heat exchanger 410 is given by $A = 2 \times 6 \times 100 \times 200$ cm$^2 = 2.4 \times 10^5$ cm$^2$ (258.3 ft$^2$). If the outside diameter of each pressure tube 418 is 1.0 cm and the plate thickness is 0.2 cm, the total thickness of the heat exchanger will be $(6 \times 1.4 + 5 \times 1.2)$ cm = 14.4 cm. Hence, the overall length, width and thickness dimensions of this heat exchanger are 200 cm by 100 cm by 14.4 cm respectively. An ambient air heat exchanger of this size could be easily mounted under the chassis of an air-powered automobile.

The above cylindrical and rectangular ambient air heat exchangers would be ideal for the second and third stage heat exchangers 48, 52, 56, 62, 66 and 70 shown schematically in FIG. 7, for air-powered automobiles. As pointed out above, two (or possibly three) cylindrical ambient air heat exchangers could be mounted under the front hood of the vehicle. The remaining heat exchangers could be mounted under the vehicle's chassis between the four wheels, and the engine could be mounted in the rear. Air ducts could be mounted in front of the vehicle and under the chassis that scoops up the air and feeds it into the heat exchangers as the vehicle moves along the roadway. No fan would be required. If the vehicle's speed increases, the quantity of air flowing through the heat exchangers automatically increases. Thus, more thermal energy is automatically fed into the heat exchangers to be extracted and converted into more mechanical work to sustain the higher vehicle's speed.

Similar ambient air heat exchangers could be mounted aboard aircraft that are also propelled by air-powered condensing atmospheric engines. Large, flying wing type, propeller drive aircraft are ideally suited for air-powered condensing atmospheric engines. The heat exchangers could be either cylindrical or rectangular. Since no fuel is required, these aircraft could provide enormous payload capability with unlimited range and could remain aloft indefinitely.

In the design of the ambient air heat exchangers disclosed above, the low temperature condensate material that condenses on the external surfaces is continuously removed by the scraper blades and thrown back into the environment. But this low temperature material could itself be utilized as a heat sink for some other closed cycle cryogenic engine stage (similar to the second stage) to extract and convert still more ambient thermal energy into mechanical work. The material could be continuously collected and placed in thermal contact with a low temperature heat exchanger. Another heat exchanger is provided that is maintained in thermal contact with the ambient environment. The engine simply utilizes these two heat exchangers as its low and high temperature heat reservoirs respectively. A suitable condensing working fluid is used that is liquid at the low temperature and gas at the high temperature. The design details of this embodiment are omitted as they are self-evident.

Still another variation that can be of significant practical value involves inserting pressure vessels between the various ambient air vaporizers (heat exchangers) and expanders. FIG. 36 illustrates this variation by showing an ambient heat exchanger 474 that is heated by ambient air 476. The pressurized gaseous working fluid 478 leaves this heat exchanger 474 by a pressure conduit 480 and is transferred to a relatively large spherical pressure vessel 482. The compressed gas 478 inside the pressure vessel 482 is fed to an expander 484 by another pressure conduit 486. A one-way check valve 488 is mounted on the conduit 480 between the heat exchanger 474 and the pressure vessel 482 to prevent any gas already inside the pressure vessel 482 from flowing back into the heat exchanger 474 due to possible pressure variations inside the heat exchanger 474. This pressure vessel 482 represents a compressed gas, load leveling, energy reservoir for storing a considerable amount of pressurized gaseous working fluid (at ambient temperature) for the expander 484. This compressed gas energy reservoir enables the power output of the expander 484 to be rapidly varied over a wide range without requiring large and rapid changes in the mass flow rate $\dot{m}_1$ of the air flowing through the first stage. When the engine is turned off, a valve 490 mounted on the conduit 486 between the pressure vessel 482 and the expander 484 is closed thereby preventing the pressurized gas inside the pressure vessel 482 from escaping after the engine is turned off. When the engine is restarted, the expander 484 utilizes the reserve compressed gas inside the pressure vessel 482 to generate instant power. This system is particularly useful in the design of air-powered atmospheric engines for automobiles.

In still another variation an additional compressor can be operatively interposed between the exhaust duct of at least one expander and the inlet duct of the following serially connected, heat exchanger in order to recompress the expanded working fluid to a higher pressure before it is reheated. This will increase the net output of the engine and give it a higher thermal efficiency.

In order to achieve the required high expansion ratios for the last expansion step of the second stage (to reduce the expanded working fluid to a saturated vapor before the condensation step) the final expansion step can be carried out through a plurality of serially connected expanders instead of one expander.

In order to obtain more control over all of the states of atmospheric engines, all of the compressors could be designed with variable output pressure and all of the expanders could be designed with variable expansion ratios. This would also provide a means for effectively controlling the mass ratios between the first and second stages and fine tuning the engine for optimum performance.

In order to maintain the walls of the first stage air expander at cryogenic temperatures when the atmospheric engine is turned off, the single thermal blanket of evacuated cryogenic multilayer insulation mounted on its external walls could be replaced by two such blankets separated by a double walled thermal jacket containing liquid air.

Still another variation involves mounting the vacuum chamber and first stage condenser in two separate thermally insulated units instead of one unit.

Still another variation may include compressing the incoming air to a pressure somewhat above ambient atmospheric pressure prior to expansion. The compressed air could be cooled by the ambient environment to ambient atmospheric temperature before being cooled to subambient temperatures prior to entering the first stage expander. This would increase this condensation ratio.

Another variation might utilize the relatively warm recompressed noncondensed exhaust air that is discharged back into the open atmosphere as a high temperature heat reservoir that is above ambient atmospheric temperature. For example, the hot air may be circulated through one or more of the ambient heat exchangers 48, 52, 56, 62, 66, and 70 (FIG. 7) in order to raise the temperature of the compressed working fluid to above ambient temperatures before expansion. This increased heat energy could then be converted into mechanical output work when the compressed gas is expanded—thus recovering some of the mechanical work expended during the final recompression process.

Although essentially all particulate contamination of ambient atmospheric air (such as dust particles, smoke particles, etc.) can be removed from the air before the air is expanded, it may be impractical to remove all of the various dissolved vapors from the air (such as water vapor, carbon dioxide, etc.) before the air is expanded. These substances can be expanded and condensed inside the solid phase condenser along with the air. However, when the solidified air is liquefied by passing through the second stage condenser, many of these substances will remain solidified at 80° K. Thus, they can be easily removed from the liquid air by filtering the liquid air as it is discharged from the second stage condenser before it enters the compressor of the third stage. If these solidified substances (such as ice and solid carbon dioxide) are not harmful to the environment, they could be immediately returned back to the environment. However, if they are harmful, they could be accumulated inside a separate vessel for disposal at a later time in a safe disposal site. Thus, the exhaust air discharged from air-powered condensing atmospheric engines will be purer and cleaner than the ambient atmosphere. Large numbers of automobiles propelled by air-powered condensing atmospheric engines in large urban areas could then clean the atmospheric pollution in these urban areas caused by industrial factories and manufacturing centers.

As pointed out above, the ambient heat exchangers 48, 52, 56, 62, 66 and 70 (FIG. 7) of my atmospheric engines can be mounted to extract natural thermal energy from water, soil (i.e., earth) or atmospheric air. They could be mounted on the roofs of houses or buildings and warmed by both solar radiation and circulating ambient air. In marine vessels, these heat exchangers could be mounted adjacent the vessel's hull and completely immersed in circulating water at ambient temperatures. In this application, large amounts of ambient water can be automatically circulated over the heat exchangers as the vessels move through the water. Hence, their temperatures will remain at about ambient water temperature. In particular, a portion of a vessel's lower hull (below the water line) would have a double hull design. The adjacent walls inside the double hull could be constructed with a separation distance ranging between 5 cm and 50 cm depending on the size of the vessel. A transverse cross section of a portion of this double hull design is shown schematically in FIG. 37. A system of contour fitting heat exchangers 492 is mounted between the adjacent walls 494 inside essentially the entire double hull and is entirely immersed in ambient water 496. A plurality of water intake scoops 498 and water discharge ducts 500 are mounted as shown in the longitudinal cross sectional view of FIG. 38, that automatically ingest large amounts of ambient water as the ship 502 moves forward. The water is automatically circulated around the heat exchangers 492 and expelled out the discharge ducts 500.

Since high pressure stainless steel cryogenic heat exchanges suitable for operation in ambient water are well known in the prior art, the construction details of the above described heat exchangers mounted aboard marine vessels are omitted. (See for example, the article "Low Temperature Heat Exchangers" by A. G. Lenfestey, *Progress in Cryogenics*, Vol. 3, Academic Press Inc., New York, 1961.) However, it is important to point out and emphasize that since the cryogenic working fluid of the second and third stages of atmospheric engines have a temperature significantly below ambient water temperatures, the rate H at which the fluid extracts the natural thermal energy from the water as it circulates through a heat exchanger is considerable. This rate of heat extraction can be estimated from the well known heat conduction equation for cylindrical tubes given by $$\dot{H} = \frac{2\pi \; KL\Delta T}{\log(R_1/R_2)}$$

where K denotes the thermal conductivity of the tube and where its outside and inside radii and length are denoted by $R_1$, $R_2$ and L respectively. The temperature difference between the ambient water outside the tube and the flowing cryogenic fluid inside the tube (i.e., temperature gradient) is denoted by $\Delta T$. For Type 310 stainless steel, K=8 Watts/(m°K.). Consequently, pressurized liquid air at 80° K. flowing through only one meter of this stainless steel tube with outer and inner radii 1.0 cm and 0.8 cm respectively, immersed in ambient water at 280° K. (44.3° F.), will be able to extract the natural thermal energy of the water and deliver it to the expander 64 (FIG. 7) at a rate of about 45.1 KW. Hence, relatively small heat exchangers immersed in ambient water will be able to extract large amounts of natural thermal energy. A detailed technical discussion on hearing cryogenic fluids inside heat exchangers can be found in the article: "The Boiling of Cryogenic Fluids—A Survey", by I. R. McDougall, *Cryogenics*, August 1971, pp. 260-267.

The actual propulsion system could be built around one large turbo expander/recompressor first stage atmospheric engine and six high power compact cryogenic turboexpanders (50 54, 58, 64, 68, 72, FIG. 7). For example, if the outlet diameter of the first stage turboexpander is 10 m (32.81 ft) and r=300 $T_1$=200° K., the total output power of the atmospheric engine would be 11,613 KW or 15,573 HP. Large vessels could have several of these atmospheric engines.

Perhaps the most important application of my atmospheric engine is in the field of large scale electric power generation. Atmospheric engines are ideally suited for this application because it is possible to scale up the above described first stage turbo expander/recompressor to enormous sizes for a stationary installation. The spiraling turbine blades could be designed and constructed similar to the wings of large aircraft. They would be relatively thick near the rotor, with internal structural features similar to the spars, ribs and trusses of aircraft wings. The turbines could be mounted with the rotor axis along the vertical direction so that they could have nearly perfect balance. The entire turbo expander/recompressor could be mounted inside a large diameter cylinder that could serve as its mounting and structural support. The turboexpander portion of the unit could be above ground while the turborecompressor portion could be underground inside the same mounting cylinder.

The internal diameter of this first stage turbo expander/recompressor could be 60 m (197 ft). The design of super high power electric generating plants could be based upon clustering large numbers of these individual first stage units into a single array that would be operated in parallel. (Standardized mass production techniques would significantly reduce the cost of each of these first stage units.) FIGS. 39 and 40 are horizontal and vertical cross sections of a single air-powered electric generating plant having a single first stage array 504 composed of 61 individual 60 m diameter turbo expander/recompressors 506. Each turbo expander/recompressor 506 is mounted inside its own mounting cylinder 508, one-half of which is underground. A plurality of high efficiency underground superconducting electric generators 510 are connected directly to the driving rotor 512 of each turborecompressor. The other end of the rotors 514 of the superconducting electric generators 510 are connected to and driven by powerful second stage turboexpanders 516 that correspond to the final expanders 58 (FIG. 7) of the second stage (which reduce the second stage working fluid to to a saturated vapor). Thermally insulated cryogenic conduits 518 feed the expanded saturated second stage vapor emerging from the turboexpanders 516 into the second stage condensers 520 mounted inside the first stage units 506. Another plurality of thermally insulated cryogenic conduits 522 carry the condensed liquefied second stage working fluid from the condensers 520 to a few main conduits 524 which feed the fluid to a plurality of relatively large cryogenic hydraulic compressors 526 (located around the outer perimeter of the array) where it is compressed to very high working pressures (exceeding 300 Atm).

The liquefied air emerging from the second stage condensers 520 is also fed to a plurality of other cryogenic hydraulic compressor 528 where it is also compressed to very high working pressures. After the compression of both fluids is accomplished, they are fed into a series of high pressure ambient heat exchangers 530 and multiple expanders 532 as previously described and represented schematically by FIG. 7. In a preferred embodiment, the ambient heat exchangers 530 are submerged in a large body of water 534 such as a lake or ocean. Each of the expanders 532 are also nested around the outer perimeter of the array 504 and coupled to high field superconducting electric generators 536. The ambient high pressure heat exchangers 530 would be constructed with a multiplicity of stainless steel conduits to give the desired strength and thermal conductivity.

Since there are relatively few moving parts each turbogenerator would require little maintenance and the chances for breakdown of any of the generating units would be small. However, in the event that such a breakdown does occur in any particular unit, the inlet feeder line and outlet discharge line serving the malfunctioning unit would be valved off and the working fluid would be diverted to other units. Hence, the malfunctioning unit would be effectively shut off and isolated from the other units without affecting them. After repairs are made, the unit is restarted by simply opening these valves.

If the operating parameters of each of the first stage turbo expander/recompressors are: $T_1 = 200°$ K., $r = 300$, $R = 0.506$ with an expander inlet flow velocity of 20 m/sec, then the net output power of each of these units will be about 21.1 MW. Consequently, the total output of the entire first stage array will be about 1,286.6 MW. The total output of the second and third stages will be about 1,724.6 MW and 3,362.8 MW respectively. Thus, the total electric generating capacity of the power plant will be about 6,374.0 MW. This output power is about 5.3 times greater than Hoover Dam or about 3 times greater than the largest nuclear power plant. (Based on a future sale price of 10¢/KW hr to the electric utility companies, the income revenue of this power plant would be about 12.748 million dollars per day or about 4.653 billion dollars per year.)

Although the initial construction costs may be about equal to that of an average sized nuclear power plant, the daily maintenance costs would be very low after the plant is completed and put into operation. Moreover, unlike fossil fueled power plants burning expensive fuel oil with steadily increasing costs, the fuel costs of this plant is zero and is avaible in unlimited amounts. Unlike nuclear power plants, which produce very dangerous radioactive waste products, this power plant generates absolutely no pollution. In fact, this plant will actually clean and purify the atmosphere while it is operating. It will become a giant air cleaner by removing large quantities of dust particles and other foreign substances—whether these substances are particulate or gaseous. The exhaust air will have a level of purity previously found only in experimental laboratores or hospitals. In addition, unlike fossil fuel or nuclear power plants, this lower plant will generate zero thermal pollution.

In a larger sense, this air-powered plant renders even the most visionary fusion power plants that are contemplated for the next century, utterly obsolete. It represents the ultimate power plant that can give mankind essentially unlimited amounts of power with zero fuel costs indefinitely into the future—while simultaneously cleaning the atmosphere. And, the more power plants put into operation, the cleaner the environment becomes!

Other embodiments of my atmospheric engine can be relatively small and adapted for generating small amounts of electric power for individual homes and apartments. These power generators could range from about 2.0 KW up to 200 KW and could be stored inside a garage or basement. All home heating would be electric. Any excess electric power not consumed could be fed into the local electric power grid and sold to the various electric utility companies for a profit. Thus instead of receiving bills from the power company, the home owners would be receiving checks!

For hundreds of years engineers and scientists have recognized that the ambient thermal energy of the natural environment that is heated by the sun contains essentially unlimited amounts of free heat energy. Unfortunately, all prior attempts to harness this natural heat energy and convert it into mechanical work by a cyclic condensing heat engine utilizing this thermal energy for its high temperature heat reservoir have failed. Because of all these unsuccessful attempts, thermodynamicists have concluded that such engines are impossible—not because of any physical law of nature, but by experience. In fact, they are so confident that such engines are impossible, they have even labeled them "perpetual motion machines of the second kind". The air-powered condensing atmospheric engine disclosed herein however represents—for the first time—a cyclic condensing heat engine that does utilize the natural thermal energy of the ambient environment as its high temperature heat reservoir. It actually harnesses the natural thermal energy of the ambient environment and converts it into mechanical work by direct thermodynamic processes that can be continued indefinitely to generate unlimited amounts of mechanical work. One of the key operating features that makes my engine realizable is that the atmosphere itself is utilized as the condensing working fluid. This enables the basic thermodynamic cycle of the engine to be "semi-open", thereby circumventing the classical thermodynamic arguments that have been constructed to prove the impossibility of such engines. But perhaps the most important operating principle of my invention is the fact that the phase transformation process is accomplished not by absorbing the latent heat of condensation of the expanded working fluid by a colder absorbing medium (as in prior art condensing heat engines) but rather by employing an isentropic expander capable of generating very high expansion ratios. Thus, instead of extracting latent heat energy from the expanded saturated working fluid vapor via convective heat transfer to a cooling medium, my engine extracts this latent heat energy from the gaseous vapor by expanding the vapor still further—well beyond the saturated vapor state—to a deeply supersaturated state. The moving molecules of the gaseous vapor rebounding from the receding movable member of the expansion chamber lose so much of their kinetic energy that a large portion of them can no longer resist the attractive intermolecular van der Waals forces and undergo spontaneous condensation. The lost kinetic energy of the molecules is transferred directly to the kinetic energy of the movable member (piston or turbine blade) of the expander and converted into mechanical output work. This is the most important operating principle of my engine.

Since the ambient atmosphere is utilized as the input fuel for my engine—which is universally available in unlimited quantities free of charge—I submit that the present invention is not only novel with respect to the prior art of heat engines, but revolutionary.

From the foregoing description, it will thus be evident that the present invention provides a vastly improved method and apparatus for generating mechanical work and power. As various other changes and modifications can be made in the above method and apparatus without departing from the spirit or scope of the invention, it is intended that all subject matter contained in the above description or shown in the accompanying drawings should be interpreted as illustrative and not in a limiting sense.

What is claimed is:

1. A method for converting a portion of the natural thermal energy of atmospheric air into mechanical work comprising the steps of:
    expanding air taken from the atmosphere inside a low pressure expansion chamber;
    extracting a portion of the thermal energy from said expanding air and converting it into mechanical work by moving a movable member inside said expansion chamber;
    condensing a portion of said expanded air at cryogenic temperatures; and
    recompressing that portion of said expanded air that does not condense.

2. A method as set forth in claim 1 wherein said expansion step has an expansion ratio exceeding approximately 100.

3. A method as set forth in claim 1 wherein said condensing step is achieved by extracting a sufficient amount of thermal energy from the air by said expansion step thereby transforming the air into supersaturated state at cryogenic temperatures which condenses essentially without having to remove any latent heat of condensation.

4. A method as set forth in claim 1 wherein the air pressure prior to said expansion step is approximately equal to ambient atmospheric pressure.

5. A method as set forth in claim 1 further comprising the step of precooling the inlet air prior to said expansion step for enhancing said condensation.

6. A method as set forth in claim 5 wherein the step of precooling the inlet air comprises the step of transferring a portion of the heat of the preexpanded air to previously condensed air with a lower temperature.

7. A method as set forth in claim 1 further comprising the step of thermally insulating the external walls of the expansion chamber from the ambient environment.

8. A method as set forth in claim 1 further comprising the step of maintaining the external walls of said expansion chamber at cryogenic temperatures for enhancing the condensation of said air.

9. A method as set forth in claim 8 wherein said step of maintaining the external walls of the expansion chamber at cryogenic temperatures comprises the step of enclosing said expansion chamber inside a jacket of previously liquefied air at cryogenic temperatures.

10. A method as set forth in claim 9 wherein said jacket comprises a Dewar vessel containing liquid air in direct thermal contact with the external walls of said expansion chamber.

11. A method as set forth in claim 1 wherein the expansion chamber has a variable expansion ratio and further comprising the step of maintaining a sufficiently high expansion ratio for inducing spontaneous condensation.

12. A method as set forth in claim 1 wherein sufficient thermal energy of the expanding air is removed by said expansion step to induce spontaneous condensation of a portion of the air at cryogenic temperatures.

13. A method as set forth in claim 1 further comprising the step of recompressing that portion of the expanded air vapor which does not condense back to ambient atmospheric pressure and discharging it back into the atmosphere in an open cycle process.

14. A method as set forth in claim 13 further comprising the step of cooling the noncondensed air before said recompressing step is completed to reduce the mechanical work consumed by said recompressing step.

15. A method as set forth in claim 14 wherein said cooling step comprises the step of transferring a portion of the heat of partially recompressed non-condensed air to an absorbing medium with a lower temperature.

16. A method as set forth in claim 1 further comprising the step of pre-compressing the air to above ambient atmospheric pressure before said expansion step to enhance said condensation.

17. A method as set forth in claim 1 further comprising the step of filtering the air drawn from the atmosphere before said expansion step for removing foreign particles.

18. A method as set forth in claim 1 wherein the air is expanded from about ambient atmospheric pressure to a pressure less than about 2 Torr.

19. A method as set forth in claim 1 further comprising the steps of:
    introducing the air into one end of an expansion chamber containing an expansion piston movable along the length of said expansion chamber thereby forcing said piston to move inside said expansion chamber generating mechanical work;
    introducing expanded noncondensed air vapor into one end of a recompression chamber containing a recompression piston movable along the length of said recompression chamber wherein said noncondensed air vapor is recompressed; and
    coupling said expansion piston to said recompression piston such that the expanding air that drives the expansion piston also drives the recompression piston so that the mechanical work required for said recompression step is supplied by said expansion step.

20. A method as set forth in claim 19 further comprising the steps of:
    mounting a vacuum chamber between said expansion chamber and said recompression chamber;
    mounting a condenser inside said vacuum chamber, wherein said condensing step comprises;
    discharging said expanded air from said expansion chamber into said vacuum chamber which passes through said condenser wherein a portion of said expanded air condenses on the walls of said condenser, and wherein the noncondensed portion passes through said condenser and enters said recompression chamber.

21. A method as set forth in claim 20 further comprising the steps of:
    introducing gaseous air into the expansion chamber between the expansion piston and an end wall of the chamber when the expansion piston is adjacent such end wall;
    transferring a relatively larger portion of the energy derived from the expanding gaseous air to the expansion piston in the form of kinetic energy by rapidly accelerating the expansion piston during the initial portion of the stroke along the length of the chamber away from the end wall;

transferring a relatively smaller portion of the energy derived from the expanding air to the expansion piston during the final portion of the stroke of the expansion piston along the length of the expansion chamber;

coupling the expansion piston to the recompression piston by flexible belt means such that the expanding air simultaneously accelerates the expansion piston and the recompression piston and imparts kinetic energy to both pistons; and coupling the recompression piston to a drive shaft extending along the length of the recompression chamber by varying pitch means for rotating the drive shaft in response to linear translation of the recompression piston along the length of the recompression chamber, the pitch means varying from a relatively long pitch adjacent the end wall to a relatively short pitch remote from the wall for decelerating both pistons for recompressing noncondensed air and for maintaining substantially uniform application of torque between the recompression piston and the shaft over a major portion of the stroke of the recompression piston, wherein the inertial mass of both pistons is utilized as a linear kinetic energy storage system during at least a portion of the stroke of the pistons.

22. A method as set forth in claim 1 wherein the step of extracting a portion of the thermal energy from said expanding air and converting it into mechanical work comprises:

introducing gaseous air into an expansion chamber including an expansion turbine;

allowing the air to expand inside the expansion chamber thereby rotating the expansion turbine; and extracting mechanical work by said rotating expansion turbine.

23. A method as set forth in claim 22 further comprising the steps of:

conveying expanded air from the expansion turbine into a second chamber adjacent the expansion chamber;

condensing at least a portion of the expanded air in the second chamber at cryogenic temperatures;

withdrawing condensed air from the second chamber;

conveying noncondensed expanded air vapor out of said second chamber and into a recompression chamber having a rotating recompression turbine; and coupling the expansion turbine to the recompression turbine such that a portion of the mechanical work generated by the expansion turbine is used to turn the recompression turbine thereby recompressing the noncondensed air.

24. A method as set forth in claim 1 wherein the expansion step is approximately isentropic.

25. A method as set forth in claim 1 further comprising the step of utilizing the thermal potential difference between the condensed cryogenic air and the ambient environment to generate additional mechanical work.

26. A method as set forth in claim 1 wherein said condensed air is solidified air at a cryogenic temperature not exceeding approximately 50° K. and further comprising the steps of:

recompressing the solidified cryogenic air to some intermediate pressure;

utilizing the partially recompressed solidified air as a low temperature heat sink for a second stage, closed cycle condensing heat engine; and utilizing the natural thermal energy of the ambient environment as the high temperature heat reservoir of said second stage engine.

27. A method as set forth in claim 26 wherein the solidified air is heated and melted to liquid air while serving as a low temperature heat sink for said second stage engine by extracting and absorbing the latent heat of condensation of said second stage engine and further comprising the step of utilizing the thermal potential difference between the liquefied air at cryogenic temperature and the natural environment at ambient temperature for generating additional mechanical work in a third stage engine.

28. A method as set forth in claim 27 wherein the step of utilizing the thermal potential difference between the liquid air at cryogenic temperature and the natural environment at ambient temperature to generate more mechanical work in a third stage engine comprises the steps of:

compressing the liquid air to a significantly higher pressure; and performing at least twice the sequential steps of passing said compressed air through a heat exchanger means having an external surface in thermal contact with the natural environment whereby the compressed air is heated to about ambient temperature by extracting and absorbing natural ambient heat energy from the environment, and expanding said heated compressed air inside an expander means whereby a portion of the natural heat energy extracted from the environment inside said heat exchanger means is converted into mechanical work.

29. A method as set forth in claim 28 wherein the expanded air emerging from the last expansion step has a temperature significantly below ambient temperature, and a pressure about equal to ambient atmospheric pressure and further comprising the step of mixing said air with a portion of new air taken from the atmosphere and recycling said mixture back through said first stage engine.

30. A method as set forth in claim 29 further comprising the step of utilizing the air emerging from at least some of the expanders, other than the last expander, as a low temperature heat sink for precooling the new air taken from the open atmosphere to a subambient temperature before conveying said expanded cold air into said ambient heat exchangers so that said new air can be cooled to a subambient temperature before mixing it with the cold recycled air emerging from the last expander of said third stage engine.

31. A method as set forth in claim 26 wherein the operating steps of said closed cycle second stage engine comprise:

compressing a liquefied cryogenic second stage working fluid having a critical temperature below the natural ambient temperature of the environment to a relatively high initial pressure;

performing at least twice the sequential steps of passing said compressed second stage working fluid through a heat exchanger means having an external surface in thermal contact with the natural environment whereby the compressed cryogenic working fluid is heated to about ambient temperature by extracting and absorbing natural ambient heat energy from the environment, and expanding said heated compressed working fluid inside an expander means whereby a portion of the natural heat energy extracted from the environment inside said heat exchanger means is converted into mechanical work;

condensing said expanded second stage working fluid by recycling said expanded working fluid through a second stage condenser means maintained in thermal contact with the low temperature solidified air wherein the solidified air is heated and melted to liquefied air at a higher temperature by extracting and absorbing latent heat of condensation from the expanded second stage working fluid; and recompressing the liquefied second stage working fluid back to the high initial working pressure to repeat the above steps in a closed cycle.

32. A method as set forth in claim 31 further comprising the step of maintaining the mass flow ratio between the solidified air and second stage working fluid passing through said second stage condenser such that all of the expanded second stage working fluid is liquefied while passing through the condenser.

33. A method as set forth in claim 31 further comprising the step of utilizing the expanded second stage working fluid emerging from at least some of the expanders, other than the last expander prior to the condensing step, as a low temperature heat sink for cooling the noncondensed air emerging from the initial expansion step of the first stage engine before said noncondensed air is completely recompressed back to ambient atmospheric pressure in order to reduce the mechanical work expended on this recompression step.

34. A method as set forth in claim 33 further comprising the step of utilizing the liquefied second stage working fluid emerging from said second stage condenser as a cryogenic coolant prior to said compression step.

35. A method as set forth in claim 28 further comprising the step of utilizing the liquid air emerging from the second stage condenser as a cryogenic coolant prior to said compression step.

36. A method as set forth in claim 32 further comprising the step of thermally insulating the low temperature solidified air and the second stage working fluid emerging from the last expander of the second stage engine prior to the condensing step such that the heat absorbed by said solidified air is substantially the latent heat of condensation extracted from the second stage working fluid while passing through the second stage condenser.

37. A method as set forth in claim 31 wherein said second stage working fluid is oxygen.

38. A method as set forth in claim 31 wherein all of the expansion and compression steps of the closed cycle second stage engine are approximately isentropic, and wherein all of the heating steps are approximately isobaric, and wherein the condensing step is approximately isothermal.

39. A method as set forth in claim 28 wherein all of the expansion and compression steps of the third stage engine are approximately isentropic, and wherein all of the heating steps are approximately isobaric.

40. A method as set forth in claim 28 further comprising the step of filtering the liquefied air for removing nonliquefied solid substances from the liquefied air prior to said compression step.

41. A method as set forth in claim 28 further comprising the step of removing accumulated condensates from the exterior surfaces of at least one ambient heat exchanger to maintain the thermal transfer efficiency thereof.

42. A method as set forth in claim 28 further comprising the step of accumulating and temporarily storing heated compressed air emerging from at least one ambient heat exchanger inside a pressure vessel before expanding said compressed air.

43. A method as set forth in claim 31 further comprising the step of removing accumulated condensates from the exterior surfaces of at least one ambient heat exchanger to maintain the thermal transfer efficiency thereof.

44. A method as set forth in claim 43 further comprising the step of utilizing said accumulated condensates removed from the exterior surfaces of said ambient heat exchangers as a low temperature heat sink for a closed cycle fourth stage engine utilizing the ambient environment as its high temperature heat reservoir.

45. A method a set forth in claim 41 further comprising the step of utilizing said accumulated condensates removed from the exterior surfaces of said ambient heat exchangers as a subambient coolant.

46. A method for generating mechanical work comprising the steps of:

providing a pressure differential across a low pressure expander means by connecting the exhaust duct of said expander to a vacuum chamber and connecting the inlet duct of said expander to the open atmosphere at ambient atmospheric pressure;

expanding atmospheric air drawn from the open atmosphere inside said expander by virtue of said pressure differential thereby converting a portion of the natural heat energy of said air into mechanical work by moving a movable member inside said expander;

condensing a portion of the expanded air discharged into said vacuum chamber at a subambient temperature primarily as a result of said expansion; and maintaining the vacuum inside said vacuum chamber.

47. A method as set forth in claim 46 wherein sufficient thermal energy is removed from said air by means of said expansion step to transform the air to a supersaturated vapor at cryogenic temperatures.

48. A method as set forth in claim 46 further comprising the step of filtering the air before said expansion step.

49. A method as set forth in claim 46 wherein said expander has a variable expansion ratio for varying the condensation ratio, pressure ratio, and the mass flow rate.

50. A method as set forth in claim 46 wherein the expansion and condensing steps transform a portion of the air to its solid phase at a temperature below the triple point.

51. A method as set forth in claim 46 wherein said expansion step has an expansion ratio exceeding approximately 100.

52. A method as set forth in claim 46 further comprising the step of thermally insulating the expander and the vacuum chamber from the ambient environment.

53. A method as set forth in claim 46 wherein the air pressure prior to said expansion step is approximately equal to ambient atmospheric pressure.

54. A method as set forth in claim 46 further comprising the step of compressing the air to above ambient atmospheric pressure prior to said expansion step to enhance said condensation.

55. A method as set forth in claim 46 wherein the air is expanded from about ambient atmospheric pressure (760 Torr) to a pressure less than about 2 Torr.

56. A method as set forth in claim 46 further comprising the step of precooling the inlet air prior to said expansion step for enhancing said condensation.

57. A method as set forth in claim 56 wherein the step of precooling the air comprises the step of transferring a portion of the heat of said air to previously condensed air with a lower temperature.

58. A method as set forth in claim 46 further comprising the step of maintaining the external walls of at least a portion of the expander and vacuum chamber at cryogenic temperatures for enhancing the condensation of the expanded air.

59. A method as set forth in claim 58 wherein said step of maintaining said walls at cryogenic temperatures comprises the step of enclosing said walls inside a jacket of previously condensed air at cryogenic temperatures.

60. A method as set forth in claim 59 wherein said jacket comprises a thermally insulated cryogenic Dewar vessel containing liquid air at cryogenic temperatures in direct thermal contact with the external walls.

61. A method as set forth in claim 46 further comprising the step of recompressing that portion of the expanded air vapor which does not condense, back to ambient atmospheric pressure and discharging it back into the atmosphere in an open cycle process.

62. A method as set forth in claim 61 wherein the mechanical work used to recompress the noncondensed air is supplied by the mechanical work generated by said expander.

63. A method as set forth in claim 61 further comprising the step of cooling the noncondensed air before said recompression step is completed to reduce the amount of mechanical work required to complete said recompression step.

64. A method as set forth in claim 63 wherein said cooling step comprises the step of transferring a portion of the heat of partially recompressed non-condensed air to a heat absorbing medium with a lower temperature.

65. A method as set forth in claim 46 further comprising the steps of:
   mounting a plurality of condensing chambers inside said vacuum chamber for condensing said expanded air vapor at cryogenic temperatures;
   maintaining the inner walls of said condensing chambers at a temperature slightly below that of the expanded air vapor such that a portion of the expanded air molecules colliding with said inside walls, solidifies on said walls;
   removing solidified air from said condensing chambers; and
   recompressing said solidified air removed from said condensing chambers.

66. A method as set forth in claim 65 wherein the step of maintaining the inner walls of the condensing chambers at a temperature slightly below that of the expanded air vapor comprises the step of maintaining a cryogenic fluid in thermal contact with said walls at a slightly lower temperature.

67. A method as set forth in claim 65 further comprising the steps of:
   mounting a recompression chamber adjacent said vacuum chamber communicating with the interior of said condensing chambers such that any expanded air vapor that does not condense inside the condensing chambers can pass into the recompression chamber; and
   recompressing said portion of noncondensed air inside said recompression chamber.

68. A method as set forth in claim 46 further comprising the steps of:
   introducing the air into one end of an expansion chamber containing an expansion piston movable along the length of said expansion chamber thereby forcing said piston to move inside said expansion chamber generating mechanical work;
   introducing expanded noncondensed air vapor into one end of a recompression chamber containing a recompression piston movable along the length of said recompression chamber wherein said noncondensed air vapor is recompressed; and
   coupling said expansion piston to said recompression piston such that the expanding air that drives the expansion piston also drives the recompression piston so that the mechanical work required for said recompression step is supplied by said expansion step.

69. A method as set forth in claim 68 further comprising the steps of:
   mounting a vacuum chamber between said expansion chamber and said recompression chamber;
   mounting a condenser inside said vacuum chamber, wherein said condensing step comprises;
   discharging said expanded air from said expansion chamber into said vacuum chamber which passes through said condenser wherein a portion of said expanded air condenses on the walls of said condenser, and wherein the non-condensed portion passes through said condenser and enters said recompression chamber.

70. A method as set forth in claim 69 further comprising the steps of:
   introducing gaseous air into the expansion chamber between the expansion piston and an end wall of the chamber when the expansion piston is adjacent such end wall;
   transferring a relatively larger portion of the energy derived from the expanding gaseous air to the expansion piston in the form of kinetic energy by rapidly accelerating the expansion piston during the initial portion of the stroke along the length of the chamber away from the end wall;
   transferring a relatively smaller portion of the energy derived from the expanding air to the expansion piston during the final portion of the stroke of the expansion piston along the length of the expansion chamber;
   coupling the recompression piston to a drive shaft extending along the length of the recompression chamber by varying pitch means for rotating the drive shaft in response to translation of the recompression piston along the length of the recompression chamber, the pitch means varying from a relatively long pitch adjacent the end wall to a relatively short pitch remote from the wall for decelerating both pistons for recompressing noncondensed air and for maintaining substantially uniform application of torque between the recompression piston and the shaft over a major portion of the stroke of the recompression piston wherein the inertial mass of both pistons is utilized as a linear kinetic energy storage system during at least a portion of the stroke of the pistons.

71. A method as set forth in claim 46 wherein said expander means is a rotating turbine expander further comprising the steps of:
introducing gaseous air into the inlet duct of said turbine expander;
discharging the expanded air inside said vacuum chamber;
generating mechanical work by allowing the air to expand inside said turbine expander thereby rotating the drive shaft of said turbine; and
extracting mechanical work by coupling said rotating drive shaft to some external load.

72. A method as set forth in claim 71 further comprising the steps of:
mounting condensing means communicating with said vacuum chamber such that a portion of said expanded air condenses inside said condensing means;
mounting a turbine recompressor means communicating with said condensing means such that the portion of expanded air that does not condense inside said condensing means is withdrawn from said condensing means and recompressed by said turbine recompressor means; and
coupling the drive shaft of said expansion turbine to the drive shaft of said recompression turbine such that the mechanical work used to turn the recompression turbine is supplied by the mechanical work generated from the expansion turbine.

73. A method as set forth in claim 46 wherein the expansion step is approximately isentropic.

74. A method as set forth in claim 46 further comprising the step of utilizing the thermal potential difference between the condensed cryogenic air and the ambient environment to generate additional mechanical work.

75. A method as set forth in claim 46 wherein said condensed air is solidified air at a cryogenic temperature not exceeding approximately 50° K. and further comprising the steps of:
recompressing the solidified cryogenic air to some intermediate pressure;
utilizing the partially recompressed solidified air as a low temperature heat sink for a second stage, closed cycle condensing heat engine; and
utilizing the natural thermal energy of the ambient environment as the high temperature heat reservoir of said second stage engine.

76. A method as set forth in claim 75 wherein the solidified air is heated and melted to liquid air while serving as a low temperature heat sink for said second stage engine by extracting and absorbing latent heat of condensation of said second stage engine and further comprising the step of utilizing the thermal potential difference between the liquefied air at cryogenic temperature and the natural environment at ambient temperature for generating additional mechanical work in a third stage engine.

77. A method as set forth in claim 76 wherein the step of utilizing the thermal potential difference between the liquid air at cryogenic temperature and the natural environment at ambient temperature to generate more mechanical work in a third stage engine comprises the steps of:
compressing the liquid air to a significantly higher pressure; and
performing at least twice the sequential steps of passing said compressed air through a heat exchanger means having an external surface in thermal contact with the natural environment whereby the compressed air is heated to about ambient temperature by extracting and absorbing natural ambient heat energy from the environment, and expanding said heated compressed air inside an expander means whereby a portion of the natural heat energy extracted from the environment inside said heat exchanger means is converted into mechanical work.

78. A method as set forth in claim 77 wherein the expanded air emerging from the last expansion step of the third stage engine has a temperature significantly below ambient atmospheric temperature, and a pressure about equal to ambient atmospheric pressure and further comprising the step of mixing said previously condensed air with a portion of new air taken from the atmosphere and recycling said mixture back through said first stage engine.

79. A method as set forth in claim 78 further comprising the step of utilizing the air emerging from at least some of the expanders of the third stage engine, other than the last expander, as a low temperature heat sink for precooling the new air taken from the open atmosphere to a subambient temperature before conveying said expanded cold air into said ambient third stage heat exchangers so that said new air can be cooled to a subambient temperature before mixing it with the cold recycled air emerging from the last expander.

80. A method as set forth in claim 75 wherein the operating steps of said closed cycle second stage engine comprise:
compressing a liquefied cryogenic second stage working fluid with a critical temperature below the natural ambient temperature of the environment to a relatively high initial pressure;
performing at least twice the sequential steps of passing said compressed second stage working fluid through a heat exchanger means having an external surface in thermal contact with the natural environment whereby the compressed cryogenic working fluid is heated to about ambient temperature by extracting and absorbing natural ambient heat energy from the environment and expanding said heated compressed working fluid inside an expander means whereby a portion of the natural heat energy extracted from the environment inside said heat exchanger means is converted into mechanical work;
condensing said expanded second stage working fluid by recycling said expanded working fluid through a second stage condenser means maintained in thermal contact with the low temperature solidified air wherein the solidified air is heated and melted to liquefied air at a higher temperature by extracting and absorbing latent heat of condensation from the expanded second stage working fluid; and
recompressing the liquefied second stage working fluid back to the high initial working pressure to repeat the above steps in a closed cycle.

81. A method as set forth in claim 80 further comprising the step of maintaining the mass flow ratio between the solidified air and second stage working fluid passing through said second stage condenser such that all of the expanded second stage working fluid is liquefied while passing through the condenser.

82. A method as set forth in claim 80 further comprising the step of utilizing the expanded second stage working fluid emerging from at least some of the expanders, other than the last expander prior to the condensing step, as a low temperature heat sink for cooling the noncondensed air emerging from the initial expansion step of the first stage engine before said noncondensed air is completely recompressed back to ambient atmospheric pressure in order to reduce the mechanical work expended on this recompression step.

83. A method as set forth in claim 82 further comprising the step of utilizing the liquefied second stage working fluid emerging from said second stage condenser as a cryogenic coolant prior to said compression step.

84. A method as set forth in claim 77 further comprising the step of utilizing the liquid air emerging from the second stage condenser as a cryogenic coolant prior to said compression step.

85. A method as set forth in claim 81 further comprising the step of thermally insulating the low temperature solidified air and the second stage working fluid emerging from the last expander of the second stage prior to the condensing step such that the heat absorbed by said solidified air is substantially the latent heat of condensation extracted from the second stage working fluid while passing through the second stage condenser.

86. A method as set forth in claim 80 wherein said second stage working fluid is oxygen.

87. A method as set forth in claim 80 wherein all of the expansion and compression steps of the closed cycle second stage engine are approximately isentropic, and wherein all of the heating steps are approximately isobaric, and wherein the condensing step is approximately isothermal.

88. A method as set forth in claim 77 wherein all of the expansion and compression steps of the third stage engine are approximately isentropic, and wherein all of the heating steps are approximately isobaric.

89. A method as set forth in claim 77 further comprising the step of filtering the liquefied air for removing nonliquefied, solid substances from the liquefied air prior to said compression step.

90. A method as set forth in claim 77 further comprising the step of removing accumulated condensates from the exterior surfaces of at least one ambient third stage heat exchanger to maintain the thermal transfer efficiency thereof.

91. A method as set forth in claim 77 further comprising the step of accumulating and temporarily storing heated compressed air emerging from at least one ambient third stage heat exchanger inside a pressure vessel before expanding said compressed air.

92. A method as set forth in claim 80 further comprising the step of removing accumulated condensates from the exterior surfaces of at least one ambient second stage heat exchanger to maintain the thermal transfer efficiency thereof.

93. A method as set forth in claim 92 further comprising the step of utilizing said accumulated condensates removed from the exterior surfaces of said ambient second stage heat exchangers at a low temperature heat sink for a closed cycle fourth stage engine utilizing the ambient environment as its high temperature heat reservoir.

94. A method as set forth in claim 90 further comprising the step of utilizing said accumulated condensates removed from the exterior surfaces of said ambient third stage heat exchangers as a subambient coolant.

95. A method for generating mechanical work comprising the steps of:
expanding gaseous atmospheric air at an initial temperature not exceeding ambient atmospheric temperature and an initial pressure approximately equal to ambient atmospheric pressure inside an expansion chamber having a partial vacuum;
converting a portion of the thermal energy of the air into mechanical work by moving a movable member inside the expansion chamber by the expanding air;
condensing a portion of the air primarily as a result of said expansion; and
maintaining a partial vacuum inside said expansion chamber.

96. A method for generating mechanical work comprising the steps of:
expanding gaseous atmospheric air at some initial temperature and pressure inside a low pressure expansion chamber;
converting a portion of the thermal energy of the expanding air into mechanical work by moving a movable member inside the expansion chamber;
condensing a portion of the air; and
maintaining the low pressure inside said expansion chamber with an expenditure of work less than that gained by said expansion by virtue of a reduction in the specific volume of the condensed air.

97. A method for converting natural thermal energy of the ambient environment into mechanical work comprising the steps of:
expanding atmospheric air drawn from the atmosphere inside an expansion chamber having a partial vacuum;
converting a portion of the thermal energy of the air into mechanical work by moving a movable member inside the chamber by the expanding air;
condensing a portion of the expanded air at cryogenic temperatures primarily as a result of said expansion step; and
maintaining an artificial low temperature heat sink by absorbing heat energy from the expanded air by a reservoir of liquefied gas at cryogenic temperatures.

98. A method as set forth in claim 97 wherein said low temperature liquefied gas is hydrogen at about 20° K. maintained in thermal contact with a portion of the expanded air.

99. A method as set forth in claim 97 further comprising the step of replenishing said reservoir of liquefied gas when said reservoir becomes depleted or runs down due to evaporization.

100. A method as set forth in claim 97 further comprising the step of maintaining the supply of liquefied gas at cryogenic temperatures by operating a cryogenic refrigerator means to maintain the low temperature of said liquefied gas thereby preventing evaporization losses.

101. A method as set forth in claim 97 wherein sufficient thermal energy is removed from said air by means of said expansion step to transform the air to a supersaturated vapor at cryogenic temperatures.

102. A method as set forth in claim 101 wherein the amount of expanded air that condenses as a result of heat transfer to the liquefied gas at cryogenic temperatures is relatively small compared to the amount that condenses as a result of overexpanding the air to a supersaturated state.

103. A method as set forth in claim 97 wherein the expansion and condensing steps transforms a portion of the air to its solid phase at a temperature below the triple point.

104. A method as set forth in claim 97 wherein said expansion step has an expansion ratio exceeding approximately 100.

105. A method as set forth in claim 97 further comprising the step of thermally insulating the expansion chamber and the low temperature liquefied gas reservoir from the ambient environment.

106. A method as set forth in claim 97 further comprising the step of filtering the air before said expansion step.

107. A method as set forth in claim 97 wherein the expansion chamber has a variable expansion ratio for varying the condensation ratio, pressure ratio, and the mass flow rate.

108. A method as set forth in claim 97 wherein the air pressure prior to said expansion step is approximately equal to ambient atmospheric pressure.

109. A method as set forth in claim 97 further comprising the step of compressing the air to above ambient atmospheric pressure prior to said expansion step to enhance said condensation.

110. A method as set forth in claim 97 wherein the air is expanded from about ambient atmospheric pressure (760 Torr) to a pressure less than about 2 Torr.

111. A method as set forth in claim 97 further comprising the step of precooling the inlet air prior to said expansion step for enhancing said condensation.

112. A method as set forth in claim 111 wherein the step of precooling the air comprises the step of transferring a portion of the heat of said air to previously condensed air with a lower temperature.

113. A method as set forth in claim 97 further comprising the step of maintaining the external walls of at least a portion of the expansion chamber at cryogenic temperatures for enhancing the condensation of the expanded air.

114. A method as set forth in claim 113 wherein said step of maintaining said walls at cryogenic temperatures comprises the step of enclosing said walls inside a jacket of previously condensed air at cryogenic temperatures.

115. A method as set forth in claim 114 wherein said jacket comprises a thermally insulated cryogenic Dewar vessel containing liquid air at cryogenic temperatures in direct thermal contact with the external walls.

116. A method as set forth in claim 97 further comprising the step of recompressing that portion of the expanded air vapor which does not condense, back to ambient atmospheric pressure and discharging it back into the atmosphere in an open cycle process.

117. A method as set forth in claim 116 wherein the mechanical work used to recompress the noncondensed air is supplied by the mechanical work generated by the expanding air.

118. A method as set forth in claim 100 wherein the mechanical work used to operate the cryogenic refrigerator means is supplied by the mechanical work generated by the expanding air.

119. A method as set forth in claim 116 further comprising the step of cooling the noncondensed air before said recompressing step is completed to reduce the amount of mechanical work required to complete said recompressing step by heat transfer to a heat absorbing medium at a lower temperature.

120. A method as set forth in claim 97 further comprising the steps of:
mounting a plurality of condensing chambers adjacent said expansion chamber for condensing said expanded air vapor at cryogenic temperatures;
maintaining the inner walls of said condensing chambers at a temperature slightly below that of the expanded air vapor such that a portion of the expanded air molecules colliding with said inside walls, solidifies on said walls;
removing solidified air from said condensing chambers; and
recompressing said solidified air removed from said condensing chambers.

121. A method as set forth in claim 120 wherein the step of maintaining the inner walls of the condensing chambers at a temperature slightly below that of the expanded air vapor comprises the step of maintaining a cryogenic fluid in thermal contact with said walls at a slightly lower temperature.

122. A method as set forth in claim 121 wherein said step of removing solidified air from said condensing chambers is such that a layer of previously solidified air is left inside the condensing chambers as condensing surfaces for new solidified air and to reduce heat transfer to said cryogenic fluid.

123. A method as set forth in claim 120 further comprising the steps of:
mounting a recompression chamber adjacent said expansion chamber communicating with the interior of said condensing chambers such that expanded air vapor that does not condense inside the condensing chambers can pass into the recompression chamber; and
recompressing said portion of noncondensed air inside said recompression chamber.

124. A method as set forth in claim 97 wherein said condensing step is achieved primarily by extracting a sufficient amount of thrmal energy from the air by said expansion step thereby transforming the air into a supersaturated state at cryogenic temperatures which condenses essentially without having to remove any latent heat of condensation.

125. A method as set forth in claim 97 comprising the steps of:
introducing the air into one end of said expansion chamber containing an expansion piston movable along the length of said expansion chamber thereby forcing said piston to move inside said expansion chamber generating mechanical work;
introducing expanded noncondensed air vapor into one end of a recompression chamber containing a recompression piston movable along the length of said recompression chamber wherein said noncondensed air vapor is recompressed; and
coupling said expansion piston to said recompression piston such that the expanding air that drives the expansion piston also drives the recompression piston so that the mechanical work required for said recompression step is supplied by said expansion step.

126. A method as set forth in claim 125 further comprising the steps of:
mounting a vacuum chamber between said expansion chamber and said recompression chamber;
mounting a condenser means inside said vacuum chamber, wherein said condensing step comprises;

discharging said expanded air from said expansion chamber into said vacuum chamber which passes through said condenser wherein a portion of said expanded air condenses on the walls of said condenser, and wherein the noncondensed portion passes through said condenser and enters said recompression chamber.

127. A method as set forth in claim 126 further comprising the steps of:
introducing gaseous air into the expansion cylinder between the expansion piston and an end wall of the chamber when the expansion piston is adjacent such end wall;
transferring a relatively larger portion of the energy derived from the expanding gaseous air to the expansion piston in the form of kinetic energy by rapidly accelerating the expansion piston during the initial portion of the stroke along the length of the expansion chamber away from the end wall;
transferring a relatively smaller portion of the energy derived from the expanding air to the expansion piston during the final portion of the stroke of the expansion piston along the length of the expansion chamber;
coupling the expansion piston to the recompression piston by flexible belt means such that the expanding air simultaneously accelerates the expansion piston and the recompression piston and imparts kinetic energy to both pistons; and
coupling the recompression piston to a drive shaft extending along the length of the recompression chamber by varying pitch means for rotating the drive shaft in response to linear translation of the recompression piston along the length of the recompression chamber, the pitch means varying from a relatively long pitch adjacent the end wall to a relatively short pitch remote from the wall for decelerating both pistons for recompressing noncondensed air and for maintaining substantially uniform application of torque between the recompression piston and the shaft over a major portion of the stroke of the recompression piston, wherein the inertial mass of both pistons is utilized as a linear kinetic energy storage system during at least a portion of the stroke of the pistons.

128. A method as set forth in claim 97 wherein the step of converting a portion of the thermal energy of said expanding air into mechanical work comprises:
introducing gaseous air into an expansion chamber including an expansion turbine;
allowing the air to expand inside the expansion chamber thereby rotating the expansion turbine; and
extracting mechanical work by said rotating expansion turbine.

129. A method as set forth in claim 128 further comprising the steps of:
conveying expanded air from the expansion turbine into a second chamber adjacent the expansion chamber;
condensing at least a portion of the expanded air in the second chamber at cryogenic temperatures;
withdrawing condensed air from the second chamber;
conveying noncondensed expanded air vapor out of said second chamber and into a recompression chamber having a recompression turbine; and
coupling the expansion turbine to the recompression turbine such that a portion of the mechanical work generated by the expansion turbine is used to turn the recompression turbine thereby recompressing the noncondensed air.

130. A method as set forth in claim 97 wherein the expansion step is approximately isentropic.

131. A method as set forth in claim 97 further comprising the step of utilizing the thermal potential difference between the condensed cryogenic air and the ambient environment to generate additional mechanical work.

132. A method as set forth in claim 97 wherein said condensed air is solidified air at a cryogenic temperature not exceeding approximately 50° K. and further comprising the steps of:
recompressing the solidified cryogenic air to some intermediate pressure;
utilizing the partially recompressed solidified air as a low temperature heat sink for a second stage, closed cycle condensing heat engine; and
utilizing the natural thermal energy of the ambient environment as the high temperature heat reservoir of said second stage engine.

133. A method as set forth in claim 132 wherein the solidified air is heated and melted to liquid air while serving as a low temperature heat sink for said second stage engine by extracting and absorbing the latent heat of condensation of said second stage engine and further comprising the step of utilizing the thermal potential difference between the liquefied air at cryogenic temperature and the natural environment at ambient temperature for generating more mechanical work in a third stage engine.

134. A method as set forth in claim 133 wherein the step of utilizing the thermal potential difference between the liquid air at cryogenic temperature and the natural environment at ambient temperature to generate more mechanical work in a third stage engine comprises the steps of:
compressing the liquid air to a significantly higher pressure; and
performing at least twice the sequential steps of passing said compressed air through a heat exchanger means having an external surface in thermal contact with the natural environment whereby the compressed air is heated to about ambient temperature by extracting and absorbing natural ambient heat energy from the environment, and expanding said heated compressed air inside an expander means whereby a portion of the natural heat energy extracted from the environment inside said heat exchanger means is converted into mechanical work.

135. A method as set forth in claim 134 wherein the compressing step comprises compressing the liquid air to a pressure on the order of 300 Atm.

136. A method as set forth in claim 134 wherein the expanded air emerging from the last expansion step of said third stage engine has a temperature significantly below ambient atmospheric temperature, and a pressure about equal to ambient atmospheric pressure and further comprising the step of mixing said air with a portion of new air taken from the atmosphere and recycling said mixture back through the first stage engine.

137. A method as set forth in claim 136 further comprising the step of utilizing th air emerging from at least some of the third stage expanders, other than the last expander, as a low temperature heat sink for precooling the new air taken from the open atmosphere to a subambient temperature before conveying said expanded cold air into said ambient third stage heat exchangers so that said new air can be cooled to a subambient temperature before mixing it with the cold recycled air emerging from the last expander of the third stage.

138. A method as set forth in claim 132 wherein the operating steps of said closed cycle second stage engine comprise:

compressing a liquefied cryogenic second stage working fluid with a critical temperature below the natural ambient temperature of the environment to a relatively high initial pressure;

performing at least twice the sequential steps of passing said compressed second stage working fluid through a heat exchanger means having an external surface in thermal contact with the natural environment whereby the compressed cryogenic working fluid is heated to about ambient temperature by extracting and absorbing natural ambient heat energy from the environment, and expanding said heated compressed working fluid inside an expander means whereby a portion of the natural heat energy extracted from the environment inside said heat exchanger means is converted into mechanical work;

condensing said expanded second stage working fluid by recycling said expanded working fluid through a second stage condenser means maintained in thermal contact with the low temperature solidified air wherein the solidified air is heated and melted to liquefied air at a higher temperature by extracting and absorbing the latent heat of condensation from the expanded second stage working fluid; and recompressing the liquefied second stage working fluid back to the high initial working pressure to repeat the above steps in a closed cycle.

139. A method as set forth in claim 138 wherein the initial pressure of said compressed liquefied second stage working fluid is on the order of 300 Atm.

140. A method as set forth in claim 138 further comprising the step of maintaining the mass flow ratio between the solidified air and second stage working fluid passing through said second stage condenser such that all of the expanded second stage working fluid is liquefied while passing through the condenser.

141. A method as set forth in claim 138 further comprising the step of utilizing the expanded second stage working fluid emerging from at least some of the second stage expanders, other than the last expander prior to the condensing step, as a low temperature heat sink for cooling the noncondensed air emerging from the initial expansion step of the first stage engine before said noncondensed air is completely recompressed back to ambient atmospheric pressure in order to reduce the mechanical work expended on this recompression step.

142. A method as set forth in claim 141 further comprising the step of utilizing the liquefied second stage working fluid emerging from said second stage condenser as a cryogenic coolant prior to said compression step.

143. A method as set forth in claim 134 further comprising the step of utilizing the liquid air emerging from the second stage condenser as a cryogenic coolant prior to said compression step.

144. A method as set forth in claim 140 further comprising the step of thermally insulating the low temperature solidified air and the second stage working fluid emerging from the last expander prior to the condensing step such that the heat absorbed by said solidified air is substantially the latent heat of condensation extracted from the second stage working fluid while passing through the second stage condenser.

145. A method as set forth in claim 138 wherein said second stage working fluid is oxygen.

146. A method as set forth in claim 138 wherein all of the expansion and compression steps of the closed cycle second stage engine are approximately isentropic, and wherein all of the heating steps are approximately isobaric, and wherein the condensing step is approximately isothermal.

147. A method as set forth in claim 134 wherein all of the expansion and compression steps of the third stage engine are approximately isentropic, and wherein all of the heating steps are approximately isobaric.

148. A method as set forth in claim 134 further comprising the step of filtering the liquefied air for removing nonliquefied solid substances from the liquefied air prior to said compression step.

149. A method as set forth in claim 134 further comprising the step of removing accumulated condensates from the exterior surfaces of at least one third stage ambient heat exchanger to maintain the thermal transfer efficiency thereof.

150. A method as set forth in claim 134 further comprising the step of accumulating and temporarily storing heated compressed air emerging from at least one third stage ambient heat exchanger inside a pressure vessel before expanding said compressed air.

151. A method as set forth in claim 138 further comprising the step of removing accumulated condensates from the exterior surfaces of at least one second stage ambient heat exchanger to maintain the thermal transfer efficiency thereof.

152. A method as set forth in claim 151 further comprising the step of utilizing said accumulated condensates removed from the exterior surfaces of said second stage ambient heat exchangers as a low temperature heat sink for a closed cycle fourth stage engine utilizing the ambient environment as its high temperature heat reservoir.

153. A method as set forth in claim 149 further comprising the step of utilizing said accumulated condensates removed from the exterior surfaces of said third stage ambient heat exchangers as a subambient coolant.

154. A method for liquefying atmospheric air comprising the steps of:

expanding air taken from the atmosphere inside a low pressure expansion chamber;

extracting a portion of the thermal energy from said expanding air and converting it into mechanical work by moving a movable member inside said expansion chamber;

condensing a portion of said expanded air at cryogenic temperatures primarily as a result of said expansion step; and recompressing that portion of said expanded air that does not condense.

155. A method as set forth in claim 154 wherein said expansion step has an expansion ratio exceeding approximately 100.

156. A method as set forth in claim 154 wherein said condensing step is achieved by extracting a sufficient amount of thermal energy from the air by said expansion step thereby transforming the air into a supersaturated state at cryogenic temperatures which condenses essentially without having to remove any latent heat of condensation.

157. A method as set forth in claim 154 wherein the air pressure prior to said expansion step is approximately equal to ambient atmospheric pressure.

158. A method as set forth in claim 154 further comprising the step of pre-cooling the inlet air prior to said expansion step for enhancing said condensation.

159. A method as set forth in claim 154 further comprising the step of thermally insulating the external walls of the expansion chamber from the ambient environment.

160. A method as set forth in claim 154 further comprising the step of maintaining the external walls of said expansion chamber at cryogenic temperatures for enhancing the condensation of said air.

161. A method as set forth in claim 160 wherein said step of maintaining the external walls of the expanxion chamber at cryogenic temperatures comprises the step of enclosing said expansion chamber inside a jacket of liquefied gas at cryogenic temperatures.

162. A method as set forth in claim 161 wherein said jacket comprises a cryogenic Dewar vessel containing liquefied gas in direct thermal contact with the external walls of said expansion chamber.

163. A method as set forth in claim 154 wherein the expansion chamber has a variable expansion ratio and further comprising the step of maintaining a sufficiently high expansion ratio for inducing spontaneous condensation.

164. A method as set forth in claim 154 wherein sufficient thermal energy of the expanding air is removed by said expansion step to induce spontaneous condensation of a portion of the air at cryogenic temperatures.

165. A method as set forth in claim 154 further comprising the step of recompressing that portion of the expanded air vapor which does not condense back to ambient atmospheric pressure and discharging it back into the atmosphere in an open cycle process.

166. A method as set forth in claim 165 wherein the mechanical work used to recompress the noncondensed air is supplied by the mechanical work generated by said expansion step.

167. A method as set forth in claim 165 further comprising the step of cooling the noncondensed air before said recompression step is completed to reduce the mechanical work expended by said recompression step.

168. A method as set forth in claim 167 wherein said cooling step comprises the step of transferring a portion of the heat of partially recompressed, noncondensed air to an absorbing medium with a lower temperature.

169. A method as set forth in claim 154 further comprising the step of precompressing the air to above ambient atmospheric pressure before expansion to enhance said condensation.

170. A method as set forth in claim 154 further comprising the step of filtering the air drawn from the atmosphere before said expansion step for removing foreign particles.

171. A method as set forth in claim 154 wherein the air is expanded from about ambient atmospheric pressure to a pressure less than about 2 Torr.

172. A method as set forth in claim 154 wherein the expansion and condensing steps transforms a portion of the air to its solid phase at a temperature below the triple point.

173. A method as set forth in claim 172 further comprising the steps of:

compressing said solidified air; and
melting said compressed solidified air to liquid air.

174. A method as set forth in claim 154 comprising the steps of:
introducing the air into one end of an expansion chamber containing an expansion piston movable along the length of said expansion chamber thereby forcing said piston to move inside said expansion chamber generating mechanical work;
introducing expanded noncondensed air vapor into one end of a recompression chamber containing a recompression piston movable along the length of said recompression chamber wherein noncondensed air vapor in recompressed; and
coupling said expansion piston to said recompression piston such that the expanding air that drives the expansion piston also drives the recompression piston so that the mechanical work required for said recompression step is supplied by said expansion step.

175. A method as set forth in claim 174 further comprising the steps of:
mounting a vacuum chamber between said expansion chamber and said recompression chamber;
mounting a condensing means communicating with said vacuum chamber wherein said condensing step comprises;
discharging said expanded air from said expansion chamber into said vacuum chamber which passes through said condensing means wherein a portion of said expanded air condenses on the walls of said condensing means, and wherein the noncondensed portion passes through said condensing means and enters said recompression chamber.

176. A method as set forth in claim 175 further comprising the steps of:
introducing gaseous air into the expansion chamber between the expansion piston and an end wall of the chamber when the expansion piston is adjacent such end wall;
transferring a relatively larger portion of the energy derived from the expanding gaseous air to the expansion piston in the form of kinetic energy by rapidly accelerating the expansion piston during the initial portion of the stroke along the length of the chamber away from the end wall;
transferring a relatively smaller portion of the energy derived from the expanding air to the expansion piston during the final portion of the stroke of the expansion piston along the length of the expansion chamber;
coupling the expansion piston to the recompression piston by flexible belt means such that the expanding air simultaneously accelerates the expansion piston and the recompression piston and imparts kinetic energy to both pistons; and
coupling the recompression piston to a drive shaft extending along the length of the recompression chamber by varying pitch means for rotating the drive shaft in response to translation of the recompression piston along the length of the recompression chamber, the pitch means varying from a relatively long pitch adjacent the end wall to a relatively short pitch remote from the wall for decelerating both pistons for recompressing noncondensed air and for maintaining substantially uniform application of torque between the recompression piston and the shaft over a major portion of the stroke of the recompression piston wherein the inertial mass of both pistons is utilized as a linear kinetic energy storage system during at least a portion of the stroke of the pistons.

177. A method as set forth in claim 154 wherein the step of extracting a portion of the thermal energy from said expanding air and converting it into mechanical work comprises:
   introducing gaseous air into an expansion chamber including an expansion turbine;
   allowing the air to expand inside the expansion chamber thereby rotating the expansion turbine; and
   extracting mechanical work by said rotating expansion turbine.

178. A method as set forth in claim 177 further comprising the steps of:
   conveying expanded air from the expansion turbine into a second chamber adjacent the expansion chamber;
   condensing at least a portion of the expanded air in the second chamber at cryogenic temperatures;
   withdrawing condensed air from the second chamber;
   conveying noncondensed expanded air vapor out of said second chamber and into a recompression chamber having a recompression tubrine; and
   coupling the expansion turbine to said recompression turbine such that a portion of the mechanical work generated by said expansion turbine is used to turn said recompression turbine thereby recompressing the noncondensed air.

179. A method as set forth in claim 154 wherein the expansion step is approximately isentropic.

180. A method as set forth in claim 154 wherein said condensed air is solidified air at a cryogenic temperature not exceeding approximately 50° K. and further comprising the steps of:
   recompressing the solidified cryogenic air to some intermediate pressure;
   utilizing the partially recompressed solidified air as a low temperature heat sink for a second stage, closed cycle condensing heat engine; and
   utilizing the natural thermal energy of the ambient environment as the high temperature heat reservoir of said second stage engine.

181. A method as set forth in claim 180 wherein the solidified air is heated and melted to liquid air while serving as a low temperature heat sink for said second stage engine by extracting and absorbing the latent heat of condensation of said second stage engine.

182. A method as set forth in claim 180 wherein the operating steps of said closed cycle second stage engine comprise:
   compressing a liquefied cryogenic second stage working fluid with a critical temperature below the natural ambient temperature of the environment to a relatively high initial pressure;
   performing at least twice the sequential steps of passing said compressed second stage working fluid through a heat exchanger means having an external surface in thermal contact with the natural environment whereby the compressed cryogenic working fluid is heated to about ambient temperature by extracting and absorbing natural ambient heat energy from the environment, and expanding said heated compressed working fluid inside an expander means whereby a portion of the natural heat energy extracted from the environment inside said heat exchanger means is converted into mechanical work;
   condensing said expanded second stage working fluid by recycling said expanded working fluid through a second stage condenser means maintained in thermal contact with the low temperature solidified air wherein the solidified air is heated and melted to liquefied air at a higher temperature by extracting and absorbing the latent heat of condensation from the expanded second stage working fluid; and
   recompressing the liquefied second stage working fluid back to the high initial working pressure to repeat the above steps in a closed cycle.

183. A method as set forth in claim 182 further comprising the step of maintaining the mass flow ratio between the solidified air and said second stage working fluid passing through said second stage condenser such that all of the expanded second stage working fluid is liquefied while passing through the condenser.

184. A method as set forth in claim 183 further comprising the step of thermally insulating the low temperature solidified air and the second stage working fluid emerging from the last expander prior to the condensing step such that the heat absorbed by said solidified air is substantially the latent heat of condensation extracted from the second stage working fluid while passing through the second stage condenser.

185. A method as set forth in claim 182 wherein said second stage working fluid is oxygen.

186. A method as set forth in claim 182 wherein the initial pressure of said compressed liquefied second stage working fluid is on the order of 300 Atm.

187. A method as set forth in claim 182 further comprising the step of utilizing a portion of the expanded second stage working fluid emerging from at least some of the expanders, other than the last expander prior to the condensing step, as a low temperature heat sink for precooling the air taken from the open atmosphere to a subambient temperature before it is expanded in order to enhance the condensing process.

188. A method as set forth in claim 182 further comprising the step of utilizing a portion of the expanded second stage working fluid emerging from at least some of the expanders, other than the last expander prior to the condensing step, as a subambient heat sink for cooling partially recompressed noncondensed air in order to reduce the amount of mechanical work required to recompress the noncondensed air completely back to ambient atmospheric pressure.

189. A method as set forth in claim 182 further comprising the step of utilizing the liquefied second stage working fluid emerging from said second stage condenser as a cryogenic coolant prior to said compression step.

190. A method as set forth in claim 189 wherein said utilizing step comprises maintaining a portion of the walls of said expansion chamber at cryogenic temperatures by enclosing said walls within a cryogenic Dewar vessel containing said liquefied second stage working fluid in direct thermal contact with said walls.

191. A method as set forth in claim 182 wherein all of the expansion and compression steps of the closed cycle second stage engine are approximately isentropic, and wherein all of the heating steps are approximately isobaric, and wherein the condensing step is approximately isothermal.

192. A method as set forth in claim 182 further comprising the step of accumulating and temporarily storing heated compressed second stage working fluid emerging from at least one ambient heat exchanger inside a pressure vessel before expanding said compressed heated working fluid.

193. A method as set forth in claim 182 further comprising the step of removing accumulated condensates from the exterior surfaces of at least one ambient heat exchanger to maintain the thermal transfer efficiency thereof.

194. A method as set forth in claim 193 further comprising the step of utilizing said accumulated condensates removed from the exterior surfaces of said ambient heat exchanger as a low temperature heat sink for a closed cycle third stage engine utilizing the ambient environment as its high temperature heat reservoir.

195. A method as set forth in claim 193 further comprising the step of utilizing said accumulated condensates removed from the exterior surfaces of said ambient heat exchanger as a subambient coolant.

196. A method as set forth in claim 193 further comprising the step of utilizing said accumulated condensates removed from the exterior surfaces of said ambient heat exchanger as a subambient heat sink for precooling the air drawn from the atmospher prior to the expansion step to enhance said condensation.

197. A method as set forth in claim 154 wherein said expansion step has an expansion ratio on the order of 300.

198. A method as set forth in claim 182 wherein the liquefied air emerging from said second stage condenser has a temperature of about 80° K. and a pressure about equal to ambient atmospheric pressure.

199. A method as set forth in claim 182 further comprising the step of feeding the liquefied air emerging from the second stage condenser into a liquid air storage vessel where it is accumulated for subsequent processing.

200. A method as set forth in claim 182 wherein a portion of the mechanical work generated from the first and second stage engines is used to drive electrical generators for producing electrical power.

201. A method for extracting natural heat energy from the ambient environment and converting a portion of it into mechanical work comprising:
condensing atmospheric air at a cryogenic temperature; and
utilizing the thermal potential difference between said condensed air at cryogenic temperature and the natural environment at ambient temperature to generate mechanical work.

202. A method as set forth in claim 201 wherein said condensing step comprises:
expanding air taken from the atmosphere inside an expansion chamber;
extracting a portion of the thermal energy from said expanding air and converting it into mechanical work by moving a movable member means inside said expansion chamber; and
condensing a portion of said expanded air at cryogenic temperatures primarily as a result of overexpanding the air so as to transform it into a supersaturated vapor.

203. A method as set forth in claim 202 further comprising means for removing air expanded inside said expansion chamber and recompressing that portion of the expanded air vapor which does not condense so as to maintain a pressure differential for said expansion chamber.

204. A method as set forth in claim 202 wherein said expansion step has an expansion ratio exceeding approximately 100.

205. A method as set forth in claim 202 wherein the air pressure prior to said expansion step is approximately equal to ambient atmospheric pressure.

206. A method as set forth in claim 202 further comprising the step of precooling the air prior to said expansion step for enhancing said condensation.

207. A method as set forth in claim 202 further comprising the step of thermally insulating the external walls of the expansion chamber from the ambient environment.

208. A method as set forth in claim 202 further comprising the step of maintaining the external walls of the expansion chamber at cryogenic temperatures for enhancing the condensation of said air.

209. A method as set forth in claim 208 wherein the step of maintaining the external walls of the expansion chamber at cryogenic temperatures comprises the step of enclosing said expansion chamber inside a jacket of liquefied gas at cryogenic temperatures.

210. A method as set forth in claim 202 wherein the expansion chamber has a variable expansion ratio and further comprising the step of maintaining a sufficiently high extension ratio for inducing spontaneous condensation.

211. A method as set forth in claim 203 wherein the recompression step recompresses the noncondensed air to a pressure approximately equal to ambient atmospheric pressure and further comprises the step of discharging said noncondensed air back into the atmosphere.

212. A method as set forth in claim 211 wherein the step of recompressing the noncondensed air back to ambient atmospheric pressure comprises:
recompressing the noncondensed air to some intermediate pressure below ambient atmospheric pressure;
extracting thermal energy from said partially recompressed air by absorbing said thermal energy in a heat absorbing medium with a lower temperature; and
compressing said partially recompressed air up to ambient atmospheric pressure after said cooling step.

213. A method as set forth in claim 211 wherein the mechanical work used to recompress said noncondensed air is supplied by the mechanical work generated from said expansion step.

214. A method as set forth in claim 202 further comprising the step of precompressing the air to above ambient atmospheric pressure prior to said expansion step to enhance said condensation.

215. A method as set forth in claim 202 further comprising the step of removing foreign substances from the air by filtration means prior to said expansion step.

216. A method as set forth in claim 202 wherein said condensing step transforms the air to solidified air crystals.

217. A method as set forth in claim 216 wherein the step of utilizing the thermal potential difference between the condensed air at cryogenic temperature and the natural environment at ambient temperature to generate mechanical work includes the step of utilizing said solidified air as a cryogenic heat sink for a closed cycle second stage condensing cryogenic engine operating between said cryogenic heat sink and the ambient environment.

218. A method as set forth in claim 217 wherein the operating steps of said closed cycle second stage cryogenic engine comprises:
utilizing a condensing cryogen with a critical temperature below the ambient temperature of the natural environment as a cryogenic second stage working fluid for said second stage cryogenic engine;
compressing liquefied second stage working fluid at a cryogenic temperature to some initial working pressure;
performing at least twice the sequential steps of passing said compressed cryogenic second stage working fluid through a second stage heat exchanger means having an external surface in thermal contact with the natural environment at ambient temperature whereby the compressed cryogenic working fluid is heated to about ambient temperature by extracting and absorbing natural ambient heat energy from the environment and expanding said heated compressed working fluid inside a second stage expander means whereby a portion of the natural heat energy extracted from the environment inside said second stage heat exchanger means is converted into mechanical work;
condensing said expanded second stage working fluid by passing said expanded working fluid through a second stage cryogenic condenser means maintained in thermal contact with said low temperature solidified air wherein the solidified air is heated and melted to liquefied air at a higher temperature by extracting and absorbing the latent heat of condensation from said expanded second stage working fluid;
withdrawing said liquefied second stage working fluid from said second stage condensing means; and
recompressing said liquefied second stage cryogenic working fluid back to said initial working pressure and repeating the above steps in a closed cycle process.

219. A method as set forth in claim 218 further comprising the step of insulating said second stage cryogenic condenser from the ambient environment such that the heat absorbed by the solidified air inside said condenser is substantially the latent heat of condensation extracted from the second stage working fluid while passing through said condenser.

220. A method as set forth in claim 219 further comprising the step of maintaining a mass flow ratio between said solidified air and said second stage working fluid passing through said second stage condensing means such that essentially all of the expanded second stage working fluid vapor entering said condenser is condensed to liquidified working fluid while passing through said condenser.

221. A method as set forth in claim 218 wherein said initial working pressure of said liquefied second stage working fluid is on the order of 300 Atm.

222. A method as set forth in claim 218 further comprising the step of utilizing the expanded second stage working fluid emerging from at least some of the second stage expanders, other than the last second stage expander prior to the condensing step, as a low temperature subambient heat sink.

223. A method as set forth in claim 218 further comprising the step of utilizing the liquefied second stage working fluid emerging from said second stage condensing means as a subambient cryogenic coolant prior to said compression step.

224. A method as set forth in claim 201 wherein the step of utilizing the thermal potential difference between the condensed air at cryogenic temperature and the natural environment at ambient temperature to generate mechanical work includes the step of utilizing condensed liquefied air as a cryogenic working fluid circulating through a cryogenic engine for extracting thermal energy from the natural environment and converting a portion of it into mechanical work.

225. A method as set forth in claim 224 further comprising the steps of:
compressing liquefied air at cryogenic temperature to a relatively high pressure; and
performing at least twice the sequential steps of passing said compressed air through a heat exchanger means maintained in thermal contact with the natural environment whereby the compressed air is heated to about ambient temperature by extracting and absorbing natural ambient heat energy from the environment, and expanding said heated compressed air inside an expander means where a portion of the natural heat energy extracted from the natural environment inside said heat exchanger means is converted into mechanical work.

226. A method as set forth in claim 225 wherein said compressing step compresses said liquefied air to a pressure on the order of 300 Atm.

227. A method as set forth in claim 225 wherein the expanded air emerging from the last expansion step has a temperature significantly below ambient atmospheric temperature and a pressure about equal to ambient atmospheric pressure and further comprising the steps of:
mixing said expanded air with a portion of new air drawn from the atmosphere; and
condensing a portion of said mixture.

228. A method as set forth in claim 227 further comprising the step of utilizing the air emerging from at least some of the expanders of said cryogenic engine, other than the last expander, as a low temperature heat sink for precooling said new air taken from the atmosphere before conveying said expanded cold air into said ambient heat exchangers so that said new air can be cooled to a subambient temperature before mixing it with the cold air emerging from the last expander in order to enhance said condensation.

229. A method as set forth in claim 225 further comprising the step of utilizing said liquefied air as a cryogenic coolant for enhancing said condensing step prior to said compressing step.

230. A method as set forth in claim 225 further comprising the step of removing accumulated condensates from the exterior surfaces of at least one ambient heat exchanger to maintain the thermal transfer efficiency thereof.

231. An apparatus for generating mechanical work comprising:
an expansion chamber means;
means for creating a partial vacuum inside said expansion chamber;
means for introducing atmospheric air with an initial enthalpy and with an initial pressure at least approximately equal to ambient atmospheric pressure into said expansion chamber means;
means for converting a portion of the initial enthalpy of said air into mechanical work by moving a movable member inside said expansion chamber means;

means for condensing a portion of the air at cryogenic temperatures primarily as a result of said expansion; and means for recompressing that portion of the air that does not condense back to ambient atmospheric pressure thereby maintaining said partial vacuum inside said expansion chamber.

232. An apparatus as set forth in claim 231 wherein the amount of thermal energy removed from the air during the expansion is sufficient for transforming a portion of the air into its solid state at a temperature below approximately 50° K.

233. An apparatus as set forth in claim 231 wherein said expansion chamber has an expansion ratio exceeding approximately 100 in order to reduce the expanded air to a supersaturated vapor at cryogenic temperatures.

234. An apparatus as set forth in claim 231 further comprising means for insulating said expansion chamber from the ambient environment.

235. An apparatus as set forth in claim 231 wherein the expansion process is approximately isentropic.

236. An apparatus as set forth in claim 231 further comprising means for precooling said air before said expansion for enhancing said condensation.

237. An apparatus as set forth in claim 236 wherein said means for precooling said pre-expanded air comprises heat exchanger means maintained in thermal contact with previously condensed air with a subambient temperature.

238. An apparatus as set forth in claim 231 further comprising means for maintaining a portion of the external walls of said expansion chamber at cryogenic temperatures for enhancing said condensation.

239. An apparatus as set forth in claim 238 wherein said means for maintaining said external walls of said expansion chamber at cryogenic temperatures comprises Dewar jacket means surrounding said external walls containing cryogenic liquid air in direct thermal contact with said walls.

240. An apparatus as set forth in claim 231 further comprising means for varying the expansion ratio of said expansion chamber while said movable member is moving.

241. An apparatus as set forth in claim 240 further comprising means for increasing or decreasing the condensation ratio of said expanding air by increasing or decreasing the expansion ratio respectively.

242. An apparatus as set forth in claim 231 further comprising air filtration means for removing solid particles from the air before said air is expanded.

243. A first stage cryogenic engine as set forth in claim 231 further comprising means for converting a portion of the thermal potential difference between the condensed air at a cryogenic temperature and the natural environment at ambient temperature into additional mechanical work by additional cryogenic engines.

244. An apparatus as set forth in claim 243 wherein the condensed air is solidified air crystals and wherein said converting means includes:

means for compressing said solidified air crystals to some intermediate pressure;

means for melting said partially compressed solidified air to partially compressed liquefied air by absorbing latent heat of condensation from a second stage cryogenic working fluid by circulating said solidified air through a cryogenic heat exchanger means in heat exchange relationship;

said second stage cryogenic working fluid having a critical temperature below natural ambient temperature;

at least one second stage ambient heat exchanger means maintained in thermal contact with the natural environment;

a second stage closed cycle condensing cryogenic engine means operating with said second stage cryogenic working fluid and utilizing said cryogenic heat exchanger as its low temperature heat sink, and said ambient heat exchanger as its high temperature heat reservoir;

means for withdrawing said partially compressed liquefield air from said cryogenic heat exchanger; and wherein said cryogenic heat exchanger is utilized as the second stage condenser.

245. An apparatus as set forth in claim 244 wherein said second stage closed cycle cryogenic engine comprises:

means for withdrawing liquefield second stage working fluid from said second stage condenser;

means for compressing said liquefied second stage working fluid withdrawn from said condenser to a relatively high pressure by a cryogenic compressor means;

a plurality of second stage ambient heat exchangers maintained in thermal contact with the ambient environment adapted for heating compressed low temperature second stage working fluid by absorbing natural heat energy from the environment;

a like plurality of serially connected second stage expanders with said second stage ambient heat exchangers interposed between adjacent expanders and adapted for converting the natural ambient heat energy absorbed by said second stage working fluid circulating through said heat exchangers into additional mechanical work; and means for recycling the expanded second stage working fluid discharged from the last expander of said serially connected second stage expanders back into said second stage condenser where it is reliquefied and whereby the above steps are repeated in a closed cycle process.

246. An apparatus as set forth in claim 245 further comprising:

means for thermally insulating said second stage condenser from the ambient environment such that the heat extracted and absorbed by the very low temperature solidified air entering said condenser from said first stage cryogenic engine is essentially the latent heat of condensation expelled by the expanded second stage vapor entering said condenser; and means for controlling the relative mass flow ratio between the solidified first stage air and the expanded second stage vapor entering said condenser such that essentially all of the expanded vapor is liquefied and all of the solidified air is melted while passing through said condenser.

247. An apparatus as set forth in claim 244 further comprising means for removing nonliquefied solid substances from the liquefied air withdrawn from said second stage condenser by filtration means.

248. An apparatus as set forth in claim 244 further comprising means for circulating a portion of said liquefied air through a double walled jacket means mounted on said first stage expansion chamber for providing said chamber with an external cryogenic environment.

249. An apparatus as set forth in claim 245 further comprising means for circulating a portion of said liquefied second stage working fluid through a double walled jacket means for providing a cryogenic environment before compressing said fluid to its high working pressure.

250. An apparatus as set forth in claim 245 further comprising means for converting a portion of the thermal potential difference between said liquefied air withdrawn from said second stage condenser at cryogenic temperature and the natural environment at ambient temperature into additional mechanical work.

251. An apparatus as set forth in claim 250 wherein said converting means is a third stage cryogenic engine comprising:
  means for compressing said liquefied air to a high working pressure significantly above ambient atmospheric pressure;
  a plurality of third stage ambient heat exchangers maintained in thermal contact with the ambient environment adapted for heating compressed low temperature air by absorbing natural thermal energy from the ambient environment;
  a like plurality of serially connected third stage expanders with said third stage ambient heat exchangers interposed between adjacent expanders and adapted for converting the natural ambient heat energy absorbed by the compressed low temperature air while circulating through said heat exchangers into additional mechanical work; and
  means for recycling the expanded air discharged from the last, third stage expander, back into said first stage expander.

252. An apparatus as set forth in claim 251 wherein said air discharged from the last, third stage expander has a temperature significantly below ambient atmospheric temperature and a pressure about equal to ambient atmospheric pressure and wherein said recycling means comprises:
  means for mixing said recycled air discharged from the last, third stage expander, with a portion of new air drawn from the open atmosphere before injecting said recycled air back into said first stage expander; and
  means for conveying said air mixture back into said first stage expander.

253. An apparatus as set forth in claim 252 further comprising means for precooling said new air taken from the open atmosphere before mixing it with said cold recycled air, said precooling means comprising:
  thermally insulated subambient heat exchanger means adapted for precooling said new air;
  thermally insulated conduit means for drawing new air from the open atmosphere and feeding it into said heat exchanger means;
  thermally insulated conduit means for conveying compressed third stage low temperature air discharged from at least some of the third stage expanders, other than the last third stage expander, into said subambient heat exchanger means for circulation through said subambient heat exchanger in heat exchange relationship with said new air drawn from the open atmosphere thereby cooling said new air to a subambient temperature while simultaneously heating said third stage air;
  conduit means for conveying said third stage air from said subambient heat exchanger means to the third stage ambient heat exchangers;
  means for mixing said precooled new air with said cold recycled air;
  thermally insulated conduit means for conveying said precooled new air from said subambient heat exchanger to said mixing means;
  thermally insulated conduit means for conveying cold recycled air discharged from the last expander of the third stage to said mixing means where it is mixed with said precooled new air; and
  thermally insulated conduit means adapted for conveying said mixed air from said mixing means into said first stage expander.

254. An apparatus as set forth in claim 245 further comprising means for precooling said noncondensed air before it is recompressed back to ambient atmospheric pressure comprising:
  means for recompressing said noncondensed air to some intermediate pressure below ambient atmospheric pressure such that the corresponding temperature is above the discharge temperature of all of the second stage expanders;
  thermally insulated subambient heat exchanger means adapted for cooling said partially recompressed noncondensed air;
  thermally insulated conduit means for conveying said partially recompressed air from said partial recompressor means into said subambient heat exchanger means;
  thermally insulated conduit means for conveying compressed second stage low temperature working fluid discharged from at least some of the second stage expanders, other than the last second stage expander, into said subambient heat exchanger for circulation through said subambient heat exchanger in heat exchange relationship with said partially recompressed noncondensed air thereby cooling said partially recompressed air to a lower temperature while simultaneously heating said second stage working fluid;
  conduit means for conveying said second stage working fluid from said subambient heat exchanger to the second stage ambient heat exchangers;
  means for compressing the precooled, partially recompressed noncondensed air up to ambient atmospheric pressure inside a second recompressor means;
  thermally insulated conduit means for conveying said precooled partially recompressed air from said subambient heat exchanger, to said second recompressor means where it is compressed back to ambient atmospheric pressure; and
  exhaust conduit means connected to said second recompressor means adapted for discharging said noncondensed air back into the open atmosphere.

255. An apparatus as set forth in claim 251 further comprising at least one pressure vessel means interposed between one of said third stage ambient heat exchangers and its adjacent downstream expander adapted for accumulating and temporarily storing heated compressed air before expanding said air for load leveling and as a source of instant stored energy that can be released by expanding said stored compressed air in said adjacent expander for generating instant mechanical power.

256. An apparatus as set forth in claim 245 further comprising at least one pressure vessel means interposed between one of said second stage ambient heat exchangers and its adjacent downstream expander adapted for accumulating and temporarily storing heated compressed gas before expanding said gas for load leveling and as a source of instant stored energy that can be released by expanding said stored compressed gas in said adjacent expander for generating instant mechanical power.

257. An apparatus as set forth in claim 245 wherein the liquefied second stage working fluid withdrawn from said second stage condenser is compressed to about 300 Atm before feeding said fluid into the first, second stage ambient heat exchanger.

258. An apparatus as set forth in claim 251 wherein the liquefied air withdrawn from said second stage condenser is compressed to about 300 Atm before feeding said liquid air into the first, third stage ambient heat exchanger.

259. An apparatus as set forth in claim 251 further comprising means for removing accumulated condensates from the exterior surface of at least one ambient heat exchanger to maintain the thermal transfer efficiency thereof.

260. An apparatus as set forth in claim 251 further comprising:
means for removing accumulated condensates from the exterior surface of at least one ambient heat exchanger; and
means for utilizing the thermal potential difference between said low temperature condensates and the natural ambient environment to generate additional mechanical work.

261. An apparatus as set forth in claim 251 further comprising:
means for removing accumulated condensates from the exterior surface of at least one ambient heat exchanger; and
means for utilizing said low temperature condensates as a subambient coolant.

262. An apparatus as set forth in claim 245 wherein said second stage working fluid is oxygen.

263. An apparatus as set forth in claim 231 wherein said condensing means comprises:
a plurality of parallel cylindrical double walled thermally conductive condensing tubes mounted adjacent said expansion chamber and adapted for receiving expanded air discharged from said expansion chamber;
means for introducing and circulating a partially compressed liquefied cryogenic coolant inside the annular region surrounding each double walled condensing tube thereby maintaining the interior tube walls at a temperature slightly below that of the expanded supersaturated air vapor entering said tubes from said expansion chamber such that when expanded metastable air molecules enter said tubes and collide with said interior walls they solidify on said walls whereby said walls become condensing surfaces; and
means for removing solidified air from the interior walls of said condensing tubes.

264. An apparatus as set forth in claim 263 wherein said solidified air removal means comprises:
a rotating screw means having an inner scraping edge and an outer edge mounted inside and extending along the longitudinal axis of each condensing tube;
means for maintaining the inner scraping edge of said screw means in a noncontacting spaced apart relationship with the interior wall surface of said condensing tubes; and
means for rotating said screws such that when said screws are rotated, an outer layer of solidified air is scraped off the interior wall surface of each tube and transferred to one end of the tubes while leaving an inner layer adjacent said walls undisturbed, said inner layers providing condensing surfaces for a new layer of solidified air while simultaneously providing thermal insulation for said liquefied cryogenic coolant inside said annular regions such that said condensation results primarily from spontaneous condensation of supersaturated metastable air molecules due to overexpansion rather than heat transfer to the liquefied cryogen by absorbing latent heat of condensation.

265. An apparatus as set forth in claim 244 wherein said compressing means for compressing said solidified air crystals comprises:
a plurality of parallel thermally insulated cylindrical compressor tubes containing solidified air crystals;
a rotating screw means having an inner scraping edge and no outer edge mounted inside and extending along the longitudinal axis of said compressor tubes;
means for maintaining the scraping edge of said screw means in contact relationship with the interior tube wall surface; and
means for rotating said screws such that when said screws are rotated, the solidified air crystals are scraped off said walls and forced to move inside said tubes and become compressed, said rotating screws becoming screw compressors.

266. An apparatus as set forth in claim 265 wherein said cryogenic heat exchanger means for melting said compressed solidified air crystals is a second stage condenser means for condensing said second stage working fluid comprising:
thermally conductive second stage condensing tubes attached to the ends of said thermally insulated solid phase compressor tubes, the beginning of said tubes conveying solidified air crystals at approximately ambient atmospheric pressure;
a second stage condensing chamber means containing said thermally conductive condensing solidified air tubes;
thermal insulation means for insulating said condensing chamber means from the ambient environment;
means for introducing expanded second stage working fluid vapor into said condensing chamber means wherein said vapor is in thermal contact with said solidified air crystals such that said vapor is condensed to a cryogenic liquid by transferring latent heat of condensation to the colder solidified air crystals whereby said solidified air crystals are simultaneously melted and heated to liquid air;
means for withdrawing said liquefied second stage working fluid from said second stage condenser; and
means for withdrawing said liquefied air from said second stage condenser.

267. An apparatus as set forth in claim 266 further comprising means for varying the mass flow ratio between the solidified air crystals and said second stage cryogenic working fluid passing in heat exchange relation through said second stage condensing means thereby controlling the outlet temperature of said condensed second stage working fluid and said melted and heated liquefied air.

268. An apparatus as set forth in claim 251 further comprising means for varying the output pressures of said second and third stage compressors.

269. An apparatus as set forth in claim 251 further comprising means for varying the pressure ratios of at least some of the second and third stage expanders.

270. An apparatus as set forth in claim 251 wherein all of the expanders and compressors of said first, second, and third stage engines are approximately isentropic, and wherein all of the heat exchangers are approximately isobaric.

271. An apparatus as set forth in claim 231 wherein said expansion chamber means is an axial flow low pressure expansion turbine comprising:
   a circular expansion chamber means with a gradually increasing radius and a longitudinal central axis of symmetry;
   a turbine drive shaft mounted inside said circular expansion chamber along said longitudinal central axis of symmetry;
   an expansion turbine mounted on said drive shaft adapted for rotation inside said expansion chamber having an inlet and an outlet, said expansion turbine comprising at least one spiralling expansion blade mounted along the length of said drive shaft with increasing radius and in continuous air-tight sealing engagement with the inside walls of said circular expansion chamber;
   means for introducing atmospheric air into said inlet;
   means for maintaining a partial vacuum at the outlet of said expansion turbine; and
   drive train means connected to said rotating drive shaft adapted for extracting mechanical work derived from expanding air via pressure differentials across said expansion turbine blade resulting from the expansion process thereby generating rotational torque on said drive shaft.

272. An apparatus as set forth in claim 271 further comprising means for thermally insulating said expansion chamber from the ambient environment.

273. An apparatus as set forth in claim 271 further comprising means for maintaining the external walls of the expansion chamber at cryogenic temperatures for reducing heat transfer into the expanding air during the expansion process thereby rendering the expansion approximately isentropic.

274. An apparatus as set forth in claim 273 wherein said means for maintaining said expansion chamber walls at cryogenic temperatures comprises jacket means surrounding said walls containing circulating liquid air at cryogenic temperatures in direct contact with said external walls.

275. An apparatus as set forth in claim 271 further comprising means for varying the expansion ratio of said expansion chamber means while said expansion turbine is rotating.

276. An apparatus as set forth in claim 271 wherein the cross sectional outlet area perpendicular to said central axis is approximately 300 times greater than the inlet area such that the expansion ratio of said expander is approximately 300.

277. An apparatus as set forth in claim 276 further comprising an annular air-inlet duct with an outer radius perpendicular to said central axis that is greater than the radius of said drive shaft and with an inner radius approximately equal to said drive shaft radius, and further comprising an annular air-outlet duct with an inner radius approximately equal to said drive shaft radius and an outer radius significantly greater than said inner radius.

278. An apparatus as set forth in claim 277 further comprising an air conduit means connected to said annular air-inlet duct and means for varying the radius of said conduit for isobarically varying the mass flow rate of air flowing into said turbine expansion chamber for varying the expansion ratio.

279. An apparatus as set forth in claim 271 further comprising a vacuum chamber means mounted at the outlet end of said expansion turbine such that the expanded air vapor is discharged from the outlet of said expansion turbine directly into said vacuum chamber.

280. An apparatus as set forth in claim 279 further comprising:
   condensing means mounted adjacent to said vacuum chamber means and adapted for condensing a portion of the expanded air vapor discharged into said vacuum chamber from said expansion turbine; and
   recompressor means communicating with said condensing means and adapted for recompressing that portion of the expanded air vapor that does not condense inside said condensing means.

281. An apparatus as set forth in claim 280 wherein said recompressor means is an axial flow, low pressure recompression turbine comprising:
   a circular recompression chamber means with a gradually decreasing radius and a longitudinal central axis of symmetry;
   a turbine drive shaft mounted inside said circular recompression chamber along said longitudinal central axis of symmetry;
   a recompression turbine mounted on said drive shaft means adapted for rotation inside said recompression chamber having an inlet and an outlet, said recompression turbine comprising at least one spiralling compression blade mounted along the length of said drive shaft with decreasing radius and in continuous airtight sealing engagement with the inside walls of said circular recompression chamber such that when said blade is rotated, gaseous air vapor at the inlet is drawn into said recompression chamber and recompressed to some discharge pressure at the outlet; and
   drive train means connecting the drive shaft of said expansion turbine to the drive shaft of said recompression turbine adapted for rotating said recompression turbine by mechanical work generated from said expansion turbine.

282. An apparatus as set forth in claim 281 further comprising a pressure activated one-way relief valve mounted on said outlet end of said recompression turbine and means for varying the relief pressure of said one-way relief valve such that the discharge air pressure can be controlled by varying the relief pressure of said relief valve.

283. An apparatus as set forth in claim 231 wherein said expansion chamber means is a single cylinder, piston driven reciprocating expander comprising:
   an expansion cylinder having a left transverse end wall and a right transverse end wall;
   an expansion piston moving in airtight engagement inside said expansion cylinder which partitions said expansion cylinder into two variable volume subchambers, a left subchamber and a right subchamber bounded in the transverse direction by said left end wall and said right end wall and by the expansion piston which moves back and forth between said end walls;

a left vacuum chamber adjacent said left transverse end wall;

a right vacuum chamber adjacent said right transverse end wall;

means for opening a passageway means between the interior of said right subchamber and said right vacuum chamber when said expansion piston is substantially adjacent said left end wall;

means for introducing a selected quantity of air into the left subchamber when said expansion piston is substantially adjacent said left end wall for establishing a pressure differential across said expansion piston between the left subchamber and the right subchamber;

means for converting a portion of the initial enthalpy of said selected quantity of air into mechanical work by expanding said air against said expansion piston thereby moving said expansion piston towards the right end wall and generating mechanical work;

means for opening a passageway means between the interior of said left subchamber and said left vacuum chamber when said expansion piston is substantially adjacent said right end wall;

means for introducing a second quantity of air into the right subchamber when said expansion piston is substantially adjacent said right end wall for establishing a new pressure differential across said expansion piston between the right subchamber and the left subchamber when the first quantity of air is at maximum expansion;

means for converting a portion of the initial enthalpy of said second quantity of air into mechanical work by expanding said air against said expansion piston thereby moving said expansion piston back toward the left end wall in a return stroke and generating additional mechanical work while the first expanded quantity of air inside the left subchamber is discharged into said left vacuum chamber;

means for reopening said passageway means between the interior of said right subchamber and said right vacuum chamber when said expansion piston is substantially adjacent said left end wall;

means for introducing a third quantity of air into the left subchamber when said expansion piston is substantially adjacent said left end wall for establishing another pressure differential across said expansion piston between the left subchamber and the right subchamber after the first quantity of air is discharged from said left subchamber and when said second quantity of air inside said right subchamber is at maximum expansion for a repeat of the above cycle;

means for maintaining a vacuum inside both left and right vacuum chambers; and means for transmitting said mechanical work generated by said expansion piston out of said expansion cylinder.

284. An apparatus as set forth in claim 283 further comprising means for thermally insulating said expansion cylinder and said vacuum chambers from the ambient environment.

285. An apparatus as set forth in claim 283 further comprising means for maintaining the external walls of said expansion cylinder and said vacuum chambers at cryogenic temperatures for reducing heat transfer into the expanded air for rendering the expansion process approximately isentropic.

286. An apparatus as set forth in claim 285 wherein said means for maintaining the external walls of said expansion cylinder and said vacuum chambers at cryogenic temperatures comprises Dewar jacket means surrounding said walls containing circulating liquid air at cryogenic temperatures in direct thermal contact with said external walls.

287. An apparatus as set forth in claim 283 further comprising means for varying the initial pressure of the air prior to expansion.

288. An apparatus as set forth in claim 283 wherein the expansion ratio of said expansion cylinder is on the order of 300.

289. An apparatus as set forth in claim 283 wherein said means for introducing a selected quantity of air into said expansion subchambers comprises:

a plurality of air-inlet ports passing through each transverse end wall;

a shutter mechanism mounted across each end wall adapted for opening and closing said air-inlet ports;

a sensor means for sensing the linear displacement of said expansion piston inside said expansion cylinder;

means for moving said air-inlet shutters by mechanical actuators mounted adjacent said shutters in response to control commands received from said sensor means adapted for opening said air-inlet ports when said expansion piston is adjacent said ports, and closing said ports when said expansion piston moves a predetermined distance away from said ports; and control means for varying said predetermined distance when said ports are closed thereby providing a means for varying the expansion ratio of said expander.

290. An apparatus as set forth in claim 283 further comprising:

a left condensing means mounted adjacent said left vacuum chamber and adapted for condensing a portion of the expanded air vapor discharged into said left vacuum chamber;

a right condensing means mounted adjacent said right vacuum chamber and adapted for condensing a portion of the expanded air vapor discharged into said right vacuum chamber; and recompressor means communicating with said left and right condensing means adapted for recompressing that portion of the expanded air vapor that does not condense inside said left and right condensing means.

291. An apparatus as set forth in claim 290 wherein said recompressor means is a single cylinder, piston driven reciprocating compressor comprising:

an annular recompression cylinder having cylindrical outer walls and cylindrical inner walls such that the recompression chamber defines an annular region bounded in the lateral direction by said inner and said outer walls;

said recompression cylinder having a length approximately equal to said expansion cylinder;

mounting means whereby said expansion cylinder is mounted inside the vacant cylindrical inner portion of the annular recompression cylinder such that the outer lateral walls of said expansion cylinder are adjacent the inner lateral walls of said recompression cylinder;

thermal insulation means for thermally insulating said recompression cylinder from said expansion cylinder, and from the ambient environment;

said annular recompression cylinder having a left transverse end wall and a right transverse end wall;

a left vacuum chamber adjacent said left transverse end wall;

a right vacuum chamber adjacent said right transverse end wall;

an annular recompression piston adapted for moving back and forth between said end walls in airtight engagement inside said annular recompression cylinder which partitions said cylinder into two variable volume annular recompression subchambers, a left recompression subchamber and a right recompression subchamber bounded in the transverse direction by said left end wall and said right end wall;

means for coupling said recompression piston to said expansion piston by flexible belt means extending in airtight engagement through the end walls and into said recompression cylinder and said expansion cylinder in closed continuous loops such that when the expansion piston is forced to move back and forth inside the expansion cylinder under the pressure forces of expanding air admitted from alternating end walls, the recompression piston is simultaneously forced to move back and forth inside the recompression cylinder in opposite directions, and such that essentially all of the mechanical work generated by said expansion piston is transmitted to said recompression piston;

means for opening a passageway means between the interior of said left recompression subchamber and said left vacuum chamber when said recompression piston is substantially adjacent said left end wall;

means for opening a passageway means between the interior of said right recompression subchamber and said right vacuum chamber when said recompression piston is substantially adjacent said right end wall;

said left condensing chamber means interposed between said left vacuum chamber of said recompression cylinder and said left vacuum chamber of said expansion cylinder adapted for condensing expanded supersaturated air vapor such that any expanded air vapor entering said left vacuum chamber of the recompression cylinder must first pass through said left condensing chamber;

said right condensing chamber means interposed between said right vaccum chamber of said recompression cylinder and said right vacuum chamber of said expansion cylinder adapted for condensing expanded supersaturated air vapor such that any expanded air vapor entering said right vacuum chamber of the recompression cylinder must first pass through said right condensing chamber;

means for closing said passageway means between the interior of said left recompression subchamber and said left vacuum chamber after said recompression piston moves to the extreme right side of said recompression cylinder adjacent said right end wall and adapted for drawing noncondensed expanded air vapor from the left vacuum chamber into said left recompression subchamber and locking said vapor inside said left recompression chamber when said recompression piston is at the extreme right thereby maintaining the vacuum inside both of the left vacuum chambers and the left condensing chamber while the expansion piston is simultaneously moving toward the left and discharging the expanded air vapor into said left vacuum chambers and said left condensing chamber;

means for closing said passageway means between the interior of said right recompression subchamber and said right vacuum chamber after said recompression piston moves all the way back to the left side of the recompression cylinder thereby drawing noncondensed expanded air vapor from the right vacuum chamber into said right recompression subchamber and locking said vapor inside said right recompression subchamber while simultaneously recompressing the noncondensed air vapor locked into the left recompression subchamber; and a plurality of pressure activated one-way relief valves mounted around the end peripheries of said left and right end walls of said recompression cylinder adapted for discharging recompressed air from alternating ends of the recompression cylinder with a certain predetermined discharge pressure such that as the expansion piston is forced to move back and forth inside the expansion cylinder by the pressure forces generated by selected quantities of expanding air, the recompression piston is forced to move back and forth inside the recompression chamber in opposite directions thereby maintaining the vacuum environments of all vacuum chambers while simultaneously recompressing expanded air vapor that does not condense while passing through said condensing chambers.

292. An apparatus as set forth in claim 291 further comprising means for varying the relief pressure of said one-way relief valves such that the discharge air pressure can be controlled by varying the relief pressure of said relief valves, said pressure not exceeding approximately ambient atmospheric pressure.

293. An apparatus as set forth in claim 291 wherein the mechanical work consumed by the recompression piston while recompressing noncondensed air vapor is less than the mechanical work generated by the expansion piston by virtue of the fact that there is less air that is recompressed than is expanded and further comprising means for extracting the excess mechanical work and converting it into rotational motion of a drive shaft.

294. An apparatus as set forth in claim 293 further comprising means for converting linear reciprocating motion of said recompression piston into rotational motion of at least one drive shaft, said means comprising:

at least one rotating drive shaft extending along the length of said recompression cylinder; and coupling means between said drive shaft and said recompression piston adapted for rotating said drive shaft in one direction in response to linear displacement of said recompression piston in either direction.

295. An apparatus as set forth in claim 294 further comprising:

flexible belt means for moving the recompression piston in response to movement of said expansion piston;

means for transferring a relatively larger fraction of the energy derived from an expanding quantity of air to the expansion piston and, by said flexible belt means, to the recompression piston by rapidly accelerating both pistons and thereby giving them a relatively large amount of kinetic energy during an initial portion of the movement along the lengths of the expansion cylinder and the recompression cylinder away from their respective end walls;

means for transferring a relatively smaller fraction of the energy derived from said expanding quantity of air to both pistons during a final portion of the movement of both pistons inside their respective cylinders;

at least one drive shaft means extending along the length of the recompression cylinder; and coupling means connecting the recompression piston to the drive shaft by groove and bearing means adapted for rotating said drive shaft in response to linear displacement of said recompression piston, said groove means having a varying pitch that is relatively long over a major portion of the initial portion of the stroke and decreasing to a relatively short pitch near the end of the stroke for allowing the initial air pressure to rapidly accelerate both pistons at the beginning of their respective strokes and then to gradually decelerate the pistons thereby enabling the recompression piston to exert a substantially uniform torque on the drive shaft over a major portion of the stroke of the recompression piston, wherein the inertial mass of both pistons is utilized as a linear kinetic energy storage system during at least a portion of their respective strokes thereby allowing the recompression piston to deliver substantially uniform torque on the drive shaft while simultaneously recompressing the non-condensed air.

296. An apparatus as set forth in claim 295 wherein said varying pitch and groove means further comprises at least two separate grooves that twist around the drive shaft in opposite directions; and bearing means on said recompression piston that ride inside said grooves for applying torque to the drive shaft in the same direction while the recompression piston is forced to move back and forth inside the recompression cylinder under the driving forces of the flexible belt means that is, in turn, driven by the expansion piston moving back and forth inside the expansion cylinder under the pressure forces of expanding air slugs entering the expansion cylinder from alternating ends.

297. An apparatus as set forth in claim 291 wherein the expansion process and the recompression process are approximately isentropic.

298. An apparatus for generating mechanical work comprising:
a vacuum chamber means;
an expansion engine means having an inlet and an outlet;
passageway means connecting said vacuum chamber means to the outlet of said expansion engine means;
passageway means for introducing atmospheric air having an initial enthalpy into the inlet of said expansion engine means;
movable member means inside said expansion engine means adapted for converting a portion of said initial enthalpy of said inlet air into mechanical work by expanding said air against said movable member means;
condensing means adapted for condensing expanded air discharged into said vacuum chamber means from said expansion engine means; and
vacuum pump means adapted for maintaining a vacuum environment inside said vacuum chamber means wherein the mechanical work generated by said expansion engine means is greater than the mechanical work consumed by said vacuum pump means by virtue of the fact that the amount of gaseous air expanded into said vacuum chamber means is greater than the amount of gaseous non-condensed air removed from said vacuum chamber means by said vacuum pump means.

299. An apparatus for generating mechanical work comprising:
an expansion chamber means;
means for introducing air having an initial enthalpy into said expansion chamber;
movable member means inside said expansion chamber means adapted for converting a portion of said initial enthalpy of said air into mechanical work; and
means for condensing a portion of the expanded air at cryogenic temperatures by reducing said air to a supersaturated vapor primarily as a result of expanding said air inside said expansion chamber means.

300. An apparatus for generating mechanical work comprising:
an expansion chamber means;
means for introducing atmospheric air having an initial enthalpy into said expansion chamber means;
means for creating a pressure differential inside said expansion chamber means;
means for converting a portion of said initial enthalpy into mechanical work by expanding said air through said pressure differential maintained inside said expansion chamber means whereby a portion of said expanded air undergoes spontaneous condensation into a solid phase as a result of said expansion; and
wherein the amount of mechanical work consumed by maintaining said pressure differential is less than that generated by expanding said air by virtue of the reduced specific volume of the solidified air.

301. An apparatus for converting natural ambient thermal energy of atmospheric air into mechanical work comprising:
an expansion chamber means;
a movable member means inside said expansion chamber means;
means for introducing air at an initial pressure and an initial temperature not exceeding natural ambient atmospheric temperature;
means for maintaining a lower pressure inside a portion of said expansion chamber means relative to the initial air pressure;
means for converting a portion of the thermal energy of said air into mechanical work by expanding said air inside said expansion chamber means thereby moving said movable member means;
means for condensing a portion of the expanded air at cryogenic temperature primarily as a result of said expansion; and
means for recompressing that portion of the expanded air that does not condense.

302. An apparatus for converting natural heat energy of the ambient environment into mechanical work comprising:
- means for producing condensed air at cryogenic temperature comprising:
  - first stage expansion chamber means;
  - movable member means inside said expansion chamber means;
  - means for introducing atmospheric air into said expansion chamber means;
  - means for creating a pressure differential inside said expansion chamber means;
  - means for generating mechanical work by expanding said air inside said expansion chamber means thereby moving said movable member; and
  - means for condensing a portion of said expanded air at cryogenic temperature primarily by expanding said air with a sufficiently high expansion ratio in order to transform the air into a supersaturated metastable vapor that undergoes spontaneous condensation; and
- means for converting the thermal potential difference between said condensed air at cryogenic temperature and the natural environment at ambient temperature into additional mechanical work.

303. An apparatus as set forth in claim 302 further comprising:
- vacuum chamber means;
- means for discharging air expanded inside said expansion chamber means into said vacuum chamber means;
- condensing means adapted for condensing a portion of the expanded air discharged into said vacuum chamber means; and
- means for maintaining a vacuum inside said vacuum chamber means.

304. An apparatus as set forth in claim 303 wherein said means for maintaining a vacuum inside said vacuum chamber means comprises:
- means for removing noncondensed air from said vacuum chamber means; and
- recompressor means for recompressing said noncondensed air.

305. An apparatus as set forth in claim 302 wherein said condensed air is solidified air and wherein said means for converting said thermal potential difference into mechanical work includes:
- means for utilizing said solidified air as a low temperature heat sink for a second stage closed cycle condensing heat engine;
- said second stage engine having a cryogenic working fluid with a critical temperature below the natural temperature of the ambient environment; and
- means for utilizing the natural heat energy of the ambient environment as the high temperature heat reservoir for said second stage engine.

306. An apparatus as set forth in claim 305 further comprising:
- a low temperature second stage condensing means;
- means for introducing said solidified air into said condensing means;
- means for introducing expanded second stage vapor into said second stage condensing means in heat exchange relationship with said solidified air such that said solidified air is heated and melted to liquefied air by absorbing latent heat of condensation from said expanded second stage vapor thereby condensing said vapor to liquefied cryogenic working fluid;
- compressing means for compressing said liquefied second stage cryogenic working fluid;
- second stage ambient heat exchanger means maintained in thermal contact with the natural environment;
- means for introducing said compressed liquefied second stage cryogenic working fluid into said second stage ambient heat exchanger means for vaporizing and heating said fluid to a compressed superheated gas by extracting and absorbing ambient heat energy from the natural environment;
- expansion means adapted for converting said ambient heat energy absorbed from the natural environment into mechanical work; and
- means for reintroducing expanded second stage working fluid vapor back into said second stage condensing means in a closed cycle.

307. An apparatus as set forth in claim 306 wherein said second stage closed cycle cryogenic engine comprises:
- means for withdrawing liquefied second stage working fluid from said second stage condenser;
- means for compressing said liquefied second stage working fluid withdrawn from said condenser to a relatively high pressure by cryogenic compressor means;
- a plurality of second stage ambient heat exchangers maintained in thermal contact with the ambient environment adapted for heating compressed low temperature second stage working fluid by absorbing natural heat energy from the environment;
- a like plurality of serially connected second stage expanders with said second stage ambient heat exchangers interposed between adjacent expanders and adapted for converting the natural ambient heat energy absorbed by said second stage working fluid circulating through said heat exchangers into additional mechanical work; and
- means for recycling the expanded second stage working fluid discharged from the last expander of said serially connected second stage expanders back into said second stage condenser where it is reliquefied and whereby the above steps are repeated in a closed cycle process.

308. An apparatus as set forth in claim 306 further comprising:
- means for withdrawing liquefied air from said second stage condensing means; and
- means for converting the termal potential difference between said liquefied air at cryogenic temperature and the natural environment at ambient temperature into additional mechanical work by third stage cryogenic engine means.

309. An apparatus as set forth in claim 308 wherein said third stage cryogenic engine means comprises:
- compressing means for compressing said liquified air at cryogenic temperature;
- third stage ambient heat exhanger means maintained in thermal contact with the natural environment;
- means for introducing said compressed liquefied air into said third stage ambient heat exchanger means for vaporizing and heating said fluid to compressed gaseous air by extracting and absorbing ambient heat energy from the natural environment; and third stage expansion means adapted for converting said ambient heat energy absorbed from the natural environment into mechanical work.

310. An apparatus as set forth in claim 309 wherein said third stage cryogenic engine further comprises:
means for compressing said liquefied air to a high working pressure significantly above ambient atmospheric pressure;
a plurality of third stage ambient heat exchangers maintained in thermal contact with the ambient environment adapted for heating compressed low temperature air by absorbing natural thermal energy from the ambient environment;
a like plurality of serially connected third stage expanders with said third stage ambient heat exchangers interposed between adjacent expanders and adapted for converting the natural ambient heat energy absorbed by the compressed low temperature air circulating through said heat exchangers into additional mechanical work; and
means for recycling the expanded air discharged from the last, third stage expander, back into said first stage expander.

311. An apparatus as set forth in claim 310 wherein said air discharged from the last, third stage expander has a temperature significantly below ambient atmospheric temperature and a pressure about equal to ambient atmospheric pressure and wherein said recycling means comprises:
means for mixing said recycled air discharged from the last, third stage expander, with a portion of new air drawn from the open atmosphere before injecting said recycled air back into said first stage expander; and
means for conveying said air mixture back into said first stage expander.

312. An apparatus as set forth in claim 311 further comprising means for precooling said new air taken from the open atmosphere before mixing it with said cold recycled air, said precooling means comprising:
thermally insulated subambient heat exchanger means adapted for precooling said new air;
thermally insulated conduit means adapted for drawing new air from the open atmosphere and feeding it into said heat exchanger means;
thermally insulated conduit means adapted for conveying compressed third stage low temperature air discharged from at least some of said third stage expanders, other than the last third stage expander, into said subambient heat exchanger for circulation through said subambient heat exchanger in heat exchange relationship with said new air drawn from the open atmosphere thereby cooling said new air to a subambient temperature while simultaneously heating third stage air;
conduit means adapted for conveying said third stage air from said subambient heat exchanger means to said third stage ambient heat exchangers;
means for mixing said precooled new air with said cold recycled air;
thermally insulated conduit means adapted for conveying said precooled new air from said subambient heat exchanger to said mixing means;
thermally insulated conduit means adapted for conveying cold recycled air discharged from the last expander of said third stage to said mixing means where it is mixed with said precooled new air; and
thermally insulated conduit means adapted for conveying said mixed air from said mixing means into said first stage expander.

313. An apparatus as set forth in claim 307 further comprising means for precooling said noncondensed air before it is recompressed back to ambient atmospheric pressure comprising:
means for recompressing said noncondensed air to some intermediate pressure below ambient atmospheric pressure such that the corresponding temperature is above the discharge temperatures of all of the second stage expanders;
thermally insulated subambient heat exchanger means adapted for cooling said partially recompressed noncondensed air;
thermally insulated conduit means adapted for conveying said partially recompressed air from said partial recompressor means into said subambient heat exchanger means;
thermally insulated conduit means adapted for conveying compressed second stage low temperature working fluid discharged from at least some of said second stage expanders, other than the last second stage expander, into said subambient heat exchanger for circulation through said subambient heat exchanger in heat exchange relationship with said partially recompressed noncondensed air thereby cooling said partially recompressed air to a lower temperature while simultaneously heating said second stage working fluid;
conduit means adapted for conveying said second stage working fluid from said subambient heat exchanger to said second stage ambient heat exchangers;
means for compressing the precooled partially recompressed noncondensed air up to ambient atmospheric pressure inside a second recompressor;
thermally insulated conduit means adapted for conveying said precooled partially recompressed air from said subambient heat exchanger, to said second recompressor where it is compressed back to ambient atmospheric pressure; and
exhaust conduit means connected to said second recompressor adapted for discharging said noncondensed air back into the open atmosphere.

314. An apparatus as set forth in claim 307 further comprising:
means for withdrawing said liquefied second stage working fluid from said second stage condensing means; and
means for circulating said cryogenic working fluid around a portion of the external walls of said first stage expansion chamber means and vacuum chamber means inside a cryogenic jacket means adapted for providing a cryogenic external environment for said first stage expansion chamber and vacuum chamber means before said working fluid is compressed inside said second stage compressor means.

315. An apparatus as set forth in claim 310 further comprising:
means for withdrawing said liquefied air from said second stage condensing means;
means for circulating said liquefied air around a portion of the external walls of said first stage expansion chamber and vacuum chamber means inside a cryogenic Dewar jacket means adapted for providing a cryogenic external environment for said first stage expansion chamber and vacuum chamber means before said liquefied air is compressed inside said third stage liquefied air compressor means.

316. An apparatus as set forth in claim 310 wherein said second and said third stage compressors compress the liquefied working fluids to about 300 Atm before feeding said cryogenic fluids into said second and third stage ambient heat exchangers.

317. An apparatus as set forth in claim 310 further comprising at least one pressure vessel means interposed between one of said ambient heat exchangers and its adjacent downstream expander adapted for accumulating and temporarily storing heated compressed gas before expanding said gas for load leveling and as a source of instant stored energy that can be released by expanding said stored compressed gas in said adjacent expander for generating instant mechanical power.

318. An apparatus as set forth in claim 310 further comprising means for removing accumulated condensates from the exterior surface of at least one second stage ambient heat exchanger to maintain the thermal transfer efficiency thereof.

319. An apparatus as set forth in claim 310 further comprising:
 means for removing accumulated condensates from the exterior surface of at least one ambient heat exchanger; and
 means for utilizing the thermal potential difference between said low temperature condensates and the natural ambient environment to generate additional mechanical work.

320. An apparatus as set forth in claim 310 further comprising:
 means for removing accumulated condensates from the exterior surface of at least one ambient heat exchanger; and
 means for utilizing said low temperature condensates as a subambient coolant.

321. An apparatus for manufacturing liquefied air comprising:
 an expansion chamber means having an inlet and an outlet;
 a vacuum chamber means communicating with the outlet of said expansion chamber means;
 movable member means inside said expansion chamber means;
 means for introducing atmospheric air into the inlet of said expansion chamber means;
 means for extracting thermal energy from said air and converting it into mechanical work by expanding said air through said expansion chamber means thereby moving said movable member means;
 condensing means communicating with said vacuum chamber means adapted for condensing a portion of the expanded air discharged into said vacuum chamber means; and
 means for maintaining a vacuum inside said vacuum chamber means.

322. An apparatus as set forth in claim 321 wherein the air is expanded with an expansion ratio exceeding approximately 100.

323. An apparatus as set forth in claim 321 whereby the amount of thermal energy extracted from the air by expanding the air into said vacuum chamber means is sufficient for reducing the air to a supersaturated metastable vapor, a portion of which undergoes spontaneous solidification into the solid phase inside said condensing means essentially without having to remove any latent heat of condensation.

324. An apparatus as set forth in claim 321 further comprising means for insulating said expansion chamber, vacuum chamber and said condensing means from the ambient environment.

325. An apparatus as set forth in claim 321 wherein the expansion process is approximately isentropic.

326. An apparatus as set forth in claim 321 futher comprising means for precooling said air before said expansion for enhancing said condensation.

327. An apparatus as set forth in claim 326 wherein said means for precooling said pre-expanded air comprises heat exchanger means maintained in thermal contact with a heat absorbing medium with a subambient temperature.

328. An apparatus as set forth in claim 321 further comprising means for maintaining a portion of the external walls of said expansion chamber means, vacuum chamber means and condensing means at cryogenic temperatures for enhancing said condensation.

329. An apparatus as set forth in claim 328 wherein said means for maintaining said external walls of said expansion chamber at cryogenic temperatures comprises Dewar jacket means surrounding said external walls containing cryogenic liquefied gas in direct thermal contact with said walls.

330. An apparatus as set forth in claim 321 further comprising means for varying the expansion ratio of said expansion chamber while said movable member is moving.

331. An apparatus as set forth in claim 330 further comprising means for increasing or decreasing the condensation ratio of said expanding air by increasing or decreasing the expansion ratio respectively.

332. An apparatus as set forth in claim 321 further comprising air filtration means for removing solid particles from the air before said air is expanded.

333. An apparatus as set forth in claim 321 wherein said means for maintaining said vacuum inside said vacuum chamber means comprises:
 means for removing noncondensed air from said vacuum chamber and said condensing means by pressure differential means;
 means for recompressing said noncondensed air back to ambient atmospheric pressure; and
 means for discharging said recompressed noncondensed air back into the open atmosphere.

334. An apparatus as set forth in claim 333 wherein the mechanical work used to recompress the noncondensed air is supplied by the mechanical work generated by expanding air inside said expansion chamber means.

335. An apparatus as set forth in claim 333 wherein said recompressing means comprises:
 a primary recompressor means adapted for recompressing the noncondensed air to some intermediate pressure below ambient atmospheric pressure;
 means for cooling said partially recompressed air; and
 secondary recompressor means adapted for compressing the partially recompressed noncondensed air back to ambient atmospheric pressure after said air is cooled by said cooling means.

336. An apparatus as set forth in claim 335 wherein said cooling means comprises:
 heat exchanger means;
 means for circulating said partially recompressed air through said heat exchanger means; and
 means for circulating a low temperature heat absorbing medium at a subambient temperature through said heat exchanger means in heat exchange relationship with said partially recompressed air.

337. An apparatus as set forth in claim 335 wherein the primary recompressor means recompresses the noncondensed air to a pressure where the corresponding temperature is above ambient temperature and wherein said cooling means comprises:
heat exchanger means maintained in thermal contact with the ambient environment; and
means for circulating said partially recompressed air through said heat exchanger means whereby said partially recompressed air is cooled to about ambient temperature.

338. An apparatus as set forth in claim 321 wherein the initial air pressure prior to said expansion is approximately equal to ambient atmospheric pressure.

339. An apparatus as set forth in claim 321 further comprising means for precompressing said air to a pressure above ambient atmospheric pressure prior to said expansion for enhancing said condensation.

340. An apparatus as set forth in claim 321 wherein sufficient thermal energy is extracted from the air by said expansion means to reduce the expanded air to a supersaturated metastable vapor at cryogenic temperatures below the triple point of air such that a portion of said supersaturated cryogenic vapor undergoes spontaneous solidification into the solid phase while passing through said condensing means.

341. An apparatus as set forth in claim 340 further comprising means for melting said solidified air into liquefied air by absorbing heat energy.

342. An apparatus as set forth in claim 341 wherein said means for melting said solidified air into liquefied air comprises means for utilizing said solidified air as a cryogenic heat sink for a second stage closed cycle condensing cryogenic engine operating between said low temperature heat sink and the natural environment at ambient temperature.

343. An apparatus as set forth in claim 341 wherein said means for melting said solidified air comprises:
a second stage closed cycle cryogenic engine utilizing a condensing cryogenic working fluid vaporizable at ambient temperature;
a cryogenic heat exchanger means;
means for introducing said solidified air into said cryogenic heat exchanger means;
means for introducing expanded second stage cryogenic working fluid vapor with a temperature above said solidified air into said heat exchanger means in heat exchange relationship with said solidified air such that the colder solidified air extracts and absorbs latent heat of condensation from said expanded second stage vapor thereby condensing said vapor to liquefied cryogenic second stage working fluid while the solidified air is simultaneously melted to liquefied air at a higher temperature;
means for withdrawing said liquefied cryogenic second stage working fluid from said cryogenic heat exchanger means; and
means for withdrawing said liquefied air from said cryogenic heat exchanger means.

344. An apparatus as set forth in claim 343 wherein said cryogenic heat exchanger means is utilized as a second stage condenser for said second stage engine further comprising:
cryogenic insulation means for insulating said second stage condenser from the ambient environment such that essentially all of the heat absorbed by the condensed low temperature air passing through the condenser is latent heat of condensation extracted from the expanded second stage working fluid vapor; and
means for controlling the relative mass flow ratio between the solidified air and the expanded second stage vapor entering said condenser such that essentially all of the expanded vapor is liquefied and all of the solidified air is melted while passing through said condenser.

345. An apparatus as set forth in claim 343 wherein the solidified air is solidified air crystals further comprising means for compressing said solidified air crystals to some relatively low initial pressure before introducing said solidified air crystals into said second stage condenser.

346. An apparatus as set forth in claim 343 wherein said second stage closed cycle cryogenic engine comprises:
means for compressing said liquefied second stage working fluid withdrawn from said second stage condenser to a relatively high initial working pressure by a cryogenic compressor means;
a plurality of second stage ambient heat exchangers maintained in thermal contact with the ambient environment adapted for heating compressed low temperature second stage working fluid by absorbing natural heat energy from the environment;
a like plurality of serially connected second stage expanders with said second stage ambient heat exchangers interposed between adjacent expanders and adapted for converting the natural ambient heat energy absorbed by said second stage working fluid circulating through said heat exchangers into additional mechanical work; and
means for recycling the expanded second stage working fluid discharged from the last expander of said serially connected second stage expanders back into said second stage condenser where it is reliquefied and whereby the above steps are repeated in a closed cycle process.

347. An apparatus as set forth in claim 346 wherein the initial working pressure is on the order of 300 Atm.

348. An apparatus as set forth in claim 346 further comprising means for circulating a portion of said liquefied second stage working fluid through a double walled jacket means surrounding said first stage expansion chamber means, vacuum chamber means, and condensing means for providing a cryogenic external environment for said means before compressing said second stage working fluid to its high initial pressure.

349. An apparatus as set forth in claim 346 wherein the outlet gas temperatures of all second stage expanders is significantly below ambient and further comprising means for utilizing the expanded gas discharged from all of said expanders, except the last expander, as a heat sink for precooling the air drawn from the open atmosphere to a subambient temperature before said air is expanded in order to enhance the condensation.

350. An apparatus as set forth in claim 349 wherein said precooling means comprises:
a heat exchanger means;
means for circulating air drawn from the open atmosphere through said heat exchanger means;
means for circulating cold subambient gas discharged from at least one second stage expander, not including the last second stage expander, through said heat exchanger means in heat exchange relationship with said air thereby cooling said air to a subambient temperature;

means for withdrawing said precooled air and introducing said air into said expansion chamber for expansion; and means for withdrawing said coolant gas from said heat exchanger means and introducing said gas into the second stage ambient heat exchanger downstream from said second stage expander.

351. An apparatus as set forth in claim 350 further comprising means for insulating said heat exchanger from the ambient environment such that essentially all of the heat absorbed by said cold second stage working fluid is taken from the air circulating through said heat exchanger.

352. An apparatus as set forth in claim 346 further comprising means for cooling partially recompressed noncondensed air before said air is completely recompressed, said means comprising:

a heat exchanger means;

means for circulating partially recompressed noncondensed air through said heat exchanger means;

means for circulating cold subambient gas discharged from at least one second stage expander, not including the last second stage expander, through said heat exchanger means in heat exchange relationship with said air thereby cooling said partially recompressed noncondensed air;

means for withdrawing said cooled partially recompressed noncondensed air from said heat exchanger means so that it can be completely recompressed to ambient atmospheric pressure; and means for withdrawing said second stage coolant gas from said heat exchanger means and introducing in into said second stage ambient heat exchangers.

353. An apparatus as set forth in claim 346 further comprising at least one pressure vessel means interposed between one of said second stage ambient heat exchangers and its adjacent downstream expander adapted for accumlating and temporarily storing heated compressed gas before expanding said gas for load leveling and as a source of instant stored energy that can be released by expanding said stored compressed gas in said adjacent expander for generating instant mechanical power.

354. An apparatus as set forth in claim 346 further comprising means for removing accumulated condensates from the exterior surface of at least one second stage ambient heat exchanger to maintain the thermal transfer efficiency thereof.

355. An apparatus as set forth in claim 346 further comprising:

means for removing accumulated condensates from the exterior surface of at least on ambient heat exchanger; and means for utilizing the thermal potential difference between said low temperature condensates and the natural environment to generate additional mechanical work.

356. An apparatus as set forth in claim 346 further comprising:

means for removing accumulated condensates from the exterior surface of at least one ambient heat exchanger; and means for utilizing said low temperature condensates as a subambient coolant.

357. An apparatus as set forth in claim 346 wherein said second stage working fluid is oxygen.

358. An apparatus as set forth in claim 321 wherein said condensing means comprises:

a plurality of parallel cylindrical double walled thermally conductive condensing tubes mounted adjacent said expansion chamber and adapted for receiving expanded air discharged from said expansion chamber;

means for introducing and circulating a partially compressed liquefied cryogenic coolant inside the annular region surrounding each double walled condensing tube thereby maintaining the interior tube walls at a temperature slightly below that of the expanded supersaturated air vapor entering said tubes from said expansion chamber such that when expanded metastable air moleculles enter said tubes and collide with said interior walls they solidify on said walls where said walls become condensing surfaces; and means for removing solidified air from the interior walls of said condensing tubes.

359. An apparatus was set forth in claim 358 wherein said solidified air removal means comprises:

a rotating screw means having an inner scraping edge and an outer edge mounted inside and extending along the longitudinal axis of each condensing tube;

means for maintaining the inner scraping edge of said screw means in a noncontacting spaced apart relationship with the interior wall surface of said condensing tube; and means for rotating said screws such that when said screws are rotated, an outer layer of solidified air is scraped off the interior wall surface of each tube and transferred to one end of the tubes while leaving an inner layer adjacent said walls undisturbed, said inner layers providing condensing surfaces for a new layer of solidified air while simultaneously providing thermal insulation for said liquefied cryogenic coolant inside and annular regions such that said condensation results primarily from spontaneous condensation of supersaturated metastable air molecules due to overexpansion rather than heat transfer to the liquefied cryogen by absorbing latent heat of condensation.

360. An apparatus as set forth in claim 359 including compressing means for compressing said solidified air crystals comprising:

a plurality of parallel thermally insulated cylindrical compression tubes containing solidified air crystals;

a rotating screw means having an inner scraping edge and no outer edge mounted inside and extending along the longitudinal axis of said compressor tubes;

means for maintaining the scraping edge of said screw means in contact relationship with the interior tube wall surface; and means for rotating said screws such that when said screws are rotated, the solidified air crystals are scraped off said walls and forced to move inside said tubes and become compressed, said rotating screws becoming screw compressors.

361. An apparatus as set forth in claim 360 further comprising cryogenic heat exchanger means for melting said solidified air crystals into liquefied air by absorbing heat energy at a low temperature.

362. An apparatus as set forth in claim 361 wherein said melting means comprises means for utilizing said solidified air as a cryogenic heat sink for a second stage closed cycle condensing cryogenic engine operating between said low temperature heat sink and the natural environment at ambient temperature.

363. An apparatus as set forth in claim 362 wherein said cryogenic heat exchanger means for melting said compressed solidified air crystals is a second stage condenser means adapted for condensing a second stage cryogenic working fluid comprising:
  thermally conductive second stage condensing tubes attached to the ends of said thermally insulated solid phase compressor tubes, the beginning of said tubes conveying solidified air crystals at approximately ambient atmospheric pressure;
  a second stage condensing chamber means containing said thermally conductive condensing solidified air tubes;
  thermal insulation means for insulating said condensing chamber means from the ambient environment;
  means for introducing expanded second stage working fluid vapor into said condensing chamber means wherein said vapor is in thermal contact with said solidified air crystals such that said vapor is condensed to a cryogenic liquid by transferring latent heat of condensation to the colder solidified air crystals whereby said solidified air crystals are simultaneously melted and heated to liquid air;
  means for withdrawing said liquefied second stage working fluid from said second stage condenser; and
  means for withdrawing said liquefied air from said second stage condenser.

364. An apparatus as set forth in claim 363 further comprising means for varying the mass flow ratio between the solidified air crystals and said second stage cryogenic working fluid passing in heat exchange relation through said second stage condensing means thereby controlling the outlet temperature of said condensed second stage working fluid and said melted and heated liquefied air.

365. An apparatus as set forth in claim 346 further comprising means for varying the output pressure of said second stage compressor.

366. An apparatus as set forth in claim 346 further comprising means for varying the pressure ratios of at least some of the second stage expanders.

367. An apparatus as set forth in claim 346 wherein all of the expanders and the compressor of said second stage engine are approximately isentropic, and wherein all of the heat exchangers are approximately isobaric.

368. An apparatus as set forth in claim 321 wherein said expansion chamber means is an axial flow low pressure expansion turbine comprising:
  a circular expansion chamber means with a gradually increasing radius along the direction of flow and a longitudinal central axis of symmetry;
  a turbine drive shaft mounted inside said circular expansion chamber along said longitudinal central axis of symmetry;
  an expansion turbine mounted on said drive shaft means adapted for rotation inside said expansion chamber having an inlet and an outlet, said expansion turbine comprising at least one spiralling expansion blade mounted along the length of said drive shaft with increasing radius and in continuous airtight sealing engagement with the inside walls of said circular expansion chamber;
  means for introducing atmospheric air into said inlet;
  means for maintaining a partial vacuum at the outlet of said expansion turbine; and
  drive train means connected to said rotating drive shaft adapted for extracting mechanical work derived from expanding air via pressure differentials across said expansion turbine blade resulting from the expansion process thereby generating rotational torque of said drive shaft.

369. An apparatus as set forth in claim 368 further comprising means for thermally insulating said expansion chamber from the ambient environment.

370. An apparatus as set forth in claim 368 further comprising means for maintaining the external walls of the expansion chamber at cryogenic temperatures for reducing heat transfer into the expanding air during the expansion process thereby rendering the expansion approximately isentropic.

371. An apparatus as set forth in claim 370 wherein said means for maintaining said expansion chamber walls at cryogenic temperatures comprises Dewar jacket means surrounding said walls containing circulating liquefied gas at cryogenic temperatures in direct thermal contact with said external walls.

372. An apparatus as set forth in claim 368 further comprising means for varying the expansion ratio of said expansion chamber means while said expansion turbine is rotating.

373. An apparatus as set forth in claim 368 wherein the cross sectional outlet area perpendicular to said central axis is approximately 300 times greater than the inlet area such that the expansion ratio of said expander is approximately 300.

374. An apparatus as set forth in claim 373 further comprising an annular air-inlet duct with an outer radius perpendicular to said central axis that is greater than the radius of said drive shaft and with an inner radius approximately equal to said drive shaft radius, and further comprising an annular air-outlet duct with an inner radius approximately equal to said drive shaft radius and an outer radius significantly greater than said inner radius.

375. An apparatus as set forth in claim 374 further comprising an air conduit means connected to said annular air-inlet duct and means for varying the radius of said conduit for isobarically varying the mass flow rate of air flowing into said turbine expansion chamber for varying the expansion ratio.

376. An apparatus as set forth in claim 368 further comprising a vacuum chamber means mounted at the outlet end of said expansion turbine such that the expanded air vapor is discharged from the outlet of said turbine directly into said vacuum chamber.

377. An apparatus as set forth in claim 376 further comprising:
  condensing means mounted adjacent to said vacuum chamber means and adapted for condensing a portion of the expanded air vapor discharged into said vacuum chamber from said expansion turbine; and
  recompressor means communicating with said condensing means and adapted for recompressing that portion of the expanded air vapor that does not condense inside said condensing means.

378. An apparatus as set forth in claim 377 wherein said recompressor means is an axial flow, low pressure recompression turbine comprising:

a circular recompression chamber means with a gradually decreasing radius along the direction of flow and a longitudinal central axis of symmetry;

a turbine drive shaft mounted inside said circular recompression chamber along said longitudinal central axis of symmetry;

a recompression turbine mounted on said drive shaft means adapted for rotation inside said recompression chamber having an inlet and an outlet, said recompression turbine comprising at least one spiralling compression blade mounted along the length of said drive shaft with decreasing radius and in continuous airtight sealing engagement with the inside walls of said circular recompression chamber such that when said blade is rotated, gaseous air vapor at the inlet is drawn into said recompression chamber and recompressed to some discharge pressure at the outlet; and drive train means connecting the drive shaft of said expansion turbine to the drive shaft of said recompression turbine adapted for rotating said recompression turbine by mechanical work generated from said expansion turbine.

379. An apparatus as set forth in claim 378 further comprising a pressure activated one-way relief valve mounted on said outlet end of said recompression turbine and means for varying the relief pressure of said one-way relief valve such that the discharge air pressure can be controlled by varying the relief pressure of said relief valve.

380. An apparatus as set forth in claim 321 wherein said expansion chamber means is a single cylinder, piston driven reciprocating expander comprising:

an expansion cylinder having a left transverse end wall and a right transverse end wall;

an expansion piston moving in airtight engagement inside said expansion cylinder which partitions said expansion cylinder into two variable volume subchambers, a left subchamber and a right subchamber bounded in the transverse direction by said left end wall and said right end wall and by the expansion piston which moves back and forth between said end walls;

a left vacuum chamber adjacent said left transverse end wall;

a right vacuum chamber adjacent said right transverse end wall;

means for opening a passageway means between the interior of said right subchamber and said right vacuum chamber when said expansion piston is substantially adjacent said left end wall;

means for introducing a selected quantity of air into the left subchamber when said expansion piston is substantially adjacent said left end wall for establishing a pressure differential across the expansion piston between the left subchamber and the right subchamber;

means for converting a portion of the initial enthalpy of said selected quantity of air into mechanical work by expanding said air against said expansion piston thereby moving said expansion piston towards the right end wall and generating mechanical work;

means for opening a passageway means between the interior of said left subchamber and said left vacuum chamber when said expansion piston is substantially adjacent said right end wall;

means for introducing a second quantity of air into the right subchamber when said expansion piston is substantially adjacent said right end wall for establishing a new pressure differential across said piston between the right subchamber and the left subchamber when the first quantity of air is at maximum expansion;

means for converting a portion of the initial enthalpy of said second quantity of air into mechanical work by expanding said air against said expansion piston thereby moving said expansion piston back toward the left end wall in a return stroke and generating additional mechanical work while the first expanded quantity of air inside the left subchamber is discharged into said left vacuum chamber;

means for reopening said passageway means between the interior of said right subchamber and said right vacuum chamber when said expansion piston is substantially adjacent said left end wall;

means for introducing a third quantity of air into the left subchamber when said expansion piston is substantially adjacent said left end wall for establishing another pressure differential across said expansion piston between the left subchamber and the right subchamber after the first quantity of air is discharged from said left subchamber and when said second quantity of air inside the right subchamber is at maximum expansion for a repeat of the above cycle;

means for maintaining a vacuum inside both left and right vacuum chambers; and means for transmitting said mechanical work generated by said expansion piston out of said expansion cylinder.

381. An apparatus as set forth in claim 380 further comprising means for thermally insulating said expansion cylinder and said vacuum chambers from the ambient environment.

382. An apparatus as set forth in claim 380 further comprising means for maintaining the external walls of said expansion cylinder and said vacuum chambers at cryogenic temperatures for reducing heat transfer into the expanded air for rendering the expansion process approximately isentropic.

383. An apparatus as set forth in claim 382 wherein said means for maintaining the external walls of said expansion cylinder and said vacuum chambers at cryogenic temperatures comprises Dewar jacket means surrounding said walls containing circulating liquefied gas at cryogenic temperatures in direct contact with said external walls.

384. An apparatus as set forth in claim 380 further comprising means for varying the initial pressure of the air prior to expansion.

385. An apparatus as set forth in claim 380 wherein the expansion ratio of said expansion cylinder is on the order of 300.

386. An apparatus as set forth in claim 380 wherein said means for introducing a selected quantity of air into the expansion cylinder subchambers comprises:

a plurality of air-inlet ports passing through each transverse end wall;

a shutter mechanism mounted across each end wall adapted for opening and closing said air-inlet ports;

a sensor means for sensing the linear displacement of said expansion piston inside said expansion cylinder;

means for moving said air-inlet shutters by mechanical actuators mounted adjacent said shutters in response to control commands received from said sensor means and adapted for opening said air-inlet ports when said expansion piston is adjacent said ports, and closing said ports when said expansion piston moves a predetermined distance away from said ports; and control means for varying said predetermined distance when said ports are closed thereby providing a means for varying the expansion ratio of said expander.

387. An apparatus as set forth in claim 380 further comprising:

a left condensing means mounted adjacent said left vacuum chamber and adapted for condensing a portion of the expanded air vapor discharged into said left vacuum chamber;

a right condensing means mounted adjacent said right vacuum chamber and adapted for condensing a portion of the expanded air vapor discharged into said right vacuum chamber; and recompressor means communicating with said left and right condensing means adapted for recompressing that portion of the expanded air vapor that does not condense inside said left and right condensing means.

388. An apparatus as set forth in claim 387 wherein said recompressor means is a single cylinder, piston driven reciprocating compressor comprising:

an annular recompression cylinder having cylindrical outer walls and cylindrical inner walls such that the recompression chamber defines an annular region bounded in the lateral direction by said inner and said outer walls;

said recompression cylinder having a length approximately equal to said expansion cylinder;

mounting means whereby said expansion cylinder is mounted inside the vacant inner cylindrical region of the annular recompression cylinder such that the outer lateral walls of said expansion cylinder are adjacent the inner lateral walls of said recompression cylinder;

thermal insulation means for thermally insulating said recompression cylinder from said expansion cylinder, and from the ambient environment;

said annular recompression cylinder having a left transverse end wall and a right transverse end wall;

a left vacuum chamber adjacent said left transverse end wall;

a right vacuum chamber adjacent said right transverse end wall;

an annular recompression piston adapted for moving back and forth between said end walls in airtight engagement inside said annular recompression cylinder which partitions said cylinder into two variable volume annular recompression subchambers, a left recompression subchamber and a right recompression subchamber bounded in the transverse direction by said left end wall and said right end wall;

means for coupling said recompression piston to said expansion piston by flexible belt means extending in air tight engagement through the end walls and into said recompression cylinder and said expansion cylinder in closed continuous loops such that when the expansion piston is forced to move back and forth inside the expansion cylinder under the pressure forces of expanding air admitted for alternating end walls, the recompression piston is simultaneously forced to move back and forth inside the recompression cylinder in opposite directions, and such that essentially all of the mechanical work generated by said expansion piston is transmitted to said recompression piston;

means for opening a passageway means between the interior of said left recompression subchamber and said left vacuum chamber when said recompression piston is substantially adjacent said left end wall;

means for opening a passageway means between the interior of said right recompression subchamber and said right vacuum chamber when said recompression piston is substantially adjacent and right end wall;

said left condensing chamber means interposed between said left vacuum chamber of said recompression cylinder and said left vacuum chamber of said expansion cylinder adapted for condensing expanded supersaturated air vapor such that any expanded air vapor entering said left vacuum chamber of the recompression cylinder must first pass through said left condensing chamber;

said right condensing chamber means interposed between said right vacuum chamber of said recompression cylinder and said right vacuum chamber of said expansion cylinder adapted for condensing expanded supersaturated air vapor such that any expanded air vapor entering said right vacuum chamber of the recompression cylinder must first pass through said right condensing chamber;

means for closing said passageway means between the interior of said left recompression subchamber and said left vacuum chamber after said recompression piston moves all the way to the extreme right side of said recompression cylinder adjacent said right end wall and adapted for drawing noncondensed expanded air vapor from the left vacuum chamber into said left recompression subchamber and locking said vapor inside said left recompression chamber when said recompression piston is at the extreme right thereby maintaining the vacuum inside both of the left vacuum chambers and the left condensing chamber while the expansion piston is simultaneously moving toward the left and discharging the expanded air vapor into said left vacuum chambers and said left condensing chamber;

means for closing said passageway means between the interior of said right recompression subchamber and said right vacuum chamber after said recompression piston moves all the way back to the left side of the recompression cylinder thereby drawing noncondensed expanded air vapor from the right vacuum chamber into said right recompression subchamber and locking said vapor inside said right recompression chamber while simultaneously recompressing the noncondensed air vapor locked into the left recompression chamber; and a plurality of pressure activated one-way relief valves mounted around the end peripheries of said left and right end walls of the recompression cylinder adapted for discharging recompressed air from alternating ends of the recompression cylinder with a certain predetermined discharge pressure such that as the expansion piston is forced to move back and forth inside the expansion cylinder by the pressure forces generated by selected quantities of expanding air, the recompression piston is forced to move back and forth inside the recompression piston in opposite directions thereby maintaining the vacuum environments of all vacuum chambers while simultaneously recompressing expanded air vapor that does not condense while passing through said condensing chambers.

389. An apparatus as set forth in claim 388 further comprising means for varying the relief pressure of said one-way relief valves such that the discharge air pressure can be controlled by varying the relief pressure of said relief valves, said pressure not exceeding approximately ambient atmospheric pressure.

390. An apparatus as set forth in claim 388 wherein the mechanical work consumed by the recompression piston while recompressing noncondensed air vapor is less than the mechanical work generated by the expansion piston by virtue of the fact that there is less air that is recompressed than is expanded and further comprising means for extracting the excess mechanical output work and converting it into rotational motion of a drive shaft.

391. An apparatus as set forth in claim 390 further comprising means for converting linear reciprocating motion of said recompression piston into rotational motion of at least one drive shaft, said means comprising:
at least one rotating drive shaft extending along the length of said recompression cylinder; and
coupling means between said drive shaft and said recompression piston adapted for rotating said drive shaft in one direction in response to linear displacement of said recompression piston in either direction.

392. An apparatus as set forth in claim 391 further comprising:
flexible belt means for moving the recompression piston in response to movement of said expansion piston;
means for transferring a relatively larger fraction of the energy derived from an expanding quantity of air to the expansion piston and, by virtue of said flexible belt means, to the recompression piston by raidly accelerating both pistons and thereby giving them a relatively large amount of kinetic energy during an initial portion of the movement along the legnth of the expansion cylinder and the recompression cylinder away from their respective end walls;
means for transferring a relatively smaller fraction of the energy derived from said expanding quantity of air to both pistons during a final portion of the movement of both pistons inside their respective cylinders;
at least one drive shaft means extending along the length of the recompression cylinder; and
coupling means connecting the recompression piston to the drive shaft by groove and bearing means adapted for rotating said drive shaft in response to linear displacement of said recompression piston, said groove means having a varying pitch that is relatively long over a major portion of the initial portion of the stroke and decreasing to a relatively short pitch near the end of the stroke for allowing the initial air pressure to rapidly accelerate both pistons at the beginning of their respective strokes and then to gradually decelerate the pistons thereby enabling the recompression piston to exert a substantially uniform torque on the drive shaft over a major portion of the stroke of the recompression piston, wherein the inertial mass of both pistons is utilized as a linear kinetic energy storage system during at least a portion of their respective strokes thereby allowing the recompression piston to deliver substantially uniform torque on the drive shaft while simultaneously recompressing the noncondensed air.

393. An apparatus as set forth in claim 392 wherein said varying pitch and groove means further comprises at least two separate grooves that twist around the drive shaft in opposite directions; and
bearing means on said recompression piston that ride inside said grooves for applying torque to the drive shaft in the same direction while the recompression piston is forced to move back and forth inside the recompression cylinder under the driving forces of the flexible belt means that is, in turn, driven by the expansion piston moving back and forth inside the expansion cylinder under the pressure forces of expanding air entering the expansion cylinder from alternating ends.

394. An apparatus as set forth in claim 388 wherein the expansion and recompression processes are approximately isentropic.

* * * * *